(12) United States Patent
Cook et al.

(10) Patent No.: US 7,357,190 B2
(45) Date of Patent: Apr. 15, 2008

(54) RADIAL EXPANSION OF TUBULAR MEMBERS

(75) Inventors: Robert Lance Cook, Katy, TX (US); Richard Carl Haut, The Woodlands, TX (US); Lev Ring, Houston, TX (US); Thomas Patrick Grant, III, Houston, TX (US); Edwin Arnold Zwald, Jr., Houston, TX (US); Andrei Gregory Filippov, Wassenaar (NL)

(73) Assignee: Shell Oil Company, Houston, TX (US)

( * ) Notice: Subject to any disclaimer, the term of this patent is extended or adjusted under 35 U.S.C. 154(b) by 241 days.

(21) Appl. No.: 10/952,416

(22) Filed: Sep. 28, 2004

(65) Prior Publication Data

US 2005/0039928 A1 Feb. 24, 2005

Related U.S. Application Data

(60) Division of application No. 10/303,992, filed as application No. PCT/US01/19014 on Jun. 12, 2001, now Pat. No. 7,270,188, application No. 10/303,992, which is a continuation-in-part of application No. 09/852,026, filed on May 9, 2001, now Pat. No. 6,561,227, which is a division of application No. 09/454,139, filed on Dec. 3, 1999, now Pat. No. 6,497,289, application No. 10/303,992, which is a continuation-in-part of application No. 09/510,913, filed on Feb. 23, 2000, application No. 10/303,992, which is a continuation-in-part of application No. 09/502,350, filed on Feb. 10, 2000, now Pat. No. 6,823,937, application No. 10/303,992, which is a continuation-in-part of application No. 09/969,922, filed on Oct. 3, 2001, now Pat. No. 6,634,431, which is a continuation of application No. 09/440,338, filed on Nov. 15, 1999, now Pat. No. 6,328,113, application No. 10/303,992, which is a continuation-in-part of application No. 10/169,434, filed on Feb. 18, 2003, application No. 10/303,992, which is a continuation-in-part of application No. 09/523,460, filed on Mar. 10, 2000, now abandoned, application No. 10/303,992, which is a continuation-in-part of application No. 09/512,895, filed on Feb. 24, 2000, now Pat. No. 6,568,471, application No. 10/303,992, which is a continuation-in-part of application No. 09/511,841, filed on Feb. 24, 2000, now Pat. No. 6,575,240, application No. 10/303,992, which is a continuation-in-part of application No. 09/588,946, filed on Jun. 7, 2000, now Pat. No. 6,557,640, application No. 10/303,992, which is a continuation-in-part of application No. 09/559,122, filed on Apr. 26, 2000, now Pat. No. 6,604,763.

(60) Provisional application No. 60/212,359, filed on Jun. 19, 2000, provisional application No. 60/111,293, filed on Dec. 7, 1998, provisional application No. 60/121,702, filed on Feb. 25, 1999, provisional application No. 60/119,611, filed on Feb. 11, 1999, provisional application No. 60/108,558, filed on Nov. 16, 1998, provisional application No. 60/183,546, filed on Feb. 18, 2000, provisional application No. 60/124,042, filed on Mar. 11, 1999, provisional application No. 60/121,841, filed on Feb. 26, 1999, provisional application No. 60/154,047, filed on Sep. 16, 1999, provisional application No. 60/121,907, filed on Feb. 26, 1999, provisional application No. 60/131,106, filed on Apr. 26, 1999, provisional application No. 60/137,998, filed on Jun. 7, 1999.

(51) Int. Cl.
*E21B 23/00* (2006.01)
(52) U.S. Cl. .................................. 166/380; 166/207
(58) Field of Classification Search ................ 166/380, 166/384, 207, 212
See application file for complete search history.

(56) References Cited

U.S. PATENT DOCUMENTS

| | | |
|---|---|---|
| 46,818 A | 3/1865 | Patterson |
| 331,940 A | 12/1885 | Bole |
| 332,184 A | 12/1885 | Bole |

| | | |
|---|---|---|
| 341,237 A | 5/1886 | Healey |
| 519,805 A | 5/1894 | Bavier |
| 802,880 A | 10/1905 | Phillips, Jr. |
| 806,156 A | 12/1905 | Marshall |
| 958,517 A | 5/1910 | Mettier |
| 984,449 A | 2/1911 | Stewart |
| 1,166,040 A | 12/1915 | Burlingham |
| 1,233,888 A | 7/1917 | Leonard |
| 1,494,128 A | 5/1924 | Primrose |
| 1,597,212 A | 10/1924 | Spengler |
| 1,589,781 A | 6/1926 | Anderson |
| 1,590,357 A | 6/1926 | Feisthamel |
| 1,613,461 A | 1/1927 | Johnson |
| 1,756,531 A | 4/1930 | Aldeen et al. |
| 1,880,218 A | 10/1932 | Simmons |
| 1,981,525 A | 11/1934 | Price |
| 2,046,870 A | 7/1936 | Clasen et al. |
| 2,087,185 A | 7/1937 | Dillom |
| 2,122,757 A | 7/1938 | Scott |
| 2,145,168 A | 1/1939 | Flagg |
| 2,160,263 A | 5/1939 | Fletcher |
| 2,187,275 A | 1/1940 | McLennan |
| 2,204,586 A | 6/1940 | Grau |
| 2,211,173 A | 8/1940 | Shaffer |
| 2,214,226 A | 9/1940 | English |
| 2,226,804 A | 12/1940 | Carroll |
| 2,246,038 A | 6/1941 | Graham |
| 2,273,017 A | 2/1942 | Boynton |
| 2,301,495 A | 11/1942 | Abegg |
| 2,305,282 A | 12/1942 | Taylor, Jr. et al. |
| 2,371,840 A | 3/1945 | Otis |
| 2,383,214 A | 8/1945 | Prout |
| 2,447,629 A | 8/1948 | Beissinger et al. |
| 2,500,276 A | 3/1950 | Church |
| 2,546,295 A | 3/1951 | Boice |
| 2,583,316 A | 1/1952 | Bannister |
| 2,609,258 A | 11/1952 | Taylor, Jr. et al. |
| 2,627,891 A | 2/1953 | Clark |
| 2,647,847 A | 8/1953 | Black et al. |
| 2,664,952 A | 1/1954 | Losey |
| 2,691,418 A | 10/1954 | Connolly |
| 2,723,721 A | 11/1955 | Corsette |
| 2,734,580 A | 2/1956 | Layne |
| 2,796,134 A | 6/1957 | Binkley |
| 2,812,025 A | 11/1957 | Teague et al. |
| 2,877,822 A | 3/1959 | Buck |
| 2,907,589 A | 10/1959 | Knox |
| 2,919,741 A | 1/1960 | Strock et al. |
| 2,929,741 A | 1/1960 | Strock et al. |
| 3,015,362 A | 1/1962 | Moosman |
| 3,015,500 A | 1/1962 | Barnett |
| 3,018,547 A | 1/1962 | Marskell |
| 3,039,530 A | 6/1962 | Condra |
| 3,067,801 A | 12/1962 | Sortor |
| 3,067,819 A | 12/1962 | Gore |
| 3,068,563 A | 12/1962 | Reverman |
| 3,104,703 A | 9/1963 | Rike et al. |
| 3,111,991 A | 11/1963 | O'Neal |
| 3,162,245 A | 12/1964 | Howard et al. |
| 3,167,122 A | 1/1965 | Lang |
| 3,175,618 A | 3/1965 | Lang et al. |
| 3,179,168 A | 4/1965 | Vincent |
| 3,188,816 A | 6/1965 | Koch |
| 3,191,677 A | 6/1965 | Kinley |
| 3,191,680 A | 6/1965 | Vincent |
| 3,203,451 A | 8/1965 | Vincent |
| 3,203,483 A | 8/1965 | Vincent |
| 3,209,546 A | 10/1965 | Lawton |
| 3,210,102 A | 10/1965 | Joslin |
| 3,233,315 A | 2/1966 | Levake |
| 3,245,471 A | 4/1966 | Howard |
| 3,270,817 A | 9/1966 | Papaila |
| 3,297,092 A | 1/1967 | Jennings |
| 3,326,293 A | 6/1967 | Skipper |
| 3,343,252 A | 9/1967 | Reesor |
| 3,353,599 A | 11/1967 | Swift |
| 3,354,955 A | 11/1967 | Berry |
| 3,358,760 A | 12/1967 | Blagg |
| 3,358,769 A | 12/1967 | Berry |
| 3,364,993 A | 1/1968 | Skipper |
| 3,371,717 A | 3/1968 | Chenoweth |
| 3,397,745 A | 8/1968 | Owens et al. |
| 3,412,565 A | 11/1968 | Lindsey et al. |
| 3,419,080 A | 12/1968 | Lebourg |
| 3,422,902 A | 1/1969 | Bouchillon |
| 3,424,244 A | 1/1969 | Kinley |
| 3,427,707 A | 2/1969 | Nowosadko |
| 3,463,228 A | 8/1969 | Heam |
| 3,477,506 A | 11/1969 | Malone |
| 3,489,220 A | 1/1970 | Kinley |
| 3,489,437 A | 1/1970 | Duret |
| 3,498,376 A | 3/1970 | Sizer et al. |
| 3,504,515 A | 4/1970 | Reardon |
| 3,508,771 A | 4/1970 | Duret |
| 3,520,049 A | 7/1970 | Lysenko et al. |
| 3,528,498 A | 9/1970 | Carothers |
| 3,532,174 A | 10/1970 | Diamantides et al. |
| 3,568,773 A | 3/1971 | Chancellor |
| 3,572,777 A | 3/1971 | Blose et al. |
| 3,574,357 A | 4/1971 | Alexandru et al. |
| 3,578,081 A | 5/1971 | Bodine |
| 3,579,805 A | 5/1971 | Kast |
| 3,581,817 A | 6/1971 | Kammerer, Jr. |
| 3,605,887 A | 9/1971 | Lambie |
| 3,631,926 A | 1/1972 | Young |
| 3,665,591 A | 5/1972 | Kowal |
| 3,667,547 A | 6/1972 | Ahistone |
| 3,669,190 A | 6/1972 | Sizer et al. |
| 3,678,727 A | 7/1972 | Jackson |
| 3,682,256 A | 8/1972 | Stuart |
| 3,687,196 A | 8/1972 | Mullins |
| 3,691,624 A | 9/1972 | Kinley |
| 3,693,717 A | 9/1972 | Wuenschel |
| 3,704,730 A | 12/1972 | Witzig |
| 3,709,306 A | 1/1973 | Curington |
| 3,711,123 A | 1/1973 | Arnold |
| 3,712,376 A | 1/1973 | Owen et al. |
| 3,746,068 A | 7/1973 | Deckert et al. |
| 3,746,091 A | 7/1973 | Owen et al. |
| 3,746,092 A | 7/1973 | Land |
| 3,764,168 A | 10/1973 | Kisling, III et al. |
| 3,776,307 A | 12/1973 | Young |
| 3,779,025 A | 12/1973 | Godley et al. |
| 3,780,562 A | 12/1973 | Kinley |
| 3,781,966 A | 1/1974 | Lieberman |
| 3,785,193 A | 1/1974 | Kinely et al. |
| 3,797,259 A | 3/1974 | Kammerer, Jr. |
| 3,805,567 A | 4/1974 | Agius-Sincero |
| 3,812,912 A | 5/1974 | Wuenschel |
| 3,818,734 A | 6/1974 | Bateman |
| 3,826,124 A | 7/1974 | Baksay |
| 3,830,294 A | 8/1974 | Swanson |
| 3,830,295 A | 8/1974 | Crowe |
| 3,834,742 A | 9/1974 | McPhillips |
| 3,848,668 A | 11/1974 | Sizer et al. |
| 3,866,954 A | 2/1975 | Slator et al. |
| 3,874,446 A | 4/1975 | Crowe |
| 3,885,298 A | 5/1975 | Pogonowski |
| 3,887,006 A | 6/1975 | Pitts |
| 3,893,718 A | 7/1975 | Powell |
| 3,898,163 A | 8/1975 | Mott |
| 3,915,478 A | 10/1975 | Al et al. |
| 3,915,763 A | 10/1975 | Jennings et al. |
| 3,935,910 A | 2/1976 | Gaudy et al. |
| 3,942,824 A | 3/1976 | Sable |
| 3,945,444 A | 3/1976 | Knudson |

| | | | | | | |
|---|---|---|---|---|---|---|
| 3,948,321 A | 4/1976 | Owen et al. | | 4,505,017 A | 3/1985 | Schukei |
| 3,963,076 A | 6/1976 | Winslow | | 4,505,987 A | 3/1985 | Yamada et al. |
| 3,970,336 A | 7/1976 | O'Sickey et al. | | 4,506,432 A | 3/1985 | Smith |
| 3,977,473 A | 8/1976 | Page, Jr. | | 4,507,019 A | 3/1985 | Thompson |
| 3,989,280 A | 11/1976 | Schwarz | | 4,508,129 A | 4/1985 | Brown |
| 3,997,193 A | 12/1976 | Tsuda et al. | | 4,508,167 A | 4/1985 | Weinberg et al. |
| 3,999,605 A | 12/1976 | Braddick | | 4,511,289 A | 4/1985 | Herron |
| 4,011,652 A | 3/1977 | Black | | 4,513,995 A | 4/1985 | Niehaus et al. |
| 4,018,634 A | 4/1977 | Fencl | | 4,519,456 A | 5/1985 | Cochran |
| 4,019,579 A | 4/1977 | Thuse | | 4,521,258 A | 6/1985 | Tamehiro et al. |
| 4,026,583 A | 5/1977 | Gottlieb | | 4,526,232 A | 7/1985 | Hughson et al. |
| 4,053,247 A | 10/1977 | Marsh, Jr. | | 4,526,839 A | 7/1985 | Herman et al. |
| 4,069,573 A | 1/1978 | Rogers, Jr. et al. | | 4,527,815 A | 7/1985 | Frick |
| 4,076,287 A | 2/1978 | Bill et al. | | 4,530,231 A | 7/1985 | Main |
| 4,096,913 A | 6/1978 | Kenneday et al. | | 4,531,552 A | 7/1985 | Kim |
| 4,098,334 A | 7/1978 | Crowe | | 4,537,429 A | 8/1985 | Landriault |
| 4,099,563 A | 7/1978 | Hutchison et al. | | 4,538,442 A | 9/1985 | Reed |
| 4,125,937 A | 11/1978 | Brown et al. | | 4,538,840 A | 9/1985 | DeLange |
| 4,152,821 A | 5/1979 | Scott | | 4,541,655 A | 9/1985 | Hunter |
| 4,168,747 A | 9/1979 | Youmans | | 4,550,782 A | 11/1985 | Lawson |
| 4,190,108 A | 2/1980 | Webber | | 4,550,937 A | 11/1985 | Duret |
| 4,204,312 A | 5/1980 | Tooker | | 4,553,776 A | 11/1985 | Dodd |
| 4,205,422 A | 6/1980 | Hardwick | | 4,573,248 A | 3/1986 | Hackett |
| 4,226,449 A | 10/1980 | Cole | | 4,576,386 A | 3/1986 | Benson et al. |
| 4,253,687 A | 3/1981 | Maples | | 4,581,817 A | 4/1986 | Kelly |
| 4,257,155 A | 3/1981 | Hunter | | 4,582,348 A | 4/1986 | Dearden et al. |
| 4,274,665 A | 6/1981 | Marsh, Jr. | | 4,590,227 A | 5/1986 | Nakamura et al. |
| RE30,802 E | 11/1981 | Rogers, Jr. | | 4,590,995 A | 5/1986 | Evans |
| 4,304,428 A | 12/1981 | Grigorian et al. | | 4,592,577 A | 6/1986 | Ayres et al. |
| 4,328,983 A | 5/1982 | Gibson | | 4,595,063 A | 6/1986 | Jennings et al. |
| 4,355,664 A | 10/1982 | Cook et al. | | 4,596,913 A | 6/1986 | Takechi |
| 4,358,511 A | 11/1982 | Smith, Jr. et al. | | 4,598,938 A | 7/1986 | Boss et al. |
| 4,359,889 A | 11/1982 | Kelly | | 4,601,343 A | 7/1986 | Lindsey, Jr. et al. |
| 4,363,358 A | 12/1982 | Ellis | | 4,603,889 A | 8/1986 | Welsh |
| 4,366,971 A | 1/1983 | Lula | | 4,605,063 A | 8/1986 | Ross |
| 4,368,571 A | 1/1983 | Cooper, Jr. | | 4,611,662 A | 9/1986 | Harrington |
| 4,379,471 A | 4/1983 | Kuenzel | | 4,614,233 A | 9/1986 | Menard |
| 4,380,347 A | 4/1983 | Sable | | 4,629,218 A | 12/1986 | Dubois |
| 4,384,625 A | 5/1983 | Roper et al. | | 4,629,224 A | 12/1986 | Landriault |
| 4,388,752 A | 6/1983 | Vinciguerra et al. | | 4,630,849 A | 12/1986 | Fukui et al. |
| 4,391,325 A | 7/1983 | Baker et al. | | 4,632,944 A | 12/1986 | Thompson |
| 4,393,931 A | 7/1983 | Muse et al. | | 4,634,317 A | 1/1987 | Skogberg et al. |
| 4,396,061 A | 8/1983 | Tamplen et al. | | 4,635,333 A | 1/1987 | Finch |
| 4,397,484 A | 8/1983 | Miller | | 4,637,436 A | 1/1987 | Stewart, Jr. et al. |
| 4,401,325 A | 8/1983 | Tsuchiya et al. | | 4,646,787 A | 3/1987 | Rush et al. |
| 4,402,372 A | 9/1983 | Cherrington | | 4,649,492 A | 3/1987 | Sinha et al. |
| 4,407,681 A | 10/1983 | Ina et al. | | 4,651,831 A | 3/1987 | Baugh et al. |
| 4,411,435 A | 10/1983 | McStravick | | 4,651,836 A | 3/1987 | Richards |
| 4,413,395 A | 11/1983 | Garnier | | 4,656,779 A | 4/1987 | Fedeli |
| 4,413,682 A | 11/1983 | Callihan et al. | | 4,660,863 A | 4/1987 | Bailey et al. |
| 4,420,866 A | 12/1983 | Mueller | | 4,662,446 A | 5/1987 | Brisco et al. |
| 4,421,169 A | 12/1983 | Dearth et al. | | 4,669,541 A | 6/1987 | Bissonnette |
| 4,422,317 A | 12/1983 | Mueller | | 4,674,572 A | 6/1987 | Gallus |
| 4,422,507 A | 12/1983 | Reimert | | 4,676,563 A | 6/1987 | Curlett et al. |
| 4,423,889 A | 1/1984 | Weise | | 4,682,797 A | 7/1987 | Hildner |
| 4,423,986 A | 1/1984 | Skogberg | | 4,685,191 A | 8/1987 | Mueller et al. |
| 4,424,865 A | 1/1984 | Payton, Jr. | | 4,685,834 A | 8/1987 | Jordan |
| 4,429,741 A | 2/1984 | Hyland | | 4,693,498 A | 9/1987 | Baugh et al. |
| 4,440,233 A | 4/1984 | Baugh et al. | | 4,711,474 A | 12/1987 | Patrick |
| 4,442,586 A | 4/1984 | Ridenour | | 4,714,117 A | 12/1987 | Dech |
| 4,444,250 A | 4/1984 | Keithahn et al. | | 4,730,851 A | 3/1988 | Watts |
| 4,449,713 A | 5/1984 | Ishido et al. | | 4,732,416 A | 3/1988 | Dearden et al. |
| 4,458,925 A | 7/1984 | Raulins et al. | | 4,735,444 A | 4/1988 | Skipper |
| 4,462,471 A | 7/1984 | Hipp | | 4,739,654 A | 4/1988 | Pilkington et al. |
| 4,467,630 A | 8/1984 | Kelly | | 4,739,916 A | 4/1988 | Ayres et al. |
| 4,468,309 A | 8/1984 | White | | 4,754,781 A | 7/1988 | Jan de Putter |
| 4,469,356 A | 9/1984 | Duret et al. | | 4,758,025 A | 7/1988 | Frick |
| 4,473,245 A | 9/1984 | Raulins et al. | | 4,762,344 A | 8/1988 | Perkins et al. |
| 4,483,399 A | 11/1984 | Colgate | | 4,776,394 A | 10/1988 | Lynde et al. |
| 4,485,847 A | 12/1984 | Wentzell | | 4,778,088 A | 10/1988 | Miller |
| 4,491,001 A | 1/1985 | Yoshida et al. | | 4,779,445 A | 10/1988 | Rabe |
| 4,495,073 A | 1/1985 | Beimgraben | | 4,793,382 A | 12/1988 | Szalvay |
| 4,501,327 A | 2/1985 | Retz | | 4,796,668 A | 1/1989 | Depret |

| | | | | | |
|---|---|---|---|---|---|
| 4,799,544 A | 1/1989 | Curlett | 5,156,223 A | 10/1992 | Hipp |
| 4,817,710 A | 4/1989 | Edwards et al. | 5,174,340 A | 12/1992 | Peterson et al. |
| 4,817,712 A | 4/1989 | Bodine | 5,174,376 A | 12/1992 | Singeetham |
| 4,817,716 A | 4/1989 | Taylor et al. | 5,181,571 A | 1/1993 | Mueller et al. |
| 4,822,081 A | 4/1989 | Blose | 5,195,583 A | 3/1993 | Toon et al. |
| 4,825,674 A | 5/1989 | Tanaka et al. | 5,197,553 A | 3/1993 | Leturno |
| 4,826,347 A | 5/1989 | Baril et al. | 5,209,600 A | 5/1993 | Koster |
| 4,827,594 A | 5/1989 | Cartry et al. | 5,226,492 A | 7/1993 | Solaeche P. et al. |
| 4,828,033 A | 5/1989 | Frison | 5,242,017 A | 9/1993 | Hailey |
| 4,830,109 A | 5/1989 | Wedel | 5,249,628 A | 10/1993 | Surjaatmadia |
| 4,832,382 A | 5/1989 | Kapgan | 5,253,713 A | 10/1993 | Gregg et al. |
| 4,836,278 A | 6/1989 | Stone et al. | RE34,467 E | 12/1993 | Reeves |
| 4,836,579 A | 6/1989 | Wester et al. | 5,275,242 A | 1/1994 | Payne |
| 4,838,349 A | 6/1989 | Berzin | 5,282,508 A | 2/1994 | Ellingsen et al. |
| 4,842,082 A | 6/1989 | Springer | 5,286,393 A | 2/1994 | Oldiges et al. |
| 4,848,459 A | 7/1989 | Blackwell et al. | 5,306,101 A | 4/1994 | Rockower et al. |
| 4,854,338 A | 8/1989 | Grantham | 5,309,621 A | 5/1994 | O'Donnell et al. |
| 4,856,592 A | 8/1989 | Van Bilderbeek et al. | 5,314,014 A | 5/1994 | Tucker |
| 4,865,127 A | 9/1989 | Koster | 5,314,209 A | 5/1994 | Kuhne |
| 4,871,199 A | 10/1989 | Ridenour et al. | 5,318,122 A | 6/1994 | Murray et al. |
| 4,872,253 A | 10/1989 | Carstensen | 5,318,131 A | 6/1994 | Baker |
| 4,887,646 A | 12/1989 | Groves | 5,325,923 A | 7/1994 | Surjaatmadja et al. |
| 4,888,975 A | 12/1989 | Soward et al. | 5,326,137 A | 7/1994 | Lorenz et al. |
| 4,892,337 A | 1/1990 | Gunderson et al. | 5,327,964 A | 7/1994 | O'Donnell et al. |
| 4,893,658 A | 1/1990 | Kimura et al. | 5,330,850 A | 7/1994 | Suzuki et al. |
| 4,904,136 A | 2/1990 | Matsumoto | 5,332,038 A | 7/1994 | Tapp et al. |
| 4,907,828 A | 3/1990 | Chang | 5,332,049 A | 7/1994 | Tew |
| 4,911,237 A | 3/1990 | Melenyzer | 5,333,692 A | 8/1994 | Baugh et al. |
| 4,913,758 A | 4/1990 | Koster | 5,335,736 A | 8/1994 | Windsor |
| 4,915,177 A | 4/1990 | Claycomb | 5,337,808 A | 8/1994 | Graham |
| 4,915,426 A | 4/1990 | Skipper | 5,337,823 A | 8/1994 | Nobileau |
| 4,917,409 A | 4/1990 | Reeves | 5,337,827 A | 8/1994 | Hromas et al. |
| 4,919,989 A | 4/1990 | Colangelo | 5,339,894 A | 8/1994 | Stotler |
| 4,921,045 A | 5/1990 | Richardson | 5,343,949 A | 9/1994 | Ross et al. |
| 4,924,949 A | 5/1990 | Curlett | 5,346,007 A | 9/1994 | Dillon et al. |
| 4,930,573 A | 6/1990 | Lane et al. | 5,348,087 A | 9/1994 | Williamson, Jr. |
| 4,934,038 A | 6/1990 | Caudill | 5,348,093 A | 9/1994 | Wood et al. |
| 4,934,312 A | 6/1990 | Koster et al. | 5,348,095 A | 9/1994 | Worrall et al. |
| 4,938,291 A | 7/1990 | Lynde et al. | 5,348,668 A | 9/1994 | Oldiges et al. |
| 4,941,512 A | 7/1990 | McParland | 5,351,752 A | 10/1994 | Wood et al. |
| 4,941,532 A | 7/1990 | Hurt et al. | 5,360,239 A | 11/1994 | Klementich |
| 4,942,925 A | 7/1990 | Themig | 5,360,292 A | 11/1994 | Allen et al. |
| 4,942,926 A | 7/1990 | Lessi | 5,361,836 A | 11/1994 | Sorem et al. |
| 4,958,691 A | 9/1990 | Hipp | 5,361,843 A | 11/1994 | Shy et al. |
| 4,968,184 A | 11/1990 | Reid | 5,366,010 A | 11/1994 | Zwart |
| 4,971,152 A | 11/1990 | Koster et al. | 5,366,012 A | 11/1994 | Lohbeck |
| 4,976,322 A | 12/1990 | Abdrakhmanov et al. | 5,368,075 A | 11/1994 | Baro et al. |
| 4,981,250 A | 1/1991 | Persson | 5,370,425 A | 12/1994 | Dougherty et al. |
| 4,995,464 A | 2/1991 | Watkins et al. | 5,375,661 A | 12/1994 | Daneshy et al. |
| 5,014,779 A | 5/1991 | Meling et al. | 5,388,648 A | 2/1995 | Jordan, Jr. |
| 5,015,017 A | 5/1991 | Geary | 5,390,735 A | 2/1995 | Williamson, Jr. |
| 5,026,074 A | 6/1991 | Hoes et al. | 5,390,742 A | 2/1995 | Dines et al. |
| 5,031,370 A | 7/1991 | Jewett | 5,396,957 A | 3/1995 | Surjaatmadja et al. |
| 5,031,699 A | 7/1991 | Artynov et al. | 5,400,827 A | 3/1995 | Baro et al. |
| 5,040,283 A | 8/1991 | Pelgrom | 5,405,171 A | 4/1995 | Allen et al. |
| 5,044,676 A | 9/1991 | Burton et al. | 5,411,301 A | 5/1995 | Moyer et al. |
| 5,048,871 A | 9/1991 | Pfeiffer et al. | 5,413,180 A | 5/1995 | Ross et al. |
| 5,052,483 A | 10/1991 | Hudson | 5,425,559 A | 6/1995 | Nobileau |
| 5,059,043 A | 10/1991 | Kuhne | 5,426,130 A | 6/1995 | Thurber et al. |
| 5,064,004 A | 11/1991 | Lundel | 5,431,831 A | 7/1995 | Vincent |
| 5,079,837 A | 1/1992 | Vanselow | 5,435,395 A | 7/1995 | Connell |
| 5,083,608 A | 1/1992 | Abdrakhmanov et al. | 5,439,320 A | 8/1995 | Abrams |
| 5,093,015 A | 3/1992 | Oldiges | 5,443,129 A | 8/1995 | Bailey et al. |
| 5,095,991 A | 3/1992 | Milberger | 5,447,201 A | 9/1995 | Mohn |
| 5,097,710 A | 3/1992 | Palynchuk | 5,454,419 A | 10/1995 | Vloedman |
| 5,101,653 A | 4/1992 | Hermes et al. | 5,456,319 A | 10/1995 | Schmidt et al. |
| 5,105,888 A | 4/1992 | Pollock et al. | 5,458,194 A | 10/1995 | Brooks |
| 5,107,221 A | 4/1992 | N'Guyen et al. | 5,462,120 A | 10/1995 | Gondouin |
| 5,119,661 A | 6/1992 | Abdrakhmanov et al. | 5,467,822 A | 11/1995 | Zwart |
| 5,134,891 A | 8/1992 | Canevet | 5,472,055 A | 12/1995 | Simson et al. |
| 5,150,755 A | 9/1992 | Cassel et al. | 5,474,334 A | 12/1995 | Eppink |
| 5,156,043 A | 10/1992 | Ose | 5,492,173 A | 2/1996 | Kilgore et al. |
| 5,156,213 A | 10/1992 | George et al. | 5,494,106 A | 2/1996 | Gueguen et al. |

| | | | | | | |
|---|---|---|---|---|---|---|
| 5,507,343 A | 4/1996 | Carlton et al. | | 6,017,168 A | 1/2000 | Fraser et al. |
| 5,511,620 A | 4/1996 | Baugh et al. | | 6,021,850 A | 2/2000 | Wood et al. |
| 5,524,937 A | 6/1996 | Sides, III et al. | | 6,024,181 A | 2/2000 | Richardson et al. |
| 5,535,824 A | 7/1996 | Hudson | | 6,027,145 A | 2/2000 | Tsuru et al. |
| 5,536,422 A | 7/1996 | Oldiges et al. | | 6,029,748 A | 2/2000 | Forsyth et al. |
| 5,540,281 A | 7/1996 | Round | | 6,035,954 A | 3/2000 | Hipp |
| 5,554,244 A | 9/1996 | Ruggles et al. | | 6,044,906 A | 4/2000 | Saltel |
| 5,566,772 A | 10/1996 | Coone et al. | | 6,047,505 A | 4/2000 | Willow |
| 5,567,335 A | 10/1996 | Baessler et al. | | 6,047,774 A | 4/2000 | Allen |
| 5,576,485 A | 11/1996 | Serata | | 6,050,341 A | 4/2000 | Metcalf |
| 5,584,512 A | 12/1996 | Carstensen | | 6,050,346 A | 4/2000 | Hipp |
| 5,606,792 A | 3/1997 | Schafer | | 6,056,059 A | 5/2000 | Ohmer |
| 5,611,399 A | 3/1997 | Richard et al. | | 6,056,324 A | 5/2000 | Reimert et al. |
| 5,613,557 A | 3/1997 | Blount et al. | | 6,062,324 A | 5/2000 | Hipp |
| 5,617,918 A | 4/1997 | Cooksey et al. | | 6,065,500 A | 5/2000 | Metcalfe |
| 5,642,560 A | 7/1997 | Tabuchi et al. | | 6,070,671 A | 6/2000 | Cumming et al. |
| 5,642,781 A | 7/1997 | Richard | | 6,073,332 A | 6/2000 | Turner |
| 5,662,180 A | 9/1997 | Coffman et al. | | 6,073,692 A | 6/2000 | Wood et al. |
| 5,664,327 A | 9/1997 | Swars | | 6,073,698 A | 6/2000 | Schultz et al. |
| 5,667,011 A | 9/1997 | Gill et al. | | 6,074,133 A | 6/2000 | Kelsey |
| 5,667,252 A | 9/1997 | Schafer et al. | | 6,078,031 A | 6/2000 | Bliault et al. |
| 5,678,609 A | 10/1997 | Washburn | | 6,079,495 A | 6/2000 | Ohmer |
| 5,685,369 A | 11/1997 | Ellis et al. | | 6,085,838 A | 7/2000 | Vercaemer et al. |
| 5,689,871 A | 11/1997 | Carstensen | | 6,089,320 A | 7/2000 | LaGrange |
| 5,695,008 A | 12/1997 | Bertet et al. | | 6,098,717 A | 8/2000 | Bailey et al. |
| 5,695,009 A | 12/1997 | Hipp | | 6,102,119 A | 8/2000 | Raines |
| 5,697,442 A | 12/1997 | Baldridge | | 6,109,355 A | 8/2000 | Reid |
| 5,697,449 A | 12/1997 | Hennig et al. | | 6,112,818 A | 9/2000 | Campbell |
| 5,718,288 A | 2/1998 | Bertet et al. | | 6,131,265 A | 10/2000 | Bird |
| 5,738,146 A | 4/1998 | Abe | | 6,135,208 A | 10/2000 | Gano et al. |
| 5,743,335 A | 4/1998 | Bussear | | 6,138,761 A | 10/2000 | Freeman et al. |
| 5,749,419 A | 5/1998 | Coronado et al. | | 6,142,230 A | 11/2000 | Smalley et al. |
| 5,749,585 A | 5/1998 | Lembcke | | 6,155,613 A | 12/2000 | Quadflieg et al. |
| 5,755,895 A | 5/1998 | Tamehiro et al. | | 6,158,785 A | 12/2000 | Beaulier et al. |
| 5,775,422 A | 7/1998 | Wong et al. | | 6,158,963 A | 12/2000 | Hollis |
| 5,785,120 A | 7/1998 | Smalley et al. | | 6,167,970 B1 | 1/2001 | Stout |
| 5,787,933 A | 8/1998 | Russ et al. | | 6,182,775 B1 | 2/2001 | Hipp |
| 5,791,419 A | 8/1998 | Valisalo | | 6,183,013 B1 | 2/2001 | Mackenzie et al. |
| 5,794,702 A | 8/1998 | Nobileau | | 6,183,573 B1 | 2/2001 | Fujiwara et al. |
| 5,797,454 A | 8/1998 | Hipp | | 6,196,336 B1 | 3/2001 | Fincher et al. |
| 5,829,520 A | 11/1998 | Johnson | | 6,216,509 B1 | 4/2001 | Lotspaih et al. |
| 5,829,524 A | 11/1998 | Flanders et al. | | 6,220,306 B1 | 4/2001 | Omura et al. |
| 5,829,797 A | 11/1998 | Yamamoto et al. | | 6,226,855 B1 | 5/2001 | Maine |
| 5,833,001 A | 11/1998 | Song et al. | | 6,231,086 B1 | 5/2001 | Tierling |
| 5,845,945 A | 12/1998 | Carstensen | | 6,237,967 B1 | 5/2001 | Yamamoto et al. |
| 5,849,188 A | 12/1998 | Voll et al. | | 6,250,385 B1 | 6/2001 | Montaron |
| 5,857,524 A | 1/1999 | Harris et al. | | 6,253,846 B1 | 7/2001 | Nazzai et al. |
| 5,862,866 A | 1/1999 | Springer | | 6,253,850 B1 | 7/2001 | Nazzai et al. |
| 5,875,851 A | 3/1999 | Vick, Jr. et al. | | 6,263,966 B1 | 7/2001 | Haut et al. |
| 5,885,941 A | 3/1999 | Sateva et al. | | 6,263,968 B1 | 7/2001 | Freeman et al. |
| 5,895,079 A | 4/1999 | Carstensen et al. | | 6,263,972 B1 | 7/2001 | Richard et al. |
| 5,901,789 A | 5/1999 | Donnelly et al. | | 6,267,181 B1 | 7/2001 | Rhein-Knudsen et al. |
| 5,918,677 A | 7/1999 | Head | | 6,273,634 B1 | 8/2001 | Lohbeck |
| 5,924,745 A | 7/1999 | Campbell | | 6,275,556 B1 | 8/2001 | Kinney et al. |
| 5,931,511 A | 8/1999 | DeLange et al. | | 6,283,211 B1 | 9/2001 | Vloedman |
| 5,933,945 A | 8/1999 | Thomeer et al. | | 6,286,558 B1 | 9/2001 | Quigley et al. |
| 5,944,100 A | 8/1999 | Hipp | | 6,302,211 B1 | 10/2001 | Nelson et al. |
| 5,944,107 A | 8/1999 | Ohmer | | 6,311,792 B1 | 11/2001 | Scott et al. |
| 5,944,108 A | 8/1999 | Baugh et al. | | 6,315,040 B1 | 11/2001 | Donnelly |
| 5,951,207 A | 9/1999 | Chen | | 6,315,043 B1 | 11/2001 | Farrant et al. |
| 5,957,195 A | 9/1999 | Bailey et al. | | 6,318,457 B1 | 11/2001 | Den Boer et al. |
| 5,964,288 A | 10/1999 | Leighton et al. | | 6,318,465 B1 | 11/2001 | Coon et al. |
| 5,971,443 A | 10/1999 | Noel et al. | | 6,322,109 B1 | 11/2001 | Campbell et al. |
| 5,975,587 A | 11/1999 | Wood et al. | | 6,325,148 B1 | 12/2001 | Trahan et al. |
| 5,979,560 A | 11/1999 | Nobileau | | 6,328,113 B1 | 12/2001 | Cook |
| 5,984,369 A | 11/1999 | Crook et al. | | 6,334,351 B1 | 1/2002 | Tsuchiya |
| 5,984,568 A | 11/1999 | Lohbeck | | 6,343,495 B1 | 2/2002 | Cheppe et al. |
| 6,009,611 A | 1/2000 | Adams et al. | | 6,343,657 B1 | 2/2002 | Baugh et al. |
| 6,012,521 A | 1/2000 | Zunkel et al. | | 6,345,373 B1 | 2/2002 | Chakradhar et al. |
| 6,012,522 A | 1/2000 | Donnelly et al. | | 6,345,431 B1 | 2/2002 | Greig |
| 6,012,523 A | 1/2000 | Campbell et al. | | 6,352,112 B1 | 3/2002 | Mills |
| 6,012,874 A | 1/2000 | Groneck et al. | | 6,354,373 B1 | 3/2002 | Vercaemer et al. |
| 6,015,012 A | 1/2000 | Reddick | | 6,390,720 B1 | 5/2002 | LeBegue et al. |

| | | |
|---|---|---|
| 6,405,761 B1 | 6/2002 | Shimizu et al. |
| 6,406,063 B1 | 6/2002 | Pfeiffer |
| 6,409,175 B1 | 6/2002 | Evans et al. |
| 6,419,025 B1 | 7/2002 | Lohbeck et al. |
| 6,419,026 B1 | 7/2002 | MacKenzie et al. |
| 6,419,033 B1 | 7/2002 | Hahn et al. |
| 6,419,147 B1 | 7/2002 | Daniel |
| 6,425,444 B1 | 7/2002 | Metcalfe et al. |
| 6,431,277 B1 | 8/2002 | Cox et al. |
| 6,443,247 B1 | 9/2002 | Wardley |
| 6,446,724 B2 | 9/2002 | Baugh et al. |
| 6,447,025 B1 | 9/2002 | Smith |
| 6,450,261 B1 | 9/2002 | Baugh |
| 6,454,013 B1 | 9/2002 | Metcalfe |
| 6,454,024 B1 | 9/2002 | Nackerud |
| 6,457,532 B1 | 10/2002 | Simpson |
| 6,457,533 B1 | 10/2002 | Metcalfe |
| 6,457,749 B1 | 10/2002 | Heijnen |
| 6,460,615 B1 | 10/2002 | Heijnen |
| 6,464,008 B1 | 10/2002 | Roddy et al. |
| 6,464,014 B1 | 10/2002 | Bernat |
| 6,470,966 B2 | 10/2002 | Cook et al. |
| 6,470,996 B1 | 10/2002 | Kyle et al. |
| 6,478,092 B2 | 11/2002 | Voll et al. |
| 6,491,108 B1 | 12/2002 | Slup et al. |
| 6,497,289 B1 | 12/2002 | Cook et al. |
| 6,513,243 B1 | 2/2003 | Bignucolo et al. |
| 6,516,887 B2 | 2/2003 | Nguyen et al. |
| 6,517,126 B1 | 2/2003 | Peterson et al. |
| 6,527,049 B2 | 3/2003 | Metcalfe et al. |
| 6,543,545 B1 | 4/2003 | Chatterji et al. |
| 6,543,552 B1 | 4/2003 | Metcalfe et al. |
| 6,550,539 B2 | 4/2003 | Maguire et al. |
| 6,550,821 B2 | 4/2003 | DeLange et al. |
| 6,557,640 B1 | 5/2003 | Cook et al. |
| 6,557,906 B1 | 5/2003 | Carcagno |
| 6,561,227 B2 | 5/2003 | Cook et al. |
| 6,561,279 B2 | 5/2003 | MacKenzie et al. |
| 6,564,875 B1 | 5/2003 | Bullock |
| 6,568,471 B1 | 5/2003 | Cook et al. |
| 6,568,488 B2 | 5/2003 | Wentworth et al. |
| 6,575,240 B1 | 6/2003 | Haut et al. |
| 6,578,630 B2 | 6/2003 | Simpson et al. |
| 6,585,053 B2 | 7/2003 | Coon |
| 6,585,299 B1 | 7/2003 | Quadflieg et al. |
| 6,591,905 B2 | 7/2003 | Coon |
| 6,598,677 B1 | 7/2003 | Baugh et al. |
| 6,598,678 B1 | 7/2003 | Simpson |
| 6,604,763 B1 | 8/2003 | Ring et al. |
| 6,607,220 B2 | 8/2003 | Sivley, IV |
| 6,609,735 B1 | 8/2003 | DeLange et al. |
| 6,619,696 B2 | 9/2003 | Baugh et al. |
| 6,622,797 B2 | 9/2003 | Sivley, IV |
| 6,629,567 B2 | 10/2003 | Lauritzen et al. |
| 6,631,759 B2 | 10/2003 | Cook et al. |
| 6,631,760 B2 | 10/2003 | Cook et al. |
| 6,631,765 B2 | 10/2003 | Baugh et al. |
| 6,631,769 B2 | 10/2003 | Cook et al. |
| 6,634,431 B2 | 10/2003 | Cook et al. |
| 6,640,895 B2 | 11/2003 | Murray |
| 6,640,903 B1 | 11/2003 | Cook et al. |
| 6,648,075 B2 | 11/2003 | Badrak et al. |
| 6,659,509 B2 | 12/2003 | Goto et al. |
| 6,662,876 B2 | 12/2003 | Lauritzen |
| 6,668,937 B1 | 12/2003 | Murray |
| 6,672,759 B2 | 1/2004 | Feger |
| 6,679,328 B2 | 1/2004 | Davis et al. |
| 6,681,862 B2 | 1/2004 | Freeman |
| 6,684,947 B2 | 2/2004 | Cook et al. |
| 6,688,397 B2 | 2/2004 | McClurkin et al. |
| 6,695,012 B1 | 2/2004 | Ring et al. |
| 6,695,065 B2 | 2/2004 | Simpson et al. |
| 6,698,517 B2 | 3/2004 | Simpson |
| 6,701,598 B2 | 3/2004 | Chen et al. |
| 6,702,030 B2 | 3/2004 | Simpson |
| 6,705,395 B2 | 3/2004 | Cook et al. |
| 6,708,767 B2 | 3/2004 | Harrall et al. |
| 6,712,154 B2 | 3/2004 | Cook et al. |
| 6,712,401 B2 | 3/2004 | Coulon et al. |
| 6,719,064 B2 | 4/2004 | Price-Smith et al. |
| 6,722,427 B2 | 4/2004 | Gano et al. |
| 6,722,437 B2 | 4/2004 | Vercaemer et al. |
| 6,722,443 B1 | 4/2004 | Metcalfe |
| 6,725,917 B2 | 4/2004 | Metcalfe |
| 6,725,919 B2 | 4/2004 | Cook et al. |
| 6,725,934 B2 | 4/2004 | Coronado et al. |
| 6,725,939 B2 | 4/2004 | Richard |
| 6,732,806 B2 | 5/2004 | Mauldin et al. |
| 6,739,392 B2 | 5/2004 | Cook et al. |
| 6,745,845 B2 | 6/2004 | Cook et al. |
| 6,755,447 B2 | 6/2004 | Galle, Jr. et al. |
| 6,758,278 B2 | 7/2004 | Cook et al. |
| 6,772,841 B2 | 8/2004 | Gano |
| 6,796,380 B2 | 9/2004 | Xu |
| 6,814,147 B2 | 11/2004 | Baugh |
| 6,817,633 B2 | 11/2004 | Brill et al. |
| 6,820,690 B2 | 11/2004 | Vercaemer et al. |
| 6,823,937 B1 | 11/2004 | Cook et al. |
| 6,832,649 B2 | 12/2004 | Bode et al. |
| 6,834,725 B2 | 12/2004 | Whanger et al. |
| 6,843,322 B2 | 1/2005 | Burtner et al. |
| 6,857,473 B2 | 2/2005 | Cook et al. |
| 6,880,632 B2 | 4/2005 | Tom et al. |
| 6,892,819 B2 | 5/2005 | Cook et al. |
| 6,902,000 B2 | 6/2005 | Simpson et al. |
| 6,902,652 B2 | 6/2005 | Martin |
| 6,923,261 B2 | 8/2005 | Metcalfe et al. |
| 6,935,429 B2 | 8/2005 | Badrak |
| 6,935,430 B2 | 8/2005 | Harrall et al. |
| 6,966,370 B2 | 11/2005 | Cook et al. |
| 6,976,539 B2 | 12/2005 | Metcalfe et al. |
| 6,976,541 B2 | 12/2005 | Brisco et al. |
| 7,000,953 B2 | 2/2006 | Berghaus |
| 7,007,760 B2 | 3/2006 | Lohbeck |
| 7,021,390 B2 | 4/2006 | Cook et al. |
| 7,036,582 B2 | 5/2006 | Cook et al. |
| 7,044,221 B2 | 5/2006 | Cook et al. |
| 7,048,062 B2 | 5/2006 | Ring et al. |
| 7,066,284 B2 | 6/2006 | Wylie et al. |
| 7,077,211 B2 | 7/2006 | Cook et al. |
| 7,077,213 B2 | 7/2006 | Cook et al. |
| 7,086,475 B2 | 8/2006 | Cook |
| 7,100,684 B2 | 9/2006 | Cook et al. |
| 7,100,685 B2 | 9/2006 | Cook et al. |
| 7,108,061 B2 | 9/2006 | Cook et al. |
| 7,108,072 B2 | 9/2006 | Cook et al. |
| 7,121,337 B2 | 10/2006 | Cook et al. |
| 7,121,352 B2 | 10/2006 | Cook et al. |
| 7,124,821 B2 | 10/2006 | Metcalfe et al. |
| 7,124,823 B2 | 10/2006 | Oosterling |
| 7,124,826 B2 | 10/2006 | Simpson |
| 7,146,702 B2 | 12/2006 | Cook et al. |
| 7,147,053 B2 | 12/2006 | Cook et al. |
| 7,159,665 B2 | 1/2007 | Cook et al. |
| 7,159,667 B2 | 1/2007 | Cook et al. |
| 7,168,496 B2 | 1/2007 | Cook et al. |
| 7,168,499 B2 | 1/2007 | Cook et al. |
| 7,172,019 B2 | 2/2007 | Cook et al. |
| 7,172,021 B2 | 2/2007 | Brisco et al. |
| 7,172,024 B2 | 2/2007 | Cook et al. |
| 7,172,964 B2 | 2/2007 | Ko et al. |
| 2001/0002626 A1 | 6/2001 | Frank et al. |
| 2001/0020532 A1 | 9/2001 | Baugh et al. |
| 2001/0045284 A1 | 11/2001 | Simpson et al. |
| 2001/0045289 A1 | 11/2001 | Cook et al. |
| 2001/0047870 A1 | 12/2001 | Cook et al. |

| | | |
|---|---|---|
| 2002/0011339 A1 | 1/2002 | Murray |
| 2002/0014339 A1 | 2/2002 | Ross |
| 2002/0020524 A1 | 2/2002 | Gano |
| 2002/0020531 A1 | 2/2002 | Ohmer |
| 2002/0033261 A1 | 3/2002 | Metcalfe |
| 2002/0060068 A1 | 5/2002 | Cook et al. |
| 2002/0062956 A1 | 5/2002 | Murray et al. |
| 2002/0066576 A1 | 6/2002 | Cook et al. |
| 2002/0066578 A1 | 6/2002 | Broome et al. |
| 2002/0070023 A1 | 6/2002 | Turner et al. |
| 2002/0070031 A1 | 6/2002 | Voll et al. |
| 2002/0079101 A1 | 6/2002 | Baugh et al. |
| 2002/0084070 A1 | 7/2002 | Voll et al. |
| 2002/0092654 A1 | 7/2002 | Coronado et al. |
| 2002/0108756 A1 | 8/2002 | Harrall et al. |
| 2002/0139540 A1 | 10/2002 | Lauritzen |
| 2002/0144822 A1 | 10/2002 | Hackworth et al. |
| 2002/0148612 A1 | 10/2002 | Cook et al. |
| 2002/0185274 A1 | 12/2002 | Simpson et al. |
| 2002/0189816 A1 | 12/2002 | Cook et al. |
| 2002/0195252 A1 | 12/2002 | Maguire et al. |
| 2002/0195256 A1 | 12/2002 | Metcalfe et al. |
| 2003/0024708 A1 | 2/2003 | Ring et al. |
| 2003/0024711 A1 | 2/2003 | Simpson et al. |
| 2003/0034177 A1 | 2/2003 | Chilwood et al. |
| 2003/0042022 A1 | 3/2003 | Lauritzen et al. |
| 2003/0047322 A1 | 3/2003 | Maguire et al. |
| 2003/0047323 A1 | 3/2003 | Jackson et al. |
| 2003/0056991 A1 | 3/2003 | Hahn et al. |
| 2003/0066655 A1 | 4/2003 | Cook et al. |
| 2003/0067166 A1 | 4/2003 | Maguire |
| 2003/0075337 A1 | 4/2003 | Sivley, IV |
| 2003/0075338 A1 | 4/2003 | Sivley, IV |
| 2003/0075339 A1 | 4/2003 | Gano et al. |
| 2003/0094277 A1 | 5/2003 | Cook et al. |
| 2003/0094278 A1 | 5/2003 | Cook et al. |
| 2003/0094279 A1 | 5/2003 | Ring et al. |
| 2003/0098154 A1 | 5/2003 | Cook et al. |
| 2003/0098162 A1 | 5/2003 | Cook |
| 2003/0107217 A1 | 6/2003 | Daigle et al. |
| 2003/0111234 A1 | 6/2003 | McClurkin et al. |
| 2003/0116318 A1 | 6/2003 | Metcalfe |
| 2003/0116325 A1 | 6/2003 | Cook et al. |
| 2003/0121558 A1 | 7/2003 | Cook et al. |
| 2003/0121655 A1 | 7/2003 | Lauritzen et al. |
| 2003/0121669 A1 | 7/2003 | Cook et al. |
| 2003/0140673 A1 | 7/2003 | Marr et al. |
| 2003/0150608 A1 | 8/2003 | Smith, Jr. et al. |
| 2003/0168222 A1 | 9/2003 | Maguire et al. |
| 2003/0173090 A1 | 9/2003 | Cook et al. |
| 2003/0192705 A1 | 10/2003 | Cook et al. |
| 2003/0221841 A1 | 12/2003 | Burtner et al. |
| 2003/0222455 A1 | 12/2003 | Cook et al. |
| 2004/0011534 A1 | 1/2004 | Simonds et al. |
| 2004/0045616 A1 | 3/2004 | Cook et al. |
| 2004/0045718 A1 | 3/2004 | Brisco et al. |
| 2004/0060706 A1 | 4/2004 | Stephenson |
| 2004/0065446 A1 | 4/2004 | Tran et al. |
| 2004/0069499 A1 | 4/2004 | Cook et al. |
| 2004/0112589 A1 | 6/2004 | Cook et al. |
| 2004/0112606 A1 | 6/2004 | Lewis et al. |
| 2004/0118574 A1 | 6/2004 | Cook et al. |
| 2004/0129431 A1 | 6/2004 | Jackson |
| 2004/0123983 A1 | 7/2004 | Cook et al. |
| 2004/0123988 A1 | 7/2004 | Cook et al. |
| 2004/0149431 A1 | 8/2004 | Wylle et al. |
| 2004/0159446 A1 | 8/2004 | Haugen et al. |
| 2004/0174017 A1 | 9/2004 | Brill et al. |
| 2004/0188099 A1 | 9/2004 | Cook et al. |
| 2004/0019466 A1 | 10/2004 | Zimmerman |
| 2004/0194278 A1 | 10/2004 | Brill et al. |
| 2004/0216873 A1 | 11/2004 | Frost, Jr. et al. |
| 2004/0221996 A1 | 11/2004 | Burge |
| 2004/0228679 A1 | 11/2004 | Reavis et al. |
| 2004/0231839 A1 | 11/2004 | Ellington et al. |
| 2004/0231855 A1 | 11/2004 | Cook et al. |
| 2004/0238181 A1 | 12/2004 | Cook et al. |
| 2004/0244968 A1 | 12/2004 | Cook et al. |
| 2004/0262014 A1 | 12/2004 | Cook et al. |
| 2005/0011641 A1 | 1/2005 | Cook et al. |
| 2005/0015963 A1 | 1/2005 | Costa et al. |
| 2005/0028988 A1 | 2/2005 | Cook et al. |
| 2005/0039910 A1 | 2/2005 | Lohbeck |
| 2005/0039928 A1 | 2/2005 | Cook et al. |
| 2005/0045324 A1 | 3/2005 | Cook et al. |
| 2005/0045341 A1 | 3/2005 | Cook et al. |
| 2005/0045342 A1 | 3/2005 | Luke et al. |
| 2005/0056433 A1 | 3/2005 | Watson et al. |
| 2005/0056434 A1 | 3/2005 | Ring et al. |
| 2005/0077051 A1 | 4/2005 | Cook et al. |
| 2005/0081358 A1 | 4/2005 | Cook et al. |
| 2005/0087337 A1 | 4/2005 | Brisco et al. |
| 2005/0098323 A1 | 5/2005 | Cook et al. |
| 2005/0103502 A1 | 5/2005 | Watson et al. |
| 2005/0123639 A1 | 6/2005 | Ring et al. |
| 2005/0133225 A1 | 6/2005 | Oosterling |
| 2005/0138790 A1 | 6/2005 | Cook et al. |
| 2005/0144771 A1 | 7/2005 | Cook et al. |
| 2005/0144772 A1 | 7/2005 | Cook et al. |
| 2005/0144777 A1 | 7/2005 | Cook et al. |
| 2005/0150098 A1 | 7/2005 | Cook et al. |
| 2005/0150660 A1 | 7/2005 | Cook et al. |
| 2005/0161228 A1 | 7/2005 | Cook et al. |
| 2005/0166387 A1 | 8/2005 | Cook et al. |
| 2005/0166388 A1 | 8/2005 | Cook et al. |
| 2005/0173108 A1 | 8/2005 | Cook et al. |
| 2005/0175473 A1 | 8/2005 | Cook et al. |
| 2005/0183863 A1 | 8/2005 | Cook et al. |
| 2005/0205253 A1 | 9/2005 | Cook et al. |
| 2005/0217865 A1 | 10/2005 | Ring et al. |
| 2005/0217866 A1 | 10/2005 | Watson et al. |
| 2005/0223535 A1 | 10/2005 | Cook et al. |
| 2005/0224225 A1 | 10/2005 | Cook et al. |
| 2005/0230102 A1 | 10/2005 | Cook et al. |
| 2005/0230103 A1 | 10/2005 | Cook et al. |
| 2005/0230104 A1 | 10/2005 | Cook et al. |
| 2005/0230123 A1 | 10/2005 | Cook et al. |
| 2005/0236159 A1 | 10/2005 | Cook et al. |
| 2005/0236163 A1 | 10/2005 | Cook et al. |
| 2005/0244578 A1 | 11/2005 | Van Egmond et al. |
| 2005/0246883 A1 | 11/2005 | Alliot et al. |
| 2005/0247453 A1 | 11/2005 | Shuster et al. |
| 2005/0265788 A1 | 12/2005 | Renkema |
| 2005/0269107 A1 | 12/2005 | Cook et al. |
| 2006/0027371 A1 | 2/2006 | Gorrara |
| 2006/0032640 A1 | 2/2006 | Costa et al. |
| 2006/0048948 A1 | 3/2006 | Noel |
| 2006/0054330 A1 | 3/2006 | Metcalfe et al. |
| 2006/0065403 A1 | 3/2006 | Watson et al. |
| 2006/0065406 A1 | 3/2006 | Shuster et al. |
| 2006/0096762 A1 | 5/2006 | Brisco |
| 2006/0102360 A1 | 5/2006 | Brisco et al. |
| 2006/0112768 A1 | 6/2006 | Shuster et al. |
| 2006/0113086 A1 | 6/2006 | Costa et al. |
| 2006/0162937 A1 | 7/2006 | Costa et al. |
| 2006/0163460 A1 | 8/2006 | Brisco |
| 2006/0196679 A1 | 9/2006 | Brisco et al. |
| 2006/0207760 A1 | 9/2006 | Watson et al. |
| 2006/0208488 A1 | 9/2006 | Costa |
| 2006/0213668 A1 | 9/2006 | Cook et al. |
| 2005/0217768 A1 | 10/2006 | Asahi et al. |
| 2006/0219414 A1 | 10/2006 | Shuster |
| 2006/0225892 A1 | 10/2006 | Watson et al. |
| 2006/0243444 A1 | 11/2006 | Brisco |
| 2006/0266527 A1 | 11/2006 | Brisco et al. |
| 2006/0272826 A1 | 12/2006 | Shuster et al. |

| | | | | | | |
|---|---|---|---|---|---|---|
| 2007/0012456 A1 | 1/2007 | Cook | | GB | 1563740 | 3/1980 |
| 2007/0017572 A1 | 1/2007 | Cook | | GB | 1582767 | 1/1981 |
| 2007/0034383 A1 | 2/2007 | Shuster et al. | | GB | 2058877 A | 4/1981 |
| 2007/0039742 A1 | 2/2007 | Costa | | GB | 2108228 A | 5/1983 |
| 2007/0029095 A1 | 8/2007 | Brisco | | GB | 2115860 A | 9/1983 |

FOREIGN PATENT DOCUMENTS

| | | | | | |
|---|---|---|---|---|---|
| AU | 767364 | 2/2004 | GB | 2125876 A | 3/1984 |
| AU | 773168 | 5/2004 | GB | 2211573 A | 7/1989 |
| AU | 770008 | 7/2004 | GB | 2216926 A | 10/1989 |
| AU | 770359 | 7/2004 | GB | 2243191 A | 10/1991 |
| AU | 771884 | 8/2004 | GB | 2256910 A | 12/1992 |
| AU | 776580 | 1/2005 | GB | 2257184 A | 6/1993 |
| AU | 780123 | 3/2005 | GB | 2305682 A | 4/1997 |
| AU | 2001269810 | 8/2005 | GB | 2325949 A | 5/1998 |
| AU | 782901 | 9/2005 | GB | 2322655 A | 9/1998 |
| AU | 783245 | 10/2005 | GB | 2326896 A | 1/1999 |
| AU | 2001294802 | 10/2005 | GB | 2329916 A | 4/1999 |
| AU | 2001283026 | 7/2006 | GB | 2329918 A | 4/1999 |
| AU | 2002239857 | 8/2006 | GB | 2331103 A | 5/1999 |
| AU | 2001292695 | 10/2006 | GB | 2336383 A | 10/1999 |
| CA | 736288 | 6/1966 | GB | 2355738 A | 4/2000 |
| CA | 771462 | 11/1967 | GB | 2343691 A | 5/2000 |
| CA | 1171310 | 7/1984 | GB | 2344606 A | 6/2000 |
| CA | 2292171 | 6/2000 | GB | 2345308 A | 7/2000 |
| CA | 2497854 | 6/2000 | GB | 2368865 A | 7/2000 |
| CA | 2298139 | 8/2000 | GB | 2346165 A | 8/2000 |
| CA | 2234386 | 3/2003 | GB | 2346632 A | 8/2000 |
| CA | 2414449 | 9/2006 | GB | 2347445 A | 9/2000 |
| CA | 2398001 | 10/2006 | GB | 2347446 A | 9/2000 |
| CA | 2289811 | 1/2007 | GB | 2347950 A | 9/2000 |
| DE | 174521 | 4/1953 | GB | 2347952 A | 9/2000 |
| DE | 2458188 | 6/1975 | GB | 2348223 A | 9/2000 |
| DE | 203767 | 11/1983 | GB | 2348657 A | 10/2000 |
| DE | 233607 A1 | 3/1986 | GB | 2357099 A | 12/2000 |
| DE | 278517 A1 | 5/1990 | GB | 2356651 A | 5/2001 |
| EP | 0084940 A1 | 8/1983 | GB | 2350137 B | 8/2001 |
| EP | 0272511 | 12/1987 | GB | 2361724 | 10/2001 |
| EP | 0294264 | 5/1988 | GB | 2365898 A | 2/2002 |
| EP | 0553566 A1 | 12/1992 | GB | 2359837 B | 4/2002 |
| EP | 0633391 A2 | 1/1995 | GB | 2370301 A | 6/2002 |
| EP | 0713953 B1 | 11/1995 | GB | 2371064 A | 7/2002 |
| EP | 0823534 | 2/1998 | GB | 2371574 A | 7/2002 |
| EP | 0881354 | 12/1998 | GB | 2373524 | 9/2002 |
| EP | 0881359 | 12/1998 | GB | 2367842 A | 10/2002 |
| EP | 0699420 | 3/1999 | GB | 2374098 A | 10/2002 |
| EP | 0937861 | 8/1999 | GB | 2374622 A | 10/2002 |
| EP | 0952305 | 10/1999 | GB | 2375560 A | 11/2002 |
| EP | 0952306 | 10/1999 | GB | 2380213 A | 4/2003 |
| EP | 1141515 A | 10/2001 | GB | 2380503 A | 4/2003 |
| EP | 1152120 A2 | 11/2001 | GB | 2381019 A | 4/2003 |
| EP | 1152120 A3 | 11/2001 | GB | 2343691 B | 5/2003 |
| EP | 1235972 A | 9/2002 | GB | 2382364 A | 5/2003 |
| EP | 1555386 A1 | 7/2005 | GB | 2382828 A | 6/2003 |
| FR | 1325596 | 6/1962 | GB | 2344606 B | 8/2003 |
| FR | 2583398 A1 | 12/1986 | GB | 2347950 B | 8/2003 |
| FR | 2717855 A1 | 9/1995 | GB | 2380213 B | 8/2003 |
| FR | 2741907 A1 | 6/1997 | GB | 2380214 B | 8/2003 |
| FR | 2771133 A | 5/1999 | GB | 2380215 B | 8/2003 |
| FR | 2780751 | 1/2000 | GB | 2348223 B | 9/2003 |
| FR | 2841626 A1 | 1/2004 | GB | 2347952 B | 10/2003 |
| GB | 557823 | 12/1943 | GB | 2348657 B | 10/2003 |
| GB | 788150 | 12/1957 | GB | 2384800 B | 10/2003 |
| GB | 851096 | 10/1960 | GB | 2384801 B | 10/2003 |
| GB | 961750 | 6/1964 | GB | 2384802 B | 10/2003 |
| GB | 1000383 | 10/1965 | GB | 2384803 B | 10/2003 |
| GB | 1062610 | 3/1967 | GB | 2384804 B | 10/2003 |
| GB | 1111536 | 5/1968 | GB | 2384805 B | 10/2003 |
| GB | 1448304 | 9/1976 | GB | 2384806 B | 10/2003 |
| GB | 1460864 | 1/1977 | GB | 2384807 B | 10/2003 |
| GB | 1520552 A | 8/1978 | GB | 2384808 B | 10/2003 |
| GB | 1542847 | 3/1979 | GB | 2385353 B | 10/2003 |
| | | | GB | 2385354 B | 10/2003 |
| | | | GB | 2385355 B | 10/2003 |
| | | | GB | 2385356 B | 10/2003 |

| | | | | | | | |
|---|---|---|---|---|---|---|---|
| GB | 2385357 | B | 10/2003 | GB | 2397264 | B | 9/2004 |
| GB | 2385358 | B | 10/2003 | GB | 2397265 | B | 9/2004 |
| GB | 2385359 | B | 10/2003 | GB | 2399120 | A | 9/2004 |
| GB | 2385360 | B | 10/2003 | GB | 2399579 | A | 9/2004 |
| GB | 2385361 | B | 10/2003 | GB | 2399580 | A | 9/2004 |
| GB | 2385362 | B | 10/2003 | GB | 2399848 | A | 9/2004 |
| GB | 2385363 | B | 10/2003 | GB | 2399849 | A | 9/2004 |
| GB | 2385619 | B | 10/2003 | GB | 2399850 | A | 9/2004 |
| GB | 2385620 | B | 10/2003 | GB | 2384502 | B | 10/2004 |
| GB | 2385621 | B | 10/2003 | GB | 2396644 | B | 10/2004 |
| GB | 2385622 | B | 10/2003 | GB | 2400126 | A | 10/2004 |
| GB | 2385623 | B | 10/2003 | GB | 2400393 | A | 10/2004 |
| GB | 2387405 | A | 10/2003 | GB | 2400624 | A | 10/2004 |
| GB | 2387861 | A | 10/2003 | GB | 2396640 | B | 11/2004 |
| GB | 2388134 | A | 11/2003 | GB | 2396642 | B | 11/2004 |
| GB | 2388860 | A | 11/2003 | GB | 2401136 | A | 11/2004 |
| GB | 2355738 | B | 12/2003 | GB | 2401137 | A | 11/2004 |
| GB | 2374622 | B | 12/2003 | GB | 2401138 | A | 11/2004 |
| GB | 2388391 | B | 12/2003 | GB | 2401630 | A | 11/2004 |
| GB | 2388392 | B | 12/2003 | GB | 2401631 | A | 11/2004 |
| GB | 2388393 | B | 12/2003 | GB | 2401632 | A | 11/2004 |
| GB | 2388394 | B | 12/2003 | GB | 2401633 | A | 11/2004 |
| GB | 2388395 | B | 12/2003 | GB | 2401634 | A | 11/2004 |
| GB | 2391028 | A | 1/2004 | GB | 2401635 | A | 11/2004 |
| GB | 2356651 | B | 2/2004 | GB | 2401636 | A | 11/2004 |
| GB | 2368865 | B | 2/2004 | GB | 2401637 | A | 11/2004 |
| GB | 2388860 | B | 2/2004 | GB | 2401638 | A | 11/2004 |
| GB | 2388861 | B | 2/2004 | GB | 2401639 | A | 11/2004 |
| GB | 2388862 | B | 2/2004 | GB | 2381019 | B | 12/2004 |
| GB | 2391886 | A | 2/2004 | GB | 2382368 | B | 12/2004 |
| GB | 2390628 | B | 3/2004 | GB | 2394979 | B | 12/2004 |
| GB | 2391033 | B | 3/2004 | GB | 2401136 | B | 12/2004 |
| GB | 2392686 | A | 3/2004 | GB | 2401137 | B | 12/2004 |
| GB | 2393199 | A | 3/2004 | GB | 2401138 | B | 12/2004 |
| GB | 2373524 | B | 4/2004 | GB | 2403970 | A | 1/2005 |
| GB | 2390387 | B | 4/2004 | GB | 2403971 | A | 1/2005 |
| GB | 2392686 | B | 4/2004 | GB | 2403972 | A | 1/2005 |
| GB | 2392691 | B | 4/2004 | GB | 2400624 | B | 2/2005 |
| GB | 2391575 | B | 5/2004 | GB | 2404402 | A | 2/2005 |
| GB | 2394979 | A | 5/2004 | GB | 2404676 | A | 2/2005 |
| GB | 2395506 | A | 5/2004 | GB | 2404680 | A | 2/2005 |
| GB | 2392932 | B | 6/2004 | GB | 2384807 | C | 3/2005 |
| GB | 2395734 | A | 6/2004 | GB | 2388134 | B | 3/2005 |
| GB | 2396635 | A | 6/2004 | GB | 2398320 | B | 3/2005 |
| GB | 2396639 | A | 6/2004 | GB | 2398323 | B | 3/2005 |
| GB | 2396640 | A | 6/2004 | GB | 2399120 | B | 3/2005 |
| GB | 2396641 | A | 6/2004 | GB | 2399848 | B | 3/2005 |
| GB | 2396642 | A | 6/2004 | GB | 2399849 | B | 3/2005 |
| GB | 2396643 | A | 6/2004 | GB | 2405893 | A | 3/2005 |
| GB | 2396644 | A | 6/2004 | GB | 2406117 | A | 3/2005 |
| GB | 2396646 | A | 6/2004 | GB | 2406118 | A | 3/2005 |
| GB | 2373468 | B | 7/2004 | GB | 2406119 | A | 3/2005 |
| GB | 2396869 | A | 7/2004 | GB | 2406120 | A | 3/2005 |
| GB | 2397261 | A | 7/2004 | GB | 2406125 | A | 3/2005 |
| GB | 2397262 | A | 7/2004 | GB | 2406126 | A | 3/2005 |
| GB | 2397263 | A | 7/2004 | GB | 2410518 | A | 3/2005 |
| GB | 2397264 | A | 7/2004 | GB | 2406599 | A | 4/2005 |
| GB | 2397265 | A | 7/2004 | GB | 2389597 | B | 5/2005 |
| GB | 2398087 | A | 8/2004 | GB | 2399119 | B | 5/2005 |
| GB | 2398317 | A | 8/2004 | GB | 2399580 | B | 5/2005 |
| GB | 2398318 | A | 8/2004 | GB | 2401630 | B | 5/2005 |
| GB | 2398319 | A | 8/2004 | GB | 2401631 | B | 5/2005 |
| GB | 2398320 | A | 8/2004 | GB | 2401632 | B | 5/2005 |
| GB | 2398321 | A | 8/2004 | GB | 2401633 | B | 5/2005 |
| GB | 2398322 | A | 8/2004 | GB | 2401634 | B | 5/2005 |
| GB | 2398323 | A | 8/2004 | GB | 2401635 | B | 5/2005 |
| GB | 2398326 | A | 8/2004 | GB | 2401636 | B | 5/2005 |
| GB | 2382367 | B | 9/2004 | GB | 2401637 | B | 5/2005 |
| GB | 2396641 | B | 9/2004 | GB | 2401638 | B | 5/2005 |
| GB | 2396643 | B | 9/2004 | GB | 2401639 | B | 5/2005 |
| GB | 2397261 | B | 9/2004 | GB | 2408277 | A | 5/2005 |
| GB | 2397262 | B | 9/2004 | GB | 2408278 | A | 5/2005 |
| GB | 2397263 | B | 9/2004 | GB | 2399579 | B | 6/2005 |

| | | | | | | |
|---|---|---|---|---|---|---|
| GB | 2409216 | A | 6/2005 | GB | 2418216 | B | 10/2006 |
| GB | 2409218 | A | 6/2005 | GB | 2419907 | B | 10/2006 |
| GB | 2401893 | B | 7/2005 | GB | 2422860 | B | 10/2006 |
| GB | 2414749 | A | 7/2005 | GB | 2406125 | B | 11/2006 |
| GB | 2414750 | A | 7/2005 | GB | 2415004 | B | 12/2006 |
| GB | 2414751 | A | 7/2005 | GB | 2422859 | B | 12/2006 |
| GB | 2398362 | B | 8/2005 | GB | 2423317 | B | 12/2006 |
| GB | 2403970 | B | 8/2005 | GB | 2426993 | A | 12/2006 |
| GB | 2403971 | B | 8/2005 | GB | 2427636 | A | 1/2007 |
| GB | 2403972 | B | 8/2005 | GB | 2427885 | A | 1/2007 |
| GB | 2380503 | B | 10/2005 | GB | 2427886 | A | 1/2007 |
| GB | 2382828 | B | 10/2005 | ID | 197/2005 | | 1/2005 |
| GB | 2398317 | B | 10/2005 | ID | 044.392/2005 | | 9/2005 |
| GB | 2398318 | B | 10/2005 | ID | 2804/2006 | | 8/2006 |
| GB | 2398319 | B | 10/2005 | JP | 208458 | | 10/1985 |
| GB | 2398321 | B | 10/2005 | JP | 6475715 | | 3/1989 |
| GB | 2398322 | B | 10/2005 | JP | 102875 | | 4/1995 |
| GB | 2412681 | A | 10/2005 | JP | 11-169975 | | 6/1999 |
| GB | 2412682 | A | 10/2005 | JP | 94068 | A | 4/2000 |
| GB | 2413136 | A | 10/2005 | JP | 107870 | A | 4/2000 |
| GB | 2414493 | A | 11/2005 | JP | 162192 | | 6/2000 |
| GB | 2409217 | B | 12/2005 | JP | 2001-47161 | | 2/2001 |
| GB | 2410518 | B | 12/2005 | JP | 2418944 | A | 4/2006 |
| GB | 2415003 | A | 12/2005 | NL | 9001081 | | 12/1991 |
| GB | 2415219 | A | 12/2005 | RO | 113267 | B1 | 5/1998 |
| GB | 2395506 | B | 1/2006 | RU | 2016345 | C1 | 7/1994 |
| GB | 2412681 | B | 1/2006 | RU | 2039214 | C1 | 7/1995 |
| GB | 2412682 | B | 1/2006 | RU | 2056201 | C1 | 3/1996 |
| GB | 2415979 | A | 1/2006 | RU | 2064357 | C1 | 7/1996 |
| GB | 2415983 | A | 1/2006 | RU | 2068940 | C1 | 11/1996 |
| GB | 2415987 | A | 1/2006 | RU | 2068943 | C1 | 11/1996 |
| GB | 2415988 | A | 1/2006 | RU | 2079633 | C1 | 5/1997 |
| GB | 2416177 | A | 1/2006 | RU | 2083798 | C1 | 7/1997 |
| GB | 2416361 | A | 1/2006 | RU | 2091655 | C1 | 9/1997 |
| GB | 2416556 | A | 2/2006 | RU | 2095179 | C1 | 11/1997 |
| GB | 2416794 | A | 2/2006 | RU | 2105128 | C1 | 2/1998 |
| GB | 2416795 | A | 2/2006 | RU | 2108445 | C1 | 4/1998 |
| GB | 2417273 | A | 2/2006 | RU | 2144128 | C1 | 1/2000 |
| GB | 2417275 | A | 2/2006 | SU | 350833 | | 9/1972 |
| GB | 2418216 | A | 3/2006 | SU | 511468 | | 9/1976 |
| GB | 2418217 | A | 3/2006 | SU | 607950 | * | 5/1978 |
| GB | 2418690 | A | 4/2006 | SU | 612004 | | 5/1978 |
| GB | 2418941 | A | 4/2006 | SU | 620582 | | 7/1978 |
| GB | 2418942 | A | 4/2006 | SU | 641070 | | 1/1979 |
| GB | 2418943 | A | 4/2006 | SU | 909114 | | 5/1979 |
| GB | 2419907 | A | 5/2006 | SU | 832049 | | 5/1981 |
| GB | 2419913 | A | 5/2006 | SU | 853089 | | 8/1981 |
| GB | 2400126 | B | 6/2006 | SU | 874952 | | 10/1981 |
| GB | 2414749 | B | 6/2006 | SU | 894169 | | 1/1982 |
| GB | 2420810 | A | 6/2006 | SU | 899850 | | 1/1982 |
| GB | 2421257 | A | 6/2006 | SU | 907220 | | 2/1982 |
| GB | 2421258 | A | 6/2006 | SU | 953172 | | 8/1982 |
| GB | 2421259 | A | 6/2006 | SU | 959878 | | 9/1982 |
| GB | 2421262 | A | 6/2006 | SU | 976019 | | 11/1982 |
| GB | 2421529 | A | 6/2006 | SU | 976020 | | 11/1982 |
| GB | 2422164 | A | 7/2006 | SU | 989038 | | 1/1983 |
| GB | 2406599 | B | 8/2006 | SU | 1002514 | | 3/1983 |
| GB | 2418690 | B | 8/2006 | SU | 1041671 | A | 9/1983 |
| GB | 2418944 | B | 8/2006 | SU | 1051222 | A | 10/1983 |
| GB | 2421257 | B | 8/2006 | SU | 1088118 | A | 4/1984 |
| GB | 2421258 | B | 8/2006 | SU | 1077803 | A | 7/1984 |
| GB | 2421259 | B | 8/2006 | SU | 1158400 | A | 5/1985 |
| GB | 2422859 | A | 8/2006 | SU | 1212575 | A | 2/1986 |
| GB | 2422860 | A | 8/2006 | SU | 1250637 | A1 | 8/1986 |
| GB | 2423317 | A | 8/2006 | SU | 1324722 | A1 | 7/1987 |
| GB | 2404676 | B | 9/2006 | SU | 1411434 | | 7/1988 |
| GB | 2414493 | B | 9/2006 | SU | 1430498 | A1 | 10/1988 |
| GB | 2418941 | B | 9/2006 | SU | 1432190 | A1 | 10/1988 |
| GB | 2418942 | B | 9/2006 | SU | 1601330 | A1 | 10/1990 |
| GB | 2418943 | B | 9/2006 | SU | 1627663 | A2 | 2/1991 |
| GB | 2424077 | A | 9/2006 | SU | 1659621 | A1 | 6/1991 |
| GB | 2405893 | B | 10/2006 | SU | 1663179 | A2 | 7/1991 |
| GB | 2417273 | B | 10/2006 | SU | 1663180 | A1 | 7/1991 |

| | | | | | | | |
|---|---|---|---|---|---|---|---|
| SU | 1677225 | A1 | 9/1991 | WO | WO01/04520 | A1 | 1/2001 |
| SU | 1677248 | A1 | 9/1991 | WO | WO01/04535 | A1 | 1/2001 |
| SU | 1686123 | A1 | 10/1991 | WO | WO01/18354 | A1 | 3/2001 |
| SU | 1686124 | A1 | 10/1991 | WO | WO01/21929 | A1 | 3/2001 |
| SU | 1686125 | A1 | 10/1991 | WO | WO01/26860 | A1 | 4/2001 |
| SU | 1698413 | A1 | 12/1991 | WO | WO01/33037 | A1 | 5/2001 |
| SU | 1710694 | A | 2/1992 | WO | WO01/38693 | A1 | 5/2001 |
| SU | 1730429 | A1 | 4/1992 | WO | WO01/60545 | A1 | 8/2001 |
| SU | 1745873 | * | 7/1992 | WO | WO01/83943 | A1 | 11/2001 |
| SU | 1745873 | A1 | 7/1992 | WO | WO01/98623 | A1 | 12/2001 |
| SU | 1747673 | A1 | 7/1992 | WO | WO02/01102 | A1 | 1/2002 |
| SU | 1749267 | A1 | 7/1992 | WO | WO02/10550 | A1 | 2/2002 |
| SU | 1786241 | A1 | 1/1993 | WO | WO02/10551 | A1 | 2/2002 |
| SU | 1804543 | A3 | 3/1993 | WO | WO 02/20941 | A1 | 3/2002 |
| SU | 1810482 | A1 | 4/1993 | WO | WO02/23007 | A1 | 3/2002 |
| SU | 1818459 | A1 | 5/1993 | WO | WO02/25059 | A1 | 3/2002 |
| SU | 1295799 | A1 | 2/1995 | WO | WO02/29199 | A1 | 4/2002 |
| WO | WO81/00132 | | 1/1981 | WO | WO02/40825 | A1 | 5/2002 |
| WO | WO90/05598 | | 3/1990 | WO | WO02/053867 | A2 | 7/2002 |
| WO | WO92/01859 | | 2/1992 | WO | WO02/053867 | A3 | 7/2002 |
| WO | WO92/08875 | | 5/1992 | WO | WO02/059456 | A1 | 8/2002 |
| WO | WO93/25799 | | 12/1993 | WO | WO02/066783 | A1 | 8/2002 |
| WO | WO93/25800 | | 12/1993 | WO | WO02/068792 | A1 | 9/2002 |
| WO | WO94/21887 | | 9/1994 | WO | WO02/073000 | A1 | 9/2002 |
| WO | WO94/25655 | | 11/1994 | WO | WO02/075107 | A1 | 9/2002 |
| WO | WO95/03476 | | 2/1995 | WO | WO02/077411 | A1 | 10/2002 |
| WO | WO96/01937 | | 1/1996 | WO | WO02/081863 | A1 | 10/2002 |
| WO | WO96/21083 | | 7/1996 | WO | WO02/081864 | A2 | 10/2002 |
| WO | WO96/26350 | | 8/1996 | WO | WO02/086285 | A1 | 10/2002 |
| WO | WO96/37681 | | 11/1996 | WO | WO02/086286 | A2 | 10/2002 |
| WO | WO97/06346 | | 2/1997 | WO | WO02/090713 | | 11/2002 |
| WO | WO97/11306 | | 3/1997 | WO | WO02/095181 | A1 | 11/2002 |
| WO | WO97/17524 | | 5/1997 | WO | WO02/103150 | A2 | 12/2002 |
| WO | WO97/17526 | | 5/1997 | WO | WO03/004819 | A2 | 1/2003 |
| WO | WO97/17527 | | 5/1997 | WO | WO03/004819 | A3 | 1/2003 |
| WO | WO97/20130 | | 6/1997 | WO | WO03/004820 | A2 | 1/2003 |
| WO | WO97/21901 | | 6/1997 | WO | WO03/004820 | A3 | 1/2003 |
| WO | WO97/35084 | | 9/1997 | WO | WO03/008756 | A1 | 1/2003 |
| WO | WO98/00626 | | 1/1998 | WO | WO03/012255 | A1 | 2/2003 |
| WO | WO98/07957 | | 2/1998 | WO | WO03/016669 | A2 | 2/2003 |
| WO | WO98/09053 | | 3/1998 | WO | WO03/016669 | A3 | 2/2003 |
| WO | WO98/22690 | | 5/1998 | WO | WO03/023178 | A2 | 3/2003 |
| WO | WO98/26152 | | 6/1998 | WO | WO03/023178 | A3 | 3/2003 |
| WO | WO98/42947 | | 10/1998 | WO | WO03/023179 | A2 | 3/2003 |
| WO | WO98/49423 | | 11/1998 | WO | WO03/023179 | A3 | 3/2003 |
| WO | WO99/02818 | | 1/1999 | WO | WO02/038343 | A3 | 4/2003 |
| WO | WO99/04135 | | 1/1999 | WO | WO03/029607 | A1 | 4/2003 |
| WO | WO99/06670 | | 2/1999 | WO | WO03/029608 | A1 | 4/2003 |
| WO | WO99/08827 | | 2/1999 | WO | WO03/036018 | A2 | 5/2003 |
| WO | WO99/08828 | | 2/1999 | WO | WO03/042486 | A2 | 5/2003 |
| WO | WO99/18328 | | 4/1999 | WO | WO03/042486 | A3 | 5/2003 |
| WO | WO99/23354 | | 5/1999 | WO | WO03/042487 | A2 | 5/2003 |
| WO | WO99/25524 | | 5/1999 | WO | WO03/042487 | A3 | 5/2003 |
| WO | WO99/25951 | | 5/1999 | WO | WO03/042489 | A2 | 5/2003 |
| WO | WO99/35368 | | 7/1999 | WO | WO03/048520 | A1 | 6/2003 |
| WO | WO99/43923 | | 9/1999 | WO | WO03/048521 | A2 | 6/2003 |
| WO | WO00/01926 | | 1/2000 | WO | WO03/055616 | A2 | 7/2003 |
| WO | WO00/04271 | | 1/2000 | WO | WO03/058022 | A2 | 7/2003 |
| WO | WO00/08301 | | 2/2000 | WO | WO03/058022 | A3 | 7/2003 |
| WO | WO00/26500 | | 5/2000 | WO | WO03/059549 | A1 | 7/2003 |
| WO | WO00/26501 | | 5/2000 | WO | WO03/064813 | A1 | 8/2003 |
| WO | WO00/26502 | | 5/2000 | WO | WO03/069115 | A3 | 8/2003 |
| WO | WO00/31375 | | 6/2000 | WO | WO03/071086 | A2 | 8/2003 |
| WO | WO00/37767 | | 6/2000 | WO | WO03/071086 | A3 | 8/2003 |
| WO | WO00/37768 | | 6/2000 | WO | WO03/078785 | A2 | 9/2003 |
| WO | WO00/37771 | | 6/2000 | WO | WO03/078785 | A3 | 9/2003 |
| WO | WO00/37772 | | 6/2000 | WO | WO03/086675 | A2 | 10/2003 |
| WO | WO00/39432 | | 7/2000 | WO | WO03/086675 | A3 | 10/2003 |
| WO | WO00/46484 | | 8/2000 | WO | WO03/089161 | A2 | 10/2003 |
| WO | WO00/50727 | | 8/2000 | WO | WO03/089161 | A3 | 10/2003 |
| WO | WO00/50732 | | 8/2000 | WO | WO03/093623 | A2 | 11/2003 |
| WO | WO00/50733 | | 8/2000 | WO | WO03/093623 | A3 | 11/2003 |
| WO | WO00/77431 | A2 | 12/2000 | WO | WO03/102365 | A1 | 12/2003 |

| | | |
|---|---|---|
| WO | WO 03/104601 A2 | 12/2003 |
| WO | WO 03/104601 A3 | 12/2003 |
| WO | WO 03/106130 A2 | 12/2003 |
| WO | WO 03/106130 A3 | 12/2003 |
| WO | WO2004/003337 A1 | 1/2004 |
| WO | WO2004/009950 A1 | 1/2004 |
| WO | WO2004/010039 A2 | 1/2004 |
| WO | WO2004/010039 A3 | 1/2004 |
| WO | WO2004/011776 A2 | 2/2004 |
| WO | WO2004/011776 A3 | 2/2004 |
| WO | WO2004/018823 A2 | 3/2004 |
| WO | WO2004/018823 A3 | 3/2004 |
| WO | WO2004/018824 A2 | 3/2004 |
| WO | WO2004/018824 A3 | 3/2004 |
| WO | WO2004/020895 A2 | 3/2004 |
| WO | WO2004/020895 A3 | 3/2004 |
| WO | WO2004/023014 A2 | 3/2004 |
| WO | WO2004/023014 A3 | 3/2004 |
| WO | WO2004/026017 A2 | 4/2004 |
| WO | WO2004/026017 A3 | 4/2004 |
| WO | WO2004/026073 A2 | 4/2004 |
| WO | WO2004/026073 A3 | 4/2004 |
| WO | WO2004/026500 A2 | 4/2004 |
| WO | WO2004/026500 A3 | 4/2004 |
| WO | WO2004/027200 A2 | 4/2004 |
| WO | WO2004/027200 A3 | 4/2004 |
| WO | WO2004/027204 A2 | 4/2004 |
| WO | WO2004/027204 A3 | 4/2004 |
| WO | WO2004/027205 A2 | 4/2004 |
| WO | WO2004/027205 A3 | 4/2004 |
| WO | WO2004/027392 A1 | 4/2004 |
| WO | WO2004/027786 A2 | 4/2004 |
| WO | WO2004/027786 A3 | 4/2004 |
| WO | WO2004/053434 A2 | 6/2004 |
| WO | WO2004/053434 A3 | 6/2004 |
| WO | WO2004/057715 A2 | 7/2004 |
| WO | WO2004/057715 A3 | 7/2004 |
| WO | WO2004/067961 A2 | 8/2004 |
| WO | WO2004/067961 A3 | 8/2004 |
| WO | WO2004/072436 A1 | 8/2004 |
| WO | WO2004/074622 A2 | 9/2004 |
| WO | WO2004/074622 A3 | 9/2004 |
| WO | WO2004/076798 A2 | 9/2004 |
| WO | WO2004/076798 A3 | 9/2004 |
| WO | WO2004/081346 A2 | 9/2004 |
| WO | WO2004/083591 A2 | 9/2004 |
| WO | WO2004/083591 A3 | 9/2004 |
| WO | WO2004/083592 A2 | 9/2004 |
| WO | WO2004/083592 A3 | 9/2004 |
| WO | WO2004/083593 A2 | 9/2004 |
| WO | WO2004/083594 A2 | 9/2004 |
| WO | WO2004/083594 A3 | 9/2004 |
| WO | WO2004/085790 A2 | 10/2004 |
| WO | WO2004/089608 A2 | 10/2004 |
| WO | WO2004/092527 A2 | 10/2004 |
| WO | WO2004/092528 A2 | 10/2004 |
| WO | WO2004/092528 A3 | 10/2004 |
| WO | WO2004/092530 A2 | 10/2004 |
| WO | WO2004/092530 A3 | 10/2004 |
| WO | WO2004/094766 A2 | 11/2004 |
| WO | WO2004/094766 A3 | 11/2004 |
| WO | WO2005/017303 A2 | 2/2005 |
| WO | WO2005/021921 A2 | 3/2005 |
| WO | WO2005/021921 A3 | 3/2005 |
| WO | WO2005/021922 A2 | 3/2005 |
| WO | WO2005/021922 A3 | 3/2005 |
| WO | WO2005/024141 A3 | 3/2005 |
| WO | WO2005/024170 A2 | 3/2005 |
| WO | WO2005/024170 A3 | 3/2005 |
| WO | WO2005/024171 A2 | 3/2005 |
| WO | WO2005/028803 A2 | 3/2005 |
| WO | WO2005/071212 A1 | 4/2005 |
| WO | WO2005/079186 A2 | 9/2005 |
| WO | WO2005/079186 A3 | 9/2005 |
| WO | WO2005/081803 | 9/2005 |
| WO | WO2005/086614 A2 | 9/2005 |
| WO | WO2006/014333 A2 | 2/2006 |
| WO | WO2006/020723 A2 | 2/2006 |
| WO | WO2006/020726 A2 | 2/2006 |
| WO | WO2006/020734 A2 | 2/2006 |
| WO | WO2006/020809 A2 | 2/2006 |
| WO | WO2006/020810 A2 | 2/2006 |
| WO | WO2006/020827 A2 | 2/2006 |
| WO | WO2006/020827 A3 | 2/2006 |
| WO | WO2006/020913 A2 | 2/2006 |
| WO | WO2006/020913 A3 | 2/2006 |
| WO | WO2006/020960 A2 | 2/2006 |
| WO | WO2006/033720 A2 | 3/2006 |
| WO | WO2004/089608 A3 | 7/2006 |
| WO | WO2006/079072 A2 | 7/2006 |
| WO | WO2006/020810 A3 | 8/2006 |
| WO | WO2006/088743 A2 | 8/2006 |
| WO | WO2006/102171 A2 | 9/2006 |
| WO | WO2006/102556 A2 | 9/2006 |
| WO | WO2006/020734 A3 | 11/2006 |
| WO | WO2006/020810 A3 | 11/2006 |
| WO | WO2006/060387 A3 | 2/2007 |
| WO | WO2007/014339 A2 | 2/2007 |

OTHER PUBLICATIONS

Mohawk Energy, :Minimizing Drilling Ecoprints Houston, Dec. 16, 2005.
International Perliminary Examination Report, Application PCT/US01/28690, Sep. 4, 2003.
International Preliminary Examination Report, Application PCT/US03/15020 (corrected), Nov. 14, 2004.
International Preliminary Report on Patentability, Application PCT/US04/00631, Mar. 2, 2006.
International Preliminary Report on Patentability, Application PCT/US04/04740, Jun. 27, 2006.
International Preliminary Report on Patentability, Application PCT/US04/10317, Jun. 23, 2006.
International Preliminary Report on Patentability, Application PCT/US04/028423, Mar. 9, 2006.
International Preliminary Report on Patentability, Application PCT/US04/028423, Jun. 19, 2006.
Combined Search Report and Written Opinion to Application No. PCT/US04/00631, Mar. 28, 2005.
Combined Search Report and Written Opinion to Application No. PCT/US04/28831, Dec. 19, 2005.
Combined Search Report and Written Opinion to Application No. PCT/US04/28889, Nov. 14, 2005.
Combined Search Report and Written Opinion to Application No. PCT/US05/28869, Apr. 17, 2006.
Search Report to Application No. GB 0507980.1, Apr. 24, 2006.
Examination Report to Application No. GB 0219757.2, Oct. 31, 2004.
Examination Report to Application No. GB 03701281.2, Jan. 31, 2006.
Examination Report to Application No. GB 040019.6, Nov. 4, 2005.
Examination Report to Application No. GB 0406257.6, Sep. 2, 2005.
Examination Report to Application No. GB 0406257.6, Nov. 9, 2005.
Examination Report to Application No. GB 0406258.4, Dec. 20, 2005.
Examination Report to Application No. GB 0412876.5, Feb. 13, 2006.
Examination Report to Application No. GB 0415835.8, Dec. 23, 2005.
Examination Report to Application No. GB 0422419.2, Nov. 8, 2005.
Examination Report to Application No. GB 0422893.8, Aug. 8, 2005.

Examination Report to Application No. GB 0422893.8, Dec. 15, 2005.
Examination Report to Application No. GB 0425948.7, Nov. 24, 2005.
Examination Report to Application No. GB 0425956.0, Nov. 24, 2005.
Examination Report to Application No. GB 0428141.6, Feb. 21, 2006.
Examination Report to Application No. GB 0500275.3, Apr. 5, 2006.
Examination Report to Application No. GB 0501667.0, Jan. 27, 2006.
Examination Report to Application No. GB 0503250.3, Nov. 15, 2005.
Examination Report to Application No. GB 0503250.3, Mar. 2, 2006.
Examination Report to Application No. GB 0506699.8, May 11, 2006.
Examination Report to Application No. GB 0506700.4, May 16, 2006.
Examination Report to Application No. GB 0506702.0, May 11, 2006.
Examination Report to Application No. GB 0507979.3, Jun. 16, 2005.
Examination Report to Application No. GB 0507979.3, Jan. 17, 2006.
Examination Report to Application No. GB 0507979.3, Jun. 6, 2006.
Examination Report to Application No. GB 0507980.1, Sep. 29, 2005.
Examination Report to Application No. GB 0509618.5, Feb. 3, 2006.
Examination Report to Application No. GB 0509620.1, Feb. 14, 2006.
Examination Report to Application No. GB 0509627.6, Feb. 3, 2006.
Examination Report to Application No. GB 0509629.2, Feb. 3, 2006.
Examination Report to Application No. GB 0509630.0, Feb. 3, 2006.
Examination Report to Application No. GB 0509630, May 11, 2006.
Examination Report to Application No. GB 0509630.0, Jun. 6, 2006.
Examination Report to Application No. GB 0509631.8, Feb. 14, 2006.
Examination Report to Application No. GB 0517448.7, Nov. 9, 2005.
Examination Report to Application No. GB 0518025.2, Oct. 27, 2005.
Examination Report to Application No. GB 0518025.2, May 25, 2006.
Examination Report to Application No. GB 0518039.3, Nov. 29, 2005.
Examination Report to Application No. GB 0518252.2, Oct. 28, 2005.
Examination Report to Application No. GB 0518252.2, May 25, 2006.
Examination Report to Application No. GB 0518799.2, Nov. 9, 2005.
Examination Report to Application No. GB 0518799.2, Jun. 14, 2006.
Examination Report to Application No. GB 0518893.3, Dec. 16, 2005.
Examination Report to Application No. GB 0519989.8, Mar. 8, 2006.
Examination Report to Application No. GB 0521024.0, Dec. 22, 2005.
Examination Report to Application No. GB 0522050.4, Dec. 13, 2005.
Examination Report to Application No. GB 0602877.3, Mar. 20, 2006.
Examination Report to Application No. GB 0603576.0, Apr. 5, 2006.
Examination Report to Application No. GB 0603656.0, May 3, 2006.
Examination Report to Application No. GB 0603995.2, Apr. 25, 2006.
Examination Report to Application No. GB 0603996.0, Apr. 27, 2006.
Examination Report to Application No. GB 0604357.4, Apr. 27, 2006.
Examination Report to Application No. GB 0604359.0, Apr. 27, 2006.
Examination Report to Application No. GB 0604360.8, Apr. 26, 2006.
Search and Examination Report to Application No. GB 0412876.5, Sep. 27, 2005.
Search and Examination Report to Application No. GB 0516429.8, Nov. 7, 2005.
Search and Examination Report to Application No. GB 0516430.6, Nov. 8, 2005.
Search and Examination Report to Application No. GB 0516431.4, Nov. 8, 2005.
Search and Examination Report to Application No. GB 0522155.1, Mar. 7, 2006.
Search and Examination Report to Application No. GB 0522892.9 Jan. 5, 2006.
Search and Examination Report to Application No. GB 0523075.0, Jan. 12, 2006.
Search and Examination Report to Application No. GB 0523076.8, Dec. 14, 2005.
Search and Examination Report to Application No. GB 0523078.4, Dec. 13, 2005.
Search and Examination Report to Application No. GB 0523132.9, Jan. 12, 2006.
Search and Examination Report to Application No. GB 0524692.1, Dec. 19, 2005.
Search and Examination Report to Application No. GB 0525768.8, Feb. 3, 2006.
Search and Examination Report to Application No. GB 0525770.4, Feb. 3, 2006.
Search and Examination Report to Application No. GB 0525772.0, Feb. 2, 2006.
Search and Examination Report to Application No. GB 0525774.6, Feb. 2, 2006.
Examination Report to Application No. AU 2003257878, Jan. 19, 2006.
Examination Report to Application No. AU 2003257878, Jan. 30, 2006.
Examination Report to Application No. AU 2003257881, Jan. 19, 2006.
Examination Report to Application No. AU 2003257881, Jan. 30, 2006.
Examination Report to Application No. AU 2004202805, Jun. 14, 2006.
Examination Report to Application No. AU 2004202809, Jun. 14, 2006.
Examination Report to Application No. AU 2004202812, Jun. 14, 2006.
Examination Report to Application No. AU 2004202813, Jun. 14, 2006.
Examination Report to Application No. AU 2004202815, Jun. 14, 2006.
Search Report to Application No. EP 03071281.2; Nov. 7, 2005.
Search Report to Application No. EP 03071281.2; Nov. 14, 2005.
Search Report to Application No. EP 03723674.2; Nov. 22, 2005.
Search Report to Application No. EP 03723674.2; May 2, 2006.
Search Report to Application No. EP 03728326.4; Mar. 13, 2006.
Search Report to Application No. EP 03728326.4; Apr. 24, 2006.
Search Report to Application No. EP 03752486.5; Feb. 8, 2006.
Search Report to Application No. EP 03759400.9; Mar. 3, 2006.
Search Report to Application No. EP 03759400.9; Mar. 24, 2006.
Search Report to Application No. EP 03793078.1; Mar. 21, 2006.
Search Report to Application No. EP 03793078.1; Jun. 16, 2006.
Examination Report to Application No. Norway 2002 1613, May 13, 2006.

International Preliminary Examination Report, Application PCT/US02/24399, Aug. 6, 2004.
International Preliminary Examination Report, Application PCT/US02/25608, Jun. 1, 2005.
International Preliminary Examination Report, Application PCT/US02/25727, Jul. 7, 2004.
International Preliminary Examination Report PCT/US02/36157, Apr. 14, 2004.
International Preliminary Examination Report, Application PCT/US02/36267, Jan. 4, 2004.
International Preliminary Examination Report, Application PCT/US02/39418, Feb. 18, 2005.
International Preliminary Examination Report, Application PCT/US03/04837, Dec. 9, 2004.
International Preliminary Examination Report, Application PCT/US03/06544, May 10, 2005.
International Preliminary Examination Report, Application PCT/US03/10144, Jul. 7, 2004.
International Preliminary Examination Report, Application PCT/US03/11765, Dec. 10, 2004.
International Preliminary Examination Report, Application PCT/US03/11765, Jan. 25, 2005.
International Preliminary Examination Report, Application PCT/US03/11765, Jul. 18, 2005.
International Preliminary Examination Report, Application PCT/US01/11765, Aug. 15, 2005 (Corrected).
International Preliminary Examination Report, Application PCT/US03/13787, Mar. 2, 2005.
International Preliminary Examination Report, Application PCT/US03/13787, Apr. 7, 2005.
International Preliminary Examination Report, Application PCT/US03/14153, May 12, 2005.
International Preliminary Examination Report, Application PCT/US03/15020, May 9, 2005.
International Preliminary Examination Report, Application PCT/US03/20870, Sep. 30, 2004.
International Preliminary Examination Report, Application PCT/US03/25667, May 25, 2005.
International Preliminary Examination Report, Application PCT/US03/25675, Aug. 30, 2005.
International Preliminary Examination Report, Application PCT/US03/25676, Aug. 17, 2004.
International Preliminary Examination Report, Application PCT/US03/25677, Aug. 17, 2004.
International Preliminary Examination Report, Application PCT/US03/25742, Dec. 20, 2004.
International Preliminary Examination Report, Application PCT/US03/29460, Dec. 8, 2004.
International Preliminary Examination Report, Application PCT/US03/29858, May 23, 2005.
International Preliminary Examination Report, Application PCT/US03/29859, Aug. 16, 2004.
International Preliminary Examination Report, Application PCT/US03/38550, May 23, 2005.
International Preliminary Report on Patentability, Application PCT/US04/02122, May 13, 2005.
International Preliminary Report on Patentability, Application PCT/US04/04740, Apr. 27, 2005.
International Preliminary Report on Patentability, Application PCT/US04/06246, May 5, 2005.
International Preliminary Report on Patentability, Application PCT/US04/08030, Apr. 7, 2005.
International Preliminary Report on Patentability, Application PCT/US04/08030, Jun. 10, 2005.
International Preliminary Report on Patentability, Application PCT/US04/08073, May 9, 2005.
International Preliminary Report on Patentability, Application PCT/US04/008170, Sep. 29, 2005.
International Preliminary Report on Patentability, Application PCT/US04/08171, Sep. 13, 2005.
International Preliminary Report on Patentability, Application PCT/US04/11177, Jun. 9, 2005.
International Preliminary Report on Patentability, Application PCT/US04/28438, Sep. 20, 2005.
Written Opinion to Application No. PCT/US02/39425, Apr. 11, 2005.
Written Opinion to Application No. PCT/US03/25675, Nov. 24, 2004.
Written Opinion to Application No. PCT/US03/25675, May 9, 2005.
Written Opinion to Application No. PCT/US04/08171, May 5, 2005.
Combined Search Report and Written Opinion to Application No. PCT/US04/02122, Feb. 24, 2005.
Combined Search Report and Written Opinion to Application No. PCT/US04/10762, Sep. 1, 2005.
Combined Search Report and Written Opinion to Application No. PCT/US04/28423, Jul. 13, 2005.
Examination Report to Application No. AU 2001278196, Apr. 21, 2005.
Examination Report to Application No. AU 2002237757, Apr. 28, 2005.
Examination Report to Application No. AU 2002240366, Apr. 13, 2005.
Search Report to Application No. EP 02806451.7; Feb. 9, 2005.
Search Report to Application No. Norway 1999 5593, Aug. 20, 2002.
Blasingame et al., "Solid Expandable Tubular Technology in Mature Basins," *Society of Petroleum Engineers* 2003.
Brass et al., "Water Production Management—PDO's Successful Application of Expandable Technology," *Society of Petroleum Engineers*, 2002.
Brock et al., "An Expanded Horizon," Hart's E&P, Feb. 2000.
Buckler et al., "Expandable Cased-hold Linear Remediates Prolific Gas Well and Minimizes Loss of Production," *Offshore Technology Conference*, 15151.
Bullock, "Advances Grow Expandable Applications," *The American Oil & Gas Reporter*, Sep. 2004.
Cales, "The Development and Applications of Solid Expandable Tubular Technology," *Enventure Global Technology*, Paper 2003-136, 2003.
Cales et al., "Reducing Non-Productive Time Through the Use of Solid Expandable Tubulars: How to Beat the Curve Through Pre-Planning," *Offshore Technology Conference*, 16669, 2004.
Cales et al., "Subsidence Remediation—Extending Well Life Through the Use of Soild Expandable Casing Systems," *AADE Houston Chapter*, Mar. 27, 2001.
Campo et al., "Case Histories- Drilling and Recompletion Applications Using Solid Expandable Tubular Technology," *Society of Petroleum Engineers*, SPE/IADC 72304, 2002.
Carstens et al., "Solid Expandable Tubular Technology: The Value of Planned Installations vs. Contingency,".
Case History, "Eemskanaal -2 Groningen," Enventure Global Technology, Feb. 2002.
Case History, "Graham Ranch No. 1 Newark East Barnett Field" Enventure Global Technology, Feb. 2002.
Case History, "K.K. Camel No. 1 Ridge Field Lafayette Parish, Louisiana," Enventure Global Technology, Feb. 2002.
Case History, "Mississippi Canyon 809 URSA TLP, OSC-G 5868, No. A-12," Enventure Global Technology, Mar. 2004.
Case History, "Unocal Sequoia Mississippi Canyon 941 Well No. 2" Enventure Global Technology, 2005.
Case History, "Yibal 381 Oman," Enventure Global Technology, Feb. 2002.
Cook, "Same Internal Casing Diameter From Surface to TD," *Offshore*, Jul. 2002.
Cottrill, "Expandable Tubulars Close in on the Hold Grail of Drilling," *Upstream*, Jul. 26, 2002.
Daigle et al., "Expandable Tubulars: Field Examples of Application in Well Construction and Remediation," *Society ot Petroleum Engineers*, SPE 62958, 2000.
Daneshy, "Technology Strategy Breeds Value," E&P, May 2004.
Data Sheet, "Enventure Cased-Hold Linear (CHL) System" Enventure Global Technology, Dec. 2002.

Data Sheet, "Enventure Openhole Linear (OHL) System" Enventure Global Technology, Dec. 2002.

Data Sheet, "Window Exit Applications OHL Window Exit Expansion" Enventure Global Technology, Jun. 2003.

Dean et al., "Monodiameter Drilling Linear—From Concept to Reality," *Society of Petroleum Engineers*, SPE/IADC 79790, 2003.

Demong et al., "Breakthrough Using Solid Expandable Tubulars to Construct Extended Reach Wells," *Society of Petroleum Engineers*, IADC/SPE 87209, 2004.

Demong et al., "Casing Design in Complex Wells: The Use of Expandables and Multilateral Technology to Attack the size Reduction Issue".

Demong et al., "Expandable Tubulars Enable Multilaterals Without Compromise on Hole Size," *Offshore*, Jun. 2003.

Demong et al., "Planning the Well Construction Process for the Use of Solid Expandable Casing," *Society of Petroluem Engineers*, SPE 85303, 2003.

Demoulin, "Les Tubes Expansibles Changent La Face Du Forage Petrolier," *L'Usine Nouvelle*, 2878:50-52, 3 Juillet 2003.

Dupal et al., "Realization of the MonoDiameter Well: Evolution of a Game-Changing Technology," *Offshore Technology Conference*, OTC 14312, 2002.

Dupal et al., "Soild Expandable Tubular Technology—A Year of Case Histories in the Drilling Environment," *Society of Petroleum Engineers*, SPE/IADC 67770, 2001.

Dupal et al., "Well Design with Expandable Tubulars Reduces Cost and Increases Success in Deepwater Applications," *Deep Offshore Technology*, 2000.

Duphorne, "Letter Re: Enventure Claims of Baker Infringement of Enventure's Expandable Patents," Apr. 1, 2005.

Enventure Global Technology, "Solid Expandable Tubulars are Enabling Technology," *Drilling Contractor*, Mar.-Apr. 2001.

"Enventure Ready to Rejuvinate the North Sea," *Roustabout*, Sep. 2004.

Escobar et al., "Increasing Solid Expandable Tubular Technology Reliability in a Myriad of Downhold Environments," *Society of Petroleum Engineers*, SPE/IADC 81094, 2003.

"Expandable Casing Accesses Remote Reservoirs," *Petroleum Engineer International*, Apr. 1999.

Filippov et al., "Expandable Tubular Solutions," *Society of Petroleum Engineers*, SPE 56500, 1999.

"First ever SET Workshop Help in Aberdeen," *Roustabout*, Oct. 2004.

Fischer, "Expandables and the Dream of the Monodiameter Well: A Status Report", *World Oil*, Jul. 2004.

Fontova, "Solid Expandable Tubulars (SET) Provide Value to Operators Worldwide in a Variety of Applications," *EP Journal of Technology*, Apr. 2005.

Furlow, "Casing Expansion, Test Process Fine Tuned on Ultradeepwater Well," *Offshore*, Dec. 2000.

Furlow, "Expandable Casing Program Helps Operator Hit TD With Large Tubulars," *Offshore*, Jan. 2000.

Furlow, "Expandable Solid Casing Reduces Telescope Effect," *Offshore*, Aug. 1998.

Furlow, "Agbada Well Solid Tubulars Expanded Bottom Up, Screens Expanded Top Down," *Offshore*, 2002.

Grant et al., "Deepwater Expandable Openhole Liner Case Histories: Learnings Through Field Applications," *Offshore Technology Conference*, OCT 14218, 2002.

Gusevik e tal., "Reaching Deep Reservoir Targets Using Solid Expandable Tubulars" *Society of Petroleum Engineers*, SPE 77612, 2002.

Haut et al., "Meeting Economic Challenges of Deepwater Drilling with Expandable-Tubular Technology," *Deep Offshore Technology Conference*, 1999.

Hull, "Monodiameter Technology Keeps Hole Diameter to TD," *Offshore* Oct. 2002.

"Innovators Chart the Course."

Langley, "Case Study: Value in Drilling Derived From Application-Specific Technology," Oct. 2004.

Lohoefer et al., "Expandable Linear Hanger Provides Cost-Effective Alternative Solution," *Society of Petroleum Engineers*, IADC/SPE 59151, 2000.

Mack et al., "How in Situ Expansion Affects Casing the Tubing Properties," *World Oil*, Jul. 1999. pp. 69-71.

Mack et al., "In-Situ Expansion of Casing and Tubing—Effect on Mechanical and Resistance to Sulfide Stress Cracking,".

Merritt, "Casing Remediation- Extending Well Life Through The Use of Solid Expandable Casing Systems,".

Merritt et al., "Well Remediation Using Expandable Cased-Hold Liners", *World Oil.*, Jul. 2002.

Merritt et al., "Well Remediation Using Expandable Cased-Hold Liners- Summary of Case Histories".

Moore et al., "Expandable Linear Hangers: Case Histories," *Offshore Technology Conference*, OTC 14313, 2002.

Moore et al., "Field Trial Proves Upgrades to Solid Expandable Tubulars," *Offshore Technology Conference*, OTC 14217, 2002.

News Release, "Shell and Halliburton Agree to Form Company to Develop and Market Expandable Casing Technology," Jun. 3, 1998.

Nor, et al., "Transforming Conventional Wells to Bigbore Completions Using Solid Expandable Tubular Technology," *Offshore Technology Conference*, OTC 14315, 2002.

Patin et al., "Overcoming Well Control Challenges with Solid Expandable Tubular Technology," *Offshore Technology Conference*, OTC 15152, 2003.

Ratliff, "Changing Safety Paradigms in the Oil and gas Industry," *Society of Petroleum Engineers*, SPE 90828, 2004.

Rivenbark, "Expandable Tubular Technology—Drill Deeper, Farther, More Economically," Enventure Global Technology.

Rivenbark et al., "Solid Expandable Tubular Technology: The Value of Planned Installation vs. Contingency," *Society of Petroleum Engineers*, SPE 90821, 2004.

Rivenbark et al., "Windows Exit Sidetrack Enhancements Through the Use of Solid Expandable Casing," *Society of Petroleum Engineers*, IADC/SPE 88030, 2004.

Roca et al., "Addressing Common Drilling Challenges Using Solid Expandable Tubular Technology," *Society of Petroleum Engineers*, SPE 80446, 2003.

Sanders et al., Practices for Providing Zonal Isolation in Conjunction with Expandable Casing Jobs-Case Histories, 2003.

Sanders et al., "Three Diverse Applications on Three Continents for a Single Major Operator," *Offshore Technology Conference*, OCT 16667, 2004.

"Set Technology: The Facts" 2004.

Siemers et al., "Development and Field Testing of Solid Expandable Corrosion Resistant Cased-hole Liners to Boost Gas Production in Corrosive Environments," *Offshore Technology Conference*, OTC 15149, 2003.

"Slim Well:Stepping Stone to MonoDiameter," *Hart's E&P*, Jun. 2003.

Smith, "Pipe Dream Reality," *New Technology Magazine*, Dec. 2003.

"Solid Expandable Tubulars," *Hart's E&P*, Mar. 2002.

Sparling et al., "Expanding Oil Field Tubulars Through a Window Demonstrates Value and Provides New Well Consturction Option," *Offshore Technology Conference*, OTC 16664, 2004.

Sumrow, "Shell Drills World's First Monodiameter Well in South Texas," *Oil and Gas*, Oct. 21, 2002.

Touboul et al., "New Technologies Combine to Reduce Drilling Cost in Ultradeepwater Applications," *Society of Petroleum Engineers*, SPE 90830, 2004.

Van Noort et al., "Use Solid Expandable Tubulars for Openhole Water Shutoff," *Society of Petroleum Engineers*, SPE 78495, 2002.

Van Noort et al., "Water Production Reduced Using Solid Expandable Tubular Technology to "Clad," in Fractured Carbonate Formation" *Offshore Technology Conference*, OTC 15153, 2003.

Von Flatern, "From Exotic to Routine—the Offshore Quick-step," *Offshore Engineer*, Apr. 2004.

Von Flatern, "Oilfield Service Trio Target Jules Verne Territory," *Offshore Engineer*, Aug. 2001.

Waddell et al., "Advances in Single-diameter Well Technology: The Next Step to Cost-Efficient Optimization," *Society of Petroleum Engineers*, SPE 90818, 2004.

Waddell et al., "Installation of Solid Expandable Tubular Systems Through Milled Casing Windows," *Society of Petroleum Engineers*, IADC/SPE 87208, 2004.

Williams, "Straightening the Drilling Curve," *Oil and Gas Investor*, Jan. 2003.
www.MITCHMET.com, "3d Surface Texture Parameters," 2004.
"Expand Your Opportunities." *Enventure*. CD-ROM. Jun. 1999.
"Expand Your Opportunities." *Enventure*. CD-ROM. May 2001.
Search Report to Application No. GB 0415835.8, Mar. 10, 2005.
Search and Examination Report to Application No. GB 0425948.7, Apr. 14, 2005.
Search and Examination Report to Application No. GB 0425951.1, Apr. 14, 2005.
Search and Examination Report to Application No. GB 0425956.0, Apr. 14, 2005.
Search and Examination Report to Application No. GB 0500600.2, Feb. 15, 2005.
Search and Examination Report to Application No. GB 0503470.7, Mar. 21, 2005.
Search and Examination Report to Application No. GB 0505039.8, Jul. 22, 2005.
Search and Examination Report to Application No. GB 0506697.2, May 20, 2005.
Search and Examination Report to Application No. GB 0506700.4, Sep. 20, 2005.
Search and Examination Report to Application No. GB 0509618.5, Sep. 27, 2005.
Search and Examination Report to Application No. GB 0509620.1, Sep. 27, 2005.
Search and Examination Report to Application No. GB 0509626.8, Sep. 27, 2005.
Search and Examination Report to Application No. GB 0509627.6, Sep. 27, 2005.
Search and Examination Report to Application No. GB 0509629.2, Sep. 27, 2005.
Search and Examination Report to Application No. GB 0509630.0, Sep. 27, 2005.
Search and Examination Report to Application No. GB 0509631.8, Sep. 27, 2005.
Search and Examination Report to Application No. GB 0512396.3, Jul. 26, 2005.
Search and Examination Report to Application No. GB 0512398.9, Jul. 27, 2005.
Examination Report to Application No. GB 0400018.8, May 17, 2005.
Examination Report to Application No. GB 0400019.6, May 19, 2005.
Examination Report to Application No. GB 0400019.6, Sep. 2, 2005.
Examination Report to Application No. GB 0403891.5, Jun. 30, 2005.
Examination Report to Application No. GB 0403893.1, Feb. 14, 2005.
Examination Report to Application No. GB 0403920.2, Feb. 15, 2005.
Examination Report to Application No. GB 0404796.5, Apr. 14, 2005.
Examination Report to Application No. GB 0406257.6, Jun. 16, 2005.
Examination Report to Application No. GB 0406258.4, Jul. 27, 2005.
Examination Report to Application No. GB 0408672.4, Jul. 12, 2004.
Examination Report to Application No. GB 0408672.4, Mar. 21, 2005.
Examination Report to Application No. GB 0412533.2, May 20, 2005.
Examination Report to Application No. GB 0428141.6, Sep. 15, 2005.
Examination Report to Application No. GB 0500184.7, Sep. 12, 2005.
Examination Report to Application No. GB 0500600.2, Sep. 6, 2005.
Examination Report to Application No. GB 0501667.0, May 27, 2005.
Examination Report to Application No. GB 0503470.7, Sep. 22, 2005.
Examination Report to Application No. GB 0506699.8, Sep. 21, 2005.
International Examination Report, Application PCT/US03/04837, Dec. 9, 2004.
International Examination Report, Application PCT/US03/11765; Dec. 10, 2004.
International Examination Report, Application PCT/US03/11765;; Jan. 25, 2005.
International Examination Report, Application PCT/US03/13787; Mar. 2, 2005.
International Search Report, Application PCT/US03/25716; Jan. 13, 2005.
International Search Report, Application PCT/US03/25742; Dec. 20, 2004.
International Examination Report, Application PCT/US03/29460; Dec. 8, 2004.
Examination Report to Application GB 0220872.6, Oct. 29, 2004.
Examination Report to Application No. GB 0225505.7, Oct. 27, 2004.
Examination Report to Application No. GB 0225505.7 Feb. 15, 2005.
Examination Report to Application No. GB 0306046.4, Sep. 10, 2004.
Examination Report to Application No. GB 0400018.8; Oct. 29, 2004.
Examination Report to Application No. GB 0400019.6; Oct. 29, 2004.
Examination Report to Application No. GB 0403891.5, Feb. 14, 2005.
Examination Report to Application No. GB 0403894.9, Feb. 15, 2005.
Examination Report to Application No. GB 0403921.0, Feb. 15, 2005.
Examination Report to Application No. GB 0406257.6, Jan. 25, 2005.
Examination Report to Application No. GB 0406258.4; Jan. 12, 2005.
Examination Report to Application No. GB 0411698.4, Jan. 24, 2005.
Search Report to Application No. GB 0415835.8, Dec. 2, 2004.
Examination Report to Application No. 0416625.2 Jan. 20, 2005.
Search and Examination Report to Application No. GB 0416834.0, Nov. 16, 2004.
Examination Report to Application No. GB 0422419.2 Dec. 8, 2004.
Search and Examination Report to Application No. GB 0422893.8 Nov. 24, 2004.
Search and Examination Report to Application No. GB 0423416.7 Nov. 12, 2004.
Search and Examination Report to Application No. GB 0423417.5 Nov. 12, 2004.
Search and Examination Report to Application No. GB 0423418.3 Nov. 12, 2004.
Search and Examination Report to Application No. GB 0426155.8 Jan. 12, 2005.
Search and Examination Report to Application No. GB 0426156.6 Jan. 12, 2005.
Search and Examination Report to Application No. GB 0426157.4 Jan. 12, 2005.
Examination Report to Application No. GB 0428141.6 Feb. 9, 2005.
Examination Report to Application No. GB 0500184.7 Feb. 9, 2005.
Search and Examination Report to Application No. GB 0500600.2 Feb. 15, 2005.
Written Opinion to Application No. PCT/US02/25608 Feb. 2, 2005.
Written Opinion to Application No. PCT/US02/25675 Nov. 24, 2004.
Written Opinion to Application No. PCT/US02/39425; Nov. 22, 2004.
Written Opinion to Application No. PCT/US03/06544; Feb. 18, 2005.
Written Opinion to Application No. PCT/US03/13787 Nov. 9, 2004.

Written Opinion to Application No. PCT/US03/14153 Nov. 9, 2004.
Written Opinion to Application No. PCT/US03/18530 Sep. 13, 2004.
Written Opinion to Application No. PCT/US03/19993 Oct. 15, 2004.
Written Opinion to Application No. PCT/US03/38550 Dec. 10, 2004.
Combined Search Report and Written Opinion to Application No. PCT/US04/02122 Feb. 24, 2005.
Combined Search Report and Written Opinion to Application No. PCT/US04/04740 Jan. 19, 2005.
Combined Search Report and Written Opinion to Application No. PCT/US04/06246 Jan. 26, 2005.
Combined Search Report and Written Opinion to Application No. PCT/US04/08030 Jan. 6, 2005.
Combined Search Report and Written Opinion to Application No. PCT/US04/08073 Mar. 4, 2005.
Combined Search Report and Written Opinion to Application No. PCT/US04/08170 Jan. 13, 2005.
Combined Search Report and Written Opinion to Application No. PCT/US04/08171 Feb. 16, 2005.
Combined Search Report and Written Opinion to Application No. PCT/US04/11172 Feb. 14, 2005.
Combined Search Report and Written Opinion to Application No. PCT/US04/28438 Mar. 14, 2005.
Halliburton Energy Services, "Halliburton Completion Products" 1996, Page Packers 5-37, United States of America.
Turcotte and Schubert, Geodynamics (1982) John Wiley & Sons, Inc., pp. 9, 432.
Baker Hughes Incorporated, "EXPatch Expandable Cladding System" (2002).
Baker Hughes Incorporated, "EXPress Expandable Screen System".
High-Tech Wells, "World's First Completion Set Inside Expandable Screen" (2003) Gilmer, J.M., Emerson, A.B.
Baker Hughes Incorporated, "Technical Overview Production Enhancement Technology" (Mar. 10, 2003) Geir Owe Egge.
Baker Hughes Incorporated, "FORMlock Expandbale Liner Hangers".
Weatherford Completion Systems, "Expandable Sand Screens" (2002).
Expandable Tubular Technology, "EIS Expandable Isolation Sleeve" (Feb. 2003).
Oilfield Catalog; "Jet-Lok Product Application Description" (Aug. 8, 2003).
Power Ultrasonics, "Design and Optimisation of an Ultrasonic Die System For Form" Chris Cheers (1999, 2000).
Research Area—Sheet Metal Forming—Superposition of Vibra; Fraunhofer IWU (2001).
Research Projects; "Analysis of Metal Sheet Formability and It's Factors of Influence" Prof. Dorel Banabic (2003).
www.materialsresources.com, "Low Temperature Bonding of Dissimilar and Hard-to-Bond Materials and Metal-Including . . . " (2004).
www.tribtech.com. "Trib-gel A Chemical Cold Welding Agent" G R Linzell (Sep. 14, 1999).
www.spurind.com, "Galavanic Protection, Metallurgical Bonds, Custom Fabrication—Spur Industries" (2000).
Lubrication Engineering, "Effect of Micro-Surface Texturing on Breakaway Torque and Blister Formation on Carbon-Graphite Faces in a Mechanical Seat" Philip Guichelaar, Karalyn Folkert, Izhak Etsion, Steven Pride (Aug. 2002).
Surface Technologies Inc., "Improving Tribological Performance of Mechanical Seals by Laser Surface Texturing" Izhak Etsion.
Tribology Transactions "Experimental Investigation of Laser Surface Texturing for Reciprocating Automotive Components" G Ryk, Y Klingerman and I Etsion (2002).
Proceeding of the International Tribiology Conference, "Microtexturing of Functional Surfaces for Improving Their Tribiological Performance" Henry Haefke, Yvonne Gerbig, Gabriel Dumitru and Valerio Romano (2002).
Sealing Technology, "A laser surface textured hydrostatic mechanical seal" Izhak Etsion and Gregory Halperin (Mar. 2003).
Metalforming Online, "Advanced Laser Texturing Tames Tough Tasks" Harvey Arbuckle.
Tribiology Transactions, "A Laser Surface Textured Parallel Thrust Bearing" V. Brizmer, Y. Klingerman and I. Etsion (Mar. 2003).
PT Design, "Scratching the Surface" Todd E. Lizotte (Jun. 1999).
Tribiology Transactions, "Friction-Reducing Surface-Texturing in Reciprocating Automotive Components" Aviram Ronen, and Izhak Etsion (2001).
Michigan Metrology "3D Surface Finish Roughness Texture Wear WYKO Veeco" C.A. Brown, PHD; Charles W.A. Johnsen, S. Chester.
International Search Report, Application PCT/IL00/00245, Sep. 18, 2000.
International Search Report, Application PCT/US00/18635, Nov. 24, 2000.
International Search Report, Application PCT/US00/27645, Dec. 29, 2000.
International Search Report, Application PCT/US00/30022, Mar. 27, 2001.
International Search Report, Application PCT/US01/04753, Jul. 3, 2001.
International Search Report, Application PCT/US01/19014, Nov. 23, 2001.
International Search Report, Application PCT/US01/23815, Nov. 16, 2001.
International Search Report, Application PCT/US01/28960, Jan. 22, 2002.
International Search Report, Application PCT/US01/30256, Jan. 3, 2002.
International Search Report, Application PCT/US01/41446, Oct. 30, 2001.
International Search Report, Application PCT/US02/00093, Aug. 6, 2002.
International Search Report, Application PCT/US02/00677, Jul. 17, 2002.
International Search Report, Application PCT/US02/00677, Feb. 24, 2004.
International Search Report, Application PCT/US02/04353, Jun. 24, 2002.
International Search Report, Application PCT/US02/20256, Jan. 3, 2003.
International Search Report, Application PCT/US02/20477; Oct. 31. 2003.
International Search Report, Application PCT/US02/20477; Apr. 6, 2004.
International Search Report, Application PCT/US02/24399; Feb. 27, 2004.
International Search Report, Application PCT/US02/24399, Aug. 6, 2004.
International Search Report, Application PCT/US02/25608; May 24, 2004.
International Search Report, Application PCT/US02/25727; Feb. 19, 2004.
International Search Report, Application PCT/US02/25727; Jul. 7, 2004.
International Search Report, Application PCT/US02/29856, Dec. 16, 2002.
International Search Report, Application PCT/US02/36157; Sep. 29, 2003.
International Search Report, Application PCT/US02/36157; Apr. 14, 2004.
International Search Report, Application PCT/US02/36267; May 21, 2004.
International Search Report, Application PCT/US02/39418, Mar. 24, 2003.
International Search Report, Application PCT/US02/39424, May 28, 2004.
International Search Report, Application PCT/US03/00609, May 20, 2004.
International Search Report, Application PCT/US03/04837, May 28, 2004.
International Search Report, Application PCT/US03/06544, Jun. 9, 2004.

International Search Report, Application PCT/US03/10144; Oct. 31, 2003.
Examination Report, Application PCT/US03/10144; Jul. 7, 2004.
International Search Report, Application PCT/US03/11765; Nov. 13, 2003.
International Search Report, Application PCT/US03/13787; May 28, 2004.
International Search Report, Application PCT/US03/14153; May 28, 2004.
International Search Report, Application PCT/US03/15020; Jul. 30, 2003.
International Search Report, Application PCT/US03/18530; Jun. 24, 2004.
International Search Report, Application PCT/US03/19993; May 24, 2004.
International Search Report, Application PCT/US03/20694; Nov. 12, 2003.
International Search Report, Application PCT/US03/20870; May 24, 2004.
International Search Report, Application PCT/US03/20870; Sep. 30, 2004.
International Search Report, Application PCT/US03/24779; Mar. 3, 2004.
International Search Report, Application PCT/US03/25675; May 25, 2004.
International Search Report, Application PCT/US03/25676; May 17, 2004.
International Examination Search Report, Application PCT/US03/25676, Aug. 17, 2004.
International Search Report, Application PCT/US03/25677; May 21, 2004.
International Examination Search Report, Application PCT/US03/25677, Aug. 17, 2004.
International Search Report, Application PCT/US03/25707; Jun. 23, 2004.
International Search Report, Application PCT/US03/25715; Apr. 9, 2004.
International Search Report, Application PCT/US03/25742; May 27, 2004.
International Search Report, Application PCT/US03/29460; May 25, 2004.
International Search Report, Application PCT/US03/25667; Feb. 26, 2004.
International Search Report, Application PCT/US03/29858; Jun. 30, 2003.
International Search Report, Application PCT/US03/29859; May 21, 2004.
International Examination Report, Application PCT/US03/29859, Aug. 16, 2004.
International Search Report, Application PCT/US03/38550; Jun. 15, 2004.
Search Report to Application No. GB 0003251.6, Jul. 13, 2000.
Search Report to Application No. GB 0004282.0, Jul. 31, 2000.
Search Report to Application No. GB 0004282.0 Jan. 15, 2001.
Search and Examination Report to Application No. GB 0004282.0, Jun. 3, 2003.
Search Report to Application No. GB 0004285.3, Jul. 12, 2000.
Search Report to Application No. GB 0004285.3, Jan. 17, 2001.
Search Report to Application No. GB 0004285.3, Jan. 19, 2001.
Search Report to Application No. GB 0004285.3, Aug. 28, 2002.
Examination Report to Application No. 0004285.3, Mar. 28, 2003.
Examination Report to Application No. GB 0005399.1; Jul. 24, 2000.
Search Report to Application No. GB 0005399.1, Feb. 15, 2001.
Examination Report to Application No. GB 0005399.1; Oct. 14, 2002.
Search Report to Application No. GB 0013661.4, Oct. 20, 2000.
Search Report to Application No. GB 0013661.4, Apr. 17, 2001.
Search Report to Application No GB 0013661.4, Feb. 19, 2003.
Examination Report to Application No. GB 00136610.4, Nov. 25, 2003.
Search Report to Application No. GB 0013661.4, Oct. 20, 2003.
Examination Report to Application No. GB 0208367.3, Apr. 4, 2003.
Examination Report to Application No. GB 0208367.3, Nov. 4, 2003.
Examination Report to Application No. GB 0208367.3, Nov. 17, 2003.
Examination Report to Application No. GB 0208367.3, Jan. 30, 2004.
Examination Report to Application No. GB 0212443.6, Apr. 10, 2003.
Examination Report to Application No. GB 0216409.3, Feb. 9, 2004.
Search Report to Application No. GB 0219757.2, Nov. 25, 2002.
Search Report to Application No. GB 0219757.2, Jan. 20, 2003.
Examination Report to Application No. GB 0219757.2, May 10, 2004.
Search Report to Application No. GB 0220872.6, Dec. 5, 2002.
Search Report to Application GB 0220872.6, Mar. 13, 2003.
Search Report to Application No. GB 0225505.7, Mar. 5, 2003.
Search and Examination Report to Application No. GB 0225505.7, Jul. 1, 2003.
Examination Report to Application No. GB 0300085.8, Nov. 28, 2003.
Examination Report to Application No. GB 030086.6, Dec. 1, 2003.
Search and Examination Report to Application No. GB 0308290.6, Jun. 2, 2003.
Search and Examination Report to Application No. GB 0308293.0, Jun. 2, 2003.
Search and Examination Report to Application No. GB 0308293.0, Jul. 14, 2003.
Search and Examination Report to Application No. GB 0308294.8, Jun. 2, 2003.
Search and Examination Report to Application No. GB 0308294.8, Jul. 14, 2003.
Search and Examination Report to Application No. GB 0308295.5, Jun. 2, 2003.
Search and Examination Report to Application No. GB 0308295.5, Jul. 14, 2003.
Search and Examination Report to Application No. GB 0308296.3, Jun. 2, 2003.
Search and Examination Report to Application No. GB 0308296.3, Jul. 14, 2003.
Search and Examination Report to Application No. GB 0308297.1, Jun. 2, 2003.
Search and Examination Report to Application No. GB 0308297.1, Jul. 2003.
Search and Examination Report to Application No. GB 0308299.7, Jun. 2, 2003.
Search and Examination Report to Application No. GB 0308299.7, Jun. 14, 2003.
Search and Examination Report to Application No. GB 0308302.9, Jun. 2, 2003.
Search and Examination Report to Application No. GB 0308303.7, Jun. 2, 2003.
Search and Examination Report to Application No. GB 0308303.7, Jul. 14, 2003.
Search and Examination Report to Application No. GB 0310090.6, Jun. 24, 2003.
Search and Examination Report to Application No. GB 0310099.7, Jun. 24, 2003.
Search and Examination Report to Application No. GB 0310101.1, Jun. 24, 2003.
Search and Examination Report to Application No. GB 0310104.5, Jun. 24, 2003.
Search and Examination Report to Application No. GB 0310118.5, Jun. 24, 2003.
Search and Examination Report to Application No. GB 0310757.0, Jun. 12, 2003.
Search and Examination Report to Application No. GB 0310759.6, Jun. 12, 2003.
Search and Examination Report to Application No. GB 0310770.3, Jun. 12, 2003.

Search and Examination Report to Application No. GB 0310772.9, Jun. 12, 2003.
Search and Examination Report to Application No. GB 0310785.1, Jun. 12, 2003.
Search and Examination Report to Application No. GB 0310795.0, Jun. 12, 2003.
Search and Examination Report to Application No. GB 0310797.6, Jun. 12, 2003.
Search and Examination Report to Application No. GB 0310799.2, Jun. 12, 2003.
Search and Examination Report to Application No. GB 0310801.6, Jun. 12, 2003.
Search and Examination Report to Application No. GB 0310833.9, Jun. 12, 2003.
Search and Examination Report to Application No. GB 0310836.2, Jun. 12, 2003.
Examination Report to Application No. GB 0310836.2, Aug. 7, 2003.
Examination Report to Application No. GB 0311596.1, May 18, 2004.
Search and Examination Report to Application No. GB 0313406.1, Sep. 3, 2003.
Examination Report to Application No. GB 0314846.7, Jul. 15, 2004.
Search and Examination Report to Application No. GB 0316883.8, Aug. 14, 2003.
Search and Examination Report to Application No. GB 0316883.8, Nov. 25, 2003.
Search and Examination Report to Application No. GB 0316886.1, Aug. 14, 2003.
Search and Examination Report to Application No. GB 0316886.1, Nov. 25, 2003.
Search and Examination Report to Application No. GB 0316887.9, Aug. 14, 2003.
Search and Examination Report to Application No. GB 0316887.9, Nov. 25, 2003.
Search and Examination Report to Application No. GB 0318545.1, Sep. 3, 2003.
Search and Examination Report to Application No. GB 0318547.4; Sep. 3, 2003.
Search and Examination Report to Application No. GB 0318549.3; Sep. 3, 2003.
Search and Examination Report to Application No. GB 0318550.1, Sep. 3, 2003.
Search and Examination Report to Application No. GB 0320579.6, Dec. 16, 2003.
Search and Examination Report to Application No. GB 0320580.4, Dec. 17, 2003.
Examination Report to Application No. GB 0320747.9, May 25, 2004.
Search and Examination Report to Application No. GB 0323891.2, Dec. 19, 2003.
Search and Examination Report to Application No. GB 0324172.6, Nov. 4, 2003.
Search and Examination Report to Application No. GB 0324174.2, Nov. 4, 2003.
Search and Examination Report to Application No. GB 0325071.9, Nov. 18, 2003.
Examination Report to Application No. GB 0325071.9, Feb. 2, 2004.
Examination Report to Application No. GB 0325072.7, Feb. 5, 2004.
Search and Examination Report to Application No. GB 0325072.1; Dec. 3, 2003.
Examination Report to Application No. GB 0325072.7; Apr. 13, 2004.
Search and Examination Report to Application No. GB 0403891.5, Jun. 9, 2004.
Search and Examination Report to Application No. GB 0403893.1, Jun. 9, 2004.
Search and Examination Report to Application No. GB 0403894.9, Jun. 9, 2004.
Search and Examination Report to Application No. GB 0403897.2, Jun. 9, 2004.
Search and Examination Report to Application No. GB 0403920.2, Jun. 10, 2004.
Search and Examination Report to Application No. GB 0403921.0, Jun. 10, 2004.
Search and Examination Report to Application No. GB 0403926.9, Jun. 10, 2004.
Examination Report to Application No. GB 0404796.5; May 20, 2004.
Search and Examination Report to Application No. GB 0404826.0, Apr. 21, 2004.
Search and Examination Report to Application No. GB 0404828.6, Apr. 21, 2004.
Search and Examination Report to Application No. GB 0404830.2, Apr. 21, 2004.
Search and Examination Report to Application No. GB 0404832.8, Apr. 21, 2004.
Search and Examination Report to Application No. GB 0404833.6, Apr. 21, 2004.
Search and Examination Report to Application No. GB 0404833.6, Aug. 19, 2004.
Search and Examination Report to Application No. GB 0404837.7, May 17, 2004.
Examination Report to Application No. GB 040837.7, Jul. 12, 2004.
Search and Examination Report to Application No. GB 0404839.3, May 14, 2004.
Search and Examination Report to Application No. GB 0404842.7, May 14, 2004.
Search and Examination Report to Application No. GB 0404845.0, May 14, 2004.
Search and Examination Report to Application No. GB 0404849.2, May 17, 2004.
Examination Report to Application No. GB 0406257.6, Jun. 28, 2004.
Examination Report to Application No. GB 0406258.4, May 20, 2004.
Examination Report to Application No. GB 0404830.2, Aug. 17, 2004.
Search and Examination Report to Application No. GB 0411698.4, Jun. 30, 2004.
Search and Examination Report to Application No. GB 0411892.3, Jul. 14, 2004.
Search and Examination Report to Application No. GB 0411893.3, Jul. 14, 2004.
Search and Examination Report to Application No. GB 0411894.9, Jun. 30, 2004.
Search and Examination Report to Application No. GB 0412190.1, Jul. 22, 2004.
Search and Examination Report to Application No. GB 0412191.9, Jul. 22, 2004.
Search and Examination Report to Application No. GB 0412192.7, Jul. 22, 2004.
Search and Examination Report to Application No. GB 0416834.0, Aug. 11, 2004.
Search and Examination Report to Application No. GB 0417810.9, Aug. 25, 2004.
Search and Examination Report to Application No. GB 0417811.7, Aug. 25, 2004.
Search and Examination Report to Application No. GB 0418005.5, Aug. 25, 2004.
Search and Examination Report to Application No. GB 0418425.5, Sep. 10, 2004.
Search and Examination Report to Application No. GB 0418426.3 Sep. 10, 2004.
Search and Examination Report to Application No. GB 0418427.1 Sep. 10, 2004.
Search and Examination Report to Application No. GB 0418429.7 Sep. 10, 2004.
Search and Examination Report to Application No. GB 0418430.5 Sep. 10, 2004.
Search and Examination Report to Application No. GB 0418431.3 Sep. 10, 2004.

Search and Examination Report to Application No. GB 0418432.1 Sep. 10, 2004.
Search and Examination Report to Application No. GB 0418433.9 Sep. 10, 2004.
Search and Examination Report to Application No. GB 0418439.6 Sep. 10, 2004.
Search and Examination Report to Application No. GB 0418442.0 Sep. 10, 2004.
Search Report to Application No. GB 9926449.1, Mar. 27, 2000.
Search Report to Application No. GB 9926449.1, Jul. 4, 2001.
Search Report to Application No. GB 9926449.1, Sep. 5, 2001.
Search Report to Application No. GB 9926450.9, Feb. 28, 2000.
Examination Report to Application No. GB 9926450.9, May 15, 2002.
Examination Report to Application No. GB 9926450.9, Nov. 22, 2002.
Search Report to Application No. GB 9930398.4, Jun. 27, 2000.
Written Opinion to Application No. PCT/US01/19014; Dec. 10, 2002.
Written Opinion to Application No. PCT/US01/23815; Jul. 25, 2002.
Written Opinion to Application No. PCT/US01/28960; Dec. 2, 2002.
Written Opinion to Application No. PCT/US01/30256; Nov. 11, 2002.
Written Opinion to Application No. PCT/US02/00093; Apr. 21, 2003.
Written Opinion to Application No. PCT/US02/00677; Apr. 17, 2003.
Written Opinion to Application No. PCT/US02/04353; Apr. 11, 2003.
Written Opinion to Application No. PCT/US02/20256; May 9, 2003.
Written Opinion to Application No. PCT/US02/24399; Apr. 28, 2004.
Written Opinion to Application No. PCT/US02/25608 Sep. 13, 2004.
Written Opinion to Application No. PCT/US02/25727; May 17, 2004.
Written Opinion to Application No. PCT/US02/39418; Jun. 9, 2004.
Written Opinion to Application No. PCT/US03/11765 May 11, 2004.
Written Opinion to Application No. PCT/US03/14153 Sep. 9, 2004.
Blasingame et al., "Solid Expandable Tubular Technology in Mature Basins," *Society of Petroleum Engineers* 2003.
Brass et al., "Water Production Management—PDO's Successful Application of Expandable Technology," *Society of Petroleum Engineers*, 2002.
Buckler et al., "Expandable Cased-hole Liner Remediates Prolific Gas Well and Minimizes Loss of Production," *Offshore Technology Conference*, 15151, date unknown.
Bullock, "Advances Grow Expandable Applications," *The American Oil & Gas Reporter*, Sep. 2004.
Cales, "The Development and Applications on Solid Expandable Tubular Technology," *Enventure Global Technology*, Paper 2003-136, 2003.
Cales et al., "Reducing Non-Productive Time Through the Use of Solid Expandable Tubulars: How to Beat the Curve Through Pre-Planning," *Offshore Technology Conference*, 16669, 2004.
Cales et al., "Subsidence Remediation—Extending Well Life Through the Use of Soild Expandable Casing Systems," *AADE Houston Chapter*, Mar. 27, 2001.
Campo et al., "Case Histories- Drilling and Recompletion Applications Using Solid Expandable Tubular Technology," *Society of Petroleum Engineers*, SPE/IADC 72304, 2002.
Carstens et al., "Solid Expandable Tubular Technology: The Value of Planned Installations vs. Contingency,", date unknown.
Case History, "Eemskanaal -2Groningen," Enventure Global Technology, Feb. 2002.
Case History, "Graham Ranch No. 1 Newark East Barnett Field" Enventure Global Technology, Feb. 2002.
Case History, "K.K. Camel No. 1 Ridge Field Lafayette Parish, Louisiana," Enventure Global Technology, Feb. 2002.
Case History, "Mississippi Canyon 809 URSA TLP, OSC-5868, No. A-12," Enventure Global Technology, Mar. 2004.
Case History, "Unocal Sequoia Mississippi Canyon 941 Well No. 2" Enventure Global Technology, 2005.
Case History, "Yibal 381 Oman," Enventure Global Technology, Feb. 2002.
Cook, "Same Internal Casing Diameter From Surface to TD," *Offshore*, Jul. 2002.
Cottrill, "Expandable Tubulars Close in on the Hole Grail of Drilling," *Upstream*, Jul. 26, 2002.
Daigle et al., "Expandable Tubulars: Field Examples of Application in Well Construction and Remediation," *Society of Petroleum Engineers*, SPE 62958, 2000.
Data Sheet, "Enventure Cased-Hold Linear (CHL) System" Enventure Global Technology, Dec. 2002.
Data Sheet, "Enventure Openhole Linear (OHL) System" Enventure Global Technology, Dec. 2002.
Data Sheet, "Window Exit Applications OHL Window Exit Expansion" Enventure Global Technology, Jun. 2003.
Dean et al., "Monodiameter Drilling Linear—From Concept to Reality," *Society of Petroleum Engineers*, SPE/IADC 79790, 2003.
Demong et al., "Breakthrough Using Solid Expandable Tubulars to Construct Extended Reach Wells," *Society of Petroleum Engineers*, IADC/SPE 87209, 2004.
Demong et al., "Casing Design in Complex Wells: The Use of Expandables and Multilateral Technology to Attack the size Reduction issue", date unknown.
Demong et al., "Expandable Tubulars Enable Multilaterals Without COmpromise on Hole Size," *Offshore*, Jun. 2003.
Demong et al., "Planning the Well Construction Process for the Use of Solid Expandable Casing," *Society of Petroleum Engineers*, SPE 85303, 2003.
Demoulin, "Les Tubes Expansibles Changent La Face Du Forage Petrolier," *L'Usine Nouvelle*, 2878:50-52, 3 Juillet 2003.
Dupal et al., "Realization of the MonoDiameter Well: Evolution of a Game-Changing Technology," *Offshore Technology Conference*, OTC 14312, 2002.
Dupal et al., "Solid Expandable Tubular Technology—A Year of Case Histories in the Drilling Environment," *Society of Petroleum Engineers*, SPE/IADC 67770, 2001.
Dupal et al., "Well Design with Expandable Tubulars Reduces Cost and Increases Success in Deepwater Applications," *Deep Offshore Technology*, 2000.
Duphorne, "Letter Re: Enventure Claims of Baker Infringement of Enventure's Expandable Patents," Apr. 1, 2005.
Enventure Global Technology, "Solid Expandable Tubulars are Enabling Technology," *Drilling Contractor*, Mar.-Apr. 2001.
"Enventure Ready to Rejuvinate the North Sea," *Roustabout*, Sep. 2004.
Escobar et al., "Increasing Solid Expandable Tubular Technology Reliability in a Myriad of Downhold Environments," *Society of Petroleum Engineers*, SPE/IADC 81094, 2003.
"Expandable Casing Accesses Remote Reservoirs," *Petroleum Engineer International*, Apr. 1999.
Filippov et al., "Expandable Tubular Solutions," *Society of Petroleum Engineers*, SPE 56500, 1999.
"First ever SET Workshop Help in Aberdeen," *Roustabout*, Oct. 2004.
Fischer, "Expandables and the Dream of the Monodiameter Well: A Status Report", *World Oil*, Jul. 2004.
Fontova, "Solid Expandable Tubulars (SET) Provide Value to Operators Worldwide in a Variety of Applications," *EP Journal of Technology*, Apr. 2005.
Furlow, "Casing Expansion, Test Process Fine Tuned on Ultra-deepwater Well," *Offshore*, Dec. 2000.
Furlow, "Expandable Casing Program Helps Operator Hit TD With Large Tubulars," *Offshore*, Jan. 2000.
Furlow, "Expandable Solid Casing Reduces Telescope Effect," *Offshore*, Aug. 1998.
Furlow, "Agbada Well Solid Tubulars Expanded Bottom Up, Screens Expanded Top Down," *Offshore*, 2002.

Grant et al., "Deepwater Expandable Openhole Liner Case Histories: Learnings Through Field Applications," *Offshore Technology Conference*, OCT 14218, 2002.
Gusevik et al., "Reaching Deep Reservoir Targets Using Solid Expandable Tubulars" *Society of Petroleum Engineers*, SPE 77612, 2002.
Haut et al., "Meeting Economic Challenges of Deepwater Drilling with Expandable-Tubular Technology," *Deep Offshore Technology Conference*, 1999.
Hull, "Monodiameter Technology Keeps Hole Diameter to TD," *Offshore* Oct. 2002.
"Innovators Chart the Course," date unknown.
Langley, "Case Study: Value in Drilling Derived From Application-Specific Technology," Oct. 2004.
Lohoefer et al., "Expandable Linear Hanger Provides Cost-Effective Alternative Solution," *Society of Petroleum Engineers*, IADC/SPE 59151, 2000.
Mack et al., "How in Situ Expansion Affects Casing the Tubing Properties," *World Oil*, Jul. 1999. pp. 69-71.
Mack et al., "In-Situ Expansion of Casing and Tubing—Effect on Mechanical Properties and Resistance to Sulfide Stress Cracking,", date unknown.
Merritt, "Casing Remediation- Extending Well Life Through The Use of Solid Expandable Casing Systems,".
Merritt et al., "Well Remediation Using Expandable Cased-Hold Liners", *World Oil.*, Jul. 2002.
Merritt et al., "Well Remediation Using Expandable Cased-Hold Liners- Summary of Case Histories", date unknown.
Moore et al., "Expandable Linear Hangers: Case Histories," *Offshore Technology Conference*, OTC 14313, 2002.
Moore et al., "Field Trial Proves Upgrades to Solid Expandable Tubulars," *Offshore Technology Conference*, OTC 14217, 2002.
News Release, "Shell and Halliburton Agree to Form Company to Develop and Market Expandable Casing Technology," Jun. 3, 1998.
Nor, et al., "Transforming Conventional Wells to Bigbore Completions Using Solid Expandable Tubular Technology," *Offshore Technology Conference*, OTC 14315, 2002.
Patin et al., "Overcoming Well Control Challenges with Solid Expandable Tubular Technology," *Offshore Technology Conference*, OTC 15152, 2003.
Ratliff, "Changing Safety Paradigms in the Oil and gas Industry," *Society of Petroleum Engineers*, SPE 90828, 2004.
Rivenbark, "Expandable Tubular Technology—Drill Deeper, Farther, More Economically," Enventure Global Technology, date unknown.
Rivenbark et al., "Solid Expandable Tubular Technology: The Value of Planned Installation vs. Contingency," *Society of Petroleum Engineers*, SPE 90821, 2004.
Rivenbark et al., "Windows Exit Sidetrack Enhancements Through the Use of Solid Expandable Casing," *Society of Petroleum Engineers*, IADC/SPE 88030, 2004.
Roca et al., "Addressing Common Drilling Challenges Using Solid Expandable Tubular Technology," *Society of Petroleum Engineers*, SPE 80446, 2003.
Sanders et al., Practices for Providing Zonal Isolation in Conjunction with Expandable Casing Jobs-Case Histories, 2003.
Sanders et al., "Three Diverse Applications on Three Continents for a Single Major Operator," *Offshore Technology Conference*, OTC 16667, 2004.
Siemers et al., "Development and Field Testing of Solid Expandable Corrosion Resistant Cased-hole Liners to Boost Gas Production in Corrosive Environments," *Offshore Technology Conerence*, OTC 15149, 2003.
Enventure Global Technology, "SET Technology: The Facts," 2004.
Flatern, "Oilfield Service Trio Target Jules Verne Territory," at http://www.oilonline.com.
Harris, "Tube Welding," At http://www.tubenet.org.uk.technical.ewi.html.
"Pipeline Rehabilitation by Sliplining with Polyethylene Pipe" 2006.
Tumey, "Letter: IP Analysis" May 6, 2006.
www.RINGZONE.com/news/article.asp?a—id=1755, "Tesco Provides Casing Drilling Operations Update," 2001.
www.RINGZONE.com/news/article.asp?a_id=2603, Conoco and Tesco Unveil Revolutionary Drilling Rig 2002.
International Preliminary Report on Patentability, Application PCT/US04/11973, Dec. 26, 2006.
International Preliminary Report on Patentability, Application PCT/US04/28438, Sep. 20, 2005.
International Preliminary Report on Patentability, Application PCT/US04/28887, Sep. 26, 2006.
International Preliminary Report on Patentability, Application PCT/US04/28889, Aug. 1, 2006.
International Preliminary Report on Patentability, Application PCT/US05/28642. Feb. 22, 2007.
International Preliminary Report on Patentability, Application PCT/US05/28819. Feb. 12, 2007.
Written Opinion to Application No. PCT/US04/29025, Jan. 4, 2007.
Combined Search Report and Written Opinion to Application No. PCT/US04/07711, Nov. 28, 2006.
Combined Search Report and Written Opinion to Application No. PCT/US04/26345, Oct. 5, 2006.
Combined Search Report and Written Opinion to Application No. PCT/US05/28473, Sep. 1, 2006.
Combined Search Report and Written Opinion to Application No. PCT/US05/28642, Jul. 14, 2006.
Combined Search Report and Written Opinion to Application No. PCT/US05/28819, Aug. 3, 2006.
Combined Search Report and Written Opinion to Application No. PCT/US05/28846, Oct. 27, 2006.
Combined Search Report and Written Opinion to Application No. PCT/US06/02449, Oct. 24, 2006.
Combined Search Report and Written Opinion to Application No. PCT/US06/04809, Aug. 29, 2006.
Combined Search Report and Written Opinion to Application No. PCT/US06/09886, Dec. 4, 2006.
Examination Report to Application No. GB 0428141.6, Jul. 18, 2006.
Examination Report to Application No. GB 0503250.3, Aug. 11, 2006.
Examination Report to Application No. GB 0506702.0, Jul. 24, 2006.
Examination Report to Application No. GB 0517448.7, Jul. 19, 2006.
Examination Report to Application No. GB 0518039.3, Aug. 2, 2006.
Examination Report to Application No. GB 0518893.3, Jul. 28, 2006.
Examination Report to Application No. GB 0518893.3, Jan. 29, 2007.
Examination Report to Application No. GB 0519989.8, Oct. 6, 2006.
Examination Report to Application No. GB 0521931.6, Nov. 8, 2006.
Examination Report to Application No. GB 0522892.9, Aug. 14, 2006.
Examination Report to Application No. GB 0603576.0, Nov. 9, 2006.
Examination Report to Application No. GB 0603656.0, Nov. 10, 2006.
Examination Report to Application No. GB 0609173.0, Feb. 6, 2007.
Search and Examination Report to Application No. GB 0507980.1, Jun. 20, 2006.
Search and Examination Report to Application No. GB 0522049.6, Jul. 13, 2006.
Search and Examination Report to Application No. GB 0522052.0, Aug. 8, 2006.
Search and Examination Report to Application No. GB 0602877.3, Sep. 25, 2006.
Search and Examination Report to Application No. GB 0609173.0, Jul. 19, 2006.
Search and Examination Report to Application No. GB 0613405.0, Nov. 2, 2006.
Search and Examination Report to Application No. GB 0613406.8, Nov. 2, 2006.

Search and Examination Report to Application No. GB 0614415.8, Oct. 26, 2006.
Search and Examination Report to Application No. GB 0621053.0, Dec. 18, 2006.
Search and Examination Report to Application No. GB 0621054.6, Dec. 18, 2006.
Search and Examination Report to Application No. GB 0621055.3, Dec. 18, 2006.
Search and Examination Report to Application No. GB 0621059.5, Dec. 18, 2006.
Search and Examination Report to Application No. GB 06210560.3, Dec. 18, 2006.
Search and Examination Report to Application No. GB 0621062.9, Dec. 18, 2006.
Search and Examination Report to Application No. GB 0624328.1, Feb. 2, 2007.
Examination Report to Application No. AU 2001278196 ,Sep. 4, 2006.
Examination Report to Application No. EP 03752486.5; Jun. 28, 2006.
Examination Report to Application No. Norway 1999 5593,Feb. 15, 2002.
Examination Report to Application No. Norway 20020070, Jan. 24, 2007.
Examination Report to Application No. Norway 20002876, Sep. 20, 2006.
Examination Report to Application No. Norway 20023885, May 29, 2006.
Examination Report To Application No. Canada 2298139, Nov. 15, 2006.
Examination Report to Application No. Canada 2383231, Feb. 7, 2007.
Examination Report to Application No. Canada 2419806, Jan. 24, 2007.
Examination Report to Application No. Canada 2432030, Jan. 30, 2007.
Examination Report to Application No. Canada 2438807, Jan. 24, 2007.
Examination Report to Application No. Canada 2517524, Jan. 30, 2007.
Examination Report to Application No. CD 02827985.9, Mar. 1, 2007.

* cited by examiner

*Primary Examiner*—William P Neuder
(74) *Attorney, Agent, or Firm*—King & Spalding LLP

(57) ABSTRACT

An apparatus and method for coupling a tubular member to a preexisting structure.

37 Claims, 88 Drawing Sheets

RADIAL EXPANSION OF TUBULAR MEMBERS

CROSS REFERENCE TO RELATED APPLICATIONS

This application is a divisional of U.S. application Ser. No. 10/303,992, filed Nov. 22, 2002, now U.S. Pat. No. 7,270,188 which is the National Stage filing of the International Application No. PCT/US01/19014, filed Jun. 12, 2001, which is based on U.S. provisional application Ser. No. 60/212,359, filed on Jun. 19, 2000, the disclosure of which is incorporated herein by reference.

This application is a divisional of U.S. application Ser. No. 10/303,992, filed Nov. 22, 2002, which was a continuation-in-part of the following patent applications: (1) U.S. Pat. No. 6,561,227, which was filed as U.S. utility patent application Ser. No. 09/852,026, filed on May 9, 2001, which was a division of U.S. Pat. No. 6,497,289, which was filed as U.S. utility patent application Ser. No. 09/454,139, filed on Dec. 3, 1999, which claimed the benefit of the filing date of U.S. provisional patent application Ser. No. 60/111,293, filed on Dec. 7, 1998; (2) U.S. utility patent application Ser. No. 09/510,913, filed on Feb. 23, 2000, which claimed the benefit of the filing date of U.S. provisional application Ser. No. 60/121,702, filed on Feb. 25, 1999; (3) U.S. utility patent application Ser. No. 09/502,350, filed on Feb. 10, 2000, now U.S. Pat. No. 6,823,937, which claimed the benefit of the filing date of U.S. provisional application Ser. No. 60/119,611 filed as Feb. 11, 1999, (4) U.S. utility patent application No. 09/969,922, filed on Oct. 3, 2001, now U.S. Pat. No. 6,634,431, which was a continuation of U.S. utility patent application Ser. No. 09/440,338, filed on Nov. 15, 1999, now U.S. Pat. No. 6,328,113, which claimed the benefit of the filing date of U.S. provisional application No. 60/108,558, filed on Nov. 16, 1998; (5) U.S. utility patent application Ser. No. 10/169,434, filed on Feb. 18, 2003, which claimed the benefit of the filing date of U.S. provisional patent application No. 60/183,546, filed on Feb. 18, 2000; (6) U.S. utility patent application Ser. No. 09/523,460, filed on Mar. 10, 2000, now abandoned, which claimed the benefit of the filing date of U.S. provisional application Ser. No. 60/124,042, filed on Mar. 11, 1999; (7) U.S. utility patent application Ser. No. 09/512,895, filed on Feb. 24, 2000 now U.S. Pat. No. 6,568,471, which claimed the benefit of the filing dates of U.S. provisional application No. 60/121,841, filed on Feb. 26, 1999 and U.S. provisional application No. 60/154,047, filed on Sep. 16, 1999; (8) U.S. utility application Ser. No. 09/511,941, filed on Feb. 24, 2000, now U.S. Pat. No. 6,575,240, which claimed the benefit of the filing date of U.S. provisional No. 60/121,907, filed on Feb. 26, 1999; (9) U.S. utility patent application Ser. No. 09/588,946, filed on Jun. 7, 2000, now U.S. Pat. No. 6,557,640, which claimed the benefit of the filing date of U.S. provisional patent application No. 60/137,998, filed on Jun. 7, 1999; and (10) U.S. utility patent application Ser. No. 09/559,122, filed on Apr. 26, 2000, now U.S. Pat. No. 6,604,763, which claimed the benefit of the filing date of U.S. provisional application No. 60/131,106, filed on Apr. 26, 1999, Applicants incorporate by reference the disclosures of these applications.

This application is related to the following co-pending patent applications: (11) U.S. utility patent application Ser. No. 10/030,593, filed on Jan. 8, 2002, which claimed the benefit of the filing date of U.S. provisional application No. 60/146,203, filed on Jul. 29, 1999 and U.S. provisional application No. 60/143,039, filed on Jul. 9, 1999; (12) U.S. utility patent application Ser. No. 10/111,982, filed on Apr. 30, 2002, now U.S. Pat. No. 7,048,067, which claimed the benefit of the filing date of U.S. provisional patent application Ser. No. 60/162,671, filed on Nov. 1, 1999; (13) U.S. utility patent application Ser. No. 10/089,419, filed on Mar. 27, 2002, now U.S. Pat. No. 6,695,012, which claimed the benefit of the filing date of U.S. provisional application No. 60/159,039, filed on Oct. 12, 1999 and U.S. provisional patent application No. 60/165,228, filed on Nov. 12, 1999; (14) U.S. utility patent application Ser. No. 09/679,906, filed on Oct. 05, 2000, which claimed the benefit of the filing date of U.S. provisional patent application No. 60/159,033, filed on Oct. 12, 1999. Applicants incorporate by reference the disclosures of these applications.

This application is related to the following co-pending applications: (1) U.S. Pat. No. 6,497,289, which was filed as U.S. patent application Ser. No. 09/454,139, filed on Dec. 3, 1999, which claims priority from provisional application 60/111,293, filed on Dec. 7, 1998, (2) U.S. patent application Ser. No. 09/510,913, filed on Feb. 23, 2000, which claims priority from provisional application 60/121,702, filed on Feb. 25, 1999, (3) U.S. patent application Ser. No. 09/502,350, filed on Feb. 10, 2000, now U.S. Pat. No. 6,823,937 which issued Nov. 30, 2004, which claims priority from provisional application 60/119,611, filed on Feb. 11, 1999, (4) U.S. Pat. No. 6,328,113, which was filed as U.S. patent application Ser. No. 09/440,338, filed on Nov. 15, 1999, which claims priority from provisional application 60/108,558, filed on Nov. 16, 1998, (5) U.S. patent application Ser. No. 10/169,434, filed on Jul. 1, 2002, which claims priority from provisional application 60/183,546, filed on Feb. 18, 2000, (6) U.S. Pat. No. 6,640,903 which was filed as U.S. patent application Ser. No. 09/523,468, filed on Mar. 10, 2000, which claims priority from provisional application 60/124,042, filed on Mar. 11, 1999, (7) U.S. Pat. No. 6,568,471, which was filed as patent application Ser. No. 09/512,895, filed on Feb. 24, 2000, which claims priority from provisional application 60/121,841, filed on Feb. 26, 1999, (8) U.S. Pat. No. 6,575,240, which was filed as patent application Ser. No. 09/511,941, filed on Feb. 24, 2000, which claims priority from provisional application 60/121,907, filed on Feb. 26, 1999, (9) U.S. Pat. No. 6,557,640, which was filed as patent application Ser. No. 09/588,946, filed on Jun. 7, 2000, which claims priority from provisional application 60/137,998, filed on Jun. 7, 1999, (10) U.S. patent application Ser. No. 09/981,916, filed on Oct. 18, 2001 as a continuation-in-part application of U.S. Pat. No. 6,328,113, which was filed as U.S. patent application Ser. No. 09/440,338, filed on Nov. 15, 1999, which claims priority from provisional application 60/108,558, filed on Nov. 16, 1998, (11) U.S. Pat. No. 6,604,763, which was filed as application Ser. No. 09/559,122, filed on Apr. 26, 2000, which claims priority from provisional application 60/131,106, filed on Apr. 26, 1999, (12) U.S. patent application Ser. No. 10/030,593, filed on Jan. 8, 2002, which claims priority from provisional application 60/146,203, filed on Jul. 29, 1999, (13) U.S. provisional patent application Ser. No. 60/143,039, filed on Jul. 9, 1999, (14) U.S. patent application Ser. No. 10/111,982, filed on Apr. 30, 2002, which claims priority from provisional patent application Ser. No. 60/162,671, filed on Nov. 1, 1999, (15) U.S. provisional patent application Ser. No. 60/154,047, filed on Sep. 16, 1999, (16) U.S. provisional patent application Ser. No. 60/438,828, filed on Jan. 9, 2003, (17) U.S. Pat. No. 6,564,875, which was filed as application Ser. No. 09/679,907, on Oct. 5, 2000, which claims priority from provisional patent application Ser. No. 60/159,082, filed on Oct. 12, 1999, (18)

U.S. patent application Ser. No. 10/089,419, filed on Mar. 27, 2002, now U.S. Pat. No. 6,695,012 which issued Feb. 24, 2004, which claims priority from provisional patent application Ser. No. 60/159,039, filed on Oct. 12, 1999, (19) U.S. patent application Ser. No. 09/679,906, filed on Oct. 5, 2000, which claims priority from provisional patent application Ser. No. 60/159,033, filed on Oct. 12, 1999, (20) U.S. patent application Ser. No. 10/303,992, filed on Nov. 22, 2002, which claims priority from provisional patent application Ser. No. 60/212,359, filed on Jun. 19, 2000, (21) U.S. provisional patent application Ser. No. 60/165,228, filed on Nov. 12, 1999, (22) U.S. provisional patent application Ser. No. 60/455,051, filed on Mar. 14, 2003, (23) PCT application US02/2477, filed on Jun. 26, 2002, which claims priority from U.S. provisional patent application Ser. No. 60/303,711, filed on Jul. 6, 2001, (24) U.S. patent application Ser. No. 10/311,412, filed on Dec. 12, 2002, which claims priority from provisional patent application Ser. No. 60/221,443, filed on Jul. 28, 2000, (25) U.S. patent application Ser. No. 10/322,947, filed on Dec. 18, 2002, filed on Jul. 28, 2000, (26) U.S. patent application Ser. No. 10/322, 947, filed on Jan. 22, 2003, now U.S. Pat. No. 6,976,541 which issued Dec. 20, 2005, which claims priority from provisional patent application Ser. No. 60/233,638, filed on Sep. 18, 2000, (27) U.S. patent application Ser. No. 10/406, 648, filed on Mar. 31, 2003, which claims priority from provisional patent application Ser. No. 60/237,334, filed on Oct. 2, 2000, (28) PCT application US02/04353, filed on Feb. 14, 2002, which claims priority from U.S. provisional patent application Ser. No. 60/270,007, filed on Feb. 20, 2001, (29) U.S. patent application Ser. No. 10/465,835, filed on Jun. 13, 2003, which claims priority from provisional patent application Ser. No. 60/262,434, filed on Jan. 17, 2001, (30) U.S. patent application Ser. No. 10/465,831, filed on Jun. 13, 2003, which claims priority from U.S. provisional patent application Ser. No. 60/259,486, filed on Jan. 3, 2001, (31) U.S. provisional patent application Ser. No. 60/452,303, filed on Mar. 5, 2003, which was filed as patent application Ser. No. 09/850,093, filed on May 7, 2001, as a divisional application of U.S. Pat. No. 6,497,289, which was filed as U.S. patent application Ser. No. 09/454,139, filed on Dec. 3, 1999, which claims priority from provisional application 60/111,293, filed on Dec. 7, 1998, (33) U.S. Pat. No. 6,561,227, which was filed as patent application Ser. No. 09/852,026, filed on May 9, 2001, as a divisional application of U.S. Pat. No. 6,497,289, which was filed as U.S. patent application Ser. No. 09/454,139, filed on Dec. 3, 1999, which claims priority from provisional application 60/111, 293, filed on Dec. 7, 1998, (34) U.S. patent application Ser. No. 09/852,027, filed on May 9, 2001, as a divisional application of U.S. Pat. No. 6,497,289, which was filed as U.S. patent application Ser. No. 09/454,139, filed on Dec. 3, 1999, which claims priority from provisional application 60/111,293, filed on Dec. 7, 1998, (35) PCT Application US02/25608, filed on Aug. 13, 2002, which claims priority from provisional application 60/318,021, filed on Sep. 7, 2001, (36) PCT Application US02/24399, filed on Aug. 1, 2002, which claims priority from U.S. provisional patent application Ser. No. 60/313,453, filed on Aug. 20, 2001, (37) PCT Application US02/29856, filed on Sep. 19, 2002, which claims priority from U.S. provisional patent application Ser. No. 60/326,886, filed on Oct. 3, 2001, (38) PCT Application US02/20256, filed on Jun. 26, 2002, which claims priority from U.S. provisional patent application Ser. No. 60/303, 740, filed on Jul. 6, 2001, (39) U.S. patent application Ser. No. 09/962,469, filed on Sep. 25, 2001, now U.S. Pat. No. 6,892,819 which issued May 17, 2005, which is a divisional of U.S. patent application Ser. No. 09/523,468, filed on Mar. 10, 2000, (now U.S. Pat. No. 6,640,903 which issued Nov. 4, 2003), which claims priority from provisional application 60/124,042, filed on Mar. 11, 1999, (40) U.S. patent application Ser. No. 09/962,470, filed on Sep. 25, 2001, which is a divisional of U.S. patent application Ser. No. 09/523,468, filed on Mar. 10, 2000, (now U.S. Pat. No. 6,640,903 which issued Nov. 4, 2003), which claims priority from provisional application 60/124,042, filed on Mar. 11, 1999, (41) U.S. patent application Ser. No. 09/962,471, filed on Sep. 25, 2001, now U.S. Pat. No. 6,739,392 which issued May 25, 2004, which is a divisional of U.S. patent application Ser. No. 09/523,468, filed on Mar. 10, 2000, (now U.S. Pat. No. 6,640,903 which issued Nov. 4, 2003), which claims priority from provisional application 60/124,042, filed on Mar. 11, 1999, (42) U.S. patent application Ser. No. 09/962,467, filed on Sep. 25, 2001, now U.S. Pat. No. 6,725,919 which issued Apr. 27, 2004, which is a divisional of U.S. patent application Ser. No. 09/523,468, filed on Mar. 10, 2000, (now U.S. Pat. No. 6,640,903 which issued Nov. 4, 2003), which claims priority from provisional application 60/124,042, filed on Mar. 11, 1999, (43) U.S. patent application Ser. No. 09/962,468, filed on Sep. 25, 2001, now U.S. Pat. No. 6,758,278 which issued Jul. 6, 2004, which is a divisional of U.S. patent application Ser. No. 09/523,468, filed on Mar. 10, 2000, (now U.S. Pat. No. 6,640,903 which issued Nov. 4, 2003), which claims priority from provisional application 60/124,042, filed on Mar. 11, 1999, (44) PCT application US 02/25727, filed on Aug. 14, 2002, which claims priority from U.S. provisional patent application Ser. No. 60/317, 985, filed on Sep. 6, 2001, and U.S. provisional patent application Ser. No. 60/318,386, filed on Sep. 10, 2001, (45) PCT application US 02/39425, filed on Dec. 10, 2002, which claims priority from U.S. provisional patent application Ser. No. 60/343,674, filed on Dec. 27, 2001, (46) U.S. utility patent application Ser. No. 09/969,922, filed on Oct. 3, 2001, (now U.S. Pat. No. 6,634,431 which issued Oct. 21, 2003), which is a continuation-in-Part application of U.S. Pat. No. 6,328,113, which was filed as U.S. patent application Ser. No. 09/440,338, filed on Nov. 15, 1999, which claims priority from provisional application 60/108,558, filed on Nov. 16, 1998, (47) U.S. utility patent application Ser. No. 10/516,467, now U.S. Pat. No. 6,745,845 which issued Jun. 8, 2004, filed on Dec. 10, 2001, which is a continuation application of U.S. utility patent application Ser. No. 09/969, 922, filed on Oct. 3, 2001, (now U.S. Pat. No. 6,634,431 which issued Oct. 21, 2003), which is a continuation-in-part application of U.S. Pat. No. 6,328,113, which was filed as U.S. patent application Ser. No. 09/440,338, filed on Nov. 15, 1999, which claims priority from provisional application 60/108,558, filed on Nov. 16, 1998, (48) PCT application US 03/00609, filed on Jan. 9, 2003, which claims priority from U.S. provisional patent application Ser. No. 60/357,372, filed on Feb. 15, 2002, (49) U.S. patent application Ser. No. 10/074,703, now U.S. Pat. No. 6,705,395 which issued Mar. 16, 2004, filed on Feb. 12, 2002, which is a divisional of U.S. Pat. No. 6,568,471, which was filed as patent application Ser. No. 09/512,895, filed on Feb. 24, 2000, which claims priority from provisional application 60/121,841, filed on Feb. 26, 1999, (50) U.S. patent application Ser. No. 10/074,244, filed on Feb. 12, 2002, now U.S. Pat. No. 6,631,759 which issued Oct. 14, 2003, which is a divisional of U.S. Pat. No. 6,568,471, which was filed as patent application Ser. No. 09/512,895, filed on Feb. 24, 2000, which claims priority from provisional 60/121,841, filed on Feb. 26, 1999, (51) U.S. patent application Ser. No. 10/076, 660, filed on Feb. 15, 2002, which is a divisional of U.S. Pat.

No. 6,568,471, which was filed as patent application Ser. No. 09/512,895, filed on Feb. 24, 2000, which claims priority from provisional application 60/121,841, filed on Feb. 26, 1999, (52) U.S. patent application Ser. No. 10/076,661, filed on Feb. 15, 2002, now U.S. Pat. No. 6,631,769 which issued Oct. 14, 2003, which is a divisional of U.S. Pat. No. 6,568,471, which was filed as patent application Ser. No. 09/512,895, which claims priority from provisional application 60/121,841, filed on Feb. 26, 1999, (53) U.S. patent application Ser. No. 10/076,659, filed on Feb. 15, 2002, now U.S. Pat. No. 7,063,142 which issued Jun. 20, 2006, is a divisional of U.S. Pat. No. 6,568,471, which was filed as patent application Ser. No. 09/512,895, filed on Feb. 24, 2000, which claims priority from provisional application 60/121,841, filed on Feb. 26, 1999, (54) U.S. patent application Ser. No. 10/078,928, filed on Feb. 20, 2002, now U.S. Pat. No. 6,684,947 which issued Feb. 3, 2004, which is a divisional of U.S. Pat. No. 6,568,471, which was filed as patent application Ser. No. 09/512,895, filed on Feb. 24, 2000, which claims priority from provisional application 60/121,841, filed on Feb. 26, 1999, (55) U.S. patent application Ser. No. 10/078,922, filed on Feb. 20, 2002, now U.S. Pat. No. 6,966,370 which issued Nov. 22, 2005, which is a divisional of U.S. Pat. No. 6,568,471, which was filed as patent application Ser. No. 09/512,895, which claims priority from provisional application 60/121,841, filed on Feb. 26, 1999, (56) U.S. patent application Ser. No. 10/078,921, filed on Feb. 20, 2002, now U.S. Pat. No. 7,044,221 which issued May 16, 2006, which is a divisional of U.S. Pat. No. 6,568,471, which was filed as patent application Ser. No. 09/512,895, filed on Feb. 24, 2000, which claims priority from provisional application 60/121,841, filed on Feb. 26, 1999, (57) U.S. patent application Ser. No. 10/261,928, filed on Oct. 1, 2002, now U.S. Pat. No. 7,011,161 which issued Mar. 14, 2006, which is a divisional of U.S. Pat. No. 6,557,640, which was filed as patent application Ser. No. 09/588,946, filed on Jun. 7, 2000, which claims priority from provisional application 60/137,998, filed on Jun. 7, 1999, (58) U.S. patent application Ser. No. 10/079,276, filed on Feb. 20, 2002, now U.S. Pat. No. 7,040,396 which issued May 9, 2006, which is a divisional of U.S. Pat. No. 6,568,471, which was filed as patent application Ser. No. 09/512,895, which claims priority from provisional application 60/121,841, filed on Feb. 26, 1999, (59) U.S. patent application Ser. No. 10/262,009, filed on Oct. 1, 2002, now U.S. Pat. No. 7,048,062 which issued May 23, 2006, which is a divisional of U.S. Pat. No. 6,557,640, which was filed as patent application Ser. No. 09/588,946, filed on Jun. 7, 2000, which claims priority from provisional application 60/137,998, filed on Jun. 7, 1999, (60) U.S. patent application Ser. No. 10/092,481, filed on Mar. 7, 2002, now U.S. Pat. No. 6,857,473 which issued Feb. 22, 2005, which is a divisional of U.S. Pat. No. 6,568,471, which was filed as patent application Ser. No. 09/512,895, filed on Feb. 24, 2000, which claims priority from provisional application 60/121,841, filed on Feb. 26, 1999, (61) U.S. patent application Ser. No. 10/261,926, filed on Oct. 1, 2002, which is a divisional of U.S. Pat. No. 6,557,640, which was filed as patent application Ser. No. 09/588,946, filed on Jun. 7, 2000, which claims priority from provisional application 60/137,998, filed on Jun. 7, 1999, (62) PCT application US 02/36157, filed on Nov. 12, 2002, which claims priority from U.S. provisional patent application Ser. No. 60/338,996, filed on Nov. 12, 2001, (63) PCT application US 02/36267, filed on Nov. 12, 2002, which claims priority from U.S. provisional patent application Ser. No. 60/339,013, filed on Nov. 12, 2001, (64) PCT application US 03/11765, filed on Apr. 16, 2003, which claims priority from U.S. provisional patent application Ser. No. 60/383,917, filed on May 29, 2002, (65) PCT application US 03/15020, filed on May 12, 2003, which claims priority from U.S. provisional patent application Ser. No. 60/391,703, filed on Jun. 26, 2002, (66) PCT application US 02/39418, filed on Dec. 10, 2002, which claims priority from U.S. provisional patent application Ser. No. 60/346,309, filed on Jan. 7, 2002, (67) PCT application US 03/06544, filed on Mar. 4, 2003, which claims priority from U.S. provisional patent application Ser. No. 60/372,048, filed on Apr. 12, 2002, (68) U.S. patent application Ser. No. 10/331,718, filed on Dec. 30, 2002, which is a divisional U.S. patent application Ser. No. 09/679,906, filed on Oct. 5, 2000, which claims priority from provisional patent application Ser. No. 60/159,033, filed on Oct. 12, 1999, (69) PCT application US 03/04837, filed on Feb. 29, 2003, which claims priority from U.S. provisional patent application Ser. No. 60/363,829, filed on Mar. 13, 2002, (70) U.S. patent application Ser. No. 10/261,927, filed on Oct. 1, 2002, now U.S. Pat. No. 7,077,213 which issued Jul. 18, 2006, which is a divisional of U.S. Pat. No. 6,557,640, which was filed as patent application Ser. No. 09/588,946, filed on Jun. 7, 2000, which claims priority from provisional application 60/137,998, filed on Jun. 7, 1999, (71) U.S. patent application Ser. No. 10/262,008, filed on Oct. 1, 2002, now U.S. Pat. No. 7,036,582 which issued May 2, 2006, which is a divisional of U.S. Pat. No. 6,557,640, which was filed as patent application Ser. No. 09/588,946, filed on Jun. 7, 2000, which claims priority from provisional application 60/137,998, filed on Jun. 7, 1999, (72) U.S. patent application Ser. No. 10/261,925, filed on Oct. 1, 2002, now U.S. Pat. No. 7,044,218 which issued May 16, 2006, which is a divisional of U.S. Pat. No. 6,557,640, which was filed as patent application Ser. No. 09/588,946, filed on Jun. 7, 2000, which claims priority from provisional application 60/137,998, filed on Jun. 7, 1999, (73) U.S. patent application Ser. No. 10/199,524, filed on Jul. 19, 2002, which is a continuation of U.S. Pat. No. 6,497,289, which was filed as U.S. patent application Ser. No. 09/454,139, filed on Dec. 3, 1999, which claims priority from provisional application 60/111,293, filed on Dec. 7, 1998, (74) PCT application US 03/10144, filed on Mar. 28, 2003, which claims priority from U.S. provisional patent application Ser. No. 60/372,632, filed on Apr. 15, 2002, (75) U.S. provisional patent application Ser. No. 60/412,542, filed on Sep. 20, 2002, (76) PCT application US 03/14153, filed on May 6, 2003, which claims priority from U.S. provisional patent application Ser. No. 60/380,147, filed on May 6, 2002, (77) PCT application US 03/19993, filed on Jun. 24, 2003which claims priority from U.S. provisional patent, application Ser. No. 60/397,284, filed on Jul. 19, 2002, (78) PCT application US 03/13787, filed on May 5, 2003, which claims priority from U.S. provisional patent application Ser. No. 60/387,486, filed on Jun. 10, 2002, (79) PCT application US 03/18530, filed on Jun. 11, 2003, which claims priority from U.S. provisional patent application Ser. No. 60/387,961, filed on Jun. 12, 2002, (80) PCT application US 03/20694, filed on Jul. 1, 2003, which claims priority from U.S. provisional patent application Ser. No. 60/398,061, filed on Jul. 24, 2002, (81) PCT application US 03/20870, filed on Jul. 2, 2003, which claims priority from U.S. provisional patent application Ser. No. 60/399,240, filed on Jul. 29, 2002, (82) U.S. provisional patent application Ser. No. 60/412,487, filed on Sep. 20, 2002, (83) U.S. provisional patent application Ser. No. 60/412,488, filed on Sep. 20, 2002, (84) U.S. patent application Ser. No. 10/280,356, filed on Oct. 25, 2002, which is a continuation of U.S. Pat. No. 6,470,966, which was filed as patent application Ser. No. 09/850,093, filed on May 7, 2001, as a divisional application of U.S. Pat. No. 6,497,289, which was filed as U.S. patent application Ser. No. 09/454,139, filed on Dec. 3, 1999, which claims priority from provisional application 60/111,293, filed on Dec. 7, 1998, (85) U.S. provisional patent application Ser. No. 60/412,177, filed on Sep. 20, 2002, (86) U.S. provisional patent application Ser. No. 60/412,653, filed on Sep. 20, 2002, (87) U.S. provisional patent application Ser. No. 60/405,610, filed on Aug. 23, 2002, (88) U.S. provisional patent application Ser. No. 60/405,394, filed on Aug. 23, 2002, (89) U.S. provisional patent application Ser. No. 60/412,544, filed on Sep. 20, 2002, (90) PCT application US 03/24779, filed on Aug. 8, 2003, which claims priority from U.S. provisional patent application Ser. No. 60/407,442, filed on Aug. 30, 2002, (91) U.S. provisional patent application Ser. No. 60/423,363, filed on Dec. 10, 2002, (92) U.S. provisional patent application Ser. No. 60/412,196, filed on Sep. 20, 2002, (93) U.S. provisional patent application Ser. No. 60/412,187, filed on Sep. 20, 2002, (94) U.S. provisional patent application Ser. No. 60/412,371, filed on Sep. 20, 2002, (95) U.S. patent application Ser. No. 10/382,325, filed on Mar. 5, 2003, which is a continuation of U.S. Pat. No. 6,557,640, which was filed as patent application Ser. No. 09/588,946, filed on Jun. 7, 2000, which claims priority from provisional application 60/137,998, filed on Jun. 7, 1999, (96) U.S. patent application Ser. No. 10/624,842, which is a divisional of U.S. patent application Ser. No. 09/502,350, filed on Feb. 10, 2000, now U.S. Pat. No. 6,823,937 which issued Nov. 30, 2004, which claims priority from provisional application 60/119,611, filed on Feb. 11, 1999, (97) U.S. provisional patent application Ser. No. 60/431,184, filed on Dec. 5, 2002, (98) U.S. provisional patent application Ser. No. 60/448,526, filed on Feb. 18, 2003, (99) U.S. provisional patent application Ser. No. 60/461,539, filed on Apr. 9, 2003, (100) U.S. provisional patent application Ser. No. 60/462,750, filed on Apr. 14, 2003, (101) U.S. provisional patent application Ser. No. 60/436,106, filed on Dec. 23, 2002, (102) U.S. provisional patent application Ser. No. 60/442,942, filed on Jan. 27, 2003, (103) U.S. provisional patent application Ser. No. 60/442,938, filed on Jan. 27, 2003, (104) U.S. patent application Ser. No. 10/418,687, filed on Apr. 18, 2003, now U.S. Pat. No. 7,021,390 which issued Apr. 4, 2006, (105) U.S. provisional patent application Ser. No. 60/454,896, filed on Mar. 14, 2003, (106) U.S. provisional patent application Ser. No. 60/450,504, filed on Feb. 26, 2003, (107) U.S. provisional patent application Ser. No. 60/451,152, filed on Mar. 9, 2003, (108) U.S. provisional patent application Ser. No. 60/455,124, filed on Mar. 17, 2003, (109) U.S. provisional patent application Ser. No. 60/453,678, filed on Mar. 11, 2003, (110) U.S. patent application Ser. No. 10/421,682, filed on Apr. 23, 2003, which is a continuation of U.S. patent application Ser. No. 09/523,468, filed on Mar. 10, 2000, (now U.S. Pat. No. 6,640,903 which issued Nov. 4, 2003), which claims priority from provisional application 60/124, 042, filed on Mar. 11, 1999, (111) U.S. provisional patent application Ser. No. 60/457,965, filed on Mar. 27, 2003, (112) U.S. provisional patent application Ser. No. 60/455, 718, filed on Mar. 18, 2003, (113) U.S. Pat. No. 6,550,821, which was filed as patent application Ser. No. 09/811,734, filed on Mar. 19, 2001, (114) U.S. patent application Ser. No. 10/436,467, filed on May 12, 2003, now U.S. Pat. No. 6,968,618 which issued Nov. 29, 2005, which is a continuation of U.S. Pat. No. 6,604,763, which was filed as application Ser. No. 09/559,122, filed on Apr. 26, 2000, which claims priority from provisional application 60/131,106, filed on Apr. 26, 1999, (115) U.S. provisional patent application Ser. No. 60/459,776, filed on Apr. 2, 2003, (116) U.S. provisional patent application Ser. No. 60/461,094, filed on Apr. 8, 2003, (117) U.S. provisional patent application Ser. No. 60/461,038, filed on Apr. 7, 2003, (118) U.S. provisional patent application Ser. No. 60/463,586, filed on Apr. 17, 2003, (119) U.S. provisional patent application Ser. No. 60/472,240, filed on May 20, 2003, (120) U.S. patent application Ser. No. 10/619,285, filed on Jul. 14, 2003, which is a continuation-in-part of U.S. utility patent application Ser. No. 09/969,922, filed on Oct. 3, 2001, (now U.S. Pat. No. 6,634,431 which issued Oct. 21, 2003), which is a continuation-in-part application of U.S. Pat. No. 6,328,113, which was filed as U.S. patent application Ser. No. 09/440, 338, filed on Nov. 15, 1999, which claims priority from provisional application 60/108,558, filed on Nov. 16, 1998, (121) U.S. utility patent application Ser. No. 10/418,688, now U.S. Pat. No. 7,055,608 which issued Jun. 6, 2006, which was filed on Apr. 18, 2003, as a division of U.S. utility patent application Ser. No. 09/523,468, filed on Mar. 10, 2000, (now U.S. Pat. No. 6,640,903, which issued Nov. 4, 2003), which claims priority from provisional application 60/124,042, filed on Mar. 11, 1999; (122) PCT patent application Ser. No. PCT/US2004/06246, filed on Feb. 26, 2004; (123) PCT patent application Ser. No. PCT/US2004/ 08170, filed on Mar. 15, 2004; (124) PCT patent application Ser. No. PCT/US2004/08171, filed on Mar. 15, 2004; (125) PCT patent application Ser. No. PCT/US2004/08073, filed on Mar. 18, 2004; (126) PCT patent application Ser. No. PCT/US2004/07711, filed on Mar. 11, 2004; (127) PCT patent application Ser. No. PCT/US2004/029025, filed on Mar. 26, 2004; (128) PCT patent application Ser. No. PCT/US2004/010317, filed on Apr. 2, 2004; (129) PCT patent application Ser. No. PCT/US2004/010712, filed on Apr. 6, 2004; (130) PCT patent application Ser. No. PCT/ US2004/010762, filed on Apr. 6, 2004; (131) PCT patent application Ser. No. PCT/US2004/011973, filed on Apr. 15, 2004; (132) U.S. provisional patent application Ser. No. 60/495,056, filed on Aug. 14, 2003; (133) U.S. provisional patent application Ser. No. 60/600,679, filed on Aug. 11, 2004; (134) PCT patent application Ser. No. PCT/US2005/ 027318, filed on Jul. 29, 2005; (135) PCT patent application Ser. No. PCT/US2005/028936, filed on Aug. 12, 2005; (136) PCT patent application Ser. No. PCT/US2005/028669, filed on Aug. 11, 2005; (137) PCT patent application Ser. No. PCT/US2005/028453, filed on Aug. 11, 2005; (138) PCT patent application Ser. No. PCT/US2005/028641, filed on Aug. 11, 2005; (139) PCT patent application Ser. No. PCT/US2005/028819, filed on Aug. 11, 2005; (140) PCT patent application Ser. No. PCT/US2005/028446, filed on Aug. 11, 2005; (141) PCT patent application Ser. No. PCT/US2005/028642, filed on Aug. 11, 2005; (142) PCT patent application Ser. No. PCT/US2005/028451, filed on Aug. 11, 2005, and (143). PCT patent application Ser. No. PCT/US2005/028473, filed on Aug. 11, 2005, (144) U.S. utility patent application Ser. No. 10/546,082, filed on Aug. 16, 2005, (145) U.S. utility patent application Ser. No. 10/546,076, filed on Aug. 16, 2005, (146) U.S. utility patent application Ser. No. 10/545,936, filed on Aug. 16, 2005, (147) U.S. utility patent application Ser. No. 10/546,079, filed on Aug. 16, 2005 (148) U.S. utility patent application Ser. No. 10/545,941, filed on Aug. 16, 2005, (149) U.S. utility patent application Ser. No. 546078, filed on Aug. 16, 2005, filed on Aug. 11, 2005, (150) U.S. utility patent application Ser. No. 10/545,941, filed on Aug. 16, 2005, (151) U.S. utility patent application Ser. No. 11/249,967, filed on Oct. 13, 2005, (152) U.S. provisional patent application Ser. No. 60/734,302, filed on Nov. 7, 2005, (153) U.S. provisional patent application Ser. No. 60/725,181, filed on Oct. 11, 2005, (154) PCT patent application Ser. No. PCT/US2005/023391, filed Jun. 29, 2005 which claims priority from U.S. provisional patent application Ser. No. 60/585,370, filed on Jul. 2, 2004, (155) U.S. provisional patent application Ser. No. 60/721,579, filed on Sep. 28, 2005, (156) U.S. provisional patent application Ser. No. 60/717,391, filed on Sep. 15, 2005, (157) U.S. provisional patent application Ser. No. 60/702,935, filed on Jul. 27, 2005, (158) U.S. provisional patent application Ser. No. 60/663,913, filed on Mar. 21, 2005, (159) U.S. provisional patent application Ser. No. 60/652,564, filed on Feb. 14, 2005, (160) U.S. provisional patent application Ser. No. 60/645,840, filed on Jan. 21, 2005, (161) PCT patent application Ser. No. PCT/US2005/043122, filed on Nov. 29, 2005 which claims priority from U.S. provisional patent application Ser. No. 60/631,703, filed on Nov. 30, 2004, (162) U.S. provisional patent application Ser. No. 60/752,787, filed on Dec. 22, 2005, (163) U.S. National Stage application Ser. No. 10/548,934, filed on Sep. 12, 2005; (164) U.S. National Stage application Ser. No. 10/549,410, filed on Sep. 13, 2005; (165) U.S. Provisional Patent Application No. 60/717,391, filed on Sep. 15, 2005; (166) U.S. National Stage application Ser. No. 10/550,906, filed on Sep. 27, 2005; (167) U.S. National Stage application Ser. No. 10/551,880, filed on Sep. 30, 2005; (168) U.S. National Stage application Ser. No. 10/552,253, filed on Oct. 4, 2005; (169) U.S. National Stage application Ser. No. 10/552,790, filed on Oct. 11, 2005; (170) U.S. Provisional Patent Application No. 60/725,181, filed on Oct. 11, 2005; (171) U.S. National Stage application Ser. No. 10/553,094, filed on Oct. 13, 2005; (172) U.S. National Stage application Ser. No. 10/553,566, filed on Oct. 17, 2005; (173) PCT Patent Application No. PCT/US2006/002449, filed on Jan. 20, 2006, (174) PCT Patent Application No. PCT/US2006/004809, filed on Feb. 9, 2006; (175) U.S. Utility patent application Ser. No. 11/356,899, filed on Feb. 17, 2006, (176) U.S. National Stage application Ser. No. 10/568,200, filed on Feb. 13, 2006, (177) U.S. National Stage application Ser. No. 10/568,719, filed on Feb. 16, 2006, filed on Feb. 16, 2006, (178) U.S. National Stage application Ser. No. 10/569,323, filed on Feb. 17, 2006, (179) U.S. National State patent application Ser. No. 10/571,041, filed on Mar. 3, 2006; (180) U.S. National State patent application Ser. No. 10/571,017, filed on Mar. 3, 2006; (181) U.S. National State patent application Ser. 10/571,086, filed on Mar. 6, 2006; and (182) U.S. National State patent application Ser. No. 10/571,085, filed on Mar. 6, 2006, (183) U.S. utility patent application Ser. No. 10/938,788, filed on Sep. 10, 2004, (184) U.S. utility patent application Ser. No. 10/938,225, filed on Sep. 10, 2004, (185) U.S. utility patent application Ser. No. 10/952,288, filed on Sep. 28, 2004, (186) U.S. utility patent application Ser. No. 10/952,416, filed on Sep. 28, 2004, (187) U.S. utility patent application Ser. No. 10/950,749, filed on Sep. 27, 2004, (188) U.S. utility patent application Ser. No. 10/950,869, filed on Sep. 27, 2004; (189) U.S. provisional patent application Ser. No. 60/761,324, filed on Jan. 23, 2006, (190) U.S. provisional patent application Ser. No. 60/754,556, filed on Dec. 28, 2005, (191) U.S. utility patent application Ser. No. 11/380,051, filed on Apr. 25, 2006, (192) U.S. utility patent application Ser. No. 11/380,055, filed on Apr. 25, 2006, (193) U.S. utility patent application Ser. No. 10/522,039, filed on Mar. 10, 2006; (194) U.S. provisional patent application Ser. No. 60/746,813, filed on May 9, 2006; (195) U.S. utility patent application Ser. No. 11/456,584, filed on Jul. 11, 2006; and (196) U.S. utility patent application Ser. No. 11/456,587, filed on Jul. 11, 2006; (197) PCT Patent Application No. PCT/US2006/009886, filed on Mar. 21, 2006; (198) PCT Patent Application No. PCT/US2006/010674, filed on Mar. 21, 2006; (199) U.S. Pat. No. 6,409,175 which issued Jun. 25, 2002, (200) U.S. Pat. No. 6,550,821 which issued Apr. 22, 2003, (201) U.S. patent application Ser. No. 10/767,953, filed Jan. 29, 2004, now U.S. Pat. No. 7,077,211 which issued Jul. 18, 2006; (202) U.S. patent application Ser. No. 10/769,726, filed Jan. 30, 2004, (203) U.S. patent application Ser. No. 10/770,363 filed Feb. 2, 2004, (204) U.S. utility patent application Ser. No. 11/068,595, filed on Feb. 28, 2005; (205) U.S. utility patent application Ser. 11/070,147, filed on Mar. 2, 2005; (206) U.S. utility patent application Ser. No. 11/071,409, filed on Mar. 2, 2005; (207) U.S. utility patent application Ser. No. 11/071,557, filed on Mar. 3, 2005; (208) U.S. utility patent application Ser. No. 11/072,578, filed on Mar. 4, 2005; (209) U.S. utility patent application Ser. No. 11/072,893, filed on Mar. 4, 2005; (210) U.S. utility patent application Ser. No. 11/072,594, filed on Mar. 4, 2005; (211) U.S. utility patent application Ser. No. 11/074,366, filed on Mar. 7, 2005; (212) U.S. utility patent application Ser. No 11/074,266, filed on Mar. 7, 2005, (213) U.S. provisional patent application Ser. No. 60/832,909, filed on Jul. 24, 2006, (214) U.S. utility patent application Ser. No. 11/536,302, filed Sep. 28, 2006, (215) U.S. utility patent application Ser. No. 11/538,228, filed Oct. 3, 2006, and (216) U.S. utility patent application Ser. No. 11/552,703, filed on Oct. 25, 2006, (217) U.S. utility application Ser. No. 11/553,240, filed on Oct. 26, 2006, (218) U.S. utility application Ser. No. 11/554,288, filed on Oct. 30, 2006, (219) U.S. utility application Ser. No. 11/560,154, filed on Nov. 15, 2006, (220) U.S. provisional application No. 60/866,536, filed on Nov. 20, 2006, and (221) U.S. provisional application No. 60/866,543, filed on Nov. 20, 2006.

BACKGROUND OF THE INVENTION

This invention relates generally to wellbore casings, and in particular to wellbore casings that are formed using expandable tubular members.

Conventionally, when a wellbore is created, a number of casings are installed in the borehole to prevent collapse of the borehole wall and to prevent undesired outflow of drilling fluid into the formation or inflow of fluid from the formation into the borehole. The borehole is drilled in intervals whereby a casing which is to be installed in a lower borehole interval is lowered through a previously installed casing of an upper borehole interval. As a consequence of this procedure the casing of the lower interval is of smaller diameter than the casing of the upper interval. Thus, the casings are in a nested arrangement with casing diameters decreasing in downward direction. Cement annuli are provided between the outer surfaces of the casings and the borehole wall to seal the casings from the borehole wall. As a consequence of this nested arrangement a relatively large borehole diameter is required at the upper part of the wellbore. Such a large borehole diameter involves increased costs due to heavy casing handling equipment, large drill bits and increased volumes of drilling fluid and drill cuttings. Moreover, increased drilling rig time is involved due to required cement pumping, cement hardening, required equipment changes due to large variations in hole diameters drilled in the course of the well, and the large volume of cuttings drilled and removed.

The present invention is directed to overcoming one or more of the limitations of the existing procedures for forming wellbores.

SUMMARY OF THE INVENTION

According to one aspect of the present invention, a method of coupling an expandable tubular member to a preexisting structure is provided that includes positioning the tubular member and an expansion cone within the preexisting structure, anchoring the tubular member to the preexisting structure, axially displacing the expansion cone relative to the tubular member by pulling the expansion cone through the tubular member, and lubricating the interface between the expansion cone and the tubular member.

According to another aspect of the present invention, a method of coupling a tubular member to a preexisting structure is provided that includes positioning the tubular member and an expansion cone within the preexisting structure, anchoring the tubular member to the preexisting structure, and axially displacing the expansion cone relative to the tubular member by pulling the expansion cone through the tubular member. The tubular member includes: an annular member, including: a wall thickness that varies less than about 8%, a hoop yield strength that varies less than about 10%, imperfections of less than about 8% of the wall thickness, no failure for radial expansions of up to about 30%, and no necking of the walls of the annular member for radial expansions of up to about 25%.

According to another aspect of the present invention, a method of coupling a tubular member to a preexisting structure is provided that includes injecting a lubricating fluid into the preexisting structure, positioning the tubular member and an expansion cone within the preexisting structure, anchoring the tubular member to the preexisting structure, and axially displacing the expansion cone relative to the tubular member by pulling the expansion cone through the tubular member.

According to another aspect of the present invention, a method of coupling an expandable tubular member to a preexisting structure is provided that includes positioning the expandable tubular member and an expansion cone within the preexisting structure, anchoring the expandable tubular member to the preexisting structure and axially displacing the expansion cone relative to the expandable tubular member by pulling the expansion cone through the expandable tubular member. The expandable tubular member includes: a first tubular member, a second tubular member, and a threaded connection for coupling the first tubular member to the second tubular member. The threaded connection includes: one or more sealing members for sealing the interface between the first and second tubular members.

According to another aspect of the present invention, a method of coupling an expandable tubular member to a preexisting structure is provided that includes positioning the expandable tubular member and an expansion cone within the preexisting structure, anchoring the expandable tubular member to the preexisting structure, and axially displacing the expansion cone relative to the expandable tubular member by pulling the expansion cone through the expandable tubular member. The expandable tubular member includes a plurality of tubular members having threaded portions that are coupled to one another by the process of: coating the threaded portions of the tubular members with a sealant, coupling the threaded portions of the tubular members and curing the sealant.

According to another aspect of the present invention, a method of coupling a tubular member to a preexisting structure is provided that includes positioning the tubular member and an expansion cone within the preexisting structure, anchoring the tubular member to the preexisting structure, and axially displacing the expansion cone relative to the tubular member by pulling the expansion cone through the expandable tubular member. The tubular member includes: a pair of rings for engaging the preexisting structure, and a sealing element positioned between the rings for sealing the interface between the tubular member and the preexisting structure.

According to another aspect of the present invention, a method of coupling a tubular member to a preexisting structure is provided that includes positioning the expandable tubular member and an expansion cone within the preexisting structure, anchoring the expandable tubular member to the preexisting structure, and axially displacing the expansion cone relative to the expandable tubular member by pulling the expansion cone through the expandable tubular member. The tubular member includes one or more slots.

According to another aspect of the present invention, a method of coupling a tubular member to a preexisting structure is provided that includes positioning the expandable tubular member and an expansion cone within the preexisting structure, anchoring the expandable tubular member to the preexisting structure, and axially displacing the expansion cone relative to the expandable tubular member by pulling the expansion cone through the expandable tubular member. The tubular member includes: a first preexpanded portion, an intermediate portion coupled to the first preexpanded portion including a sealing element, and a second preexpanded portion coupled to the intermediate portion.

According to another aspect of the present invention, a method of coupling a tubular member to a preexisting structure is provided that includes positioning the expandable tubular member and an expansion cone within the preexisting structure, anchoring the expandable tubular member to the preexisting structure, and axially displacing the expansion cone relative to the expandable tubular member by pulling the expansion cone through the expandable tubular member by applying an axial force to the expansion cone. The axial force includes: a substantially constant axial force, and an increased axial force.

According to another aspect of the present invention, a method of coupling a tubular member to a preexisting structure is provided that includes positioning the tubular member and an expansion cone within the preexisting structure, anchoring the tubular member to the preexisting structure, and axially displacing the expansion cone relative to the expandable tubular member by pushing and pulling the expansion cone through the expandable tubular member.

According to another aspect of the present invention, a method of coupling a tubular member to a preexisting structure is provided that includes positioning the tubular member and an expansion cone within the preexisting structure, anchoring the tubular member to the preexisting structure, axially displacing the expansion cone relative to the tubular member by pulling the expansion cone through the expandable tubular member, and injecting a curable fluidic sealing material between the tubular member and the preexisting structure prior to axially displacing the expansion cone.

According to another aspect of the present invention, a method of coupling a tubular member to a preexisting structure is provided that includes positioning the tubular member and an expansion cone within the preexisting structure, anchoring the tubular member to the preexisting structure by increasing the size of the expansion cone, and axially displacing the expansion cone relative to the tubular member by pulling the expansion cone through the tubular member.

According to another aspect of the present invention, a method of coupling a tubular member to a preexisting structure is provided that includes positioning the tubular member and an expansion cone within the preexisting structure, anchoring the tubular member to the preexisting structure by heating a portion of the tubular member, and axially displacing the expansion cone relative to the tubular member by pulling the expansion cone through the tubular member.

According to another aspect of the present invention, a method of coupling an expandable tubular member to a preexisting structure is provided that includes positioning the expandable tubular member, an expansion cone, and an anchoring device within the preexisting structure, positioning the anchoring device above the expansion cone, anchoring the expandable tubular member to the preexisting structure using the anchoring device, and axially displacing the expansion cone.

According to another aspect of the present invention, a method of coupling an expandable tubular member to a preexisting structure is provided that includes positioning the tubular member and an expansion cone within the preexisting structure, explosively anchoring the tubular member to the preexisting structure, and axially displacing the expansion cone relative to the tubular member.

According to another aspect of the present invention, a method of coupling an expandable tubular to a preexisting structure is provided that includes fixing the position of an expansion cone within the preexisting structure, driving the expandable tubular member onto the expansion cone in a first direction, and axially displacing the expansion cone in a second direction relative to the expandable tubular member. The first and second directions are different.

According to another aspect of the present invention, a method of coupling an expandable tubular member to a preexisting structure is provided that includes placing the expandable tubular, an expansion cone, and a resilient anchor within the preexisting structure, releasing the resilient anchor, and axially displacing the expansion cone within the expandable tubular member.

According to another aspect of the present invention, a method of coupling an expandable tubular member to a preexisting structure is provided that includes placing the expandable tubular member, an expansion cone, and an anchor into the preexisting structure, and anchoring the expandable tubular member to the preexisting structure by: pivoting one or more engagement elements, and axially displacing the expansion cone.

According to another aspect of the present invention, a method of coupling an expandable tubular member to a preexisting structure is provided that includes placing the expandable tubular member and an expansion cone into the preexisting structure, placing a quantity of a fluidic material onto the expandable tubular member to anchor the expandable tubular member to the preexisting structure, and axially displacing the expansion cone.

According to another aspect of the present invention, a method of coupling an expandable tubular member to a preexisting structure is provided that includes positioning the expandable tubular member and an expansion cone into the preexisting structure, anchoring the expandable tubular member to the preexisting structure by injecting a quantity of a hardenable fluidic material into the preexisting structure, at least partially curing the hardenable fluidic sealing material, and axially displacing the expansion cone.

According to another aspect of the present invention, a method of coupling an expandable tubular member to a preexisting structure is provided that includes placing the expandable tubular member and an expansion cone within the preexisting structure and applying an axial force to the expandable tubular member in a downward direction.

According to another aspect of the present invention, a method of coupling an expandable tubular member to a preexisting structure is provided that includes placing the expandable tubular member and an expansion cone within the preexisting structure, injecting a quantity of a first fluidic material having a first density into the region of the preexisting structure outside of the expandable tubular member, and injecting a quantity of a second fluidic material having a second density into a portion of the expandable tubular member below the expansion cone. The second density is greater than the first density.

According to another aspect of the present invention, a method of coupling an expandable tubular member to a preexisting structure is provided that includes placing the expandable tubular member and an expansion cone into the preexisting structure, anchoring the expandable tubular member to the preexisting structure, applying an axial force to the expansion cone, and pressurizing an interior portion of the expandable tubular member below the expansion cone.

According to another aspect of the present invention, a method of coupling an expandable tubular member to a preexisting structure is provided that includes placing the expandable tubular member and an expansion cone into the preexisting structure and applying an axial force to the expandable tubular member.

According to another aspect of the present invention, an apparatus for coupling a tubular member to a preexisting structure is provided that includes an expandable tubular member, an anchoring device adapted to couple the expandable tubular member to the preexisting structure, and an expansion cone movably coupled to the expandable tubular member and adapted to radially expand the expandable tubular member, including: a housing including a tapered first end and a second end, one or more grooves formed in the outer surface of the tapered first end, and one or more axial flow passages fluidically coupled to the grooves.

According to another aspect of the present invention, an apparatus for coupling an expandable tubular member to a preexisting structure is provided that includes an expandable tubular member, an anchoring device adapted to couple the expandable tubular member to the preexisting structure, and an expansion cone movably coupled to the expandable tubular member and adapted to radially expand the expandable tubular member. The expandable tubular member includes: an annular member, having: a wall thickness that varies less than about 8%, a hoop yield strength that varies less than about 10%, imperfections of less than about 8% of the wall thickness, no failure for radial expansions of up to about 30%, and no necking of the walls of the annular member for radial expansions of up to about 25%.

According to another aspect of the present invention, an apparatus for coupling an expandable tubular member to a preexisting structure is provided that includes an expandable tubular member, an anchoring device adapted to couple the expandable tubular member to the preexisting structure, and an expansion cone movably coupled to the expandable tubular member and adapted to radially expand the expandable tubular member. The expandable tubular member includes: a first tubular member, a second tubular member, and a threaded connection for coupling the first tubular member to the second tubular member, the threaded connection including: one or more sealing members for sealing the interface between the first and second tubular members.

According to another aspect of the present invention, an apparatus for coupling an expandable tubular member to a preexisting structure is provided that includes an expandable tubular member, an anchoring device adapted to couple the expandable tubular member to the preexisting structure, and an expansion cone movably coupled to the expandable tubular member and adapted to radially expand the expandable tubular member. The expandable tubular member includes: a layer of a lubricant coupled to the interior surface of the tubular member.

According to another aspect of the present invention, an apparatus for coupling an expandable tubular member to a preexisting structure is provided that includes an expandable tubular member, an anchoring device adapted to couple the expandable tubular member to the preexisting structure, and an expansion cone movably coupled to the expandable tubular member and adapted to radially expand the expandable tubular member. The expandable tubular member includes: a pair of tubular members having threaded portions coupled to one another, and a quantity of a sealant within the threaded portions of the tubular members.

According to another aspect of the present invention, an apparatus for coupling an expandable tubular member to a preexisting structure is provided that includes an expandable tubular member, an anchoring device adapted to couple the expandable tubular member to the preexisting structure, and an expansion cone movably coupled to the expandable tubular member and adapted to radially expand the expandable tubular member. The expandable tubular member includes: a pair of rings for engaging the preexisting structure, and a sealing element positioned between the rings for sealing the interface between the tubular member and the preexisting structure.

According to another aspect of the present invention, an apparatus for coupling an expandable tubular member to a preexisting structure is provided that includes an expandable tubular member, an anchoring device adapted to couple the expandable tubular member to the preexisting structure, and an expansion cone movably coupled to the expandable tubular member and adapted to radially expand the expandable tubular member. The expandable tubular member includes one or more slots.

According to another aspect of the present invention, an apparatus for coupling an expandable tubular member to a preexisting structure is provided that includes an expandable tubular member, an anchoring device adapted to couple the expandable tubular member to the preexisting structure, and an expansion cone movably coupled to the expandable tubular member and adapted to radially expand the expandable tubular member. The expandable tubular member includes: a first preexpanded portion, an intermediate portion coupled to the first preexpanded portion including a sealing element, and a second preexpanded portion coupled to the intermediate portion.

According to another aspect of the present invention, an apparatus for coupling an expandable tubular member to a preexisting structure is provided that includes an expandable tubular member, an anchoring device adapted to couple the expandable tubular member to the preexisting structure, an expansion cone movably coupled to the expandable tubular member and adapted to radially expand the expandable tubular member, and a valveable fluid passage coupled to the anchoring device.

According to another aspect of the present invention, an apparatus for coupling an expandable tubular member to a preexisting structure is provided that includes a first support member, a second support member coupled to the first support member, an expansion cone coupled to the first support member, an expandable tubular member coupled to the expansion cone, and an anchoring device coupled to the second support member adapted to couple the expandable tubular member to the preexisting structure. The anchoring device is positioned above the expansion cone.

According to another aspect of the present invention, an apparatus for coupling an expandable tubular member to a preexisting structure is provided that includes a first support member, a second support member coupled to the first support member, an expansion cone coupled to the first support member, an expandable tubular member coupled to the expansion cone, and an explosive anchoring device coupled to the second support member adapted to couple the expandable tubular member to the preexisting structure.

According to another aspect of the present invention, an apparatus for coupling an expandable tubular member to a preexisting structure is provided that includes a support member, an expandable expansion cone coupled to the support member, and an expandable tubular member coupled to the expansion cone.

According to another aspect of the present invention, an apparatus for coupling an expandable tubular member to a preexisting structure is provided that includes a support member, an expandable expansion cone coupled to the support member, and an expandable tubular member coupled to the expandable expansion cone.

According to another aspect of the present invention, an apparatus for coupling an expandable tubular to a preexisting structure is provided that includes a support member, an expansion cone coupled to the support member, an expandable tubular member coupled to the expansion cone including one or more shape memory metal inserts, and a heater coupled to the support member in opposing relation to the shape memory metal inserts.

According to another aspect of the present invention, an apparatus for coupling an expandable tubular member to a preexisting structure is provided that includes a support member, an expansion cone coupled to the support member, an expandable tubular member coupled to the expandable expansion cone, and a resilient anchor coupled to the expandable tubular member.

According to another aspect of the present invention, an expandable tubular member is provided that includes: an expandable tubular body, one or more resilient panels coupled to the expandable tubular body, and a release member releasably coupled to the resilient panels adapted to controllably release the resilient panels.

According to another aspect of the present invention, an apparatus for coupling an expandable tubular member to a preexisting structure is provided that includes a support member, an expansion cone coupled to the support member, an expandable tubular member coupled to the expandable expansion cone, and an anchor coupled to the expandable tubular member, including: one or more spikes pivotally coupled to the expandable tubular member for engaging the preexisting structure.

According to another aspect of the present invention, an apparatus for coupling an expandable tubular member to a preexisting structure is provided that includes a support member, an expansion cone coupled to the support member, an expandable tubular member coupled to the expandable expansion cone, and an anchor coupled to the expandable tubular member, including: one or more petal baskets pivotally coupled to the expandable tubular member.

According to another aspect of the present invention, an apparatus for coupling an expandable tubular member to a preexisting structure is provided that includes a support member, an expansion cone coupled to the support member, an expandable tubular member coupled to the expansion cone, including: a slotted portion provided at one end of the expandable tubular member.

According to another aspect of the present invention, an apparatus for coupling an expandable tubular member to a preexisting structure is provided that includes a support member, an expansion cone, an expandable tubular member coupled to the expansion cone, a coupling device coupled to the support member and an end portion of the expandable tubular member, and A mass coupled to the end portion of the expandable tubular member. The weight of the mass is greater than the yield strength of the expandable tubular member.

According to another aspect of the present invention, an apparatus for coupling an expandable tubular member to a preexisting structure is provided that includes a support member including a fluid passage, an expansion cone coupled to the support member, an expandable tubular member coupled to the expansion cone, a slip joint coupled to the expansion cone, an end plate coupled to the slip joint, a fluid chamber coupled to the fluid passage, the fluid chamber defined by the interior portion of the expandable tubular member between the expansion cone and the end plate.

According to another aspect of the present invention, a method of coupling a tubular member to a preexisting structure is provided that includes positioning the tubular member and an expansion cone within the preexisting structure, axially displacing the expansion cone, removing the expansion cone, and applying direct radial pressure to the tubular member.

According to another aspect of the present invention, an apparatus is provided that includes a tubular member coupled to a preexisting structure. The tubular member is coupled to the preexisting structure by the process of:

Positioning the tubular member and an expansion cone within the preexisting structure, axially displacing the expansion cone, removing the expansion cone, and applying direct radial pressure to the tubular member.

BRIEF DESCRIPTION OF THE DRAWINGS

FIG. 16a is a top view of an embodiment of a resilient anchor for use in the apparatus of FIG. 15a.

FIG. 17a is a top view of an alternate embodiment of a resilient anchor for use in the apparatus of FIG. 15a.

FIG. 18a is a fragmentary cross-sectional top view of an alternate embodiment of a resilient anchor for use in the apparatus of FIG. 15a.

FIG. 19b is a cross-sectional view of the expandable tubular member of FIG. 19a.

FIG. 19c is a bottom view of the expandable tubular member of FIG. 19a.

FIG. 21a is an illustration of an embodiment of the anchor of the apparatus of FIG. 20a.

FIG. 22a is an illustration of an alternative embodiment of the anchor of the apparatus of FIG. 20a.

FIG. 22c is a cross-sectional illustration of the petals of the anchor of FIG. 22a.

DETAILED DESCRIPTION

A method and apparatus for coupling tubular members to a preexisting structure is provided. In an exemplary embodiment, the tubular members are coupled to the preexisting structure by radially expanding the tubular members into contact with the preexisting structure. In an exemplary embodiment, the tubular members are radially expanded by anchoring one end of the tubular members to the preexisting structure and then pulling an expansion cone through the tubular members. In this manner, the tubular members are radially expanded and coupled to the preexisting structure.

Figure 1A:
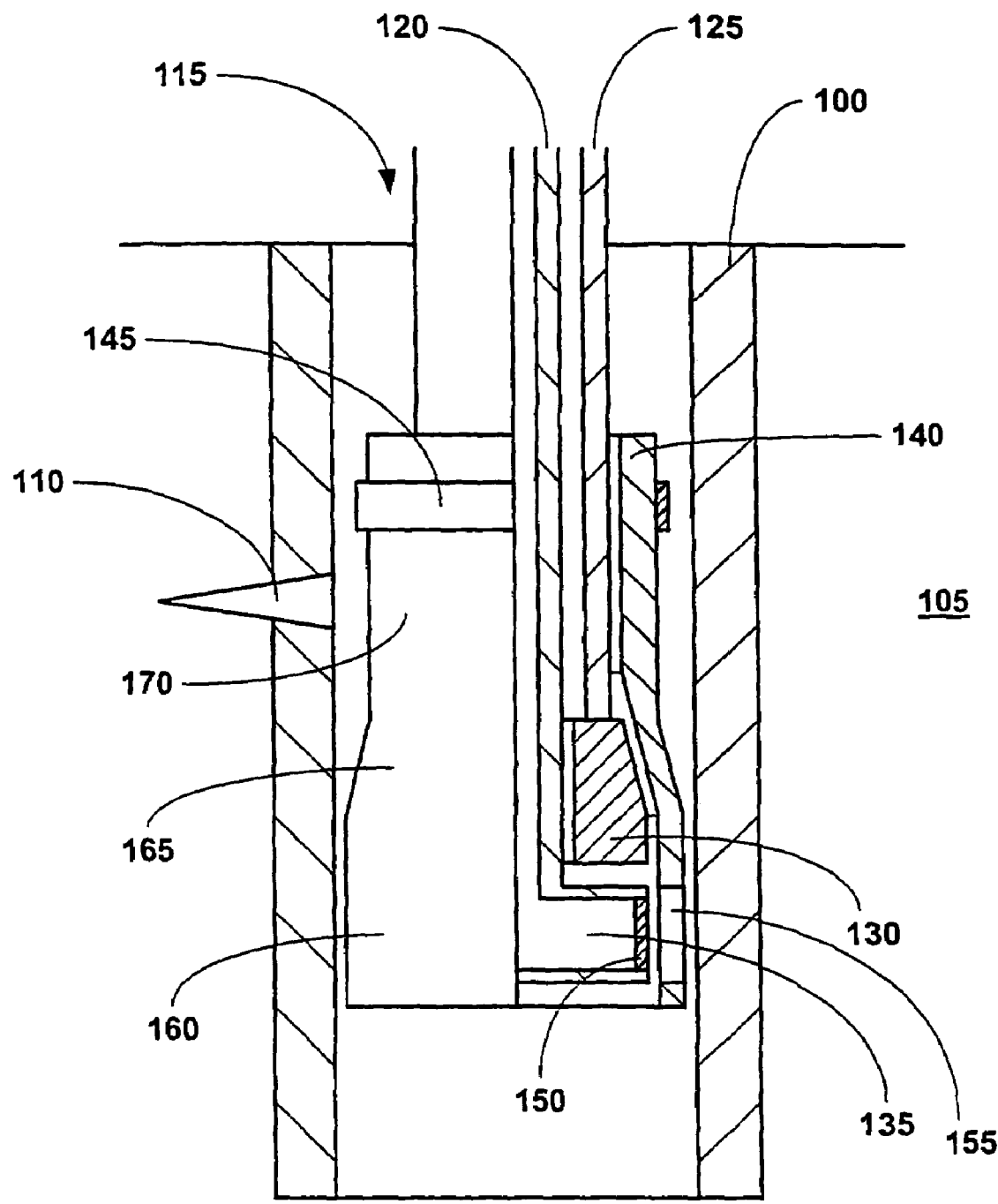
FIG. 1a is a fragmentary cross-sectional illustration of the placement of an embodiment of an apparatus for expanding a tubular member within a wellbore casing.

Referring initially to FIGS, 1a, 1b, 1c, 1d, 1e, 1f and 1g, an exemplary embodiment of a method and apparatus for coupling an expandable tubular member to a preexisting structure will be described. Referring to FIG. 1a, a wellbore casing 100 is positioned within a subterranean formation 105. The wellbore casing 100 may be positioned in any orientation from the vertical direction to the horizontal direction. The wellbore casing 100 further includes one or more openings 110 that may have been the result of unintentional damage to the wellbore casing 100, or due to a prior perforation or fracturing operation performed upon the surrounding subterranean formation 105. As will be recognized by persons having ordinary skill in the art, the openings 110 can adversely affect the subsequent operation and use of the wellbore casing 100 unless they are sealed off.

In an exemplary embodiment, an apparatus 115 is utilized to seal off the openings 110 in the wellbore casing 100. More generally, the apparatus 115 is preferably utilized to form or repair wellbore casings, pipelines, or structural supports.

The apparatus 115 preferably includes a first support member 120, a second support member 125, an expansion cone 130, an anchoring device 135, and expandable tubular member 140, and one or more sealing members 145.

The first support member 120 is preferably adapted to be coupled to a surface location. The first support member 120 is further coupled to the anchoring device 135. The first support member 120 is preferably adapted to convey pressurized fluidic materials and/or electrical current and/or communication signals from a surface location to the anchoring device 135. The first support member 120 may, for example, be conventional commercially available slick wire, braided wire, coiled tubing, or drilling stock material.

The second support member 125 is preferably adapted to be coupled to a surface location. The second support member 125 is further coupled to the expansion cone 130. The second support member 125 is preferably adapted to permit the expansion cone 130 to be axially displaced relative to the first support member 120. The second support member 125 may, for example, be conventional commercially available slick wire, braided wire, coiled tubing, or drilling stock material.

The expansion cone 130 is coupled to the second support member 125. The expansion cone 130 is preferably adapted to radially expand the expandable tubular member 140 when the expansion cone 130 is axially displaced relative to the expandable tubular member 140. In an exemplary embodiment, the expansion cone 130 is provided substantially as disclosed in one or more of the following: (1) U.S. utility patent application Ser. No. 09/454,139, filed on Dec. 3, 1999, which claimed the benefit of the filing date of U.S. provisional patent application No. 60/111,293, filed on Dec. 7, 1998; (2) U.S. utility patent application Ser. No. 09/510,913, filed on Feb. 23, 2000, which claimed the benefit of the filing date of U.S. provisional application No. 60/121,702, filed on Feb. 25, 1999; (3) U.S. utility patent application Ser. No. 09/502,350, filed on Feb. 10, 2000, which claimed the benefit of the filing date of U.S. provisional application No. 60/119,611, (4) U.S. utility patent application Ser. No. 09/440,338, filed on Nov. 15, 1999, which claimed the benefit of the filing date of U.S. provisional application No. 60/108,558, filed on Nov. 16, 1998; (5) U.S. provisional patent application No. 60/183,546, filed on Feb. 18, 2000; (6) U.S. utility patent application Ser. No. 09/523,460, filed on Mar. 10, 2000, which claimed the benefit of the filing date of U.S. provisional application No. 60/124,042, filed on Mar. 11, 1999; (7) U.S. utility patent application Ser. No. 09/512,895, filed on Feb. 24, 2000, which claimed the benefit of the filing dates of U.S. provisional application No. 60/121,841, filed on Feb. 26, 1999 and U.S. provisional application No. 60/154,047, filed on Sep. 16, 1999; (8) U.S. utility application Ser. No. 09/511,941, filed on Feb. 24, 2000, which claimed the benefit of the filing date of U.S. provisional Ser. No. 60/121,907, filed on Feb. 26, 1999; (9) U.S. utility patent application Ser. No. 09/588,946, filed on Jun. 7, 2000, which claimed the benefit of the filing date of U.S. provisional patent application Ser. No. 60/137,998, filed on Jun. 7, 1999; (10) U.S. utility patent application Ser. No. 09/559,122, filed on Apr. 26, 2000, which claimed the benefit of the filing date of U.S. provisional application No. 60/131,106, filed on Apr. 26, 1999; (11) U.S. provisional application No. 60/146,203, filed on Jun. 29, 1999; (12) U.S. provisional application No. 60/143,039, filed on Jun. 9, 1999; (13) U.S. provisional patent application Ser. No. 60/162,671, filed on Nov. 1, 1999; (14) U.S. provisional application No. 60/159,039, filed on Oct. 12, 1999; (15) U.S. provisional patent application Ser. No. 60/159,033, filed on Oct. 12, 1999; and (16) U.S. provisional patent application Ser. No. 60/165,228, filed on Nov. 12, 1999, the disclosures of which are incorporated herein by reference.

The anchoring device 135 is coupled to the first support member 120. The anchoring device 135 is preferably adapted to be controllably coupled to the expandable tubular member 140 and the wellbore casing 100. In this manner, the anchoring device 135 preferably controllably anchors the expandable tubular member 140 to the wellbore casing 100 to facilitate the radial expansion of the expandable tubular member 140 by the axial displacement of the expansion cone 130. In an exemplary embodiment, the anchoring device 135 includes one or more expandable elements 150 that are adapted to controllably extend from the body of the anchoring device 135 to engage both the expandable tubular member 140 and the wellbore casing 100. In an exemplary embodiment, the expandable elements 150 are actuated using fluidic pressure. In an exemplary embodiment, the anchoring device 135 is any one of the hydraulically actuated packers commercially available from Halliburton Energy Services or Baker-Hughes.

The expandable tubular member 140 is removably coupled to the expansion cone 130. The expandable tubular member 140 is further preferably adapted to be removably coupled to the expandable element 150 of the anchoring device 135. In an exemplary embodiment, the expandable tubular member 140 includes one or more anchoring windows 155 for permitting the expandable elements 150 of the anchoring device 135 to engage the wellbore casing 100 and the expandable tubular member 140.

In an exemplary embodiment, the expandable tubular member 140 further includes a lower section 160, an intermediate section 165, and an upper section 170. In an exemplary embodiment, the lower section 160 includes the anchoring windows 155 in order to provide anchoring at an end portion of the expandable tubular member 140. In an exemplary embodiment, the wall thickness of the lower and intermediate sections, 160 and 165, are less than the wall thickness of the upper section 170 in order to optimally couple the radially expanded portion of the expandable tubular member 140 to the wellbore casing 100.

In an exemplary embodiment, the expandable tubular member 140 is further provided substantially as disclosed in one or more of the following: (1) U.S. utility patent application Ser. No. 09/454,139, filed on Dec. 3, 1999, which claimed the benefit of the filing date of U.S. provisional patent application No. 60/111,293, filed on Dec. 7, 1998; (2) U.S. utility patent application Ser. No. 09/510,913, filed on Feb. 23, 2000, which claimed the benefit of the filing date of U.S. provisional application No. 60/121,702, filed on Feb. 25, 1999; (3) U.S. utility patent application Ser. No. 09/502, 350, filed on Feb. 10, 2000, which claimed the benefit of the filing date of U.S. provisional application No. 60/119,611, (4) U.S. utility patent application Ser. No. 09/440,338, filed on Nov. 15, 1999, which claimed the benefit of the filing date of U.S. provisional application No. 60/108,558, filed on Nov. 16, 1998; (5) U.S. provisional patent application No. 60/183,546, filed on Feb. 18, 2000; (6) U.S. utility patent application Ser. No. 09/523,460, filed on Mar. 10, 2000, which claimed the benefit of the filing date of U.S. provisional application No. 60/124,042, filed on Mar. 11, 1999; (7) U.S. utility patent application Ser. No. 09/512,895, filed on Feb. 24, 2000, which claimed the benefit of the filing dates of U.S. provisional application No. 60/121,841, filed on Feb. 26, 1999 and U.S. provisional application No. 60/154,047, filed on Sep. 16, 1999; (8) U.S. utility application Ser. No. 09/511,941, filed on Feb. 24, 2000, which claimed the benefit of the filing date of U.S. provisional Ser. No. 60/121,907, filed on Feb. 26, 1999; (9) U.S. utility patent application Ser. No. 09/588,946, filed on Jun. 7, 2000, which claimed the benefit of the filing date of U.S. provisional patent application Ser. No. 60/137,998, filed on Jun. 7, 1999; (10) U.S. utility patent application Ser. No. 09/559, 122, filed on Apr. 26, 2000, which claimed the benefit of the filing date of U.S. provisional application No. 60/131,106, filed on Apr. 26, 1999; (11) U.S. provisional application No. 60/146,203, filed on Jun. 29, 1999; (12) U.S. provisional application No. 60/143,039, filed on Jun. 9, 1999; (13) U.S. provisional patent application Ser. No. 60/162,671, filed on Nov. 1, 1999; (14) U.S. provisional application No. 60/159, 039, filed on Oct. 12, 1999; (15) U.S. provisional patent application No. 60/159,033, filed on Oct. 12, 1999; and (16)

U.S. provisional patent application No. 60/165,228, filed on Nov. 12, 1999, the disclosures of which are incorporated herein by reference.

The sealing members 145 are coupled to the outer surface of the upper portion 170 of the expandable tubular member 140. The sealing members 145 are preferably adapted to engage and fluidicly seal the interface between the radially expanded expandable tubular member 140 and the wellbore casing 100. In an exemplary embodiment, the apparatus 115 includes a plurality of sealing members 145. In an exemplary embodiment, the sealing members 145 surround and isolate the opening 110.

As illustrated in FIG. 1a, the apparatus 115 is preferably positioned within the wellbore casing 100 with the expandable tubular member 140 positioned in opposing relation to the opening 110. In an exemplary embodiment, the apparatus 115 includes a plurality of sealing members 145 that are positioned above and below the opening 110. In this manner, the radial expansion of the expandable tubular member 140 optimally fluidicly isolates the opening 110.

Figure 1B:
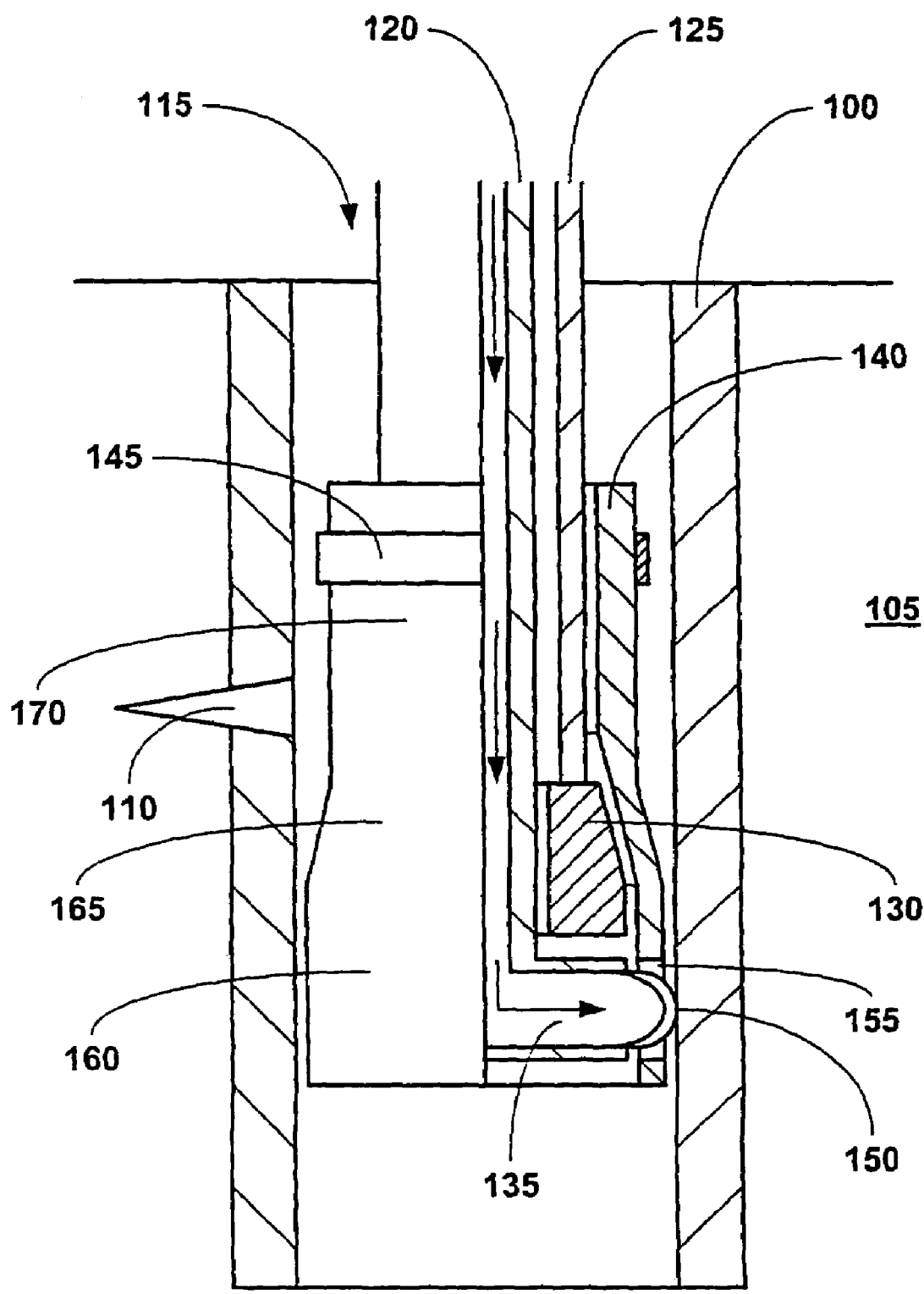
FIG. 1b is a fragmentary cross-sectional illustration of the apparatus of FIG. 1a after anchoring the expandable tubular member of the apparatus to the wellbore casing.

As illustrated in FIG. 1b, the apparatus 115 is then anchored to the wellbore casing 100 using the anchoring device 135. In an exemplary embodiment, the anchoring device 135 is pressurized and the expandable element 150 is extended from the anchoring device 135 through the corresponding anchoring window 155 in the expandable tubular member 140 into intimate contact with the wellbore casing 100. In this manner, the lower section 160 of the expandable tubular member 140 is removably coupled to the wellbore casing 100.

In an alternative embodiment, a compressible cement and/or epoxy is then injected into the annular space between the unexpanded portion of the tubular member 140 and the wellbore casing 100. The compressible cement and/or epoxy is then permitted to at least partially cure prior to the initiation of the radial expansion process. In this manner, an annular structural support and fluidic seal is provided around the tubular member 140.

Figure 1C:
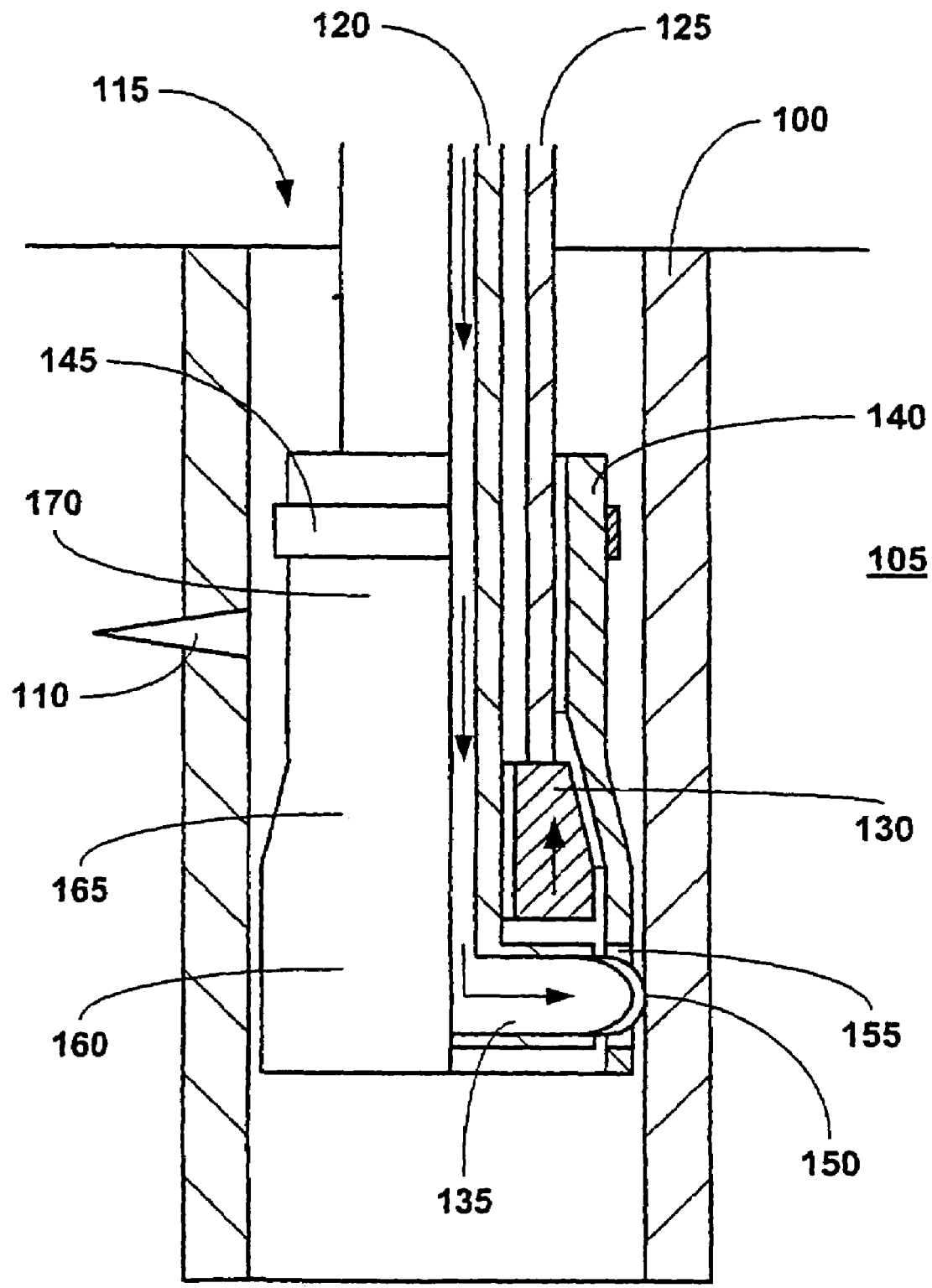
FIG. 1c is a fragmentary cross-sectional illustration of the apparatus of FIG. 1b after initiating the axial displacement of the expansion cone.

As illustrated in FIG. 1c, the expansion cone 130 is then axially displaced by applying an axial force to the second support member 125. In an exemplary embodiment, the axial displacement of the expansion cone 130 radially expands the expandable tubular member 140 into intimate contact with the walls of the wellbore casing 100.

Figure 1D:
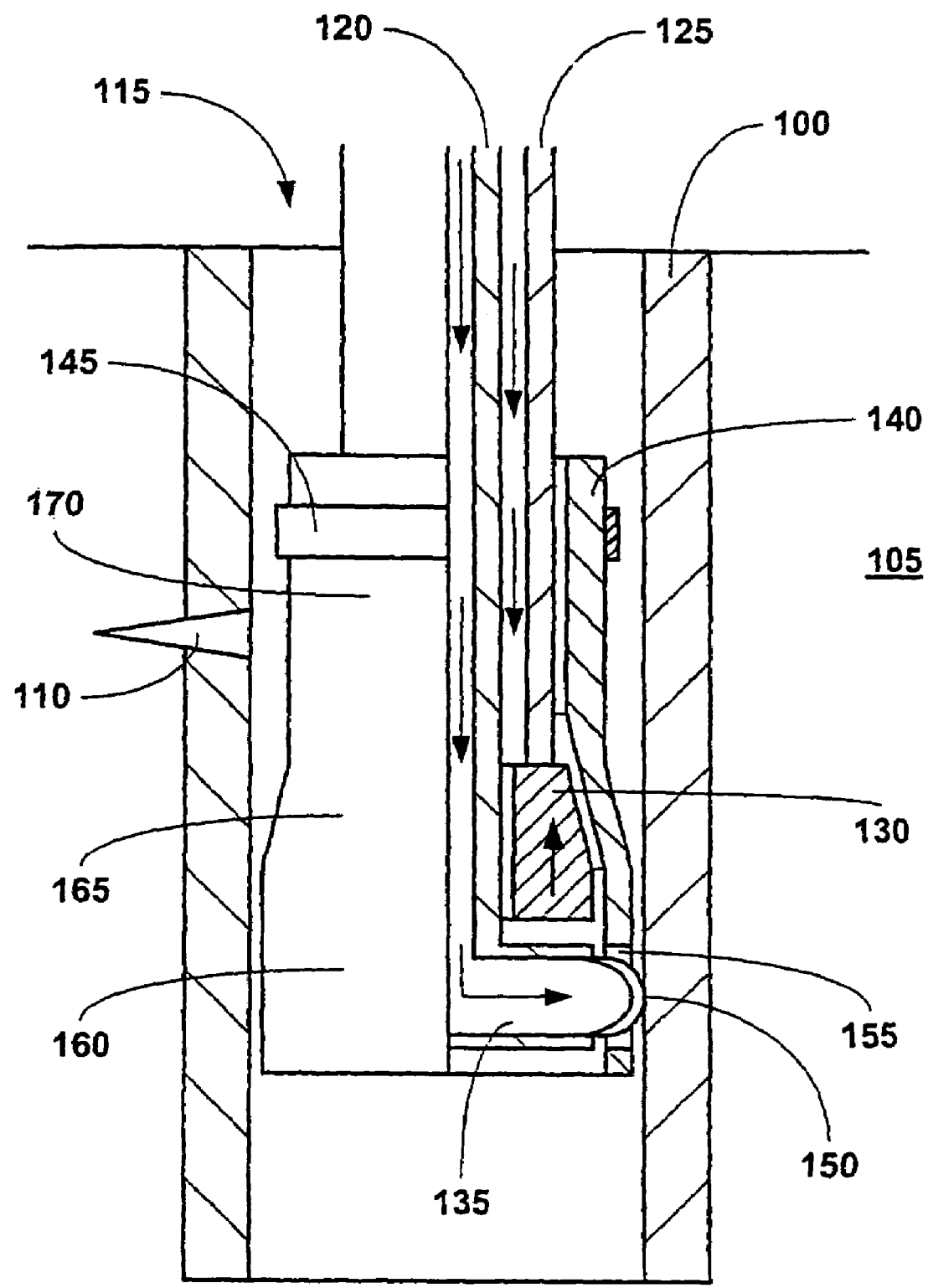
FIG. 1d is a fragmentary cross-sectional illustration of the apparatus of FIG. 1b after initiating the axial displacement of the expansion cone by pulling on the expansion cone and injecting a pressurized fluid below the expansion cone.

In an alternative embodiment, as illustrated in FIG. 1d, the axial displacement of the expansion cone 130 is enhanced by injecting a pressurized fluidic material into the annular space between the first support member 120 and the second support member 125. In this manner, an upward axial force is applied to the lower annular face of the expansion cone 130 using the pressurized fluidic material. In this manner, a temporary need for increased axial force during the radial expansion process can be easily satisfied.

Figure 1E:
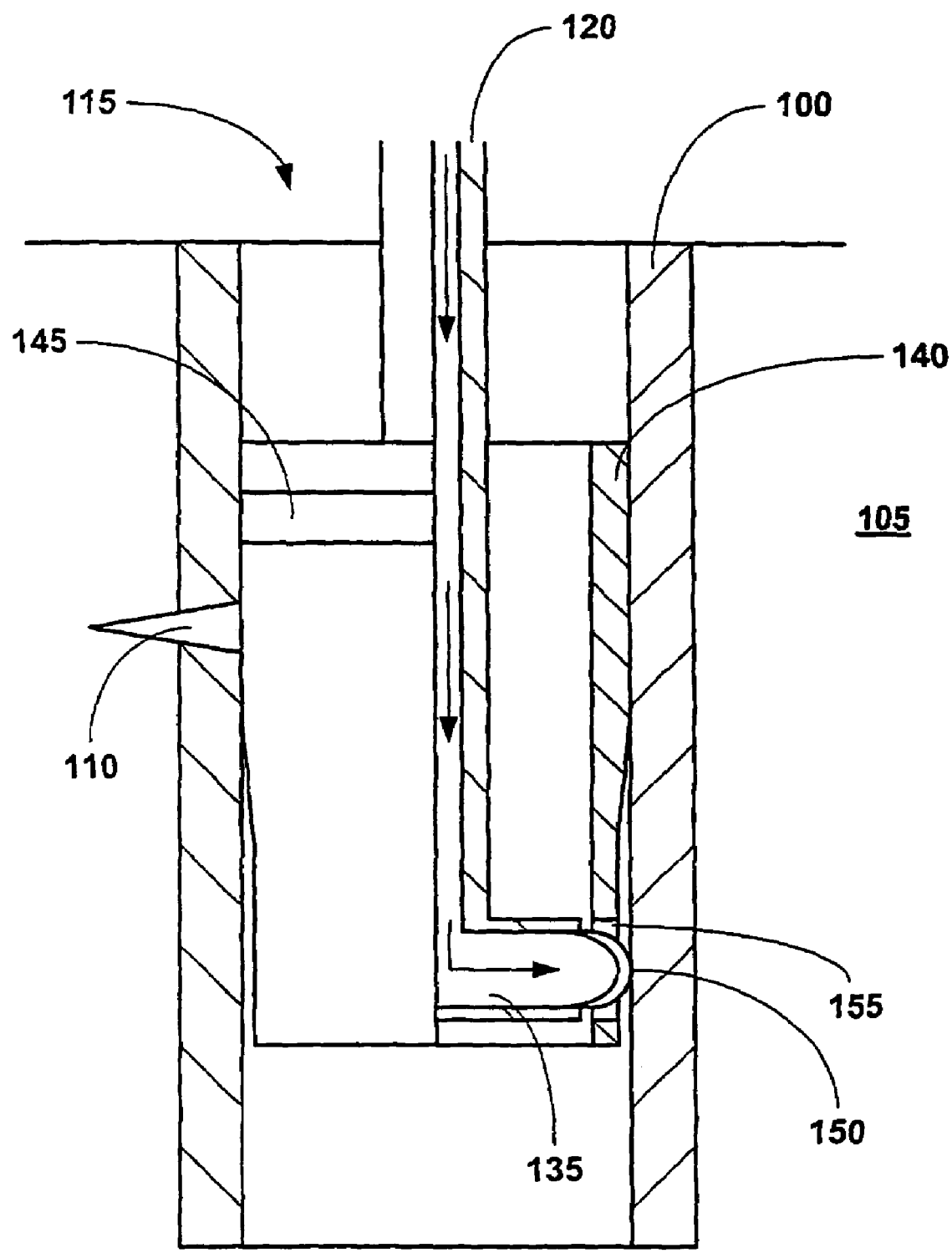
FIG. 1e is a fragmentary cross-sectional illustration of the apparatus of FIGS. 1c and 1d after the completion of the radial expansion of the expandable tubular member.
Figure 1F:
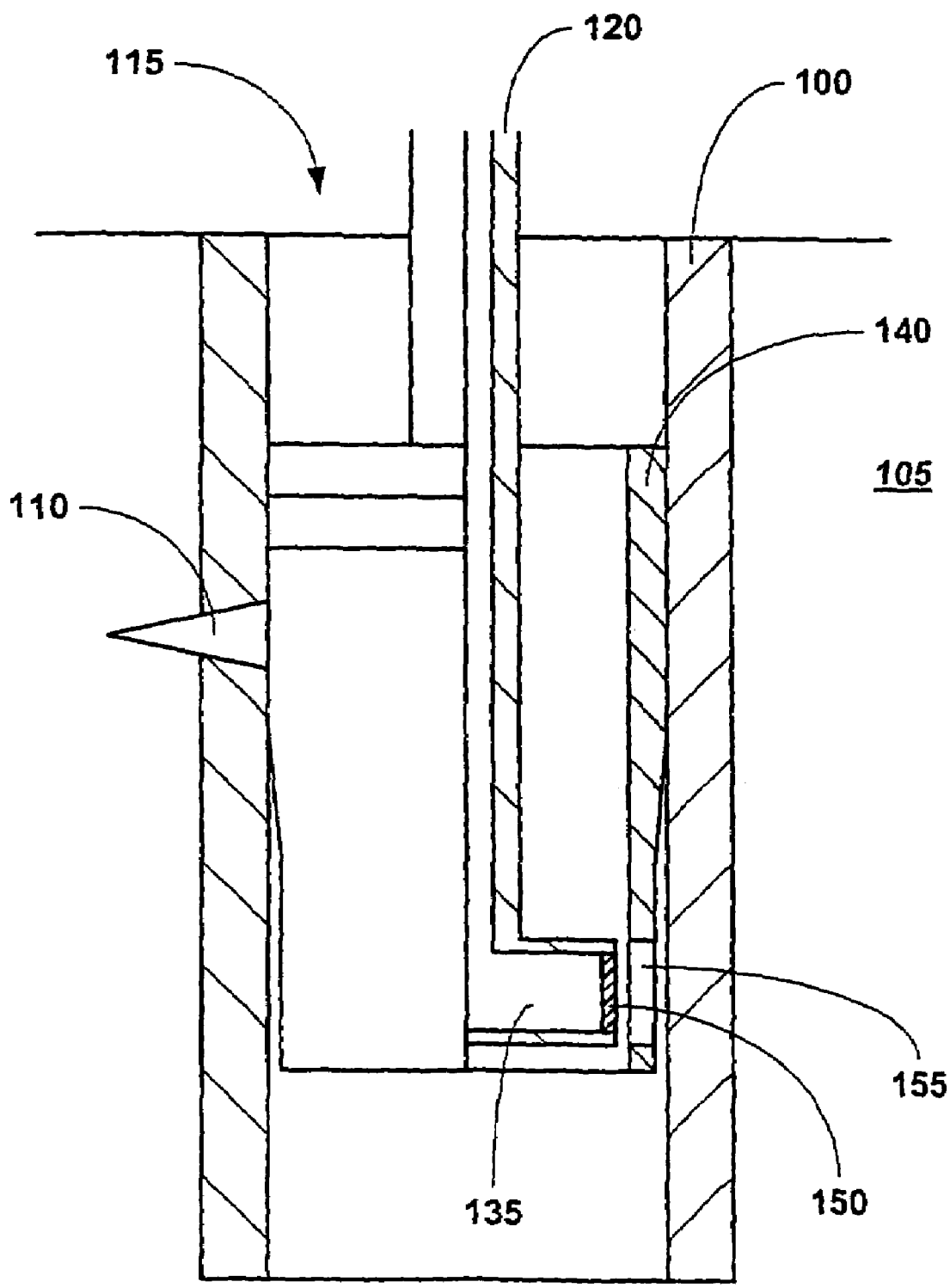
FIG. 1f is a fragmentary cross-sectional illustration of the apparatus of FIG. 1e after the decoupling of the anchoring device of the apparatus from the wellbore casing.
Figure 1G:
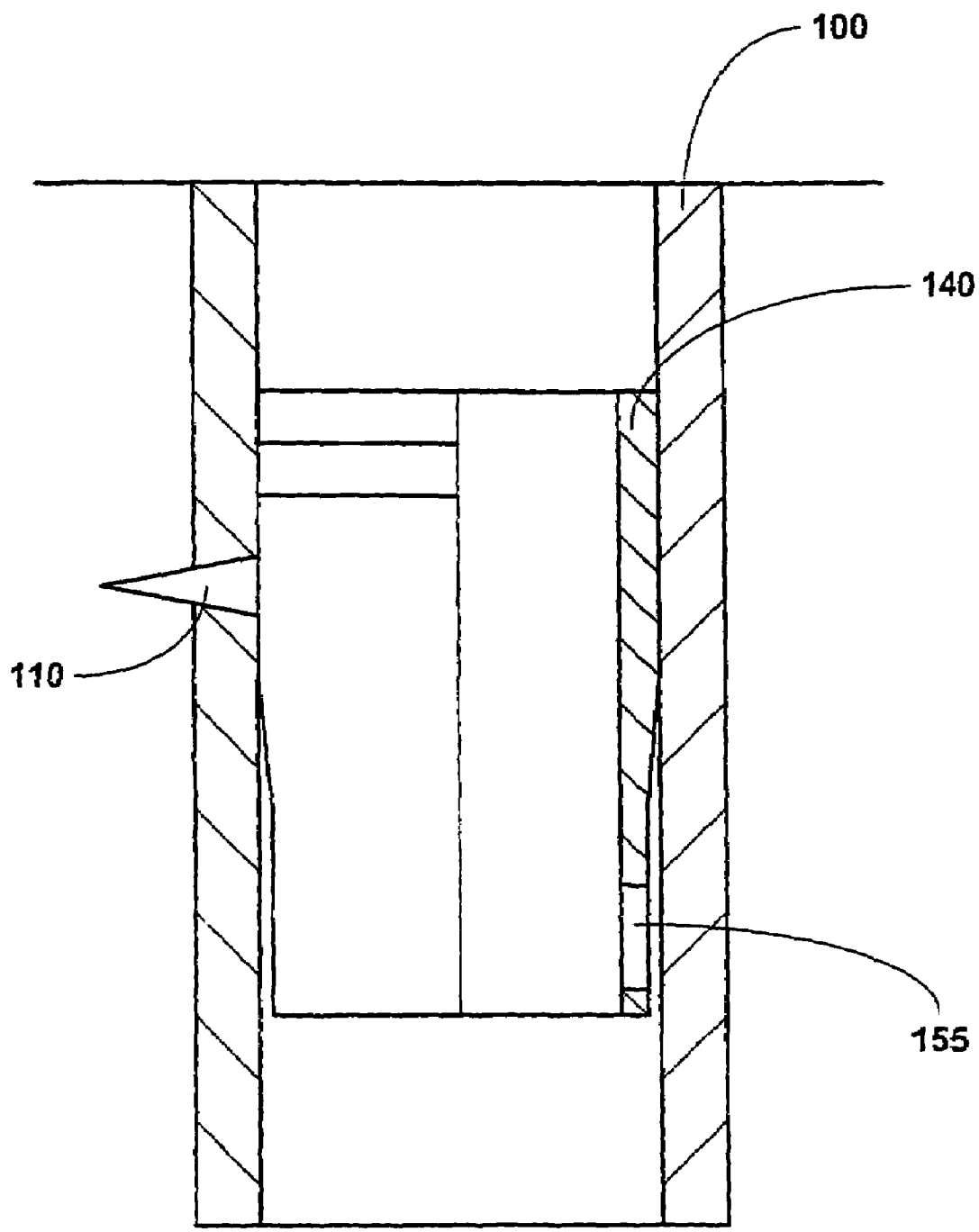
FIG. 1g is a fragmentary cross-sectional illustration of the apparatus of FIG. 1f after the removal of the anchoring device of the apparatus from the wellbore casing.

As illustrated in FIGS. 1e, 1f, and 1g, after the expandable tubular member 140 has been radially expanded by the axial displacement of the expansion cone 130, the first support member 120 and the anchoring device 135 are preferably removed from expandable tubular member 140 by depressurizing the anchoring device 135 and then lifting the first support member 120 and anchoring device 135 from the wellbore casing 100.

As illustrated in FIG. 1g, in an exemplary embodiment, the opening 110 in the wellbore casing 100 is sealed off by the radially expanded expandable tubular member 140. In this manner, repairs to the wellbore casing 100 are optimally provided. More generally, the apparatus 115 is used to repair or form wellbore casings, pipelines, and structural supports.

Figure 2A:
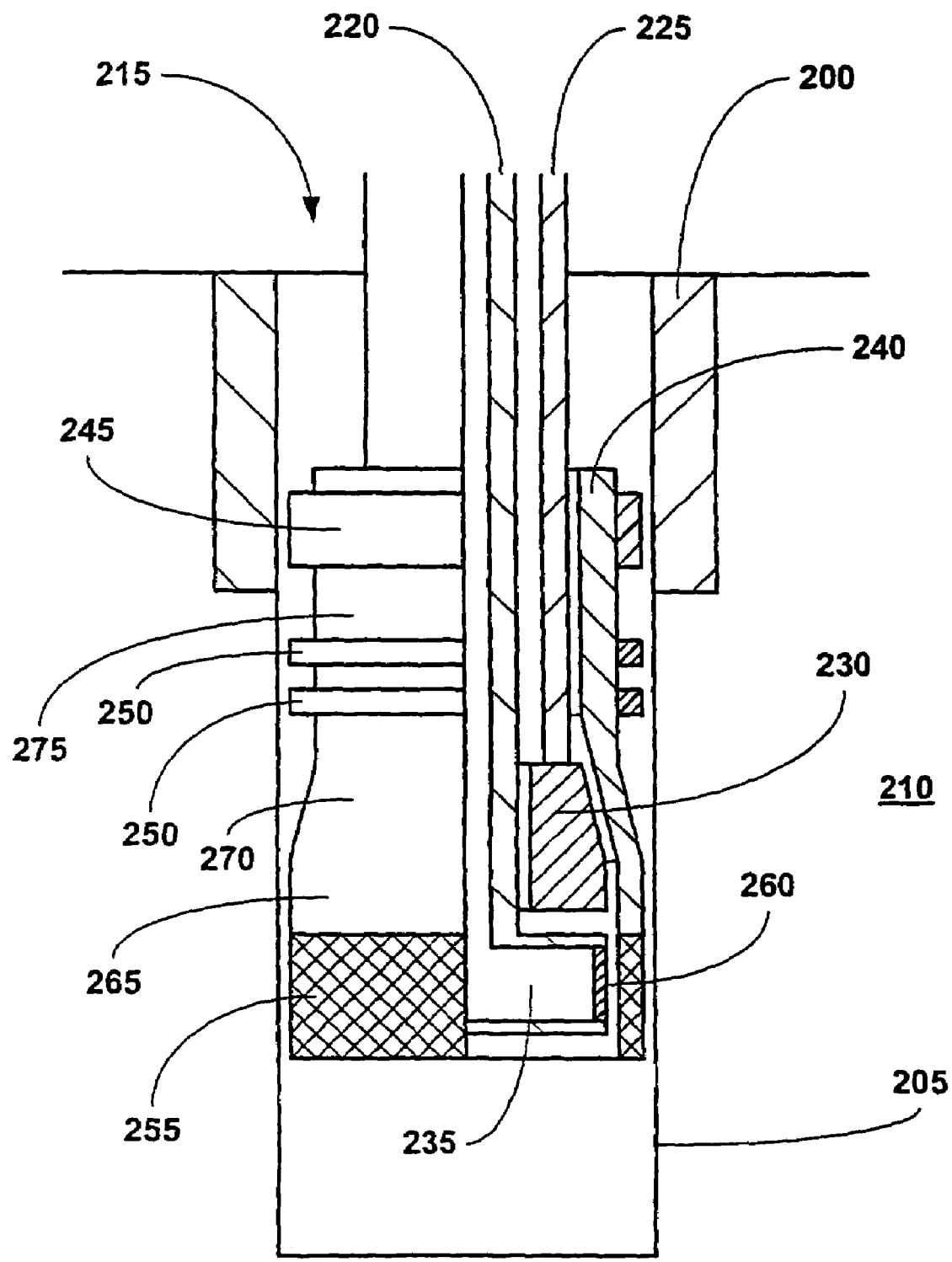
FIG. 2a is a fragmentary cross-sectional illustration of the placement of an embodiment of an apparatus for expanding a tubular member within a wellbore casing and an open hole in a subterranean formation.

Referring to FIGS, 2a, 2b, 2c, 2d, 2e and 2f, an alternative embodiment of a method and apparatus for coupling an expandable tubular member to a preexisting structure will be described. Referring to FIG. 2a, a wellbore casing 200 and an open hole wellbore section 205 are positioned within a subterranean formation 210. The wellbore casing 200 and the open hole wellbore section 205 may be positioned in any orientation from the vertical direction to the horizontal direction.

In an exemplary embodiment, an apparatus 215 is utilized to couple an expandable tubular member to an end portion of the wellbore casing 200. In this manner, the open hole wellbore section 205 is provided with a cased portion. More generally, the apparatus 215 is preferably utilized to form or repair wellbore casings, pipelines, or structural supports.

The apparatus 215 preferably includes a first support member 220, a second support member 225, an expansion cone 230, an anchoring device 235, an expandable tubular member 240, one or more upper sealing members 245, one or more lower sealing members 250, and a flexible coupling element 255.

The first support member 220 is preferably adapted to be coupled to a surface location. The first support member 220 is further coupled to the anchoring device 235. The first support member 220 is preferably adapted to convey pressurized fluidic materials and/or electrical current and/or communication signals from a surface location to the anchoring device 235. The first support member 220 may, for example, be conventional commercially available slick wire, braided wire, coiled tubing, or drilling stock material.

The second support member 225 is preferably adapted to be coupled to a surface location. The second support member 225 is further coupled to the expansion cone 230. The second support member 225 is preferably adapted to permit the expansion cone 230 to be axially displaced relative to the first support member 220. The second support member 225 may, for example, be conventional commercially available slick wire, braided wire, coiled tubing, or drilling stock material.

In an alternative embodiment, the support member 220 is telescopically coupled to the support member 225, and the support member 225 is coupled to a surface support structure.

The expansion cone 230 is coupled to the second support member 225. The expansion cone 230 is preferably adapted to radially expand the expandable tubular member 240 when the expansion cone 230 is axially displaced relative to the expandable tubular member 240. In an exemplary embodiment, the expansion cone 230 is provided substantially as disclosed in one or more of the following: (1) U.S. utility patent application Ser. No. 09/454,139, filed on Dec. 3, 1999, which claimed the benefit of the filing date of U.S. provisional patent application No. 60/111,293, filed on Dec. 7, 1998; (2) U.S. utility patent application Ser. No. 09/510,913, filed on Feb. 23, 2000, which claimed the benefit of the filing date of U.S. provisional application No. 60/121,702, filed on Feb. 25, 1999; (3) U.S. utility patent application Ser. No. 09/502,350, filed on Feb. 10, 2000, which claimed the benefit of the filing date of U.S. provisional application No. 60/119,611, (4) U.S. utility patent application Ser. No. 09/440,338, filed on Nov. 15, 1999, which claimed the benefit of the filing date of U.S. provisional application No. 60/108,558, filed on Nov. 16, 1998; (5) U.S. provisional patent application No. 60/183,546, filed on Feb. 18, 2000; (6) U.S. utility patent application Ser. No. 09/523,460, filed on Mar. 10, 2000, which claimed the benefit of the filing date of U.S. provisional application No. 60/124,042, filed on Mar. 11, 1999; (7) U.S. utility patent application Ser. No. 09/512,895, filed on Feb. 24, 2000, which claimed the benefit of the filing dates of U.S. provisional application No. 60/121,841, filed on Feb. 26, 1999 and U.S. provisional application No. 60/154,047, filed on Sep. 16, 1999; (8) U.S. utility application Ser. No. 09/511,941, filed on Feb. 24, 2000, which claimed the benefit of the filing date of U.S. provisional Ser. No. 60/121,907, filed on Feb. 26, 1999; (9) U.S. utility patent application Ser. No. 09/588,946, filed on Jun. 7, 2000, which claimed the benefit of the filing date of U.S. provisional patent application Ser. No. 60/137,998, filed on Jun. 7, 1999; (10) U.S. utility patent application Ser. No. 09/559,122, filed on Apr. 26, 2000, which claimed the benefit of the filing date of U.S. provisional application No. 60/131,106, filed on Apr. 26, 1999; (11) U.S. provisional application No. 60/146,203, filed on Jul. 29, 1999; (12) U.S. provisional application No. 60/143,039, filed on Jul. 9, 1999; (13) U.S. provisional patent application Ser. No. 60/162,671, filed on Nov. 1, 1999; (14) U.S. provisional application No. 60/159,039, filed on Oct. 12, 1999; (15) U.S. provisional patent application No. 60/159,033, filed on Oct. 12, 1999; and (16) U.S. provisional patent application No. 60/165,228, filed on Nov. 12, 1999, the disclosures of which are incorporated herein by reference.

The anchoring device 235 is coupled to the first support member 220. The anchoring device 235 is preferably adapted to be controllably coupled to the expandable tubular member 240 and the open hole wellbore section 205. In this manner, the anchoring device 235 preferably controllably anchors the expandable tubular member 240 to the open hole wellbore section 205 to facilitate the radial expansion of the expandable tubular member 240 by the axial displacement of the expansion cone 230. In an exemplary embodiment, the anchoring device 235 includes one or more expandable elements 260 that are adapted to controllably extend from the body of the anchoring device 235 to engage both the flexible coupling element 255 and the open hole wellbore section 205. In an exemplary embodiment, the expandable elements 260 are actuated using fluidic pressure. In an exemplary embodiment, the anchoring device 235 is any one of the hydraulically actuated packers commercially available from Halliburton Energy Services or Baker-Hughes.

The expandable tubular member 240 is removably coupled to the expansion cone 230. The expandable tubular member 240 is further preferably coupled to the flexible coupling element 255.

In an exemplary embodiment, the expandable tubular member 240 further includes a lower section 265, an intermediate section 270, and an upper section 275. In an exemplary embodiment, the lower section 265 is coupled to the flexible coupling element 255 in order to provide anchoring at an end portion of the expandable tubular member 240. In an exemplary embodiment, the wall thickness of the lower and intermediate sections, 265 and 270, are less than the wall thickness of the upper section 275 in order to optimally couple the radially expanded portion of the expandable tubular member 240 to the wellbore casing 200 and the open hole wellbore section 205.

In an exemplary embodiment, the expandable tubular member 240 is further provided substantially as disclosed in one or more of the following: (1) U.S. utility patent application Ser. No. 09/454,139, filed on Dec. 3, 1999, which claimed the benefit of the filing date of U.S. provisional patent application No. 60/111,293, filed on Dec. 7, 1998; (2) U.S. utility patent application Ser. No. 09/510,913, filed on Feb. 23, 2000, which claimed the benefit of the filing date of U.S. provisional application No. 60/121,702, filed on Feb. 25, 1999; (3) U.S. utility patent application Ser. No. 09/502,350, filed on Feb. 10, 2000, which claimed the benefit of the filing date of U.S. provisional application No. 60/119,611, (4) U.S. utility patent application Ser. No. 09/440,338, filed on Nov. 15, 1999, which claimed the benefit of the filing date of U.S. provisional application No. 60/108,558, filed on Nov. 16, 1998; (5) U.S. provisional patent application No. 60/183,546, filed on Feb. 18, 2000; (6) U.S. utility patent application Ser. No. 09/523,460, filed on Mar. 10, 2000, which claimed the benefit of the filing date of U.S. provisional application No. 60/124,042, filed on Mar. 11, 1999; (7) U.S. utility patent application Ser. No. 09/512,895, filed on Feb. 24, 2000, which claimed the benefit of the filing dates of U.S. provisional application No. 60/121,841, filed on Feb. 26, 1999 and U.S. provisional application No. 60/154,047, filed on Sep. 16, 1999; (8) U.S. utility application Ser. No. 09/511,941, filed on Feb. 24, 2000, which claimed the benefit of the filing date of U.S. provisional Ser. No. 60/121,907, filed on Feb. 26, 1999; (9) U.S. utility patent application Ser. No. 09/588,946, filed on Jun. 7, 2000, which claimed the benefit of the filing date of U.S. provisional patent application Ser. No. 60/137,998, filed on Jun. 7, 1999; (10) U.S. utility patent application Ser. No. 09/559,122, filed on Apr. 26, 2000, which claimed the benefit of the filing date of U.S. provisional application No. 60/131,106, filed on Apr. 26, 1999; (11) U.S. provisional application No. 60/146,203, filed on Jul. 29, 1999; (12) U.S. provisional application No. 60/143,039, filed on Jul. 9, 1999; (13) U.S. provisional patent application Ser. No. 60/162,671, filed on Nov. 1, 1999; (14) U.S. provisional application No. 60/159,039, filed on Oct. 12, 1999; (15) U.S. provisional patent application No. 60/159,033, filed on Oct. 12, 1999; and (16) U.S. provisional patent application No. 60/165,228, filed on Nov. 12, 1999, the disclosures of which are incorporated herein by reference.

The upper sealing members 245 are coupled to the outer surface of the upper portion 275 of the expandable tubular member 240. The upper sealing members 245 are preferably adapted to engage and fluidicly seal the interface between the radially expanded expandable tubular member 240 and the wellbore casing 200. In an exemplary embodiment, the apparatus 215 includes a plurality of upper sealing members 245.

The lower sealing members 250 are coupled to the outer surface of the upper portion 275 of the expandable tubular member 240. The lower sealing members 250 are preferably adapted to engage and fluidicly seal the interface between the radially expanded expandable tubular member 240 and the open wellbore section 205. In an exemplary embodiment, the apparatus 215 includes a plurality of lower sealing members 250.

The flexible coupling element 255 is coupled to the lower portion 265 of the expandable tubular member 240. The flexible coupling element 255 is preferably adapted to radially expanded by the anchoring device 235 into engagement within the walls of the open hole wellbore section 205. In this manner, the lower portion 265 of the expandable tubular member 240 is coupled to the walls of the open hole wellbore section 205. In an exemplary embodiment, the flexible coupling element 255 is a slotted tubular member. In an exemplary embodiment, the flexible coupling element 255 includes one or more hook elements for engaging the walls of the open hole wellbore section 205.

As illustrated in FIG. 2a, the apparatus 215 is preferably positioned with the expandable tubular member 240 positioned in overlapping relation with a portion of the wellbore casing 200. In this manner, the radially expanded tubular member 240 is coupled to the lower portion of the wellbore casing 200. In an exemplary embodiment, the upper sealing members 245 are positioned in opposing relation to the lower portion of the wellbore casing 200 and the lower sealing members 250 are positioned in opposing relation to the walls of the open hole wellbore section 205. In this manner, the interface between the radially expanded tubular member 240 and the wellbore casing 200 and open hole wellbore section 205 is optimally fluidicly sealed.

Figure 2B:
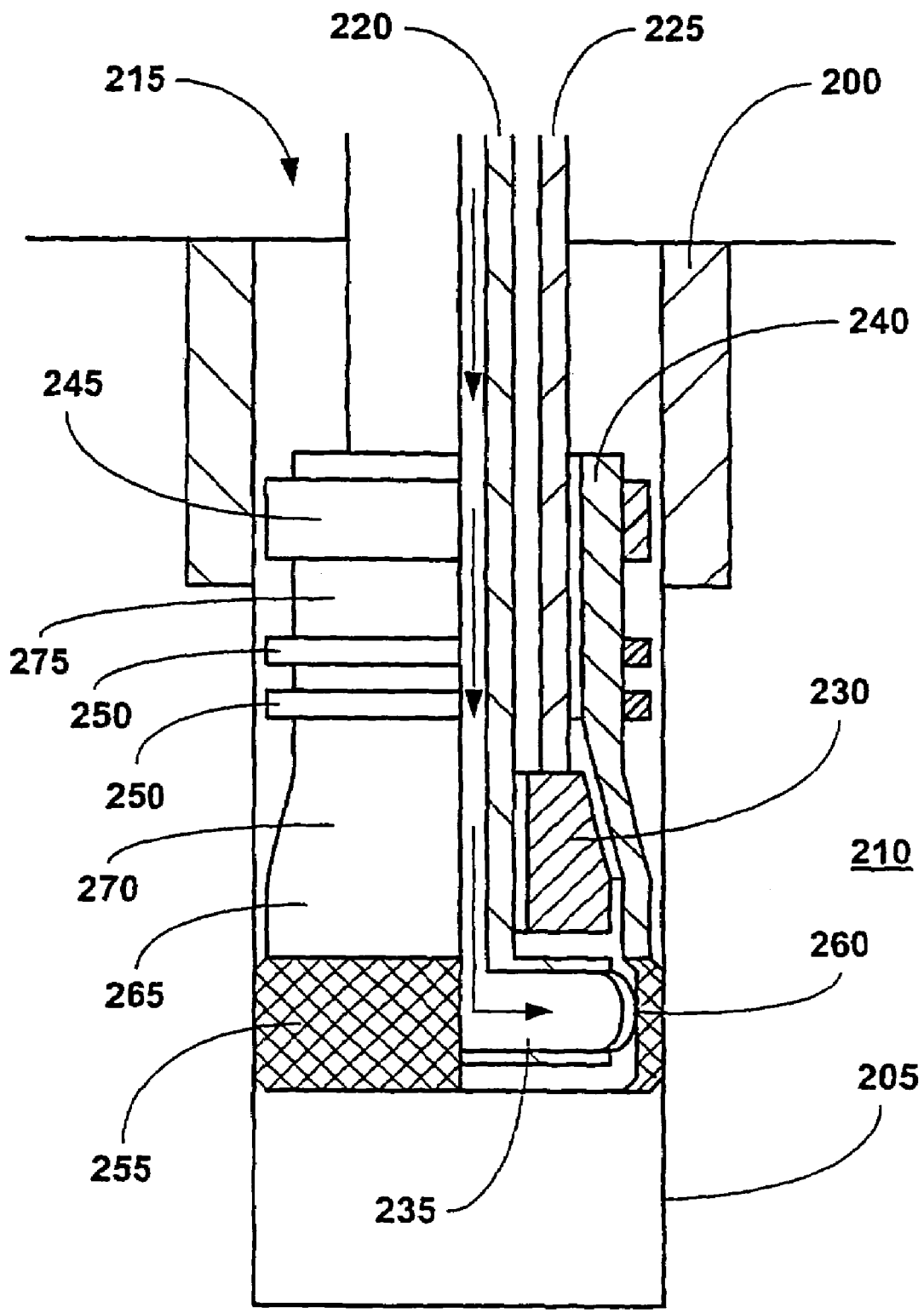
FIG. 2b is a fragmentary cross-sectional illustration of the apparatus of FIG. 2a after anchoring the expandable tubular member of the apparatus to the open hole.

As illustrated in FIG. 2b, the apparatus 215 is then anchored to the open hole wellbore section 205 using the anchoring device 235. In an exemplary embodiment, the anchoring device 235 is pressurized and the expandable element 260 is radially extended from the anchoring device 235 causing the flexible coupling element 255 to radially expand into intimate contact with the walls of the open hole wellbore section 205. In this manner, the lower section 265 of the expandable tubular member 240 is removably coupled to the walls of the open hole wellbore section 205.

In an alternative embodiment, a compressible cement and/or epoxy is then injected into the annular space between the unexpanded portion of the tubular member 240 and the wellbore casing 100 and/or the open hole wellbore section 205. The compressible cement and/or epoxy is then permitted to at least partially cure prior to the initiation of the radial expansion process. In this manner, an annular structural support and fluidic seal is provided around the tubular member 240.

Figure 2C:
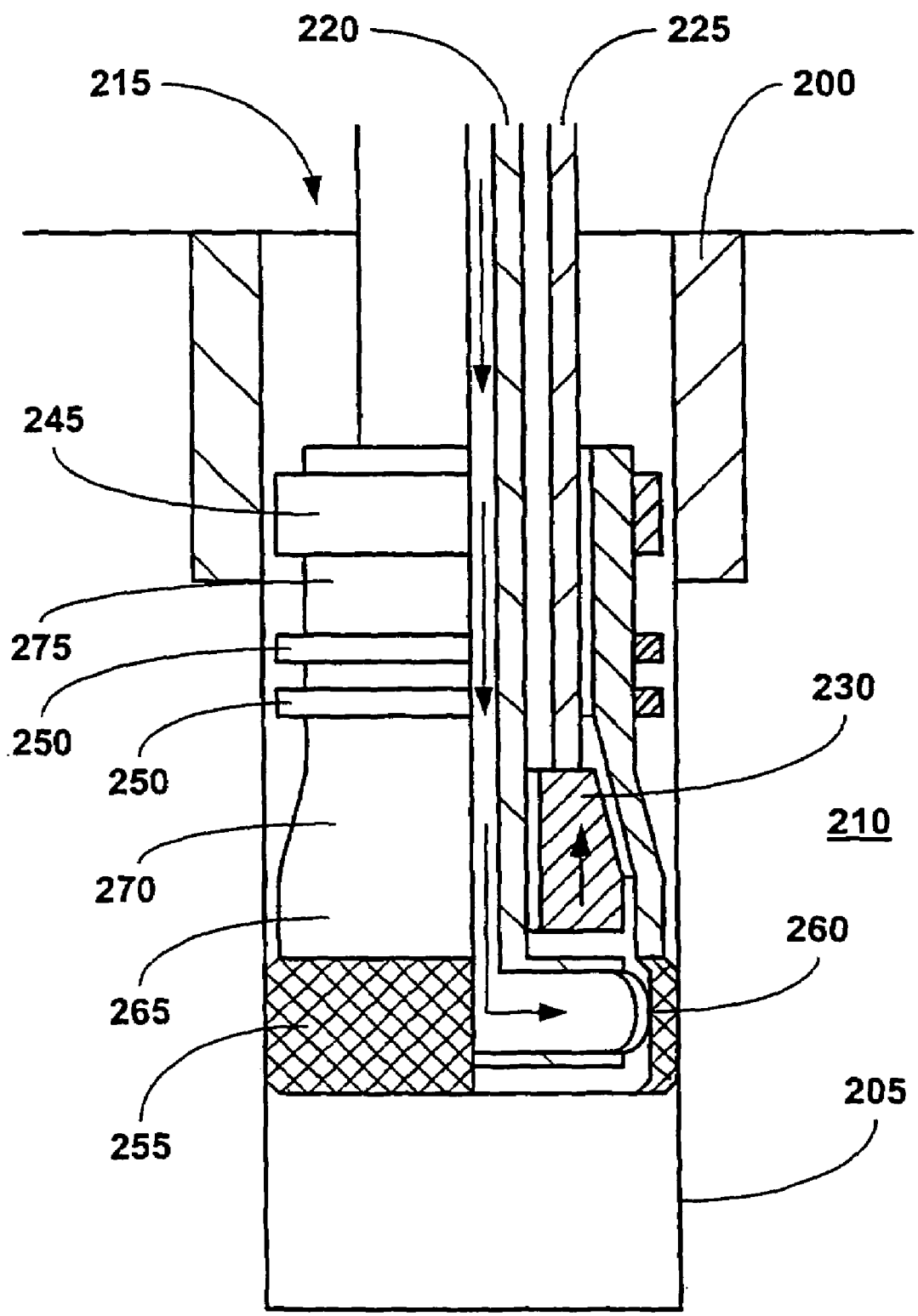
FIG. 2c is a fragmentary cross-sectional illustration of the apparatus of FIG. 2b after initiating the axial displacement of the expansion cone.

As illustrated in FIG. 2c, the expansion cone 230 is then axially displaced by applying an axial force to the second support member 225. In an exemplary embodiment, the axial displacement of the expansion cone 230 radially expands the expandable tubular member 240 into intimate contact with the walls of the open hole wellbore section 205.

Figure 2D:
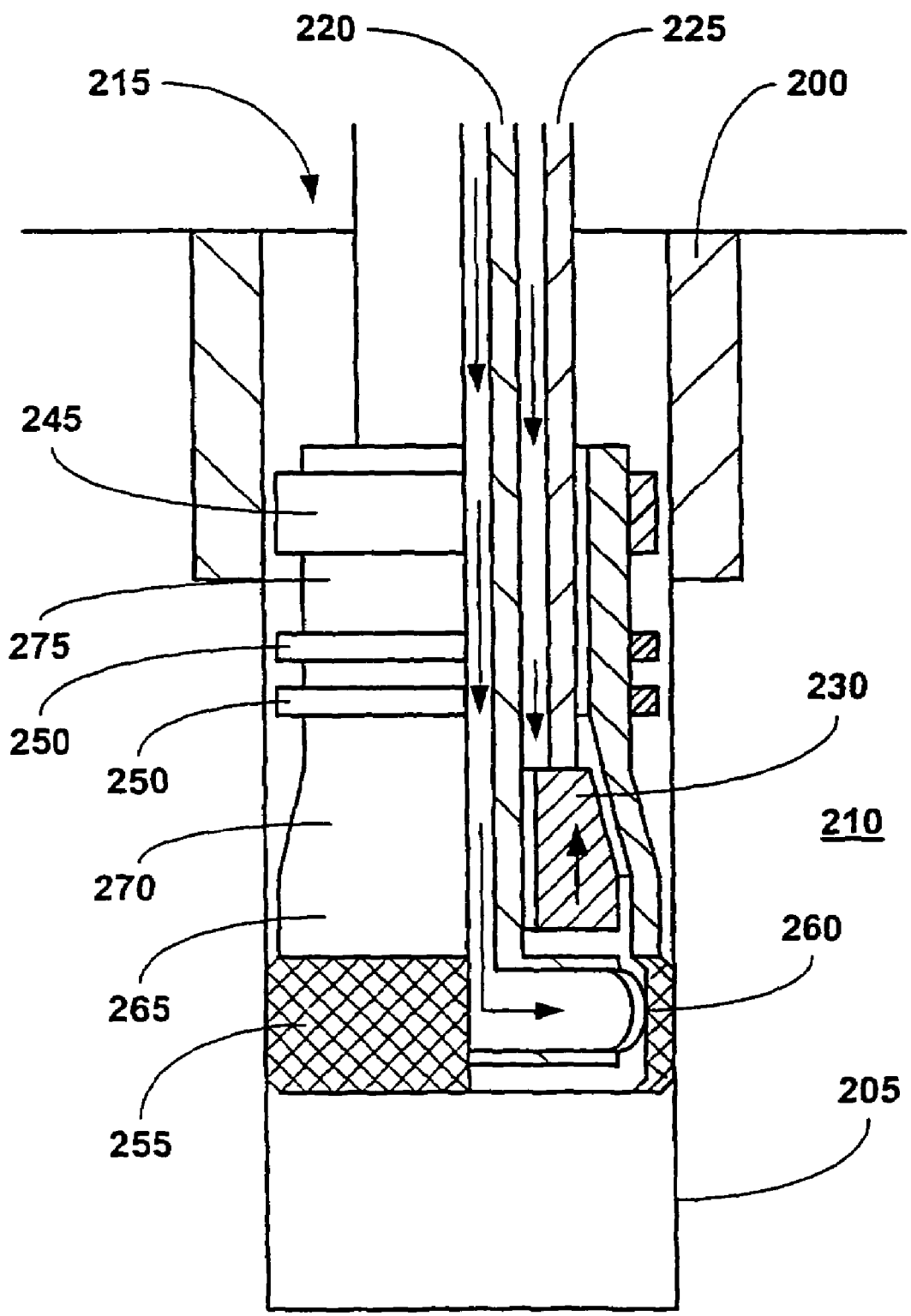
FIG. 2d is a fragmentary cross-sectional illustration of the apparatus of FIG. 2b after initiating the axial displacement of the expansion cone by pulling on the expansion cone and also by injecting a pressurized fluid below the expansion cone.

In an alternative embodiment, as illustrated in FIG. 2d, the axial displacement of the expansion cone 230 is enhanced by injecting a pressurized fluidic material into the annular space between the first support member 220 and the second support member 225. In this manner, an upward axial force is applied to the lower annular face of the expansion cone 230 using the pressurized fluidic material. In this manner, a temporary need for increased axial force during the radial expansion process can be easily satisfied.

Figure 2E:
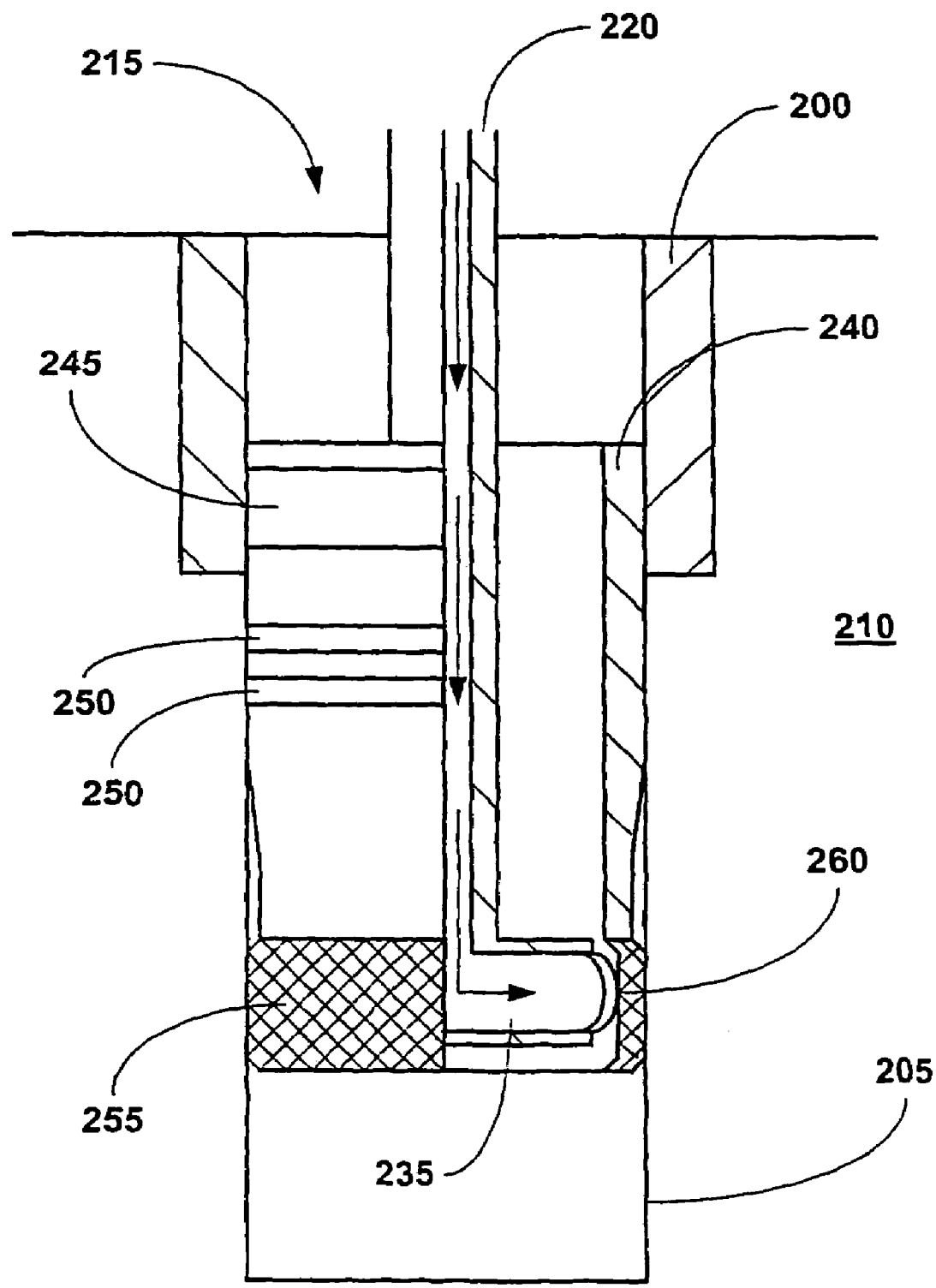
FIG. 2e is a fragmentary cross-sectional illustration of the apparatus of FIGS. 2c and 2d after the completion of the radial expansion of the expandable tubular member.
Figure 2F:
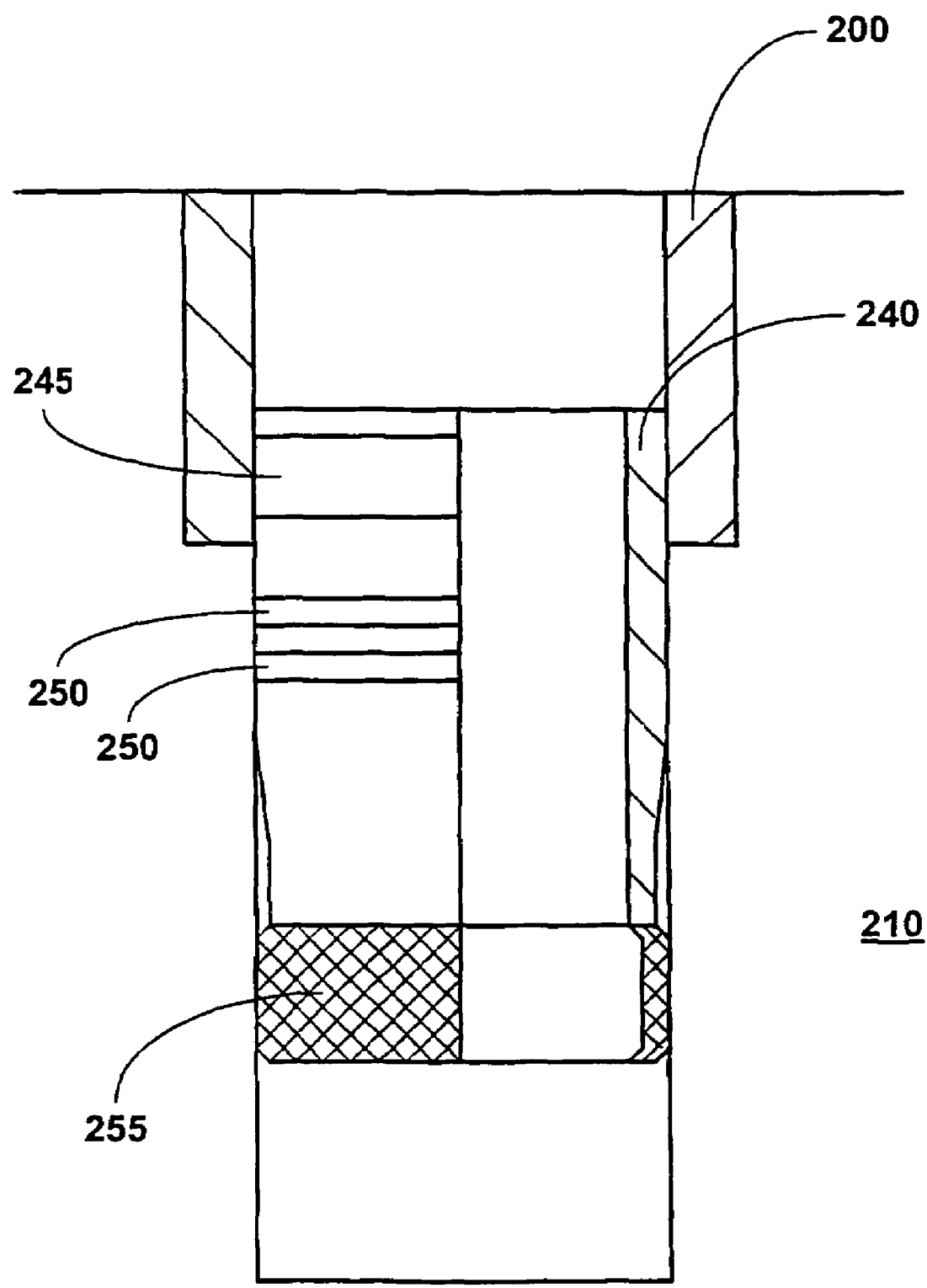
FIG. 2f is a fragmentary cross-sectional illustration of the apparatus of FIG. 2e after the decoupling of the anchoring device of the apparatus from the open hole.

As illustrated in FIGS. 2e and 2f, after the expandable tubular member 240 has been radially expanded by the axial displacement of the expansion cone 230, the first support member 220 and the anchoring device 235 are preferably removed from expandable tubular member 240 by de-pressurizing the anchoring device 235 and then lifting the first support member 220 and anchoring device 235 from the wellbore casing 200 and the open hole wellbore section 205.

Figure 3A:
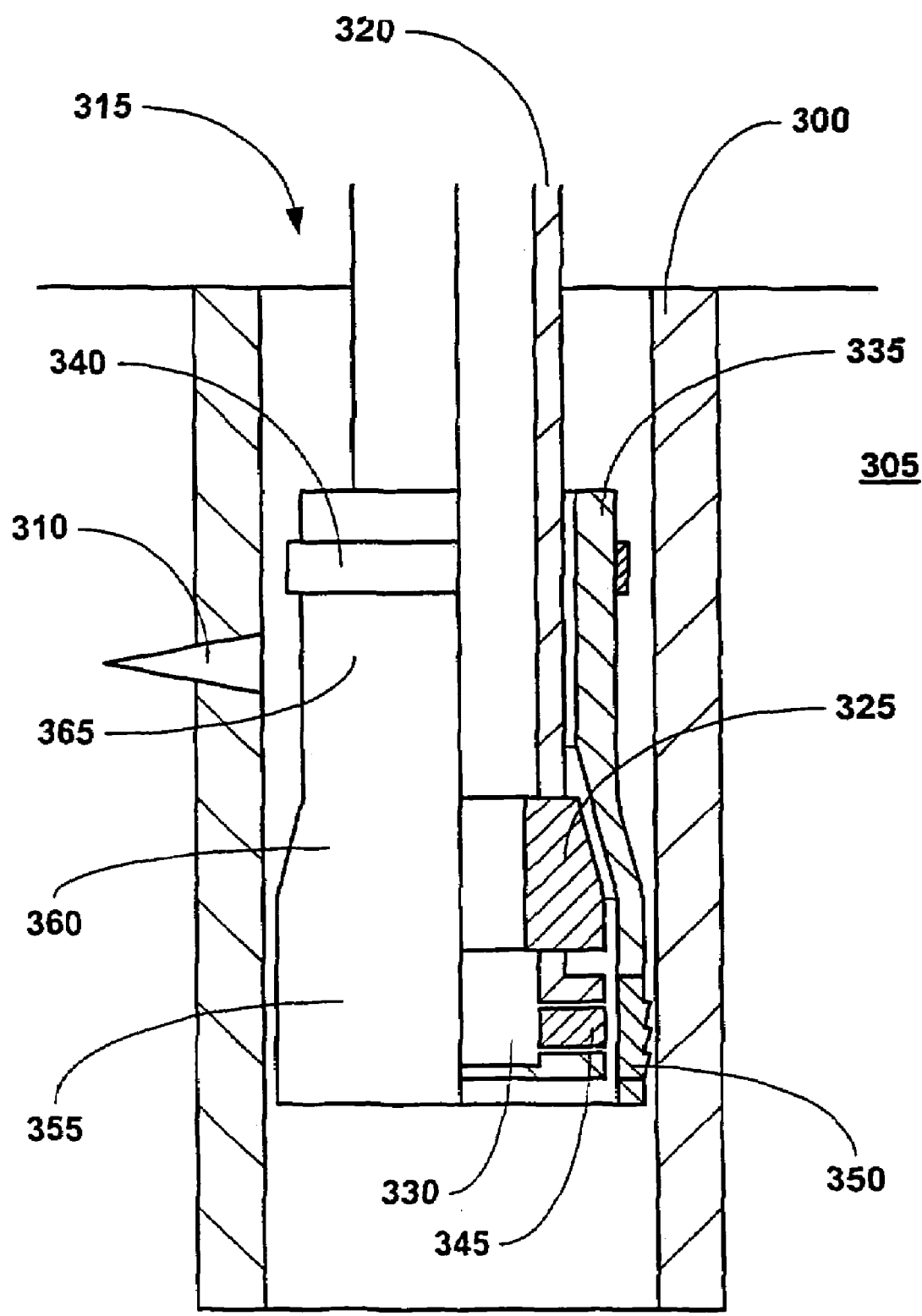
FIG. 3a is a fragmentary cross-sectional illustration of the placement of an embodiment of an apparatus for expanding a tubular member within a wellbore casing.

Referring to FIGS. 3a, 3b, 3c, and 3d, an alternative embodiment of a method and apparatus for coupling an expandable tubular member to a preexisting structure will be described. Referring to FIG. 3a, a wellbore casing 300 is positioned within a subterranean formation 305. The wellbore casing 300 may be positioned in any orientation from the vertical direction to the horizontal direction. The wellbore casing 300 further includes one or more openings 310 that may have been the result of unintentional damage to the wellbore casing 300, or due to a prior perforation or fracturing operation performed upon the surrounding subterranean formation 305. As will be recognized by persons having ordinary skill in the art, the openings 310 can adversely affect the subsequent operation and use of the wellbore casing 300 unless they are sealed off.

In an exemplary embodiment, an apparatus 315 is utilized to seal off the openings 310 in the wellbore casing 300. More generally, the apparatus 315 is preferably utilized to form or repair wellbore casings, pipelines, or structural supports.

The apparatus 315 preferably includes a support member 320, an expansion cone 325, an anchoring device 330, an expandable tubular member 335, and one or more sealing members 340.

The support member 320 is preferably adapted to be coupled to a surface location. The support member 320 is further coupled to the expansion cone 325 and the anchoring device 330. The support member 320 is preferably adapted to convey pressurized fluidic materials and/or electrical current and/or communication signals from a surface location to the anchoring device 330. The support member 320 may, for example, be conventional commercially available slick wire, braided wire, coiled tubing, or drilling stock material.

The expansion cone 325 is coupled to the support member 320. The expansion cone 325 is preferably adapted to radially expand the expandable tubular member 335 when the expansion cone 325 is axially displaced relative to the expandable tubular member 335. In an exemplary embodiment, the expansion cone 325 is provided substantially as disclosed in one or more of the following: (1) U.S. utility patent application Ser. No. 09/454,139, filed on Dec. 3, 1999, which claimed the benefit of the filing date of U.S. provisional patent application No. 60/111,293, filed on Dec. 7, 1998; (2) U.S. utility patent application Ser. No. 09/510,913, filed on Feb. 23, 2000, which claimed the benefit of the filing date of U.S. provisional application No. 60/121,702, filed on Feb. 25, 1999; (3) U.S. utility patent application Ser. No. 09/502,350, filed on Feb. 10, 2000, which claimed the benefit of the filing date of U.S. provisional application No. 60/119,611, (4) U.S. utility patent application Ser. No. 09/440,338, filed on Nov. 15, 1999, which claimed the benefit of the filing date of U.S. provisional application No. 60/108,558, filed on Nov. 16, 1998; (5) U.S. provisional patent application No. 60/183,546, filed on Feb. 18, 2000; (6) U.S. utility patent application Ser. No. 09/523,460, filed on Mar. 10, 2000, which claimed the benefit of the filing date of U.S. provisional application No. 60/124,042, filed on Mar. 11, 1999; (7) U.S. utility patent application Ser. No. 09/512,895, filed on Feb. 24, 2000, which claimed the benefit of the filing dates of U.S. provisional application No. 60/121,841, filed on Feb. 26, 1999 and U.S. provisional application No. 60/154,047, filed on Sep. 16, 1999; (8) U.S. utility application Ser. No. 09/511,941, filed on Feb. 24, 2000, which claimed the benefit of the filing date of U.S. provisional Ser. No. 60/121,907, filed on Feb. 26, 1999; (9) U.S. utility patent application Ser. No. 09/588,946, filed on Jun. 7, 2000, which claimed the benefit of the filing date of U.S. provisional patent application Ser. No. 60/137,998, filed on Jun. 7, 1999; (10) U.S. utility patent application Ser. No. 09/559,122, filed on Apr. 26, 2000, which claimed the benefit of the filing date of U.S. provisional application No. 60/131,106, filed on Apr. 26, 1999; (11) U.S. provisional application No. 60/146,203, filed on Jun. 29, 1999; (12) U.S. provisional application No. 60/143,039, filed on Jun. 9, 1999; (13) U.S. provisional patent application Ser. No. 60/162,671, filed on Nov. 1, 1999; (14) U.S. provisional application No. 60/159,039, filed on Oct. 12, 1999; (15) U.S. provisional patent application No. 60/159,033, filed on Oct. 12, 1999; and (16) U.S. provisional patent application No. 60/165,228, filed on Nov. 12, 1999, the disclosures of which are incorporated herein by reference.

The anchoring device 330 is coupled to the support member 320 and the expansion cone 325. The anchoring device 335 is preferably adapted to controllably coupled to the expandable tubular member 335 to the wellbore casing 300. In this manner, the anchoring device 330 preferably controllably anchors the expandable tubular member 335 to the wellbore casing 300 to facilitate the radial expansion of the expandable tubular member 335 by the axial displacement of the expansion cone 325. In an exemplary embodiment, the anchoring device 330 includes one or more expandable elements 345 that are adapted to controllably extend from the body of the anchoring device 330 to radially displace corresponding engagement elements 350 provided in the expandable tubular member 335. In an exemplary embodiment, the radial displacement of the engagement elements 350 couples the expandable tubular member 335 to the wellbore casing 300. In an exemplary embodiment, the expandable elements 345 are pistons that are actuated using fluidic pressure. In an exemplary embodiment, the anchoring device 330 is any one of the hydraulically actuated anchoring devices commercially available from Halliburton Energy Services or Baker-Hughes.

In an alternative embodiment, the expandable elements 345 are explosive devices that controllably generate a radially directed explosive force for radially displacing the engagement elements 350. In an exemplary embodiment, the explosive expandable elements 345 are shaped explosive charges commercially available from Halliburton Energy Services.

The expandable tubular member 335 is removably coupled to the expansion cone 325. In an exemplary embodiment, the expandable tubular member 335 includes one or more engagement devices 350 that are adapted to be radially displaced by the anchoring device 330 into engagement with the walls of the wellbore casing 300. In this manner, the expandable tubular member 335 is coupled to the wellbore casing 300. In an exemplary embodiment, the engagement devices 350 include teeth for biting into the surface of the wellbore casing 100.

In an exemplary embodiment, the expandable tubular member 335 further includes a lower section 355, an intermediate section 360, and an upper section 365. In an exemplary embodiment, the lower section 355 includes the engagement device 350 in order to provide anchoring at an end portion of the expandable tubular member 335. In an exemplary embodiment, the wall thickness of the lower and intermediate sections, 355 and 360, are less than the wall thickness of the upper section 365 in order to optimally couple the radially expanded portion of the expandable tubular member 335 to the wellbore casing 300.

In an exemplary embodiment, the expandable tubular member 335 is further provided substantially as disclosed in one or more of the following: (1) U.S. utility patent application Ser. No. 09/454,139, filed on Dec. 3, 1999, which claimed the benefit of the filing date of U.S. provisional patent application No. 60/111,293, filed on Dec. 7, 1998; (2) U.S. utility patent application Ser. No. 09/510,913, filed on Feb. 23, 2000, which claimed the benefit of the filing date of U.S. provisional application No. 60/121,702, filed on Feb. 25, 1999; (3) U.S. utility patent application Ser. No. 09/502, 350, filed on Feb. 10, 2000, which claimed the benefit of the filing date of U.S. provisional application No. 60/119,611, (4) U.S. utility patent application Ser. No. 09/440,338, filed on Nov. 15, 1999, which claimed the benefit of the filing date of U.S. provisional application No. 60/108,558, filed on Nov. 16, 1998; (5) U.S. provisional patent application No. 60/183,546, filed on Feb. 18, 2000; (6) U.S. utility patent application Ser. No. 09/523,460, filed on Mar. 10, 2000, which claimed the benefit of the filing date of U.S. provisional application No. 60/124,042, filed on Mar. 11, 1999; (7) U.S. utility patent application Ser. No. 09/512,895, filed on Feb. 24, 2000, which claimed the benefit of the filing dates of U.S. provisional application No. 60/121,841, filed on Feb. 26, 1999 and U.S. provisional application No. 60/154,047, filed on Sep. 16, 1999; (8) U.S. utility application Ser. No. 09/511,941, filed on Feb. 24, 2000, which claimed the benefit of the filing date of U.S. provisional Ser. No. 60/121,907, filed on Feb. 26, 1999; (9) U.S. utility patent application Ser. No. 09/588,946, filed on Jun. 7, 2000, which claimed the benefit of the filing date of U.S. provisional patent application Ser. No. 60/137,998, filed on Jun. 7, 1999; (10) U.S. utility patent application Ser. No. 09/559, 122, filed on Apr. 26, 2000, which claimed the benefit of the filing date of U.S. provisional application No. 60/131,106, filed on Apr. 26, 1999; (11) U.S. provisional application No. 60/146,203, filed on Jul. 29, 1999; (12) U.S. provisional application No. 60/143,039, filed on Jul. 9, 1999; (13) U.S. provisional patent application Ser. No. 60/162,671, filed on Nov. 1, 1999; (14) U.S. provisional application No. 60/159, 039, filed on Oct. 12, 1999; (15) U.S. provisional patent application Ser. No. 60/159,033, filed on Oct. 12, 1999; and (16) U.S. provisional patent application No. 60/165,228, filed on Nov. 12, 1999, the disclosures of which are incorporated herein by reference.

The sealing members 340 are coupled to the outer surface of the upper portion 365 of the expandable tubular member 335. The sealing members 340 are preferably adapted to engage and fluidicly seal the interface between the radially expanded expandable tubular member 335 and the wellbore casing 300. In an exemplary embodiment, the apparatus 315 includes a plurality of sealing members 340. In an exemplary embodiment, the sealing members 340 surround and isolate the opening 310.

As illustrated in FIG. 3a, the apparatus 315 is preferably positioned within the wellbore casing 300 with the expandable tubular member 335 positioned in opposing relation to the opening 310. In an exemplary embodiment, the apparatus 315 includes a plurality of sealing members 340 that are positioned above and below the opening 310. In this manner, the radial expansion of the expandable tubular member 335 optimally fluidicly isolates the opening 310.

Figure 3B:
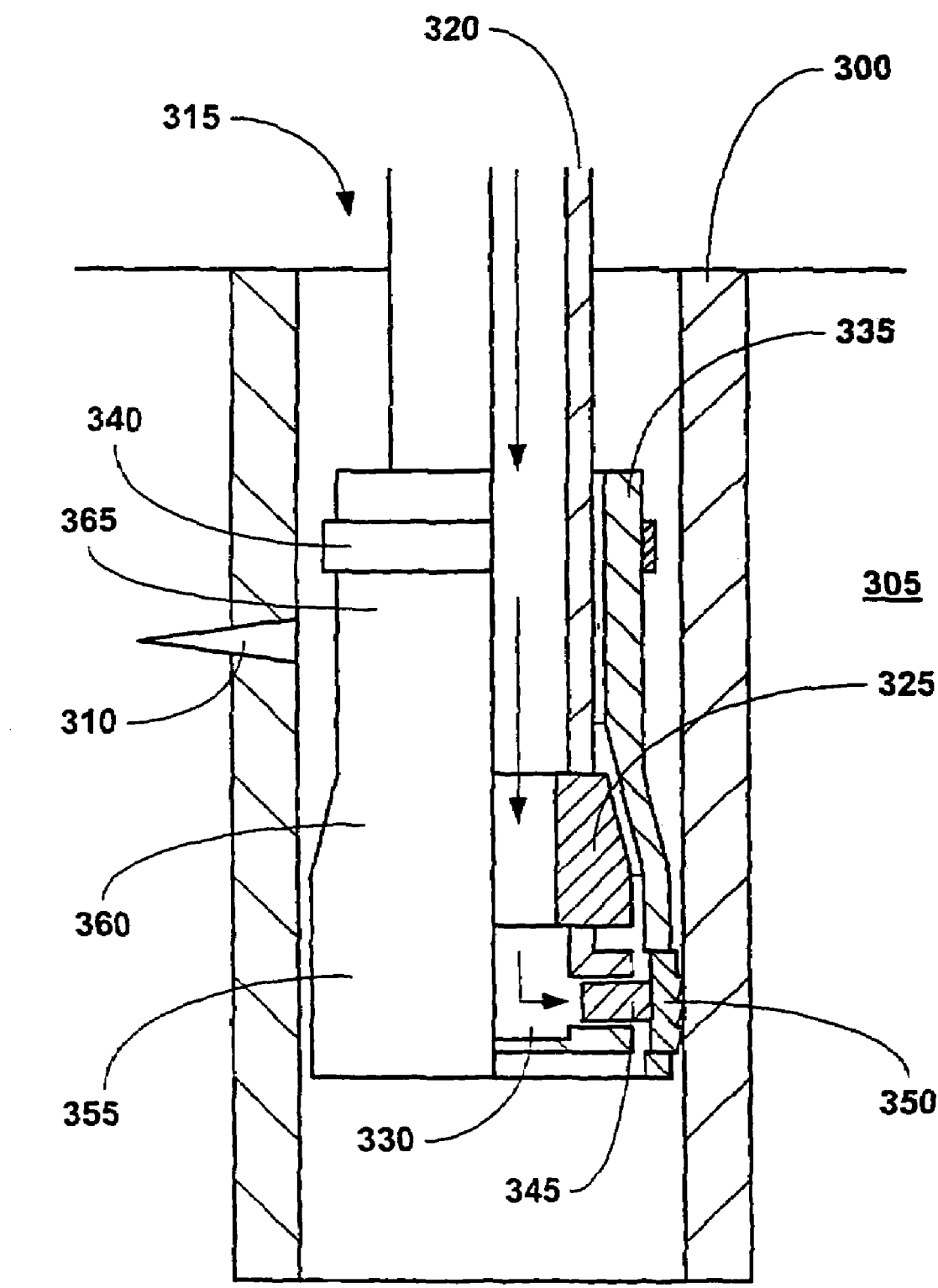
FIG. 3b is a fragmentary cross-sectional illustration of the apparatus of FIG. 3a after anchoring the expandable tubular member of the apparatus to the wellbore casing.

As illustrated in FIG. 3b, the expandable tubular member 335 of the apparatus 315 is then anchored to the wellbore casing 300 using the anchoring device 330. In an exemplary embodiment, the anchoring device 330 is pressurized and the expandable element 345 is extended from the anchoring device 330 and radially displaces the corresponding engagement elements 350 of the expandable tubular member 335 into intimate contact with the wellbore casing 300. In this manner, the lower section 355 of the expandable tubular member 335 is coupled to the wellbore casing 300.

In an alternative embodiment, a compressible cement and/or epoxy is then injected into the annular space between the unexpanded portion of the tubular member 335 and the wellbore casing 300. The compressible cement and/or epoxy is then permitted to at least partially cure prior to the initiation of the radial expansion process. In this manner, an annular structural support and fluidic seal is provided around the tubular member 335.

Figure 3C:
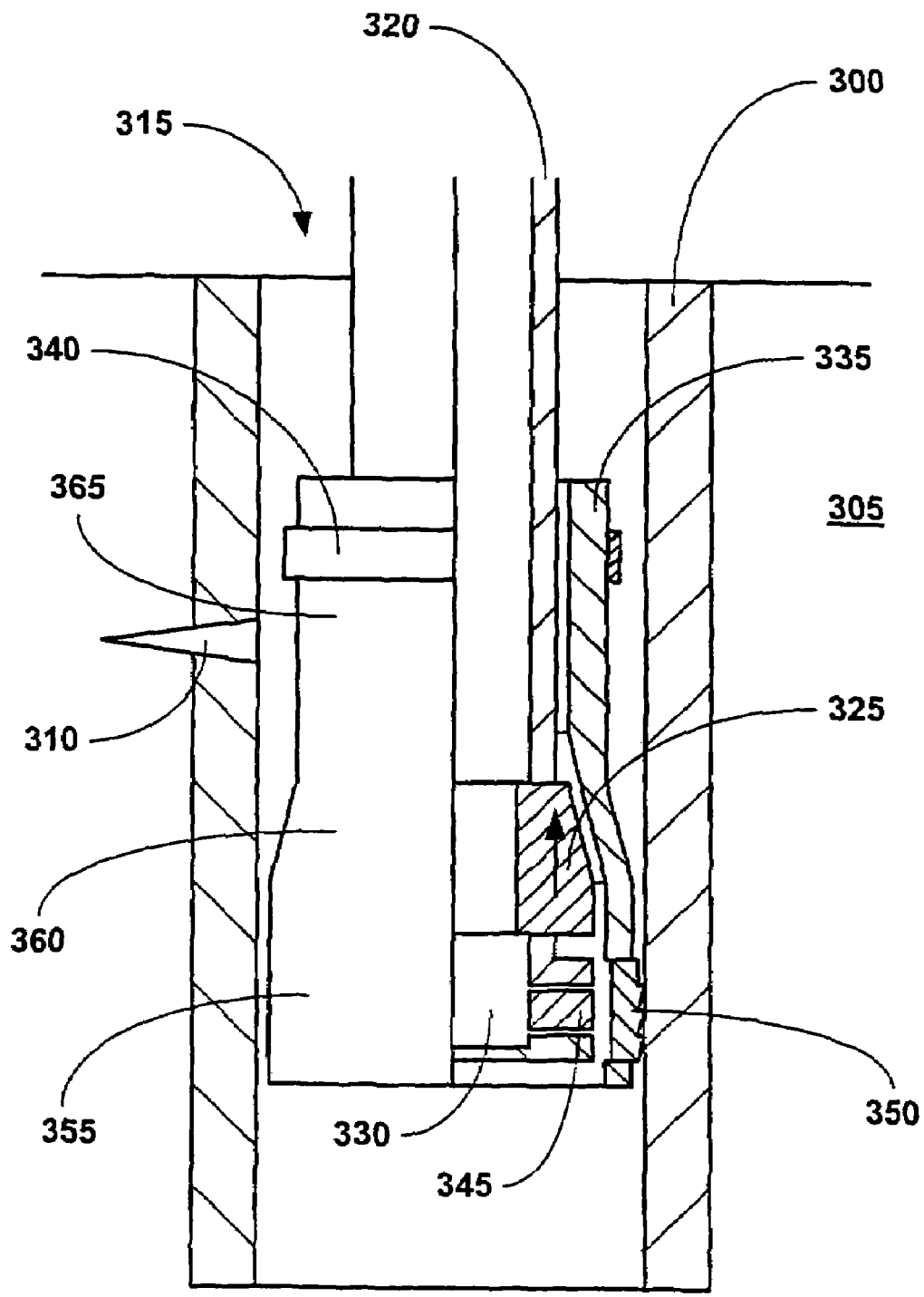
FIG. 3c is a fragmentary cross-sectional illustration of the apparatus of FIG. 3b after initiating the axial displacement of the expansion cone.

As illustrated in FIG. 3c, the anchoring device 330 is then deactivated and the expansion cone 325 is axially displaced by applying an axial force to the support member 320. In an exemplary embodiment, the deactivation of the anchoring device 330 causes the expandable elements 345 to radially retract into the anchoring device 330. Alternatively, the expandable elements 345 are resiliently coupled to the anchoring device 330. In this manner, the expandable elements 345 retract automatically upon the deactivation of the anchoring device 330. In an exemplary embodiment, the axial displacement of the expansion cone 325 radially expands the expandable tubular member 335 into intimate contact with the walls of the wellbore casing 300.

Figure 3D:
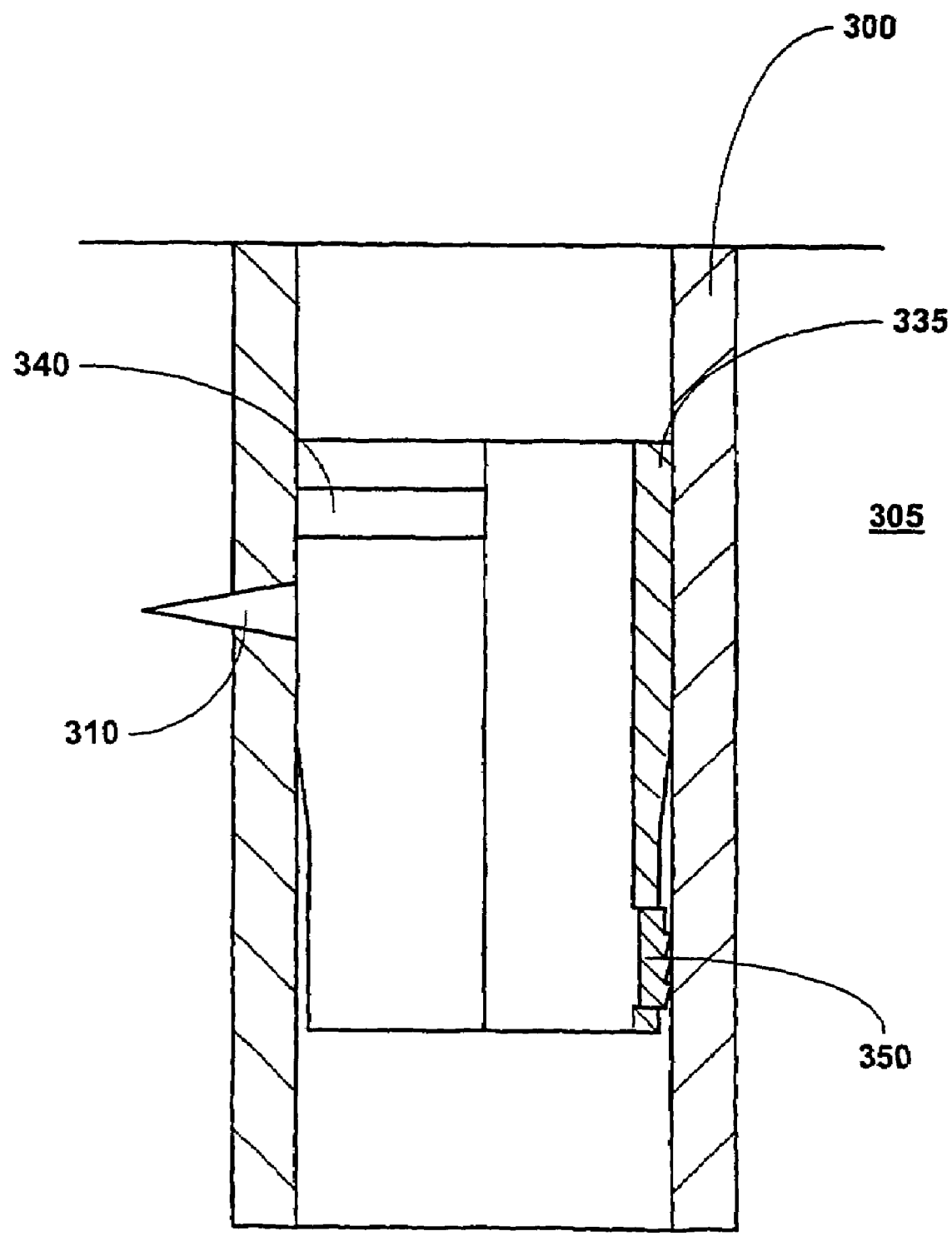
FIG. 3d is a fragmentary cross-sectional illustration of the apparatus of FIG. 3c after completing the radial expansion of the expandable tubular member.

As illustrated in FIG. 3d, after the expandable tubular member 335 has been radially expanded by the axial displacement of the expansion cone 335, the support member 320, expansion cone 325, and the anchoring device 330 are preferably removed from the expanded expandable tubular member 335.

In an exemplary embodiment, the opening 310 in the wellbore casing 300 is sealed off by the radially expanded tubular member 335. In this manner, repairs to the wellbore casing 300 are optimally provided. More generally, the apparatus 315 is used to repair or form wellbore casings, pipelines, and structural supports.

Figure 4:
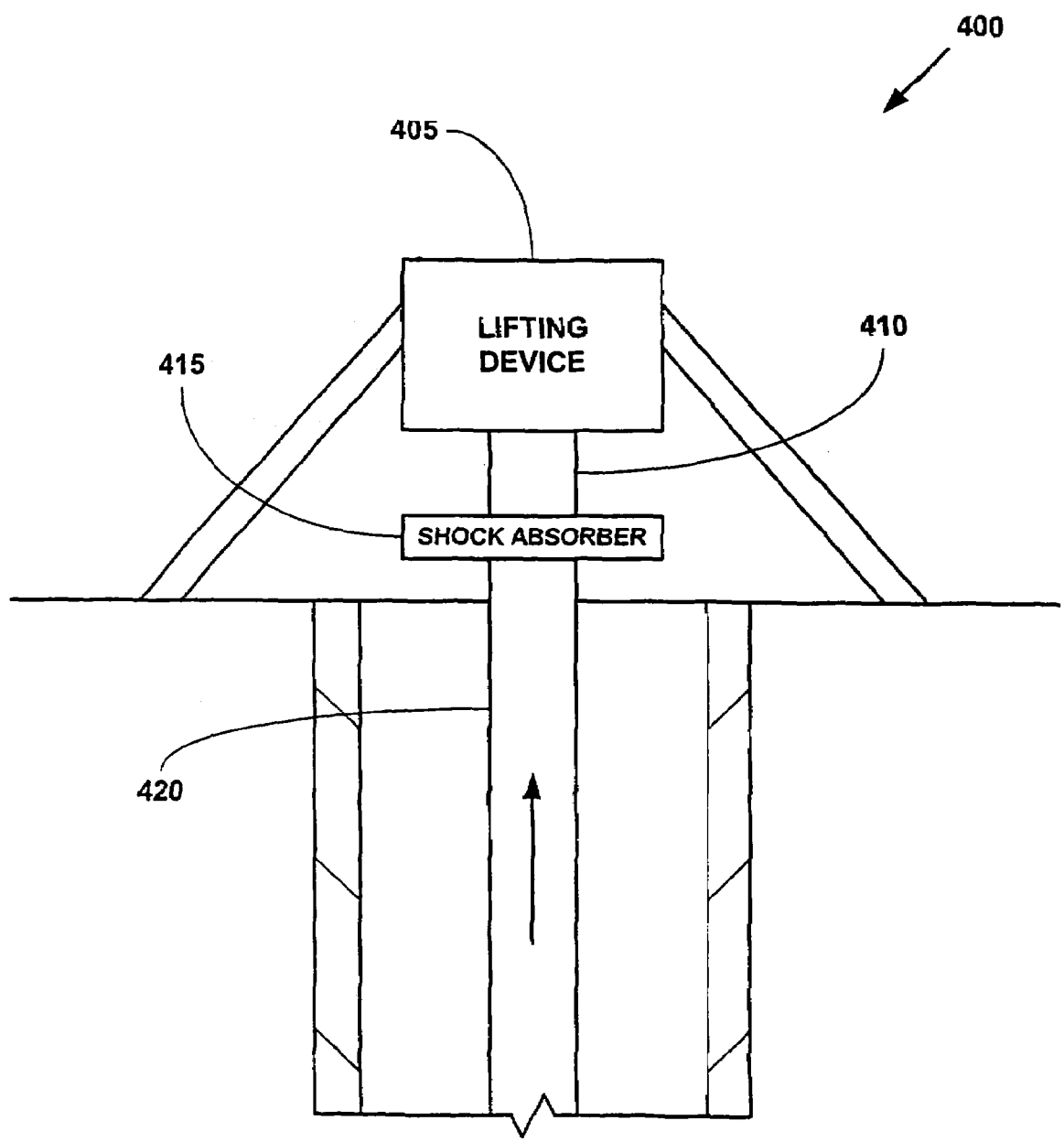
FIG. 4 is a fragmentary cross-sectional illustration of an embodiment of a shock absorbing system for use in the apparatus of FIGS. 1a to 3d.

Referring to FIG. 4, an embodiment of a system 400 for applying an axial force to the expansion cones 130, 230, and 325 includes a lifting device 405, a first support member 410, a shock absorber 415, and a second support member 420. In an exemplary embodiment, the system 400 is adapted to minimize the transfer of shock loads, created during the completion of the radial expansion of tubular members by the expansion cones 130, 230, and 325, to the lifting device 405. In this manner, the radial expansion of tubular members by the expansion cones 130, 230 and 325 is provided in an optimally safe manner.

The lifting device 405 is supported at a surface location and is coupled to the first support member 410. The lifting device 405 may comprise any number of conventional commercially available lifting devices suitable for manipulating tubular members within a wellbore.

The first support member 410 is coupled to the lifting device 405 and the shock absorber 415. The first support member 410 may comprise any number of conventional commercially available support members such as, for example, coiled tubing, a drill string, a wireline, braided wire, or a slick line.

The shock absorber 415 is coupled to the first support member 410 and the second support member 420. The shock absorber 415 is preferably adapted to absorb shock loads transmitted from the second support member 420. The shock absorber 415 may be any number of conventional commercially available shock absorbers.

The second support member 420 is coupled to the shock absorber 415. The second support member 420 is further preferably adapted to be coupled to one or more of the expansion cones 130, 230 and 325.

In an exemplary embodiment, during operation of the system 400, the lifting device applies an axial force to one of the expansion cones 130, 230 and 325 in order to radially expand tubular members. In an exemplary embodiment, upon the completion of the radial expansion process, when the expansion cones 130, 230 and 325, exit the radially expanded tubular members, the sudden shock loads generated are absorbed, or at least minimized, by the shock absorber 415. In this manner, the radial expansion of tubular members by pulling the expansion cones 130, 230 and 325 using the lifting device 405 is provided in an optimally safe manner.

Figure 5:
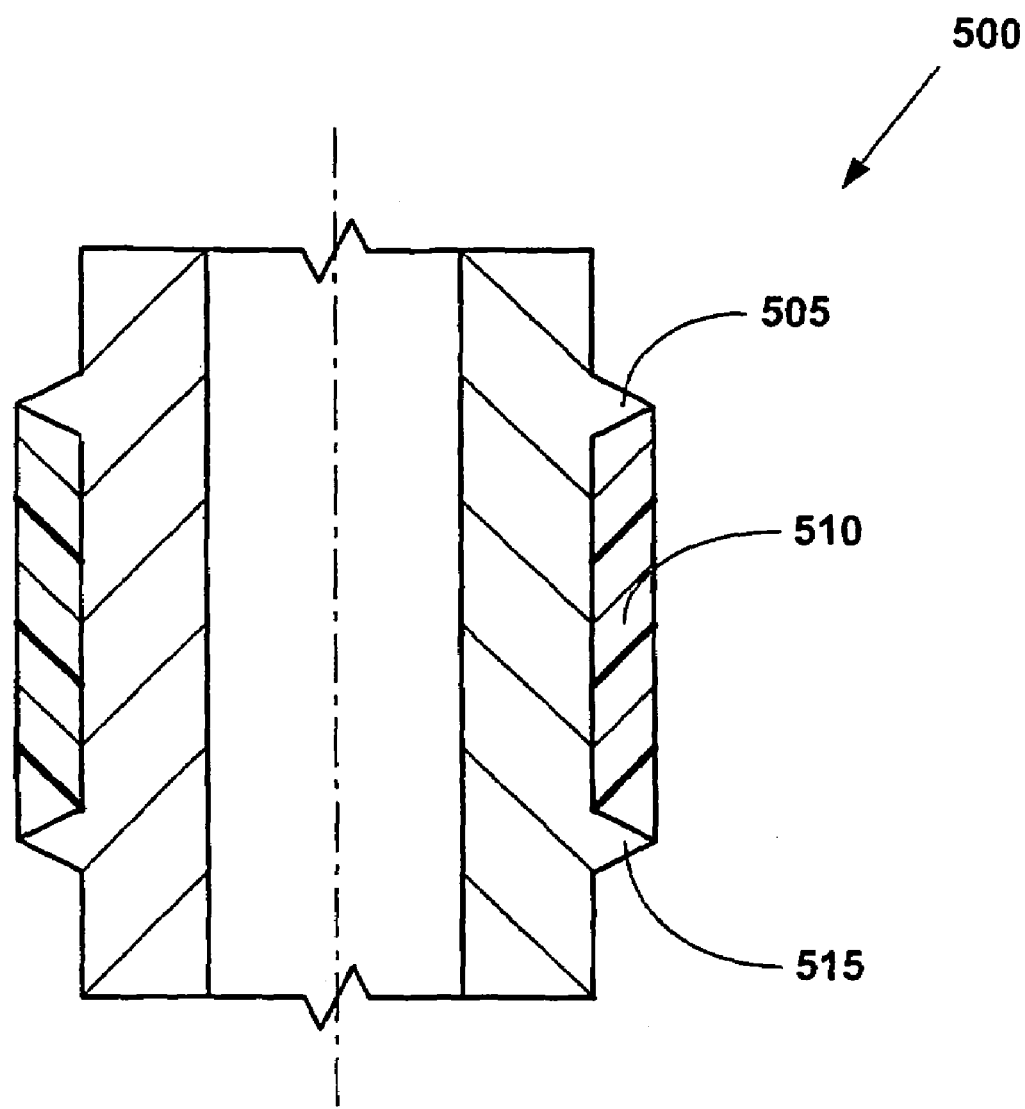
FIG. 5 is a cross-sectional illustration of an embodiment of a coupling arrangement for use in the expandable tubular members of the apparatus of FIGS. 1a to 3d.

Referring to FIG. 5, an embodiment of a coupling system 500 for use in the expandable tubular members 140, 240, and 335 will now be described. In an exemplary embodiment, the system 500 includes an upper ring 505, a sealing element 510, and a lower ring 515. In an exemplary embodiment, the upper ring 505, the sealing element 510, and the lower ring 515 are provided on the outer surfaces of the expandable tubular members 140, 240, and 335. In this manner, when the expandable tubular members 140, 240 and 335 are radially expanded, the upper ring 505, the sealing element 510, and the lower ring 515 engage the interior surface of the preexisting structure that the expandable tubular members 140, 240 and 335 are coupled to. In an exemplary embodiment, the upper and lower rings, 505 and 515, penetrate the interior surface of the preexisting structure that the expandable tubular members 140, 240 and 335 are coupled to in order to optimally anchor the tubular members 140, 240 and 335 to the preexisting structure. In an exemplary embodiment, the sealing element 510 is compressed into contact with the interior surface of the preexisting structure that the expandable tubular members 140, 240 and 335 are coupled to in order to optimally fluidicly seal the interface between the tubular members 140, 240 and 335 and the preexisting structure.

In an exemplary embodiment, the upper and lower rings, 505 and 515, extend from the outer surfaces of the tubular members 140, 240 and 335 by a distance of about 1/64 to 2 inches. In an exemplary embodiment, the upper and lower rings, 505 and 515, extend about 1/8" from the outer surfaces of the tubular members 140, 240, and 335 in order to optimally engage the preexisting structure.

In an exemplary embodiment, the sealing element 510 extends from the outer surfaces of the tubular members 140, 240 and 335 by a distance substantially equal to the extension of the upper and lower rings, 505 and 515, above the outer surfaces of the tubular members 140, 240 and 335. In an exemplary embodiment, the sealing element 510 is fabricated from rubber in order to optimally fluidicly seal and engage the preexisting structure.

In an exemplary embodiment, the tubular members 140, 240 and 335 include a plurality of the coupling systems 500. In an exemplary embodiment, the coupling systems 500 are provided on the lower, intermediate, and upper portions of the tubular members 140, 240, and 335.

Figure 6:
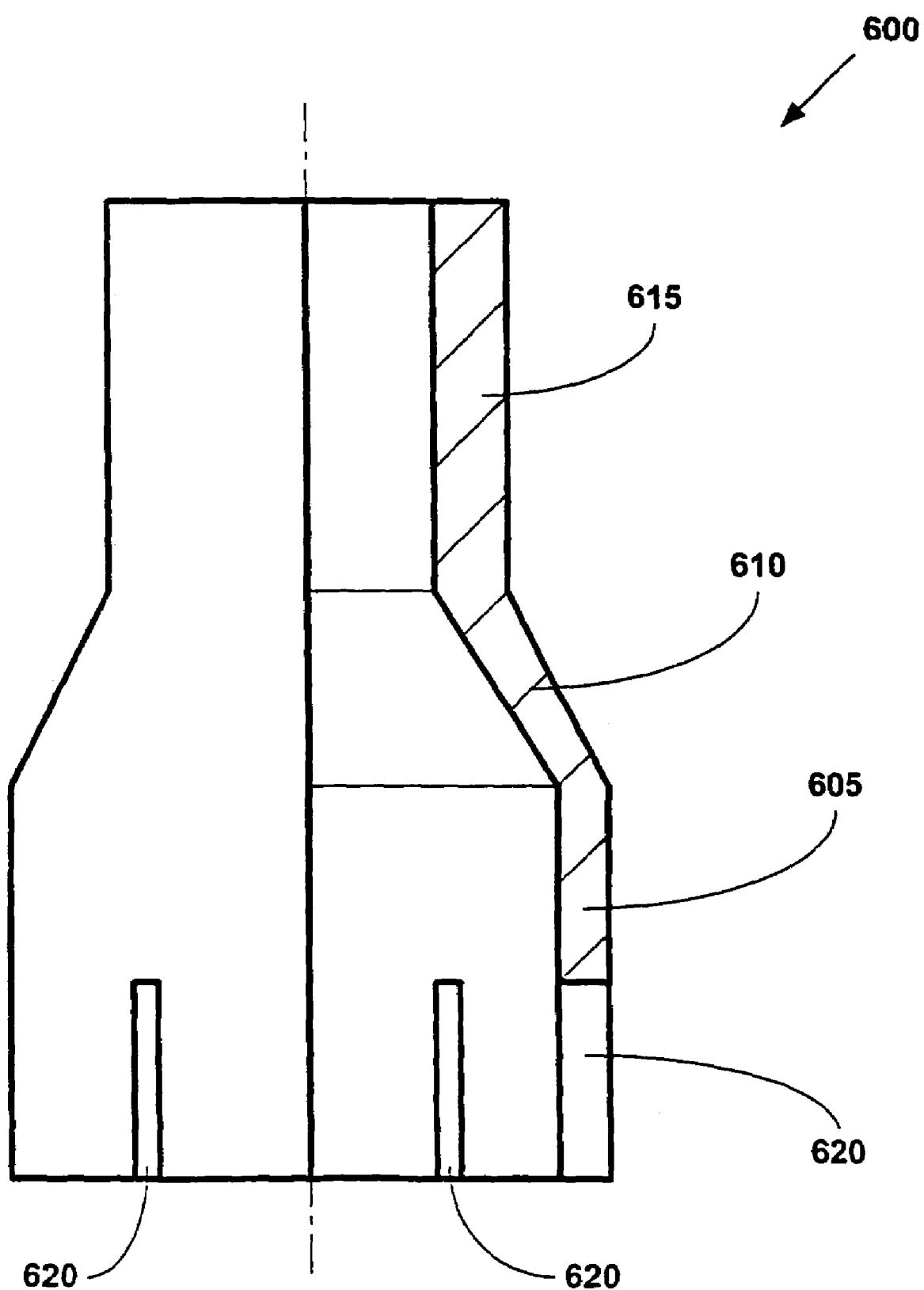
FIG. 6 is a cross-sectional illustration of an embodiment of an expandable tubular member having a slotted lower section for use in the apparatus of FIGS. 1a to 3d.

Referring now to FIG. 6, an exemplary embodiment of an expandable tubular member 600 for use in the apparatus 115, 215 and 315 will be described. The tubular member 600 preferably includes a lower portion 605, an intermediate portion 610, and an upper portion 615.

The lower portion 605 is coupled to the intermediate portion 610. In an exemplary embodiment, the lower portion 605 is further adapted to mate with the anchoring devices 135, 235, and 330. In an exemplary embodiment, the lower portion 605 further preferably includes one or more slotted portions 620 for facilitating the radial expansion of the lower portion 605 by the anchoring devices 135, 235, and 330. In this manner, the lower portion 605 of the tubular member 600 is preferably radially expanded by the anchoring devices 135, 235, and 330 into contact with the preexisting structure. Furthermore, in this manner, the lower portion 605 of the tubular member 600 is anchored to the preexisting structure prior to the initiation of the radial expansion process.

The intermediate portion 610 is coupled to the lower portion 605 and the upper portion 615. In an exemplary embodiment, the wall thicknesses of the lower and intermediate portions, 605 and 610, are less than the wall thickness of the upper portion 615 in order to faciliate the radial expansion of the tubular member 600. In an exemplary embodiment, the lower and intermediate portions, 605 and 610, are preexpanded to mate with the expansion cone.

Figure 7:
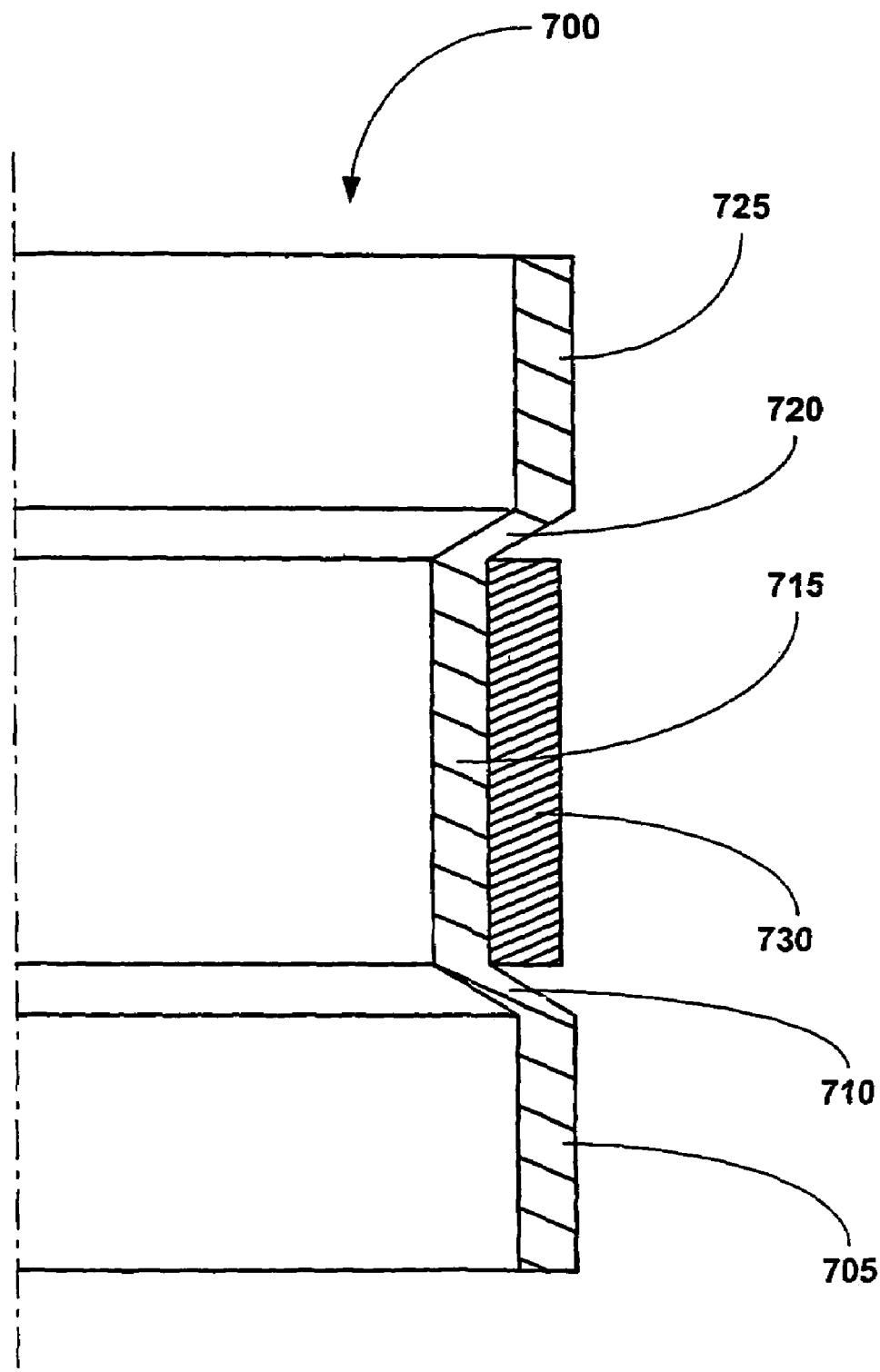
FIG. 7 is a cross-sectional illustration of an embodiment of an expandable tubular member having a pre-expanded upper portion for use in the apparatus of FIGS. 1a to 3d.

Referring to FIG. 7, an exemplary embodiment of an expandable tubular member 700 for use in the apparatus 115, 215 and 315 will be described. In an exemplary embodiment, the tubular member 700 minimizes the shock loads created upon the completion of the radial expansion process. In an exemplary embodiment, the tubular member 700 includes a lower portion 705, a lower transitionary portion 710, an intermediate portion 715, an upper transitionary portion 720, an upper portion 725, and a sealing element 730.

The lower portion 705 is coupled to the lower transitionary portion 710. The lower portion 705 is preferably adapted to mate with the expansion cone and the anchoring device.

The lower transitionary portion 710 is coupled to the lower portion 705 and the intermediate portion 715. In an exemplary embodiment, the lower transitionary portion 710 is adapted to mate with the expansion cone. In an exemplary embodiment, the wall thicknesses of the lower portion 705 and the lower transitionary portion 710 are less than the wall thicknesses of the intermediate portion 715, the upper transitionary portion 720 and the upper portion 725 in order to optimally facilitate the radial expansion process.

The intermediate portion 715 is coupled to the lower transitionary portion 710 and the upper transitionary portion 720. In an exemplary embodiment, the outside diameter of the intermediate portion 715 is less than the wall thicknesses of the lower portion 705 and the upper portion 725.

The upper transitionary portion 720 is coupled to the intermediate portion 715 and the upper portion 725.

The upper portion 725 is coupled to the upper transitionary portion 720.

The sealing element 730 is coupled to the outside surface of the intermediate portion 715. In an exemplary embodiment, the outside diameter of the sealing element 730 is less than or equal to the outside diameter of the lower portion 705 and the upper portion 725 in order to optimally protect the sealing element 703 during placement of the tubular member 700 within the preexisting structure.

In an exemplary embodiment, during the radial expansion of the tubular member 700 using the apparatus 115, 215 and 315, the preexpansion of the upper transitionary portion 720 and the upper portion 725 reduces the shock loads typically created during the end portion of the radial expansion process. In this manner, the radial expansion process is optimally provided in a safe manner. Furthermore, because the sealing element 730 is preferably recessed below the surfaces of the lower portion 705 and the upper portion 725, the sealing element 730 is optimally protected from damage during the placement of the tubular member 700 within the preexisting structure.

Figure 8:
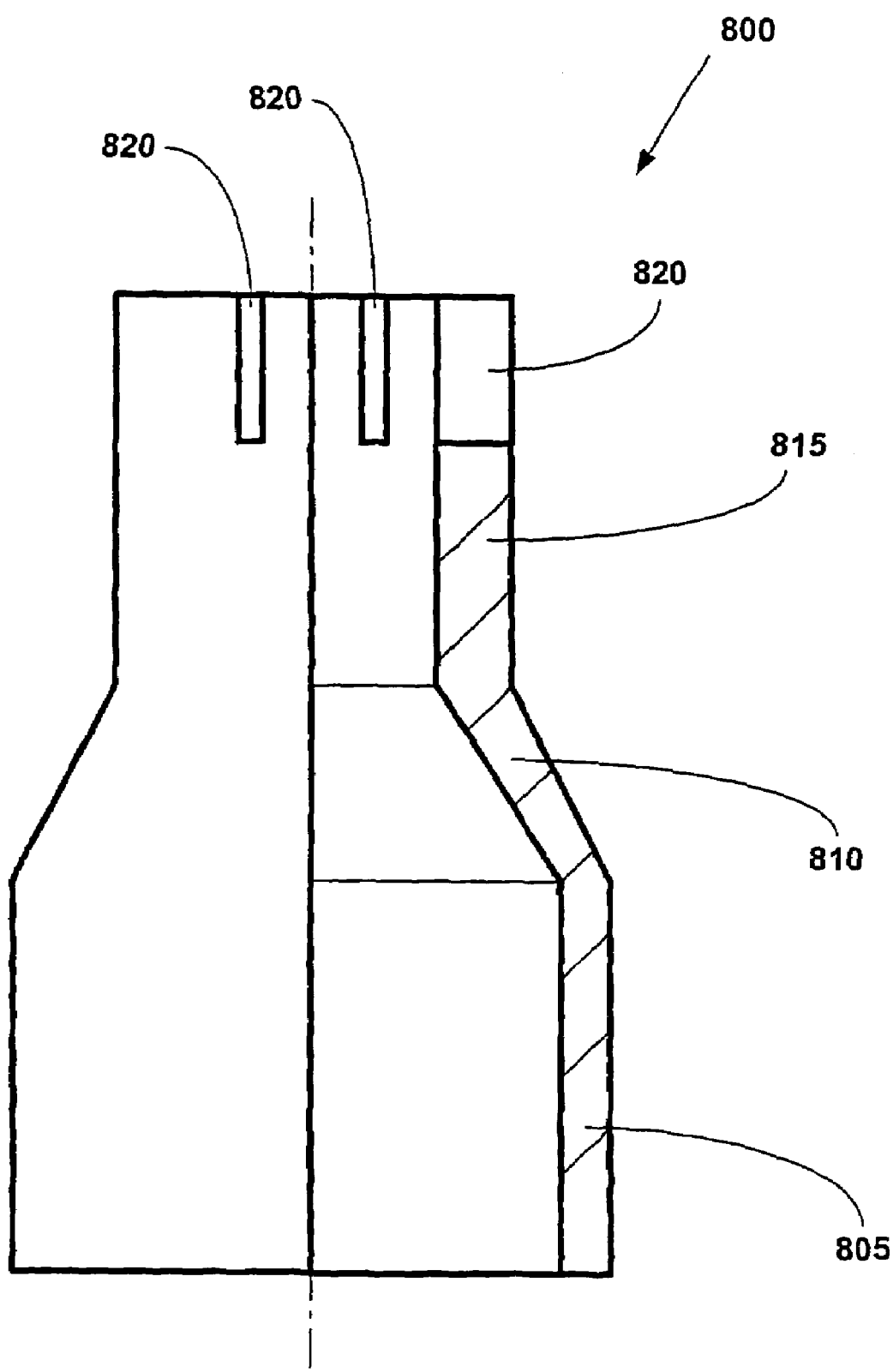
FIG. 8 is a cross-sectional illustration of an embodiment of an expandable tubular member having a slotted upper section for use in the apparatus of FIGS. 1a to 3d.

Referring to FIG. 8, an exemplary embodiment of an expandable tubular member 800 for use in the apparatus 115, 215 and 315 will be described. The tubular member 800 preferably includes a lower portion 805, an intermediate portion 810, and an upper portion 815.

The lower portion 805 is coupled to the intermediate portion 810. In an exemplary embodiment, the lower portion 805 is further adapted to mate with the expansion cones 130, 230, 325 and the anchoring devices 135, 235, and 330.

The intermediate portion 810 is coupled to the lower portion 805 and the upper portion 815. In an exemplary embodiment, the wall thicknesses of the lower and intermediate portions, 805 and 810, are less than the wall thickness of the upper portion 815 in order to faciliate the radial expansion of the tubular member 800. In an exemplary embodiment, the lower and intermediate portions, 805 and 810, are preexpanded to mate with the expansion cone.

The upper portion 815 is coupled to the intermediate portion 810. In an exemplary embodiment, the upper portion 815 further preferably includes one or more slotted portions 820 for facilitating the radial expansion of the upper portion 815 by the expansion cones 130, 230, and 325. In this manner, the upper portion 815 of the tubular member 800 is preferably radially expanded by the expansion cones 130, 230, and 325 with minimal shock loads when the expansion cones 130, 230 and 325 exit the expandable tubular member 800.

Figure 9:
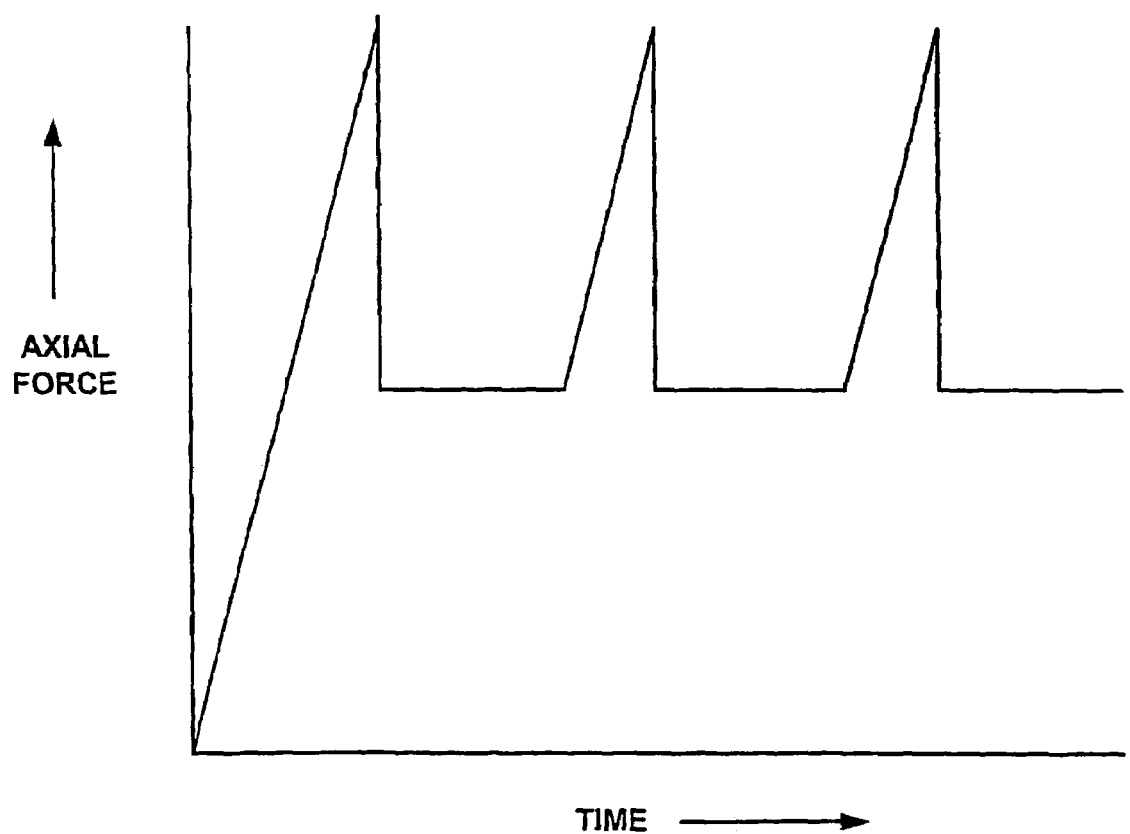
FIG. 9 is a graphical illustration of an embodiment of a method of applying an axial force to the expansion cones of the apparatus of FIGS. 1a to 3d.

Referring to FIG. 9, an exemplary embodiment of a method of applying an axial force to the expansion cones 130, 230, and 325 will now be described. In an exemplary embodiment, the axial displacement of the expansion cones 130, 230, and 325 during the radial expansion process is provided by applying an axial force to the expansion cones 130, 230, and 325. In an exemplary embodiment, the axial force provided includes the application of a substantially constant axial force for some time periods and the application of increased axial force for other time periods in order to optimally facilitate the radial expansion process by minimizing the effects of friction. In an exemplary embodiment, the application of the increased axial force is provided on a periodic basis in order to optimally provide a variable contact area between the expansion cone and the tubular member being expanded. In an alternative embodiment, the application of the increased axial force is provided on a random basis in order to optimally provide a variable contact area between the expansion cone and the tubular member being expanded. In an exemplary embodiment, the duty cycle of the application of constant and increased axial forces ranges from about 90/10% to 60/40% in order to optimally radially expand the tubular members. In an exemplary embodiment, the ratio of the increased axial force to the substantially constant axial force ranges from about 1.5 to 1 to about 4 to 1 in order to optimally provide a variable contact area between the expansion cone and the tubular member being expanded, promote more even wear of the expansion cone, and clean debris from the expansion cone surface.

Figure 10A:
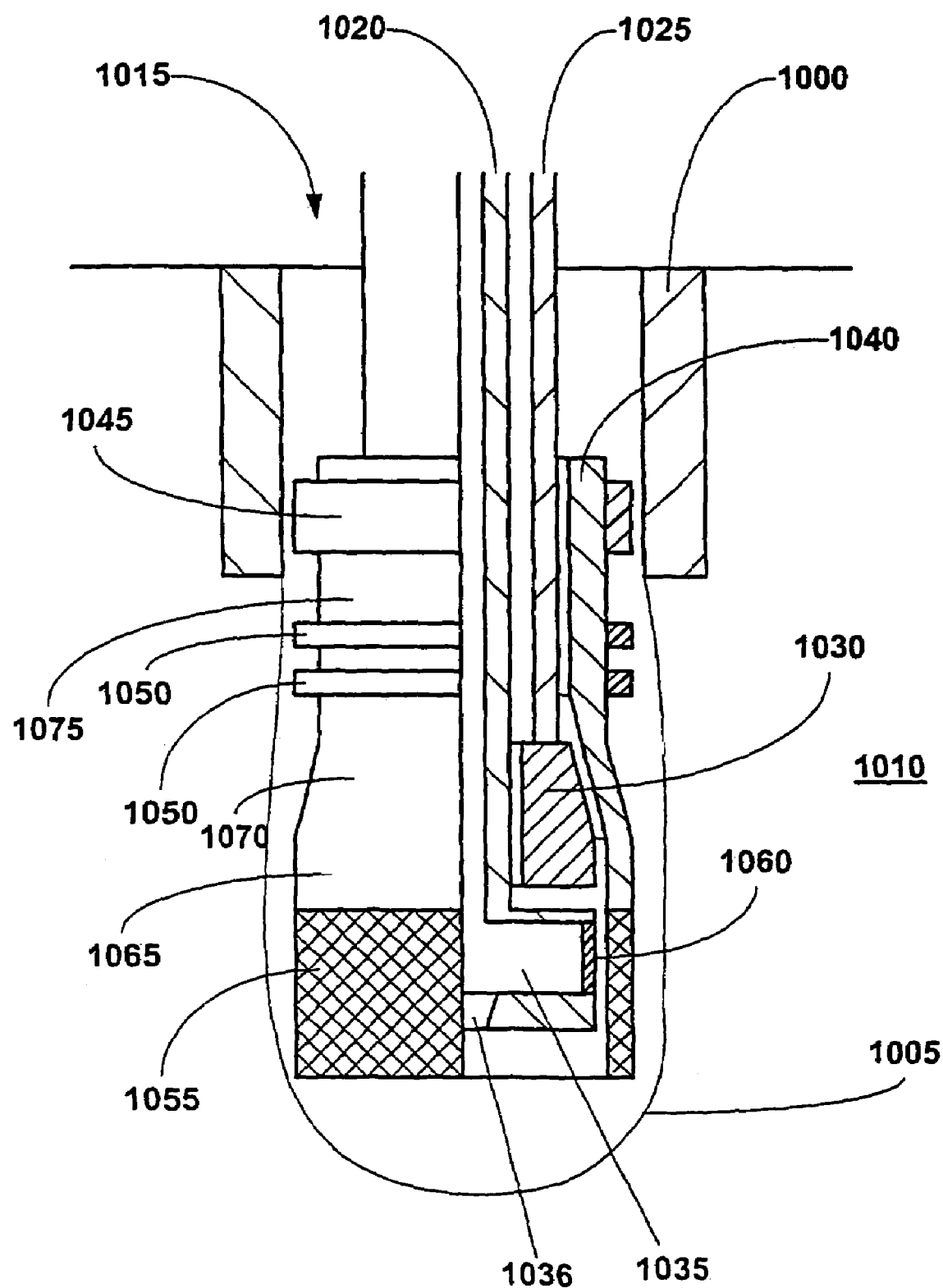
FIG. 10a is a fragmentary cross-sectional illustration of the placement of an embodiment of an apparatus for expanding a tubular member within a wellbore casing.

Referring to FIGS. 10a to 10i, an embodiment of an apparatus and method for forming a wellbore casing will now be described. As illustrated in FIG. 10a, a wellbore casing 1000 and an open hole wellbore section 1005 are provided in a subterranean formation 1010. The wellbore casing 1000 and open hole wellbore section 1005 may be orientated at any orientation ranging from the vertical to the horizontal. In an exemplary embodiment, a new section of wellbore casing is formed in the open hole wellbore section 1005 using an apparatus 1015. More generally, the apparatus 1015 is utilized to form or repair wellbore casings, pipelines, or structural supports.

The apparatus 1015 preferably includes a first support member 1020, a second support member 1025, an expansion cone 1030, an anchoring device 1035, an expandable tubular member 1040, one or more upper sealing members 1045, one or more lower sealing members 1050, and a flexible coupling element 1055.

The first support member 1020 is preferably adapted to be coupled to a surface location. The first support member 1020 is further coupled to the anchoring device 1035. The first support member 1020 is preferably adapted to convey pressurized fluidic materials and/or electrical current and/or communication signals from a surface location to the anchoring device 1035. The first support member 1020 may, for example, be conventional commercially available slick wire, braided wire, coiled tubing, or drilling stock material.

The second support member 1025 is preferably adapted to be coupled to a surface location. The second support member 1025 is further coupled to the expansion cone 1030. The second support member 1025 is preferably adapted to permit the expansion cone 1030 to be axially displaced relative to the first support member 1020. The second support member 1025 may, for example, be conventional commercially available slick wire, braided wire, coiled tubing, or drilling stock material.

In an alternative embodiment, the support member 1020 is telescopically coupled to the support member 1025, and the support member 1025 is coupled to a surface support member.

The expansion cone 1030 is coupled to the second support member 1025. The expansion cone 1030 is preferably adapted to radially expand the expandable tubular member 1040 when the expansion cone 1030 is axially displaced relative to the expandable tubular member 1040. In an exemplary embodiment, the expansion cone 1030 is provided substantially as disclosed in one or more of the following: (1) U.S. utility patent application Ser. No. 09/454,139, filed on Dec. 3, 1999, which claimed the benefit of the filing date of U.S. provisional patent application No. 60/111,293, filed on Dec. 7, 1998; (2) U.S. utility patent application Ser. No. 09/510,913, filed on Feb. 23, 2000, which claimed the benefit of the filing date of U.S. provisional application No. 60/121,702, filed on Feb. 25, 1999; (3) U.S. utility patent application Ser. No. 09/502,350, filed on Feb. 10, 2000, which claimed the benefit of the filing date of U.S. provisional application No. 60/119,611, (4) U.S. utility patent application Ser. No. 09/440,338, filed on Nov. 15, 1999, which claimed the benefit of the filing date of U.S. provisional application No. 60/108,558, filed on Nov. 16, 1998; (5) U.S. provisional patent application No. 60/183,546, filed on Feb. 18, 2000; (6) U.S. utility patent application Ser. No. 09/523,460, filed on Mar. 10, 2000, which claimed the benefit of the filing date of U.S. provisional application No. 60/124,042, filed on Mar. 11, 1999; (7) U.S. utility patent application Ser. No. 09/512,895, filed on Feb. 24, 2000, which claimed the benefit of the filing dates of U.S. provisional application No. 60/121,841, filed on Feb. 26, 1999 and U.S. provisional application No. 60/154,047, filed on Sep. 16, 1999; (8) U.S. utility application Ser. No. 09/511,941, filed on Feb. 24, 2000, which claimed the benefit of the filing date of U.S. provisional Ser. No. 60/121,907, filed on Feb. 26, 1999; (9) U.S. utility patent application Ser. No. 09/588,946, filed on Jun. 7, 2000, which claimed the benefit of the filing date of U.S. provisional patent application Ser. No. 60/137,998, filed on Jun. 7, 1999; (10) U.S. utility patent application Ser. No. 09/559,122, filed on Apr. 26, 2000, which claimed the benefit of the filing date of U.S. provisional application No. 60/131,106, filed on Apr. 26, 1999; (11) U.S. provisional application No. 60/146,203, filed on Jul. 29, 1999; (12) U.S. provisional application No. 60/143,039, filed on Jul. 9, 1999; (13) U.S. provisional patent application Ser. No. 60/162,671, filed on Nov. 1, 1999; (14) U.S. provisional application No. 60/159,039, filed on Oct. 12, 1999; (15) U.S. provisional patent application No. 60/159,033, filed on Oct. 12, 1999; and (16) U.S. provisional patent application No. 60/165,228, filed on Nov. 12, 1999, the disclosures of which are incorporated herein by reference.

The anchoring device 1035 is coupled to the first support member 1020. The anchoring device 1035 is preferably adapted to be controllably coupled to the expandable tubular member 1040 and the open hole wellbore section 1005. In this manner, the anchoring device 1035 preferably controllably anchors the expandable tubular member 1040 to the open hole wellbore section 1005 to facilitate the radial expansion of the expandable tubular member 1040 by the axial displacement of the expansion cone 1030.

In an exemplary embodiment, the anchoring device 1035 includes one or more expandable elements 1060 that are adapted to controllably extend from the body of the anchoring device 1035 to engage both the flexible coupling element 1055 and the open hole wellbore section 1005. In an exemplary embodiment, the expandable elements 1060 are actuated using fluidic pressure.

In an exemplary embodiment, the anchoring device 1035 further includes a fluid passage 1036 adapted to receive a ball plug or other similar valving element. In this manner, fluidic materials can be exhausted from the anchoring device 1035 and the fluid passage 1036 can be controllably plugged. In an exemplary embodiment, the anchoring device 1035 is any one of the hydraulically actuated packers commercially available from Halliburton Energy Services or Baker-Hughes, modified in accordance with the teachings of the present disclosure.

In an exemplary embodiment, the anchoring devices 135, 235, and 330 are also modified to includes a fluid passage that can be controllably plugged in order to permit fluidic materials to be exhausted from the anchoring devices 135, 235, and 330.

The expandable tubular member 1040 is removably coupled to the expansion cone 1030. The expandable tubular member 1040 is further preferably coupled to the flexible coupling element 1055.

In an exemplary embodiment, the expandable tubular member 1040 further includes a lower section 1065, an intermediate section 1070, and an upper section 1075. In an exemplary embodiment, the lower section 1065 is coupled to the flexible coupling element 1055 in order to provide anchoring at an end portion of the expandable tubular member 1040. In an exemplary embodiment, the wall thickness of the lower and intermediate sections, 1065 and 1070, are less than the wall thickness of the upper section 1075 in order to optimally couple the radially expanded portion of the expandable tubular member 1040 to the wellbore casing 1000 and the open hole wellbore section 1005.

In an exemplary embodiment, the expandable tubular member 1040 is further provided substantially as disclosed in one or more of the following: (1) U.S. utility patent application Ser. No. 09/454,139, filed on Dec. 3, 1999, which claimed the benefit of the filing date of U.S. provisional patent application No. 60/111,293, filed on Dec. 7, 1998; (2) U.S. utility patent application Ser. No. 09/510,913, filed on Feb. 23, 2000, which claimed the benefit of the filing date of U.S. provisional application No. 60/121,702, filed on Feb. 25, 1999; (3) U.S. utility patent application Ser. No. 09/502,350, filed on Feb. 10, 2000, which claimed the benefit of the filing date of U.S. provisional application No. 60/119,611, (4) U.S. utility patent application Ser. No. 09/440,338, filed on Nov. 15, 1999, which claimed the benefit of the filing date of U.S. provisional application No. 60/108,558, filed on Nov. 16, 1998; (5) U.S. provisional patent application No. 60/183,546, filed on Feb. 18, 2000; (6) U.S. utility patent application Ser. No. 09/523,460, filed on Mar. 10, 2000, which claimed the benefit of the filing date of U.S. provisional application No. 60/124,042, filed on Mar. 11, 1999; (7) U.S. utility patent application Ser. No. 09/512,895, filed on Feb. 24, 2000, which claimed the benefit of the filing dates of U.S. provisional application No. 60/121,841, filed on Feb. 26, 1999 and U.S. provisional application No. 60/154,047, filed on Sep. 16, 1999; (8) U.S.

utility application Ser. No. 09/511,941, filed on Feb. 24, 2000, which claimed the benefit of the filing date of U.S. provisional Ser. No. 60/121,907, filed on Feb. 26, 1999; (9) U.S. utility patent application Ser. No. 09/588,946, filed on Jun. 7, 2000, which claimed the benefit of the filing date of U.S. provisional patent application Ser. No. 60/137,998, filed on Jun. 7, 1999; (10) U.S. utility patent application Ser. No. 09/559,122, filed on Apr. 26, 2000, which claimed the benefit of the filing date of U.S. provisional application No. 60/131,106, filed on Apr. 26, 1999; (11) U.S. provisional application No. 60/146,203, filed on Jul. 29, 1999; (12) U.S. provisional application No. 60/143,039, filed on Jul. 9, 1999; (13) U.S. provisional patent application Ser. No. 60/162,671, filed on Nov. 1, 1999; (14) U.S. provisional application No. 60/159,039, filed on Oct. 12, 1999; (15) U.S. provisional patent application No. 60/159,033, filed on Oct. 12, 1999; and (16) U.S. provisional patent application No. 60/165,228, filed on Nov. 12, 1999, the disclosures of which are incorporated herein by reference.

In an exemplary embodiment, the expandable tubular member 1040 is further provided in accordance with the teachings of embodiments of expandable tubular members described above and illustrated in FIGS. 5-8.

The upper sealing members 1045 are coupled to the outer surface of the upper portion 1075 of the expandable tubular member 1040. The upper sealing members 1045 are preferably adapted to engage and fluidicly seal the interface between the radially expanded expandable tubular member 1040 and the wellbore casing 1000. In an exemplary embodiment, the apparatus 1015 includes a plurality of upper sealing members 1045.

The lower sealing members 1050 are coupled to the outer surface of the upper portion 1075 of the expandable tubular member 1040. The lower sealing members 1050 are preferably adapted to engage and fluidicly seal the interface between the radially expanded expandable tubular member 1040 and the open wellbore section 1005. In an exemplary embodiment, the apparatus 1015 includes a plurality of lower sealing members 1050.

The flexible coupling element 1055 is coupled to the lower portion 1065 of the expandable tubular member 1040. The flexible coupling element 1055 is preferably adapted to radially expanded by the anchoring device 1035 into engagement within the walls of the open hole wellbore section 1005. In this manner, the lower portion 1065 of the expandable tubular member 1040 is coupled to the walls of the open hole wellbore section 1005. In an exemplary embodiment, the flexible coupling element 1055 is a slotted tubular member. In an exemplary embodiment, the flexible coupling element 1055 includes one or more hook elements for engaging the walls of the open hole wellbore section 1005.

As illustrated in FIG. 10*a*, the apparatus 1015 is preferably positioned with the expandable tubular member 1040 positioned in overlapping relation with a portion of the wellbore casing 1000. In this manner, the radially expanded tubular member 1040 is coupled to the lower portion of the wellbore casing 1000. In an exemplary embodiment, the upper sealing members 1045 are positioned in opposing relation to the lower portion of the wellbore casing 1000 and the lower sealing members 1050 are positioned in opposing relation to the walls of the open hole wellbore section 1005. In this manner, the interface between the radially expanded tubular member 1040 and the wellbore casing 1000 and open hole wellbore section 1005 is optimally fluidicly sealed.

Figure 10B:
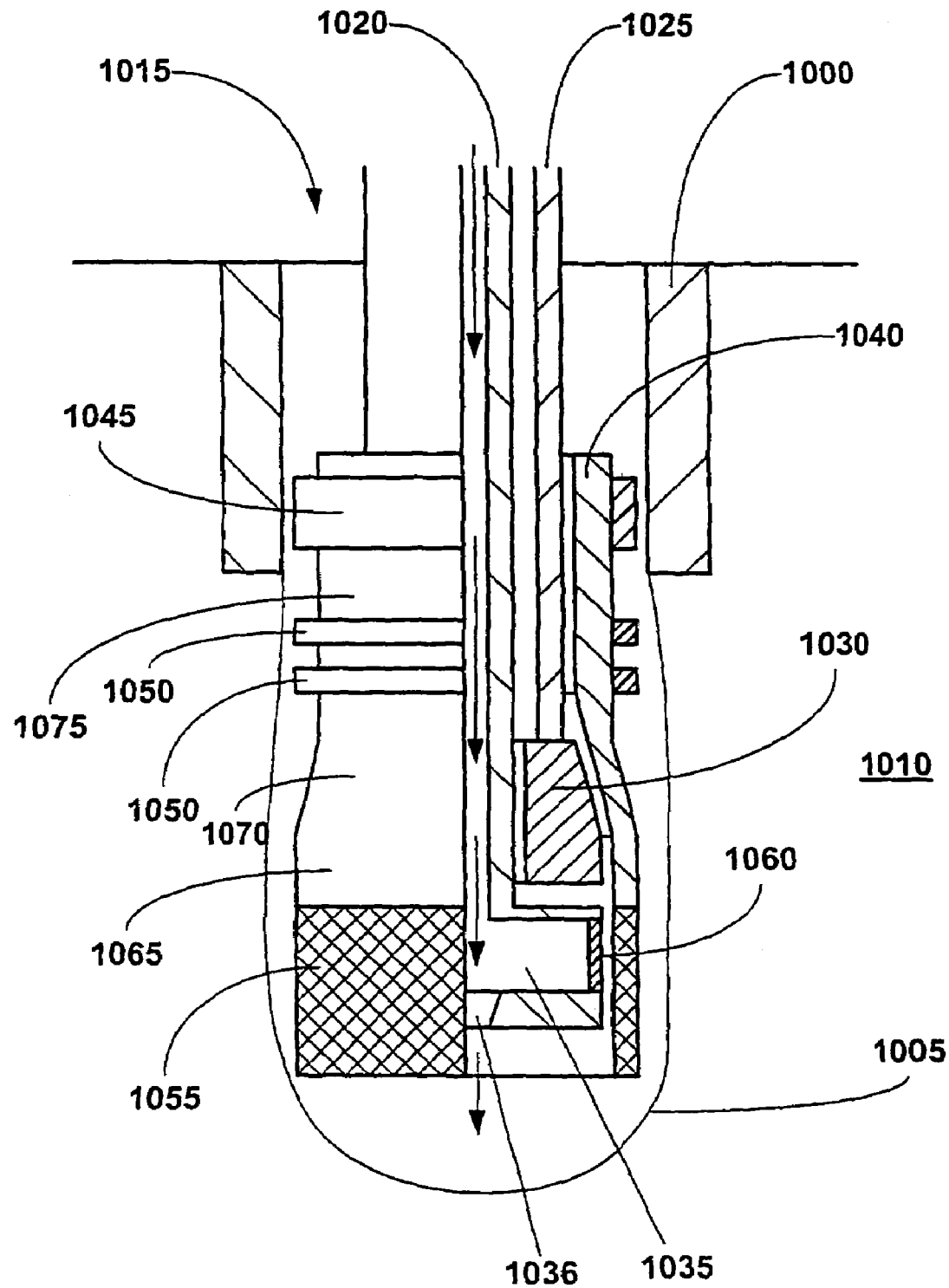
FIG. 10b is a fragmentary cross-sectional illustration of the apparatus of FIG. 10a during the injection of a non-hardenable fluidic material into and out of the apparatus.

As illustrated in FIG. 10*b*, in an exemplary embodiment, a quantity of a non-hardenable fluidic material is then injected into and then out of the apparatus 1015. In an exemplary embodiment, the non-hardenable material is discharged from the apparatus 1015 using the valveable flow passage 1065. The non-hardenable fluidic material may be any number of conventional commercially available fluidic materials such as, for example, drilling mud.

Figure 10C:
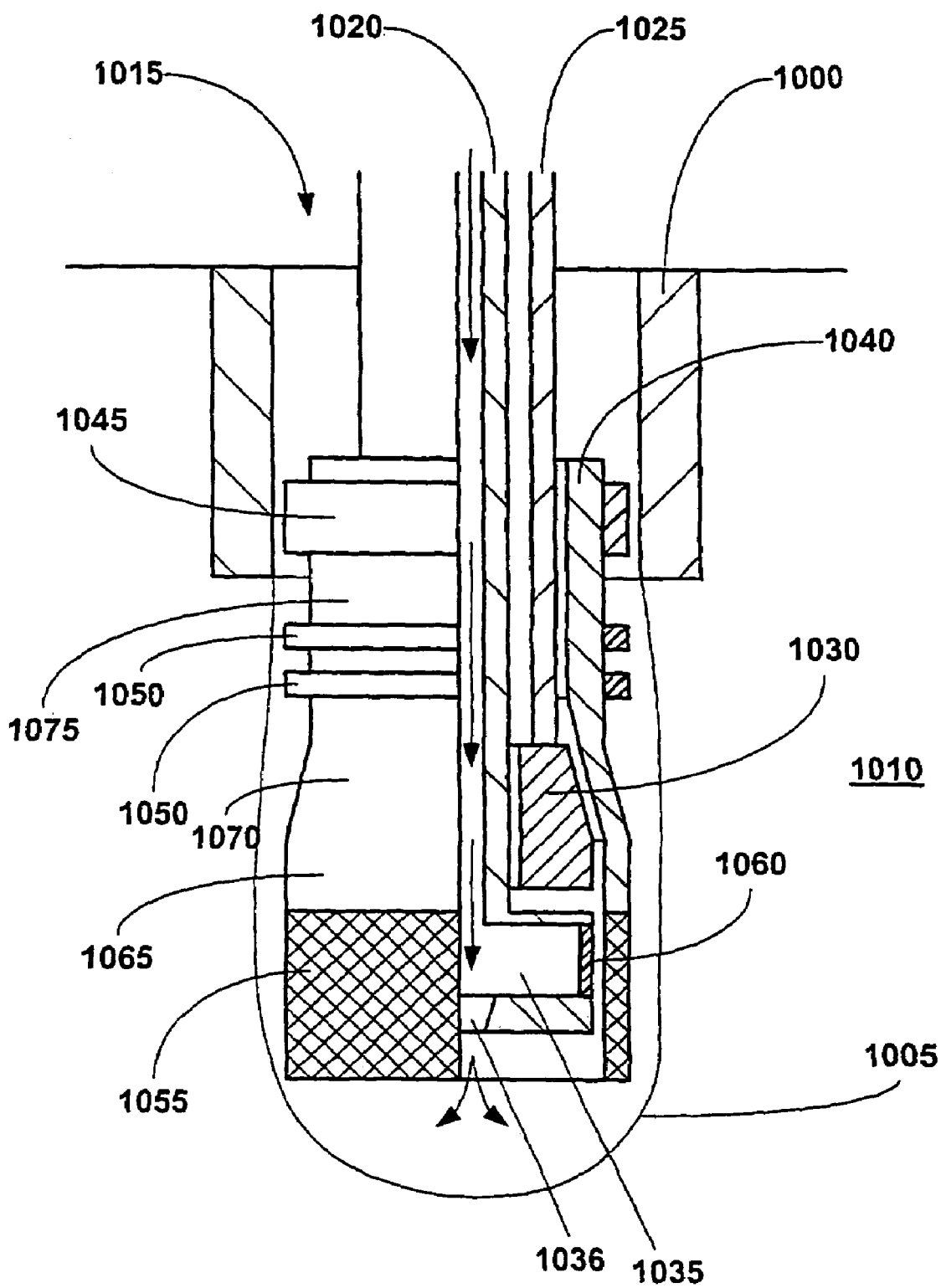
FIG. 10c is a fragmentary cross-sectional illustration of the apparatus of FIG. 10b during the injection of a hardenable fluidic sealing material into and out of the apparatus.

As illustrated in FIG. 10*c*, in an exemplary embodiment, a quantity of a hardenable fluidic sealing material is then injected into and out of the apparatus 1015. In an exemplary embodiment, the hardenable fluidic sealing material is exhausted from the apparatus 1015 using the valveable flow passage 1065. In an exemplary embodiment, the hardenable fluidic sealing material is permitted to completely fill the annular space between the tubular member 1040 and the open hole wellbore section 1005. The hardenable fluidic sealing material may be any number of conventional commercially available materials such as, for example, cement, slag mix and/or epoxy resin. In this manner, a fluidic sealing annular element is provided around the radially expanded tubular member 1040.

Figure 10D:
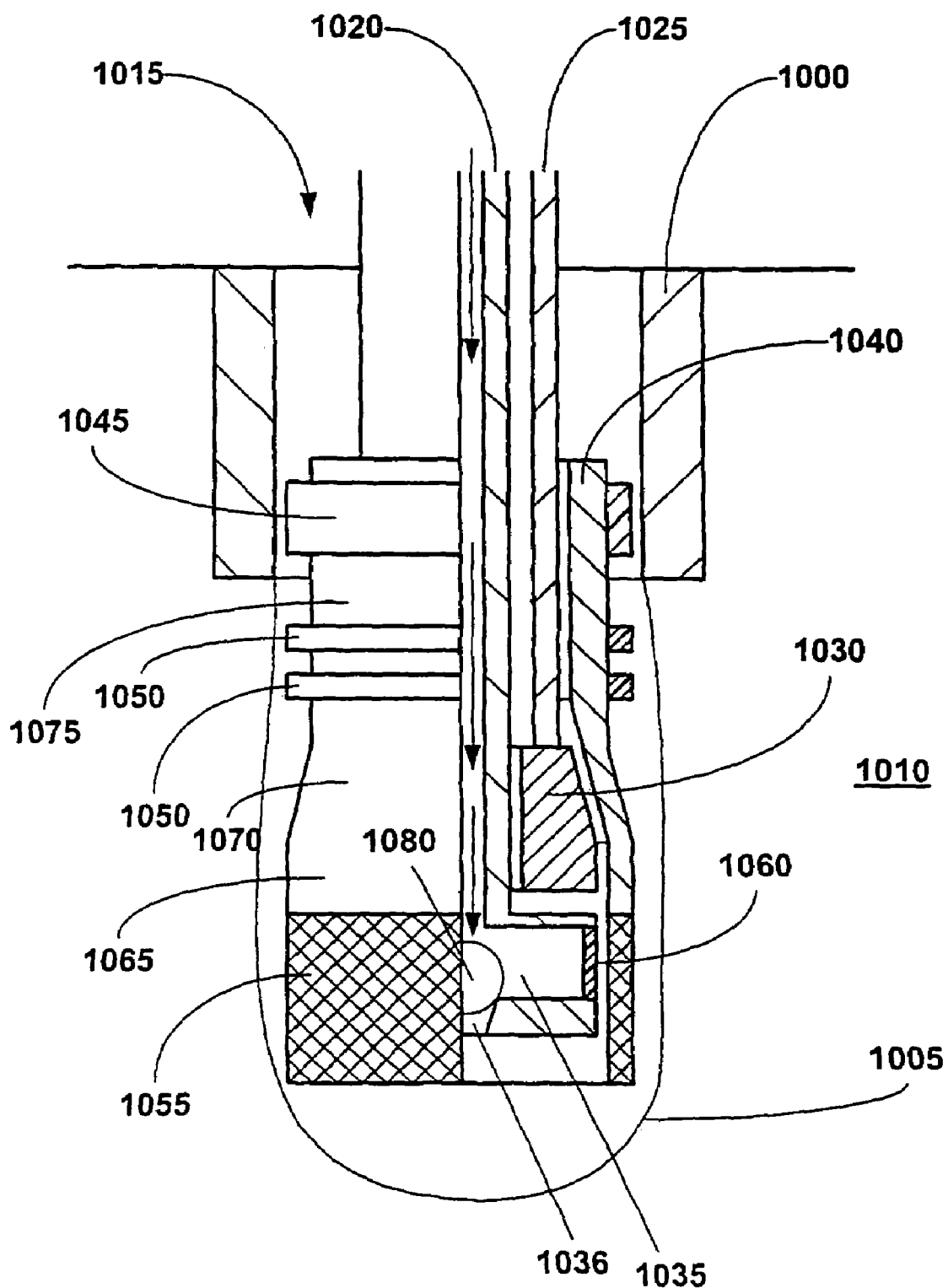
FIG. 10d is a fragmentary cross-sectional illustration of the apparatus of FIG. 10c after the placement of a valve closure element into the valve passage of the anchoring device of the apparatus.

As illustrated in FIG. 10*d*, in an exemplary embodiment, another quantity of a non-hardenable fluidic material is then injected into and out of the apparatus 1015. In an exemplary embodiment, a ball plug or dart 1080, or other similar fluid passage blocking device, is placed into the non-hardenable fluid material. In an exemplary embodiment, the ball plug 1080 then seats in and seals off the valveable fluid passage 1065. In this manner, the anchoring device 1035 is then pressurized to anchor the tubular member 1040 to the open hole wellbore section 1005.

In an alternative embodiment, the valveable fluid passage 1065 includes a remote or pressure activated valve for sealing off the valveable fluid passage 1065.

Figure 10E:
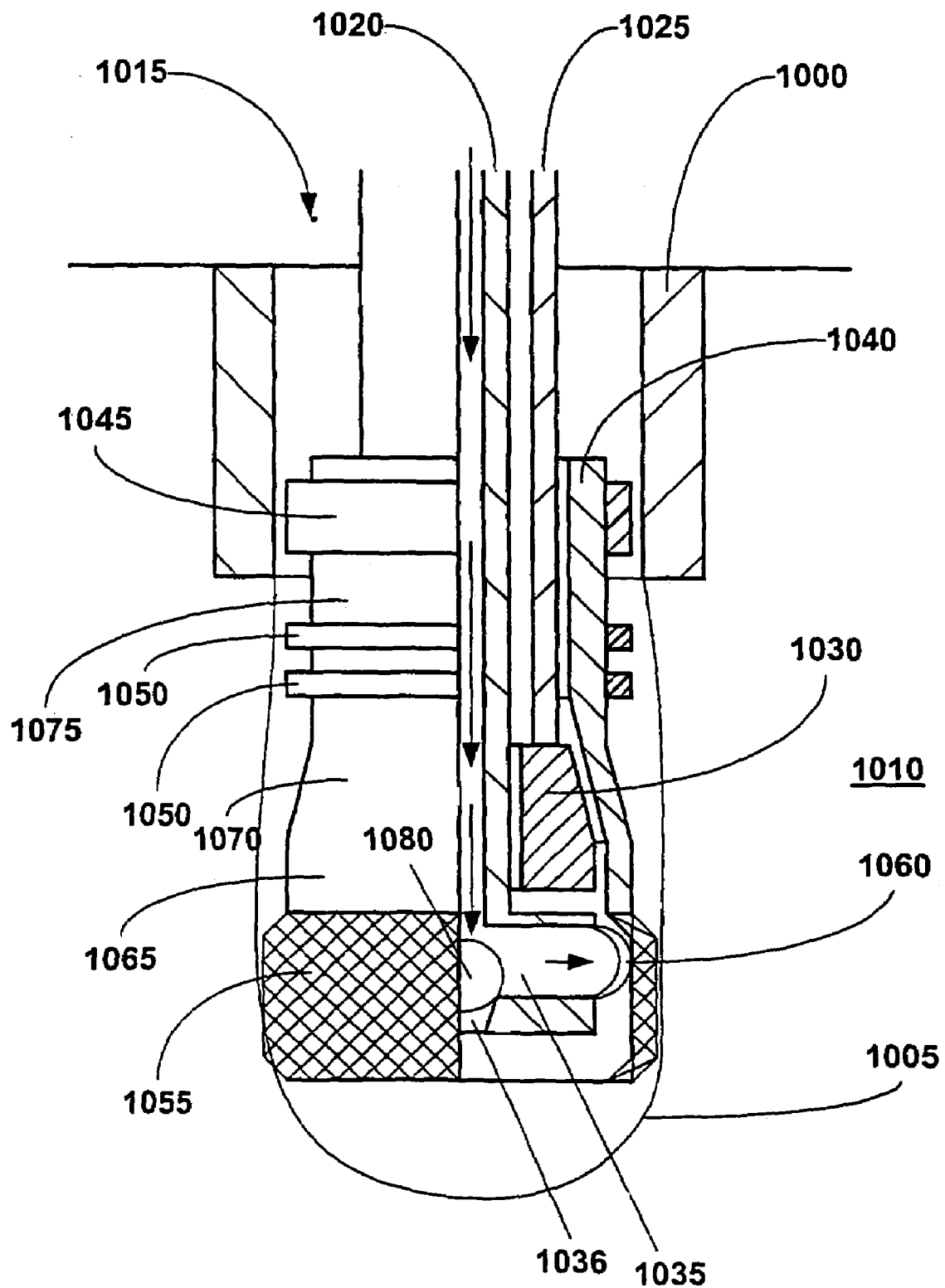
FIG. 10e is a fragmentary cross-sectional illustration of the apparatus of FIG. 10d after anchoring the expandable tubular member of the apparatus to the wellbore casing.

As illustrated in FIG. 10*e*, in an exemplary embodiment, the apparatus 1015 is then anchored to the open hole wellbore section 1005 using the anchoring device 1035. In an exemplary embodiment, the anchoring device 1035 is pressurized and the expandable element 1060 is radially extended from the anchoring device 1035 causing the flexible coupling element 1055 to radially expand into intimate contact with the walls of the open hole wellbore section 1005. In this manner, the lower section 1065 of the expandable tubular member 1040 is removably coupled to the walls of the open hole wellbore section 1005.

Figure 10F:
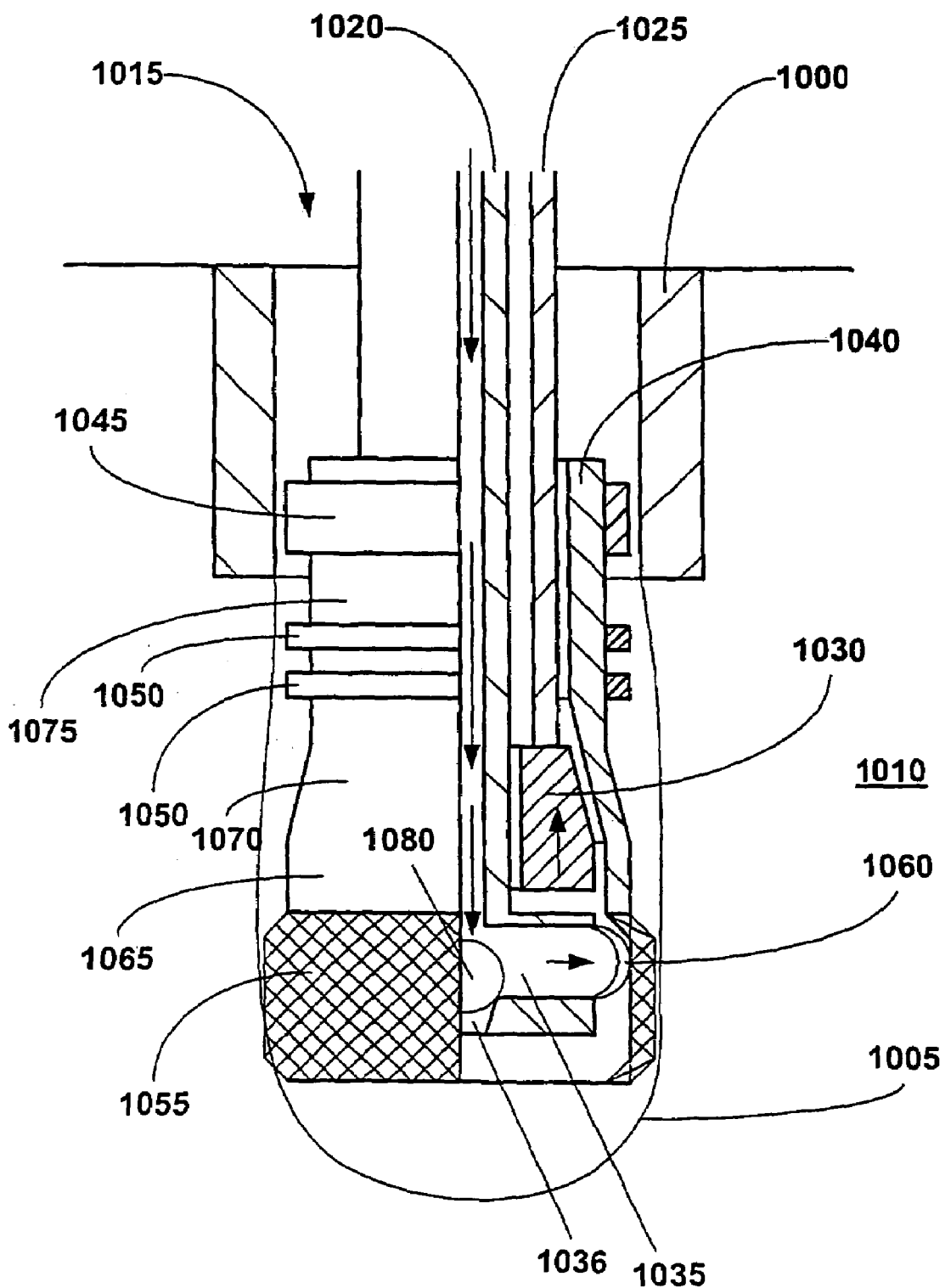
FIG. 10f is a fragmentary cross-sectional illustration of the apparatus of FIG. 10e after initiating the axial displacement of the expansion cone.

As illustrated in FIG. 10*f*, the expansion cone 1030 is then axially displaced by applying an axial force to the second support member 1025. In an exemplary embodiment, the axial displacement of the expansion cone 1030 radially expands the expandable tubular member 1040 into intimate contact with the walls of the open hole wellbore section 1005.

Figure 10G:
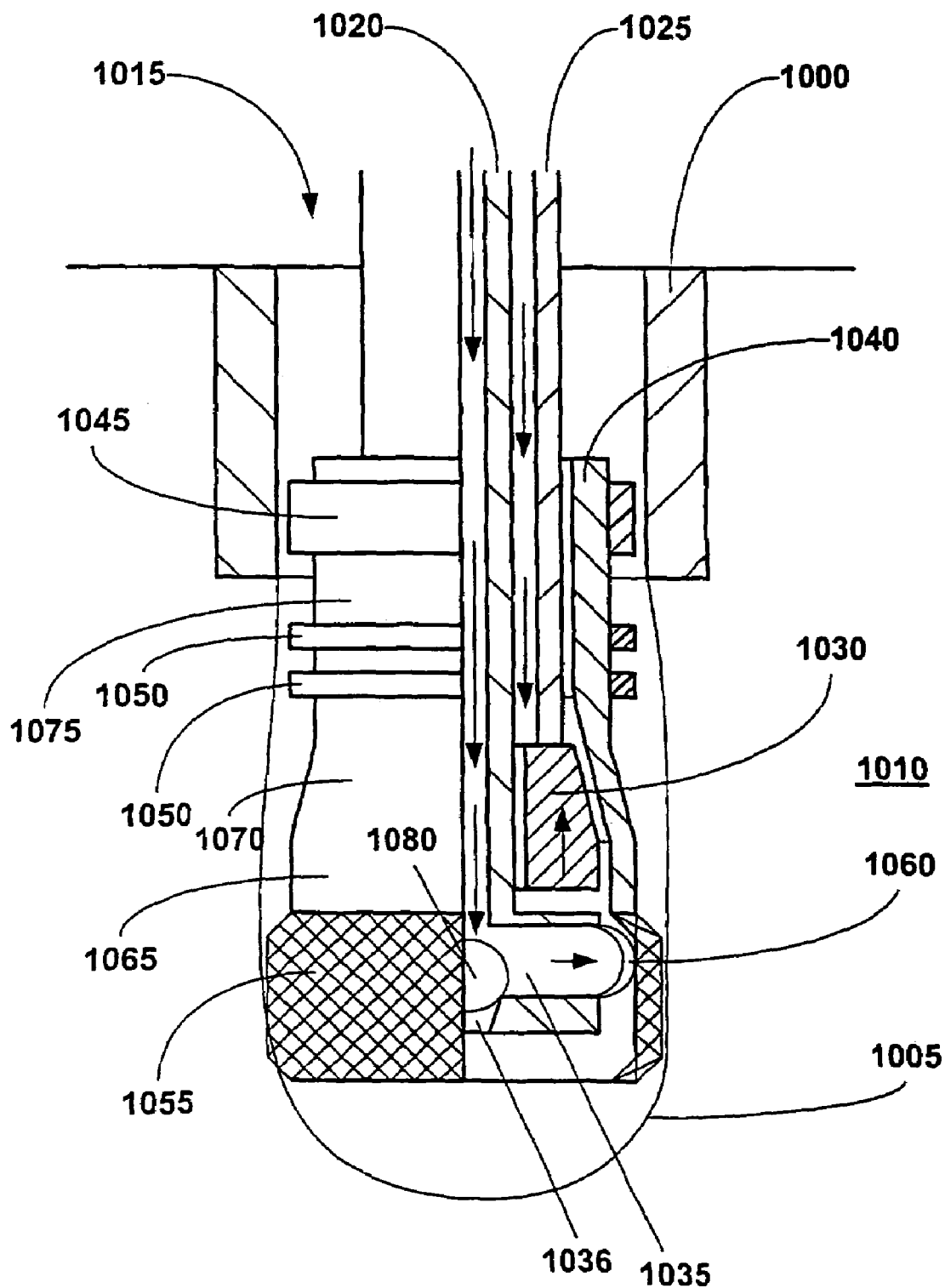
FIG. 10g is a fragmentary cross-sectional illustration of the apparatus of FIG. 10e after initiating the axial displacement of the expansion cone by pulling on the expansion cone and injecting a pressurized fluid below the expansion cone.

In an alternative embodiment, as illustrated in FIG. 10*g*, the axial displacement of the expansion cone 1030 is enhanced by injecting a pressurized fluidic material into the annular space between the first support member 1020 and the second support member 1025. In this manner, an upward axial force is applied to the lower annular face of the expansion cone 1030 using the pressurized fluidic material. In this manner, a temporary need for increased axial force during the radial expansion process can be easily satisfied.

In an exemplary embodiment, the hardenable fluidic sealing material is then permitted to at least partial cure.

Figure 10H:
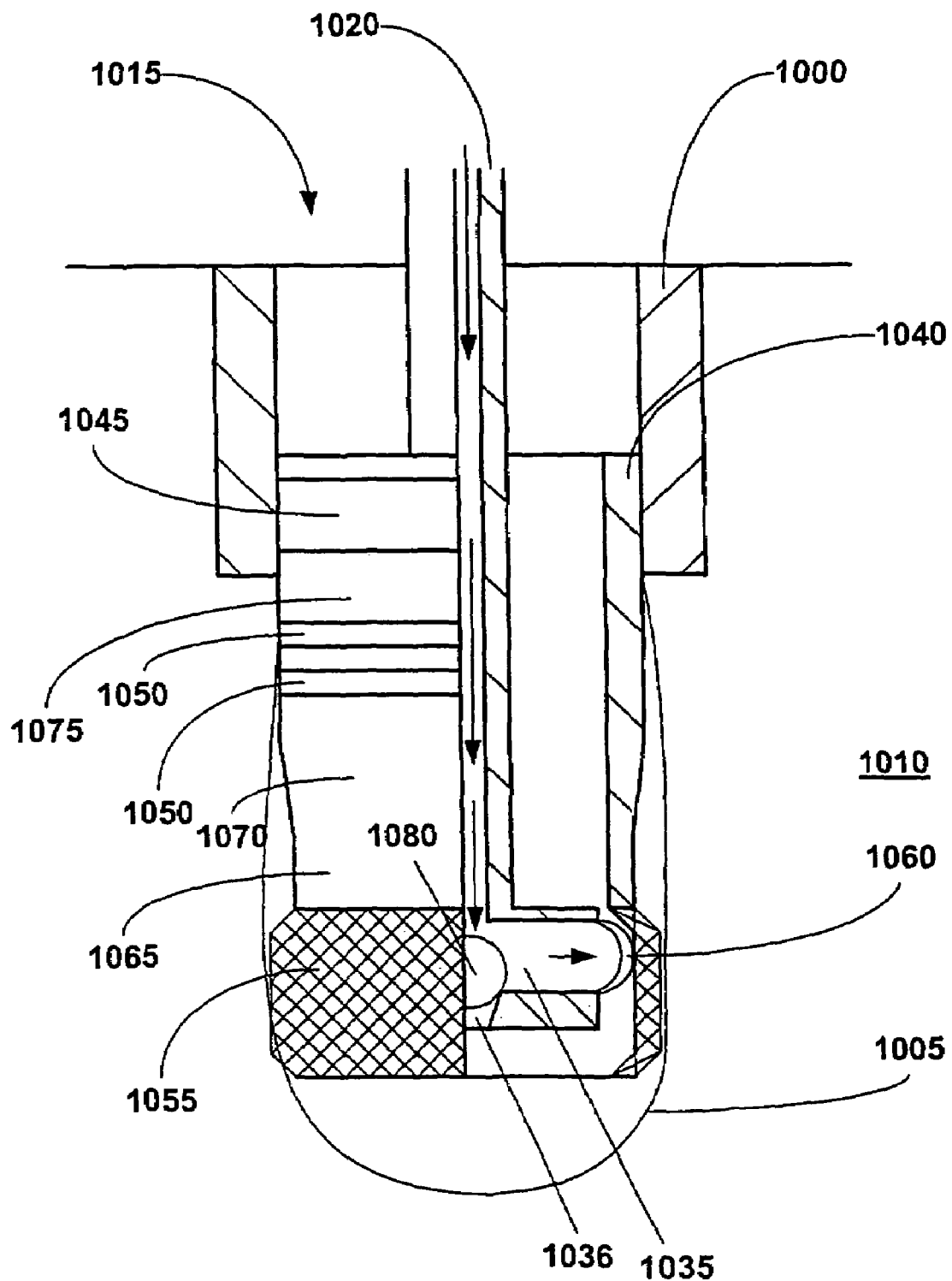
FIG. 10h is a fragmentary cross-sectional illustration of the apparatus of FIGS. 10f and 10g after the completion of the radial expansion of the expandable tubular member.
Figure 10I:
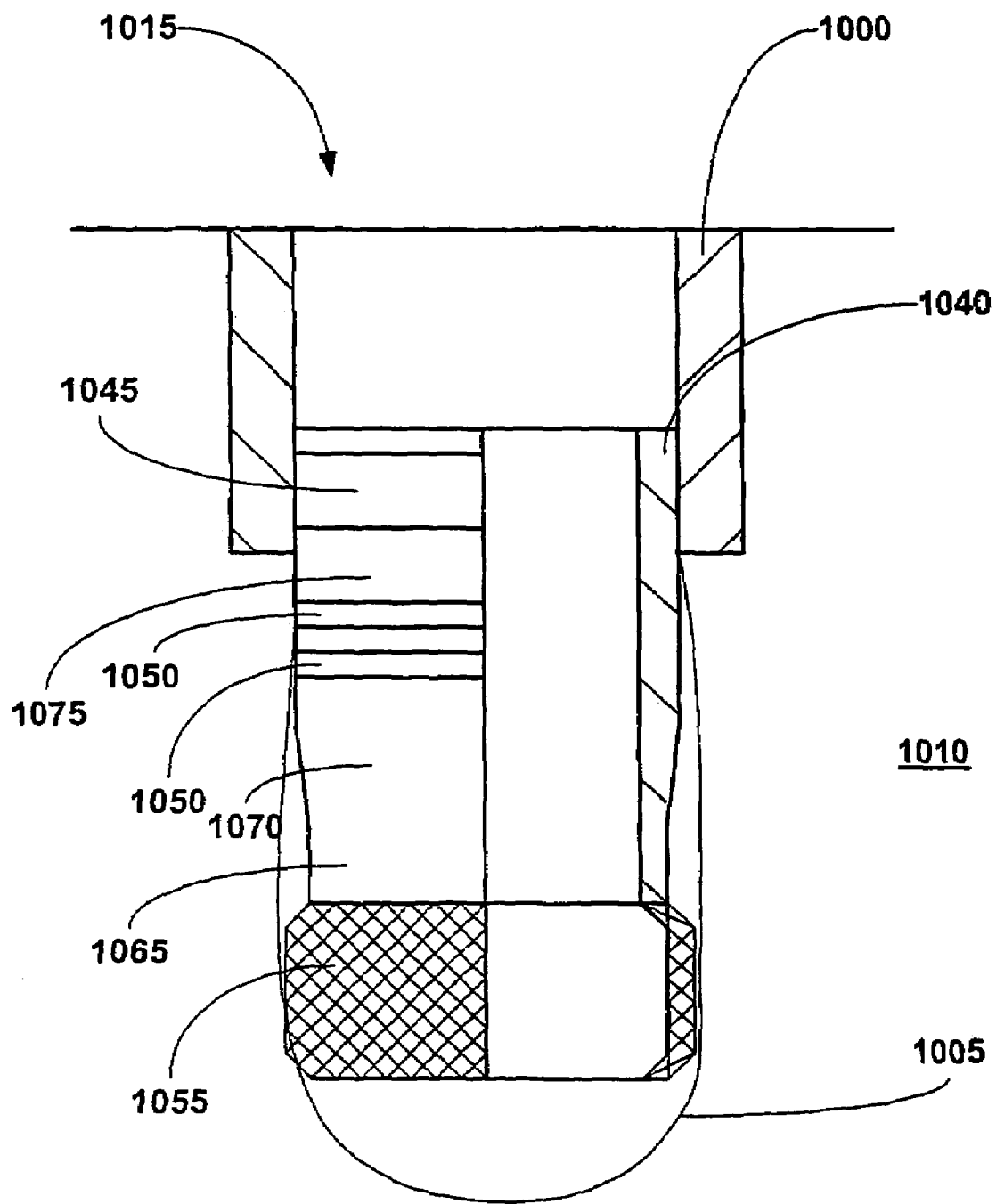
FIG. 10i is a fragmentary cross-sectional illustration of the apparatus of FIG. 10h after the decoupling and removal of the anchoring device of the apparatus from the wellbore casing.

As illustrated in FIGS. 10*h* and 10*i*, after the expandable tubular member 1040 has been radially expanded by the axial displacement of the expansion cone 1030, the first support member 1020 and the anchoring device 1035 are preferably removed from expandable tubular member 1040 by de-pressurizing the anchoring device 1035 and then lifting the first support member 1020 and anchoring device 1035 from the wellbore casing 1000 and the open hole wellbore section 1005.

In an exemplary embodiment, the resulting new section of wellbore casing includes the radially expanded tubular member 1040 and the outer annular layer of the cured fluidic sealing material. In this manner, a new section of wellbore casing is optimally provided. More generally, the apparatus 1015 is used to form and/or repair wellbore casings, pipelines, and structural supports.

Figure 11A:
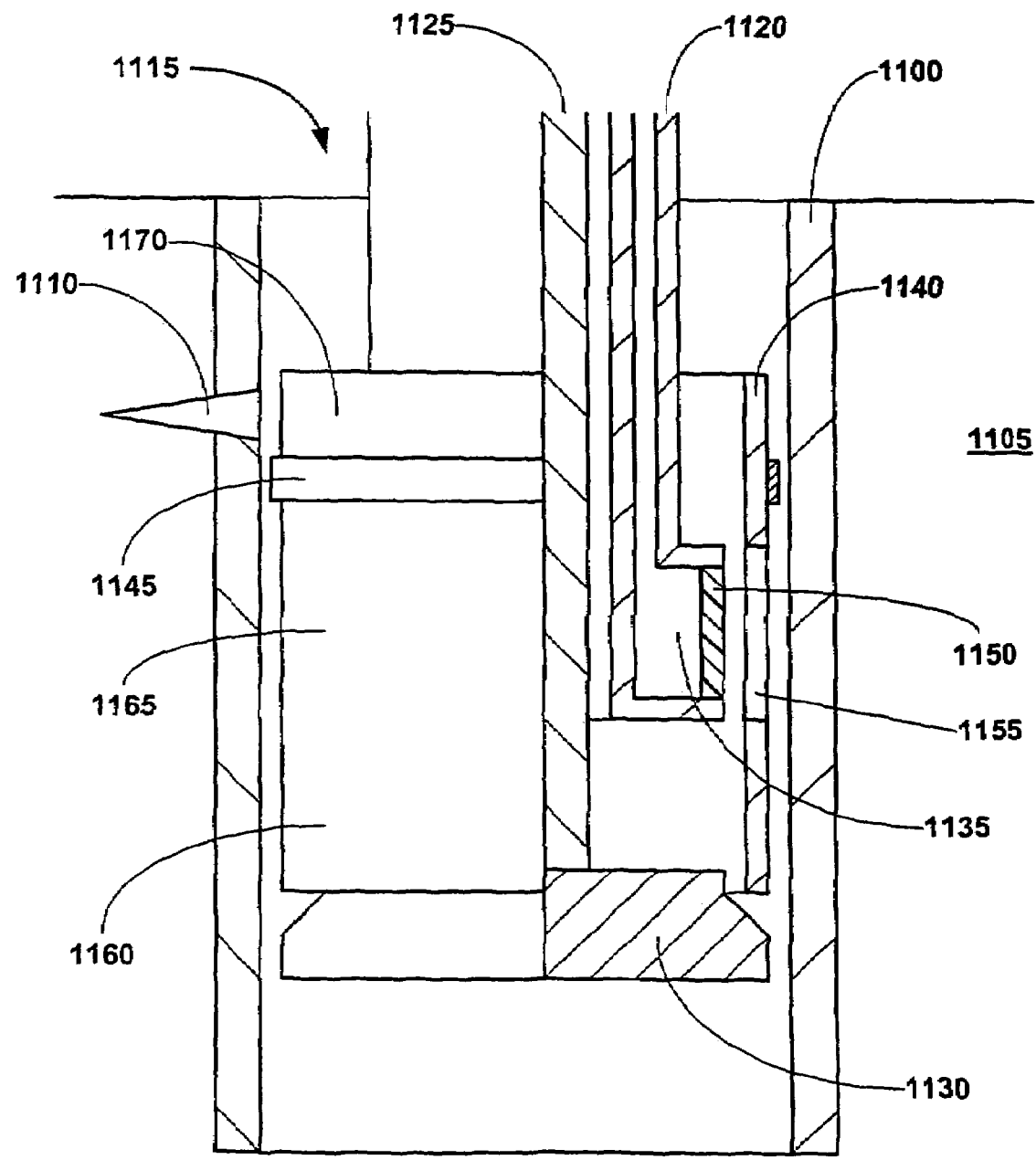
FIG. 11a is a fragmentary cross-sectional illustration of an alternative embodiment of an apparatus for coupling an expandable tubular member to a preexisting structure.

Referring to FIGS. 11a to 11g, an alternative embodiment of an apparatus and method for coupling an expandable tubular member to a preexisting structure will now be described. Referring to FIG. 11a, a wellbore casing 1100 is positioned within a subterranean formation 1105. The wellbore casing 1100 may be positioned in any orientation from the vertical direction to the horizontal direction. The wellbore casing 1100 further includes one or more openings 1110 that may have been the result of unintentional damage to the wellbore casing 1100, or due to a prior perforation or fracturing operation performed upon the surrounding subterranean formation 1105. As will be recognized by persons having ordinary skill in the art, the openings 1110 can adversely affect the subsequent operation and use of the wellbore casing 1100 unless they are sealed off.

In an exemplary embodiment, an apparatus 1115 is utilized to seal off the openings 1110 in the wellbore casing 1100. More generally, the apparatus 1115 is preferably utilized to form or repair wellbore casings, pipelines, or structural supports.

The apparatus 1115 preferably includes a first support member 1120, a second support member 1125, an expansion cone 1130, an anchoring device 1135, and expandable tubular member 1140, and one or more sealing members 1145.

The first support member 1120 is preferably adapted to be coupled to a surface location. The first support member 1120 is further coupled to the anchoring device 1135. The first support member 1120 is preferably adapted to convey pressurized fluidic materials and/or electrical current and/or communication signals from a surface location to the anchoring device 1135. The first support member 1120 preferably has a substantially hollow annular cross sectional shape. The first support member 1120 may, for example, be fabricated from conventional commercially available slick wire, braided wire, coiled tubing, or drilling stock material.

The second support member 1125 is preferably adapted to be coupled to a surface location. The second support member 1125 is further coupled to the expansion cone 1130. The second support member 1125 is preferably adapted to permit the expansion cone 1130 to be axially displaced relative to the first support member 1120. The second support member 1125 may, for example, be conventional commercially available slick wire, braided wire, coiled tubing, or drilling stock material.

In an exemplary embodiment, the first support member 1120 is coupled to a surface location by a slip joint and/or sliding sleeve apparatus that is concentrically coupled to the second support member 1125.

The expansion cone 1130 is coupled to the second support member 1125. The expansion cone 1130 is preferably adapted to radially expand the expandable tubular member 1140 when the expansion cone 1130 is axially displaced relative to the expandable tubular member 1140. In an exemplary embodiment, the expansion cone 1130 is provided substantially as disclosed in one or more of the following: (1) U.S. utility patent application Ser. No. 09/454,139, filed on Dec. 3, 1999, which claimed the benefit of the filing date of U.S. provisional patent application No. 60/111,293, filed on Dec. 7, 1998; (2) U.S. utility patent application Ser. No. 09/510,913, filed on Feb. 23, 2000, which claimed the benefit of the filing date of U.S. provisional application No. 60/121,702, filed on Feb. 25, 1999; (3) U.S. utility patent application Ser. No. 09/502,350, filed on Feb. 10, 2000, which claimed the benefit of the filing date of U.S. provisional application No. 60/119,611, (4) U.S. utility patent application Ser. No. 09/440,338, filed on Nov. 15, 1999, which claimed the benefit of the filing date of U.S. provisional application No. 60/108,558, filed on Nov. 16, 1998; (5) U.S. provisional patent application No. 60/183,546, filed on Feb. 18, 2000; (6) U.S. utility patent application Ser. No. 09/523,460, filed on Mar. 10, 2000, which claimed the benefit of the filing date of U.S. provisional application No. 60/124,042, filed on Mar. 11, 1999; (7) U.S. utility patent application Ser. No. 09/512,895, filed on Feb. 24, 2000, which claimed the benefit of the filing dates of U.S. provisional application No. 60/121,841, filed on Feb. 26, 1999 and U.S. provisional application No. 60/154,047, filed on Sep. 16, 1999; (8) U.S. utility application Ser. No. 09/511,941, filed on Feb. 24, 2000, which claimed the benefit of the filing date of U.S. provisional Ser. No. 60/121,907, filed on Feb. 26, 1999; (9) U.S. utility patent application Ser. No. 09/588,946, filed on Jun. 7, 2000, which claimed the benefit of the filing date of U.S. provisional patent application Ser. No. 60/137,998, filed on Jun. 7, 1999; (10) U.S. utility patent application Ser. No. 09/559,122, filed on Apr. 26, 2000, which claimed the benefit of the filing date of U.S. provisional application No. 60/131,106, filed on Apr. 26, 1999; (11) U.S. provisional application No. 60/146,203, filed on Jul. 29, 1999; (12) U.S. provisional application No. 60/143,039, filed on Jul. 9, 1999; (13) U.S. provisional patent application Ser. No. 60/162,671, filed on Nov. 1, 1999; (14) U.S. provisional application No. 60/159,039, filed on Oct. 12, 1999; (15) U.S. provisional patent application No. 60/159,033, filed on Oct. 12, 1999; and (16) U.S. provisional patent application No. 60/165,228, filed on Nov. 12, 1999, the disclosures of which are incorporated herein by reference.

The anchoring device 1135 is coupled to the first support member 1120. The anchoring device 1135 is preferably adapted to be controllably coupled to the expandable tubular member 1140 and the wellbore casing 1100. In this manner, the anchoring device 1135 preferably controllably anchors the expandable tubular member 1140 to the wellbore casing 1100 to facilitate the radial expansion of the expandable tubular member 1140 by the axial displacement of the expansion cone 1130. In an exemplary embodiment, the anchoring device 1135 includes one or more expandable elements 1150 that are adapted to controllably extend from the body of the anchoring device 1135 to engage both the expandable tubular member 1140 and the wellbore casing 1100. In an exemplary embodiment, the expandable elements 1150 are actuated using fluidic pressure. In an exemplary embodiment, the anchoring device 1135 is any one of the hydraulically actuated packers commercially available from Halliburton Energy Services or Baker-Hughes modified in accordance with the teachings of the present disclosure.

The expandable tubular member 1140 is removably coupled to the expansion cone 1130. The expandable tubular member 1140 is further preferably adapted to be removably coupled to the expandable elements 1150 of the anchoring device 1135. In an exemplary embodiment, the expandable tubular member 1140 includes one or more anchoring windows 1155 for permitting the expandable elements 1150 of the anchoring device 1135 to engage the wellbore casing 1100 and the expandable tubular member 1140.

In an exemplary embodiment, the expandable tubular member 1140 further includes a lower section 1160, an intermediate section 1165, and an upper section 1170. In an exemplary embodiment, the lower section 1160 rests upon and is supported by the expansion cone 1130. In an exemplary embodiment, the intermediate section 1165 includes the anchoring windows 1155 in order to provide anchoring at an intermediate portion of the expandable tubular member 1140.

In an exemplary embodiment, the expandable tubular member 1140 is further provided substantially as disclosed in one or more of the following: (1) U.S. utility patent application Ser. No. 09/454,139, filed on Dec. 3, 1999, which claimed the benefit of the filing date of U.S. provisional patent application No. 60/111,293, filed on Dec. 7, 1998; (2) U.S. utility patent application Ser. No. 09/510,913, filed on Feb. 23, 2000, which claimed the benefit of the filing date of U.S. provisional application No. 60/121,702, filed on Feb. 25, 1999; (3) U.S. utility patent application Ser. No. 09/502,350, filed on Feb. 10, 2000, which claimed the benefit of the filing date of U.S. provisional application No. 60/119,611, (4) U.S. utility patent application Ser. No. 09/440,338, filed on Nov. 15, 1999, which claimed the benefit of the filing date of U.S. provisional application No. 60/108,558, filed on Nov. 16, 1998; (5) U.S. provisional patent application No. 60/183,546, filed on Feb. 18, 2000; (6) U.S. utility patent application Ser. No. 09/523,460, filed on Mar. 10, 2000, which claimed the benefit of the filing date of U.S. provisional application No. 60/124,042, filed on Mar. 11, 1999; (7) U.S. utility patent application Ser. No. 09/512,895, filed on Feb. 24, 2000, which claimed the benefit of the filing dates of U.S. provisional application No. 60/121,841, filed on Feb. 26, 1999 and U.S. provisional application No. 60/154,047, filed on Sep. 16, 1999; (8) U.S. utility application Ser. No. 09/511,941, filed on Feb. 24, 2000, which claimed the benefit of the filing date of U.S. provisional Ser. No. 60/121,907, filed on Feb. 26, 1999; (9) U.S. utility patent application Ser. No. 09/588,946, filed on Jun. 7, 2000, which claimed the benefit of the filing date of U.S. provisional patent application Ser. No. 60/137,998, filed on Jun. 7, 1999; (10) U.S. utility patent application Ser. No. 09/559,122, filed on Apr. 26, 2000, which claimed the benefit of the filing date of U.S. provisional application No. 60/131,106, filed on Apr. 26, 1999; (11) U.S. provisional application No. 60/146,203, filed on Jul. 29, 1999; (12) U.S. provisional application No. 60/143,039, filed on Jul. 9, 1999; (13) U.S. provisional patent application Ser. No. 60/162,671, filed on Nov. 1, 1999; (14) U.S. provisional application No. 60/159,039, filed on Oct. 12, 1999; (15) U.S. provisional patent application No. 60/159,033, filed on Oct. 12, 1999; and (16) U.S. provisional patent application No. 60/165,228, filed on Nov. 12, 1999, the disclosures of which are incorporated herein by reference.

The sealing members 1145 are coupled to the outer surface of the expandable tubular member 1140. The sealing members 1145 are preferably adapted to engage and fluidicly seal the interface between the radially expanded expandable tubular member 1140 and the wellbore casing 1100. In an exemplary embodiment, the apparatus 1115 includes a plurality of sealing members 1145. In an exemplary embodiment, the sealing members 1145 surround and isolate the opening 1110.

As illustrated in FIG. 11*a*, the apparatus 1115 is preferably positioned within the wellbore casing 1100 with the expandable tubular member 1140 positioned in opposing relation to the opening 1110. In an exemplary embodiment, the apparatus 1115 includes a plurality of sealing members 1145 that are positioned above and below the opening 1110. In this manner, the radial expansion of the expandable tubular member 1140 optimally fluidicly isolates the opening 1110.

Figure 11B:
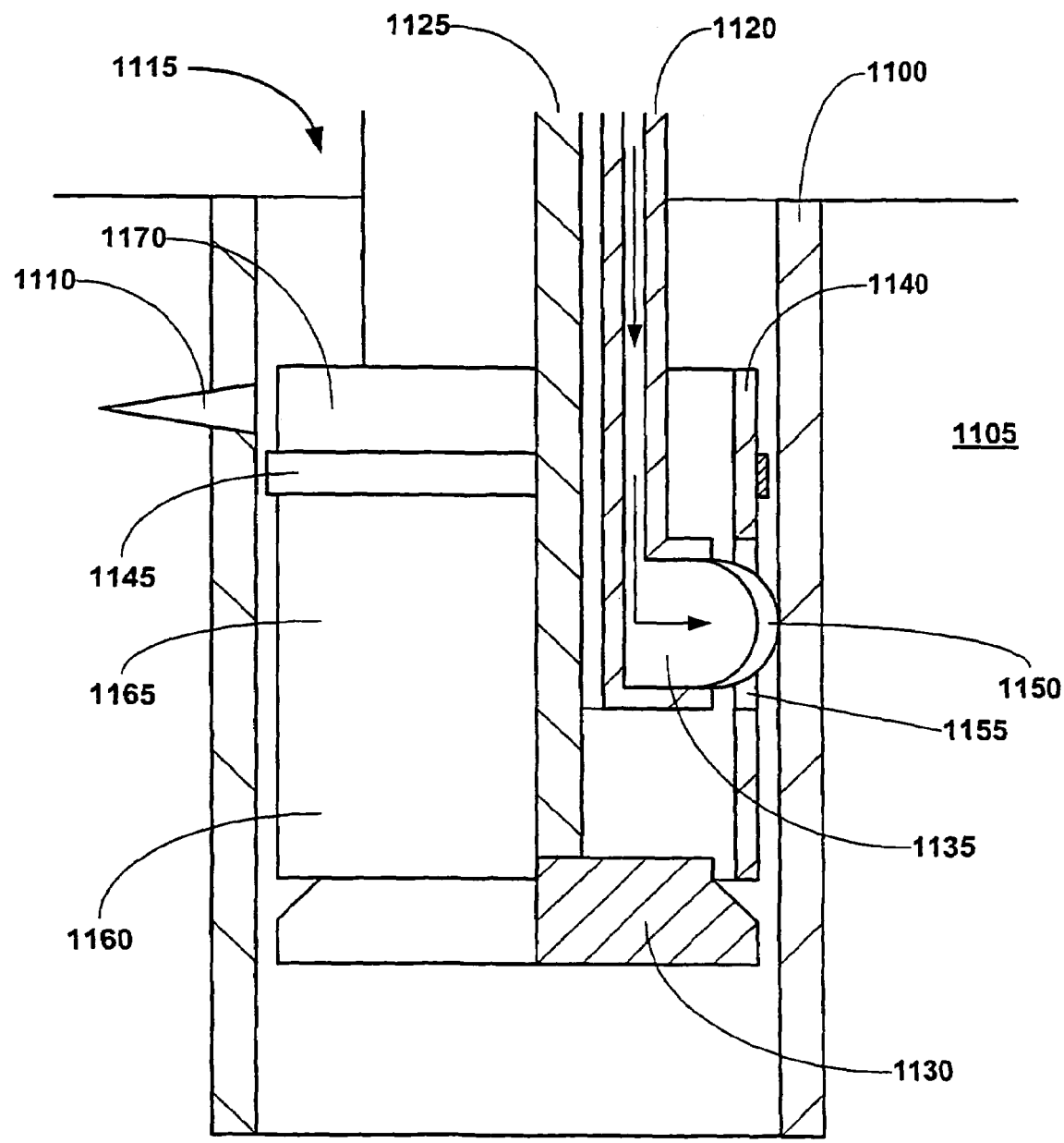
FIG. 11b is a fragmentary cross-sectional illustration of the apparatus of FIG. 11a after anchoring the expandable tubular member of the apparatus to the wellbore casing.

As illustrated in FIG. 11*b*, the apparatus 1115 is then anchored to the wellbore casing 1100 using the anchoring device 1135. In an exemplary embodiment, the anchoring device 1135 is pressurized and the expandable element 1150 is extended from the anchoring device 1135 through the corresponding anchoring window 1155 in the expandable tubular member 1140 into intimate contact with the wellbore casing 1100. In this manner, the intermediate section 1165 of the expandable tubular member 1140 is removably coupled to the wellbore casing 1100.

In an alternative embodiment, a compressible cement and/or epoxy is then injected into at least a portion of the annular space between the unexpanded portion of the tubular member 1140 and the wellbore casing 1100. The compressible cement and/or epoxy is then permitted to at least partially cure prior to the initiation of the radial expansion process. In this manner, an annular structural support and fluidic seal is provided around the tubular member 1140.

Figure 11C:
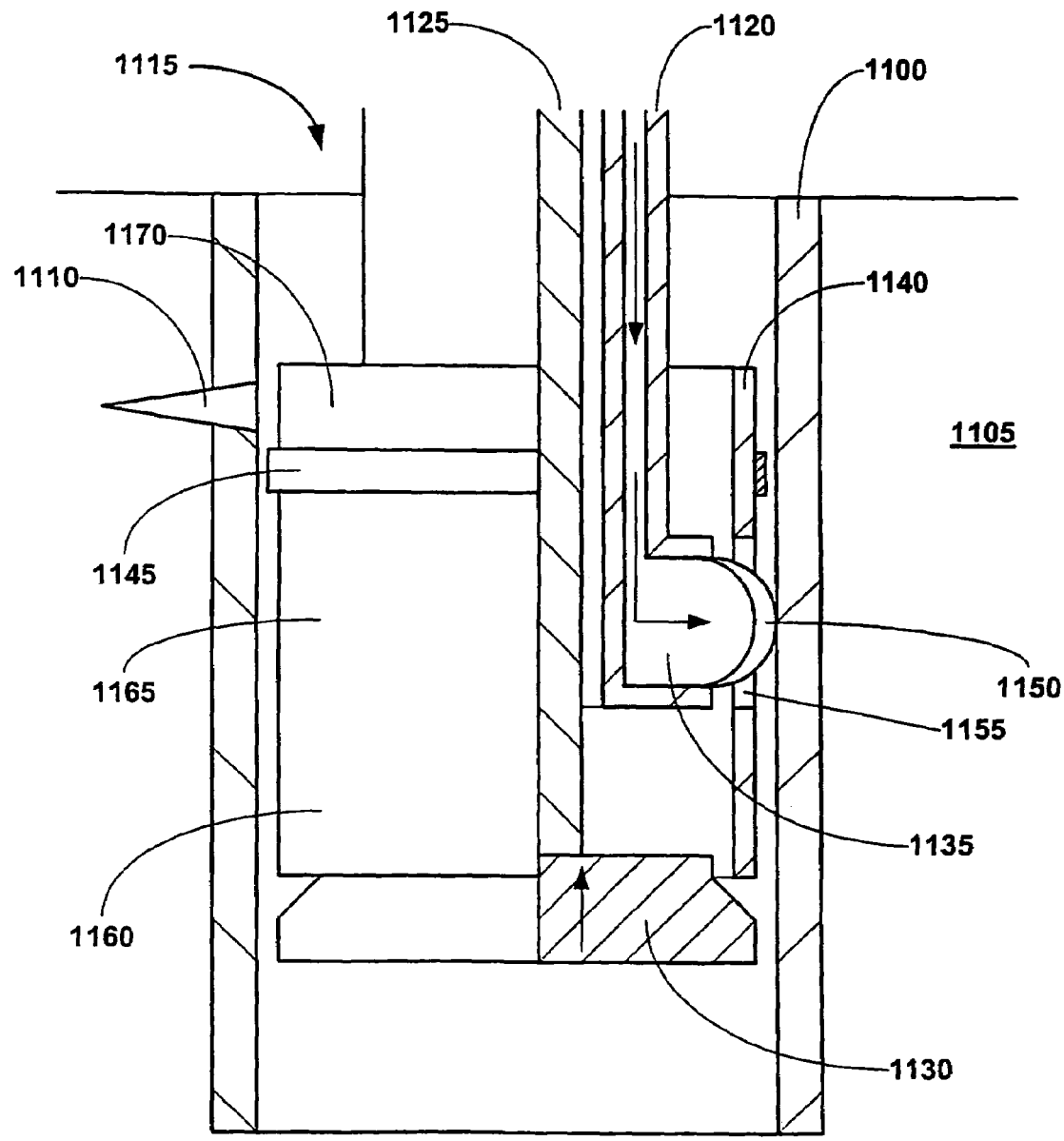
FIG. 11c is a fragmentary cross-sectional illustration of the apparatus of FIG. 11b after initiating the axial displacement of the expansion cone.

As illustrated in FIG. 11*c*, in an exemplary embodiment, the expansion cone 1130 is then axially displaced by applying an axial force to the second support member 1125. In an exemplary embodiment, the axial displacement of the expansion cone 1130 radially expands the lower section 1160 of the expandable tubular member 1140 into intimate contact with the walls of the wellbore or the wellbore casing 1100.

Figure 11D:
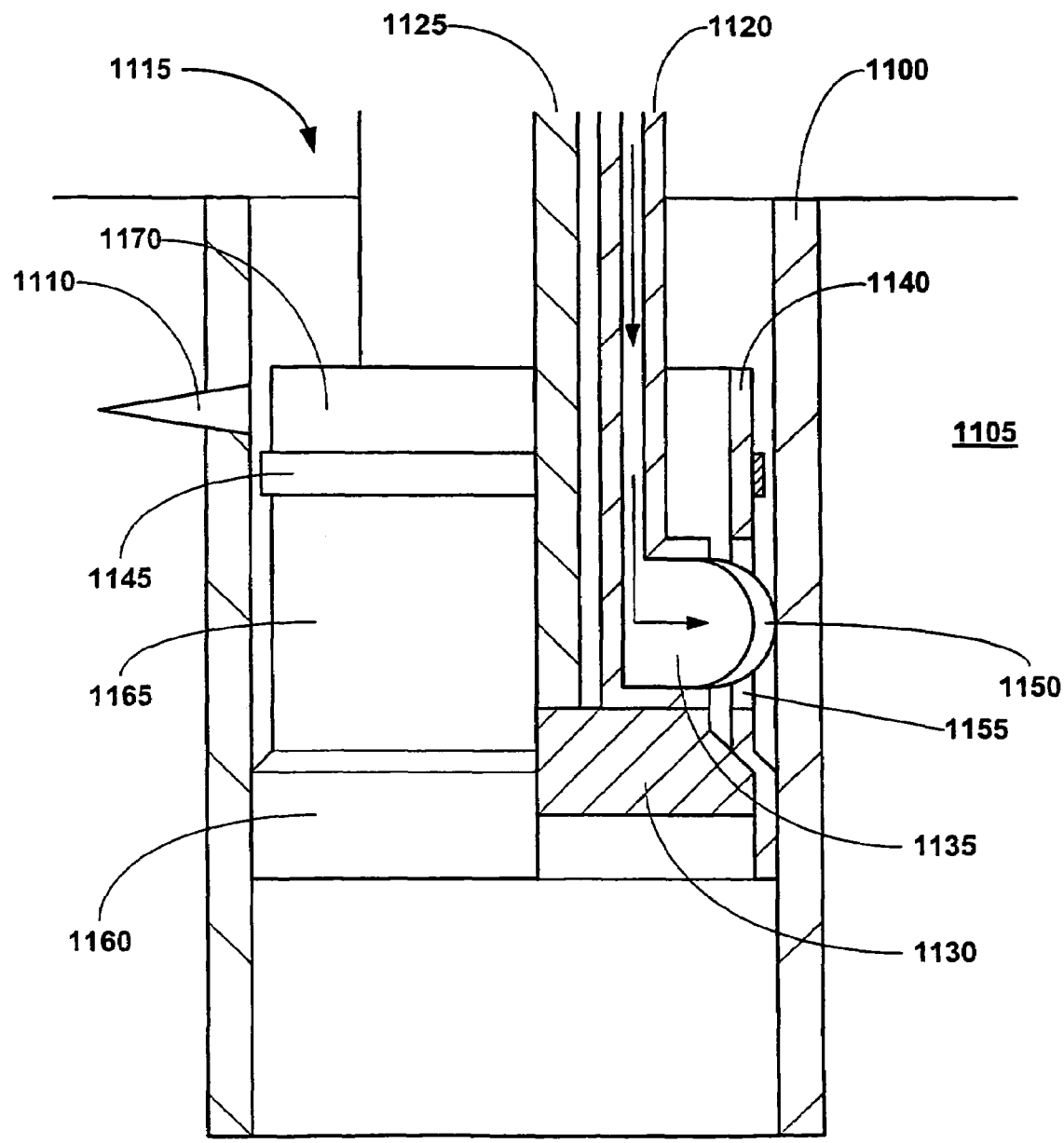
FIG. 11d is a fragmentary cross-sectional illustration of the apparatus of FIG. 11c after stopping the axial displacement of the expansion cone prior to deactivating the anchoring device.

As illustrated in FIG. 11*d*, in an exemplary embodiment, the axial displacement of the expansion cone 1130 is stopped once the expansion cone 1130 contacts the lower portion of the anchoring device 1135.

Figure 11E:
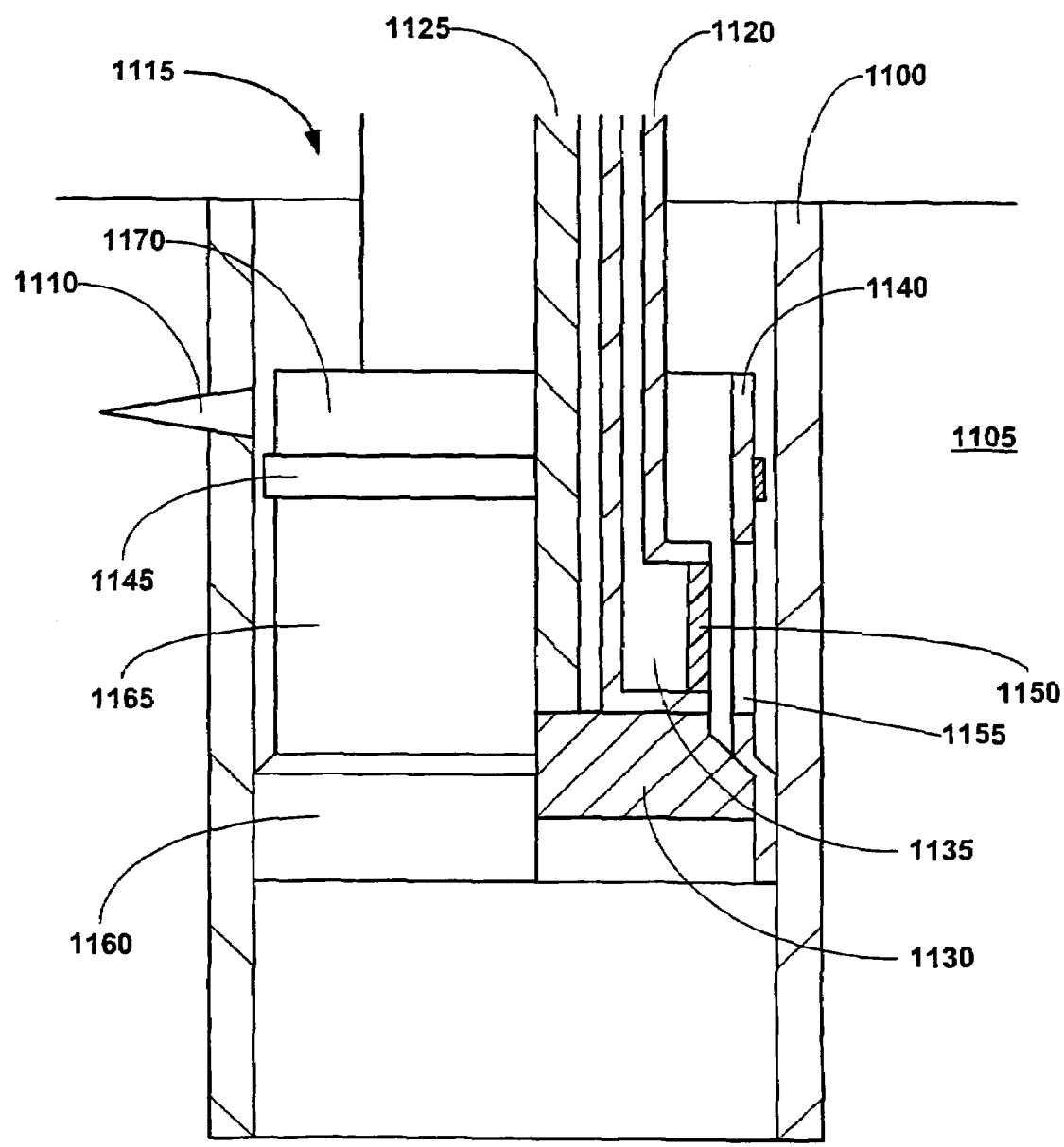
FIG. 11e is a fragmentary cross-sectional illustration of the apparatus of FIG. 11d after deactivating the anchoring device.

As illustrated in FIG. 11*e*, in an exemplary embodiment, the anchoring device 1135 is then decoupled from the wellbore casing 1100 and the expandable tubular member 1140.

Figure 11F:
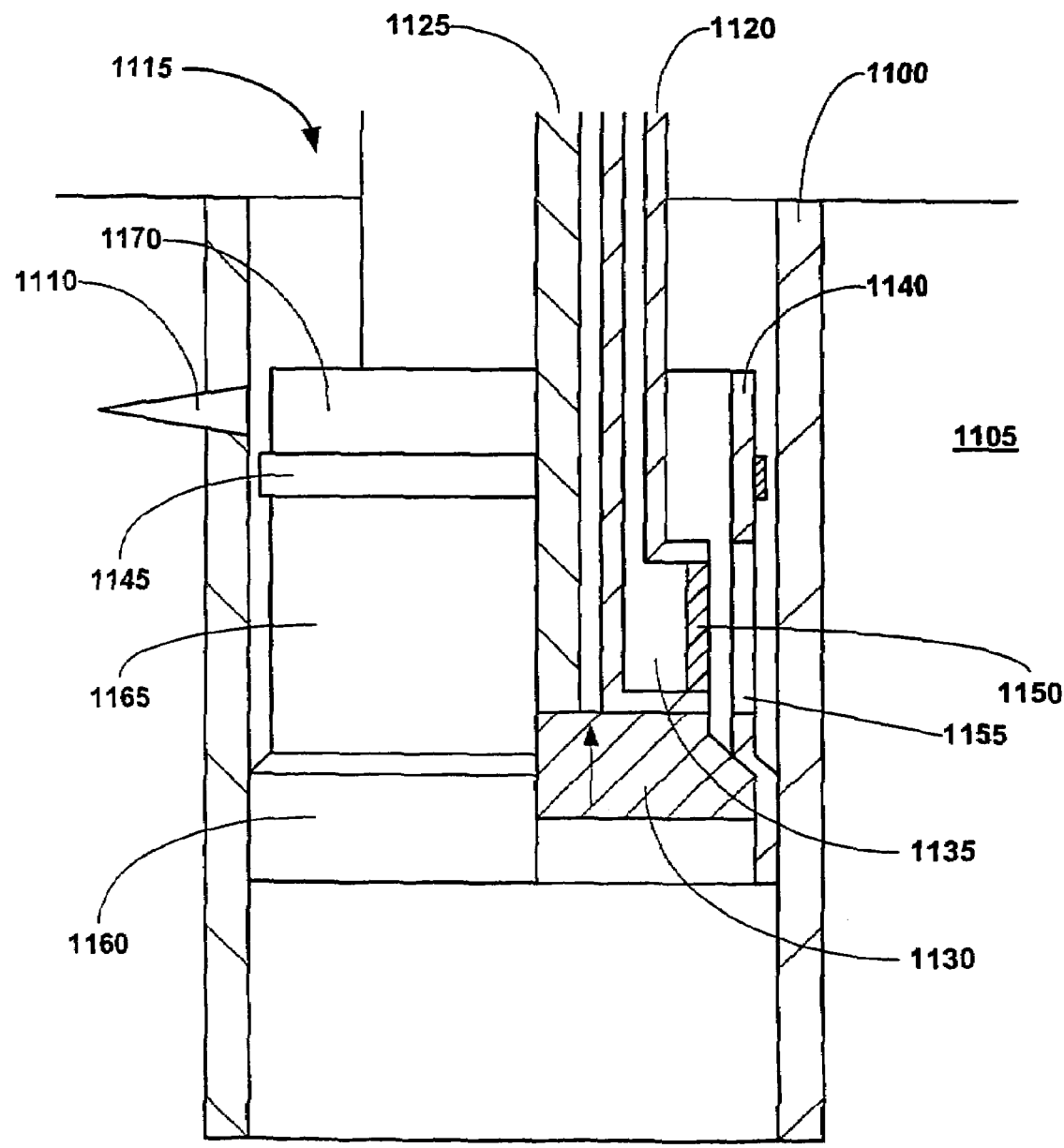
FIG. 11f is a fragmentary cross-sectional illustration of the apparatus of FIG. 11e after initiating the axial displacement of the expansion cone and the deactivated anchoring device.

As illustrated in FIG. 11*f*, in an exemplary embodiment, the axial displacement of the expansion cone 1130 is then resumed. In an exemplary embodiment, the anchoring device 1135 is also axial displaced. In this manner, the lower section 1160 of the expandable tubular member 1140 is self-anchored to the wellbore casing 1100. In an exemplary embodiment, the lower section 1160 of the expandable tubular member 1140 includes one or more outer rings or other coupling members to facilitate the self-anchoring of the lower section 1160 of the expandable tubular member 1140 to the wellbore or the wellbore casing 1100.

Figure 11G:
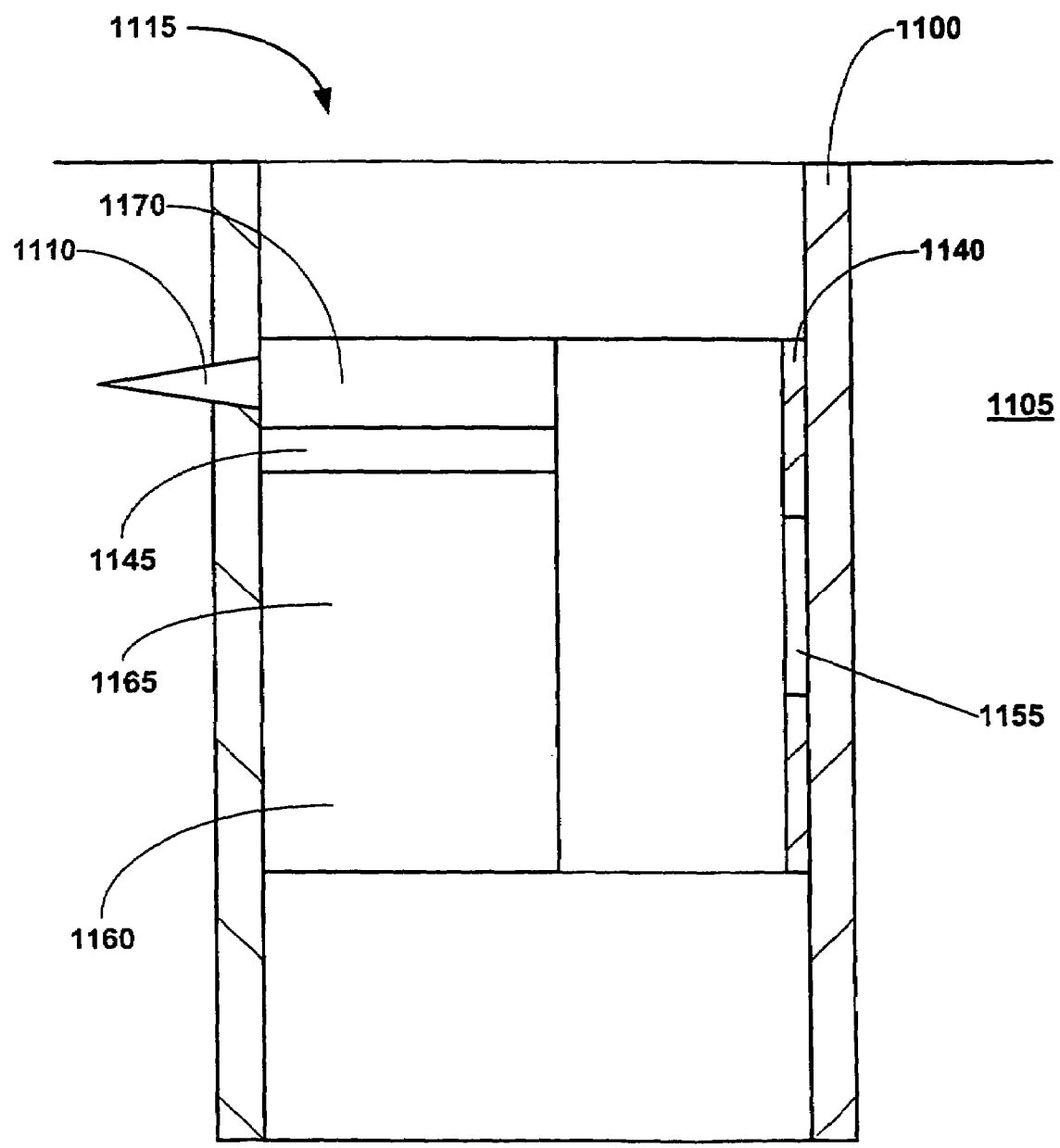
FIG. 11g is a fragmentary cross-sectional illustration of the apparatus of FIG. 11f after the completion of the radial expansion of the expandable tubular member.

As illustrated in FIG. 11*g*, after the expandable tubular member 1140 has been completely radially expanded by the axial displacement of the expansion cone 1130, the 1110 in the wellbore casing 1100 is sealed off by the radially expanded tubular member 1140. In this manner, repairs to the wellbore casing 1100 are optimally provided. More generally, the apparatus 1115 is used to repair or form wellbore casings, pipelines, and structural supports. In an exemplary embodiment, the inside diameter of the radially expanded tubular member 1140 is substantially constant.

Figure 12A:
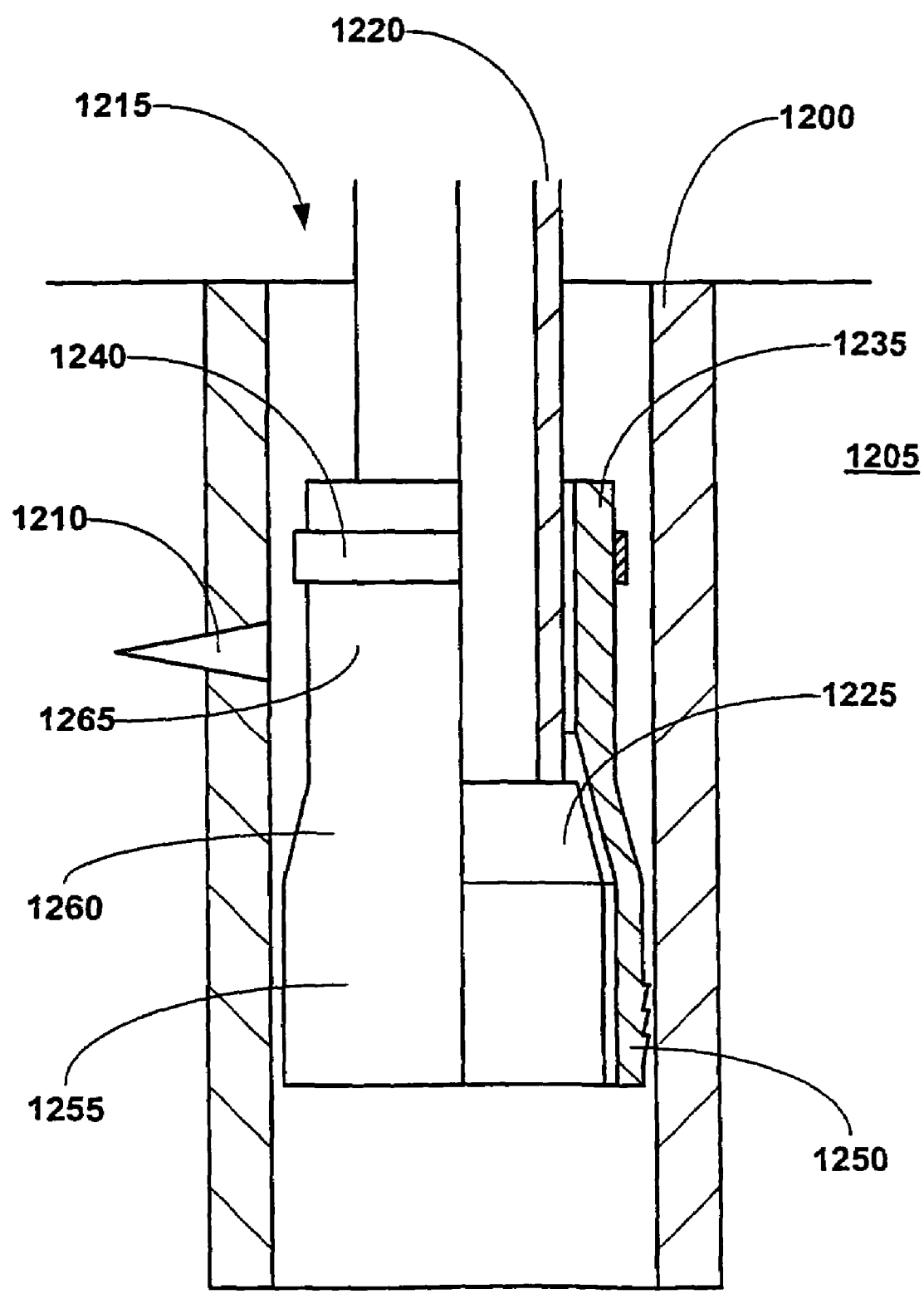
FIG. 12a is a fragmentary cross-sectional illustration of an alternative embodiment of an apparatus for coupling an expandable tubular member to a preexisting structure positioned within a wellbore.

Referring to FIGS. 12a to 12d, an alternative embodiment of an apparatus and method for coupling an expandable tubular member to a preexisting structure will now be described. Referring to FIG. 12a, a wellbore casing 1200 is positioned within a subterranean formation 1205. The wellbore casing 1200 may be positioned in any orientation from the vertical direction to the horizontal direction. The wellbore casing 1200 further includes one or more openings 1210 that may have been the result of unintentional damage to the wellbore casing 1200, or due to a prior perforation or fracturing operation performed upon the surrounding subterranean formation 1205. As will be recognized by persons having ordinary skill in the art, the openings 1210 can adversely affect the subsequent operation and use of the wellbore casing 1200 unless they are sealed off.

In an exemplary embodiment, an apparatus 1215 is utilized to seal off the openings 1210 in the wellbore casing 1200. More generally, the apparatus 1215 is preferably utilized to form or repair wellbore casings, pipelines, or structural supports.

The apparatus 1215 preferably includes a support member 1220, an expandable expansion cone 1225, an expandable tubular member 1235, and one or more sealing members 1240.

The support member 1220 is preferably adapted to be coupled to a surface location. The support member 1220 is further coupled to the expandable expansion cone 1225. The support member 320 is preferably adapted to convey pressurized fluidic materials and/or electrical current and/or communication signals from a surface location to the expandable expansion cone. The support member 1220 may, for example, be conventional commercially available slick wire, braided wire, coiled tubing, or drilling stock material.

The expandable expansion cone 1225 is coupled to the support member 1220. The expandable expansion cone 1225 is preferably adapted to radially expand the expandable tubular member 1235 when the expandable expansion cone 1225 is axially displaced relative to the expandable tubular member 1235. The expandable expansion cone 1225 is further preferably adapted to radially expand at least a portion of the expandable tubular member 1235 when the expandable expansion cone 1225 is controllably radially expanded. The expandable expansion cone 1225 may be any number of conventional commercially available radially expandable expansion cones. In an exemplary embodiment, the expandable expansion cone 1225 is provided substantially as disclosed in U.S. Pat. No. 5,348,095, the disclosure of which is incorporated herein by reference.

In an exemplary embodiment, the expansion cone 1225 is further provided substantially as disclosed in one or more of the following: (1) U.S. utility patent application Ser. No. 09/454,139, filed on Dec. 3, 1999, which claimed the benefit of the filing date of U.S. provisional patent application No. 60/111,293, filed on Dec. 7, 1998; (2) U.S. utility patent application Ser. No. 09/510,913, filed on Feb. 23, 2000, which claimed the benefit of the filing date of U.S. provisional application No. 60/121,702, filed on Feb. 25, 1999; (3) U.S. utility patent application Ser. No. 09/502,350, filed on Feb. 10, 2000, which claimed the benefit of the filing date of U.S. provisional application No. 60/119,611, (4) U.S. utility patent application Ser. No. 09/440,338, filed on Nov. 15, 1999, which claimed the benefit of the filing date of U.S. provisional application No. 60/108,558, filed on Nov. 16, 1998; (5) U.S. provisional patent application No. 60/183,546, filed on Feb. 18, 2000; (6) U.S. utility patent application Ser. No. 09/523,460, filed on Mar. 10, 2000, which claimed the benefit of the filing date of U.S. provisional application No. 60/124,042, filed on Mar. 11, 1999; (7) U.S. utility patent application Ser. No. 09/512,895, filed on Feb. 24, 2000, which claimed the benefit of the filing dates of U.S. provisional application No. 60/121,841, filed on Feb. 26, 1999 and U.S. provisional application No. 60/154,047, filed on Sep. 16, 1999; (8) U.S. utility application Ser. No. 09/511,941, filed on Feb. 24, 2000, which claimed the benefit of the filing date of U.S. provisional Ser. No. 60/121,907, filed on Feb. 26, 1999; (9) U.S. utility patent application Ser. No. 09/588,946, filed on Jun. 7, 2000, which claimed the benefit of the filing date of U.S. provisional patent application Ser. No. 60/137,998, filed on Jun. 7, 1999; (10) U.S. utility patent application Ser. No. 09/559,122, filed on Apr. 26, 2000, which claimed the benefit of the filing date of U.S. provisional application No. 60/131,106, filed on Apr. 26, 1999; (11) U.S. provisional application No. 60/146,203, filed on Jul. 29, 1999; (12) U.S. provisional application No. 60/143,039, filed on Jul. 9, 1999; (13) U.S. provisional patent application Ser. No. 60/162,671, filed on Nov. 1, 1999; (14) U.S. provisional application No. 60/159,039, filed on Oct. 12, 1999; (15) U.S. provisional patent application No. 60/159,033, filed on Oct. 12, 1999; and (16) U.S. provisional patent application No. 60/165,228, filed on Nov. 12, 1999, the disclosures of which are incorporated herein by reference.

The expandable tubular member 1235 is removably coupled to the expansion cone 1225. In an exemplary embodiment, the expandable tubular member 1235 includes one or more engagement devices 1250 that are adapted to couple with and penetrate the wellbore casing 1200. In this manner, the expandable tubular member 1235 is optimally coupled to the wellbore casing 1200. In an exemplary embodiment, the engagement devices 1250 include teeth for biting into the surface of the wellbore casing 1200.

In an exemplary embodiment, the expandable tubular member 1235 further includes a lower section 1255, an intermediate section 1260, and an upper section 1265. In an exemplary embodiment, the lower section 1255 includes the engagement devices 1250 in order to provide anchoring at an end portion of the expandable tubular member 1235. In an exemplary embodiment, the wall thickness of the lower and intermediate sections, 1255 and 1260, are less than the wall thickness of the upper section 1265 in order to optimally faciliate the radial expansion of the lower and intermediate sections, 1255 and 1260, of the expandable tubular member 1235. In an alternative embodiment, the lower section 1255 of the expandable tubular member 1235 is slotted in order to optimally facilitate the radial expansion of the lower section 1255 of the expandable tubular member 1235 using the expandable expansion cone 1225.

In an exemplary embodiment, the expandable tubular member 1235 is further provided substantially as disclosed in one or more of the following: (1) U.S. utility patent application Ser. No. 09/454,139, filed on Dec. 3, 1999, which claimed the benefit of the filing date of U.S. provisional patent application No. 60/111,293, filed on Dec. 7, 1998; (2) U.S. utility patent application Ser. No. 09/510,913, filed on Feb. 23, 2000, which claimed the benefit of the filing date of U.S. provisional application No. 60/121,702, filed on Feb. 25, 1999; (3) U.S. utility patent application Ser. No. 09/502,350, filed on Feb. 10, 2000, which claimed the benefit of the filing date of U.S. provisional application No. 60/119,611, (4) U.S. utility patent application Ser. No. 09/440,338, filed on Nov. 15, 1999, which claimed the benefit of the filing date of U.S. provisional application No. 60/108,558, filed on Nov. 16, 1998; (5) U.S. provisional patent application No. 60/183,546, filed on Feb. 18, 2000;

(6) U.S. utility patent application Ser. No. 09/523,460, filed on Mar. 10, 2000, which claimed the benefit of the filing date of U.S. provisional application No. 60/124,042, filed on Mar. 11, 1999; (7) U.S. utility patent application Ser. No. 09/512,895, filed on Feb. 24, 2000, which claimed the benefit of the filing dates of U.S. provisional application No. 60/121,841, filed on Feb. 26, 1999 and U.S. provisional application No. 60/154,047, filed on Sep. 16, 1999; (8) U.S. utility application Ser. No. 09/511,941, filed on Feb. 24, 2000, which claimed the benefit of the filing date of U.S. provisional Ser. No. 60/121,907, filed on Feb. 26, 1999; (9) U.S. utility patent application Ser. No. 09/588,946, filed on Jun. 7, 2000, which claimed the benefit of the filing date of U.S. provisional patent application Ser. No. 60/137,998, filed on Jun. 7, 1999; (10) U.S. utility patent application Ser. No. 09/559,122, filed on Apr. 26, 2000, which claimed the benefit of the filing date of U.S. provisional application No. 60/131,106, filed on Apr. 26, 1999; (11) U.S. provisional application No. 60/146,203, filed on Jul. 29, 1999; (12) U.S. provisional application No. 60/143,039, filed on Jul. 9, 1999; (13) U.S. provisional patent application Ser. No. 60/162,671, filed on Nov. 1, 1999; (14) U.S. provisional application No. 60/159,039, filed on Oct. 12, 1999; (15) U.S. provisional patent application Ser. No. 60/159,033, filed on Oct. 12, 1999; and (16) U.S. provisional patent application No. 60/165,228, filed on Nov. 12, 1999, the disclosures of which are incorporated herein by reference.

The sealing members 1240 are preferably coupled to the outer surface of the upper portion 1265 of the expandable tubular member 1235. The sealing members 1240 are preferably adapted to engage and fluidicly seal the interface between the radially expanded expandable tubular member 1235 and the wellbore casing 1200. In an exemplary embodiment, the apparatus 1215 includes a plurality of sealing members 1240. In an exemplary embodiment, the sealing members 1240 surround and isolate the opening 1210.

As illustrated in FIG. 12*a*, the apparatus 1215 is preferably positioned within the wellbore casing 1200 with the expandable tubular member 1235 positioned in opposing relation to the opening 1210. In an exemplary embodiment, the apparatus 1215 includes a plurality of sealing members 1240 that are positioned above and below the opening 1210. In this manner, the radial expansion of the expandable tubular member 1235 optimally fluidicly isolates the opening 1210.

Figure 12B:
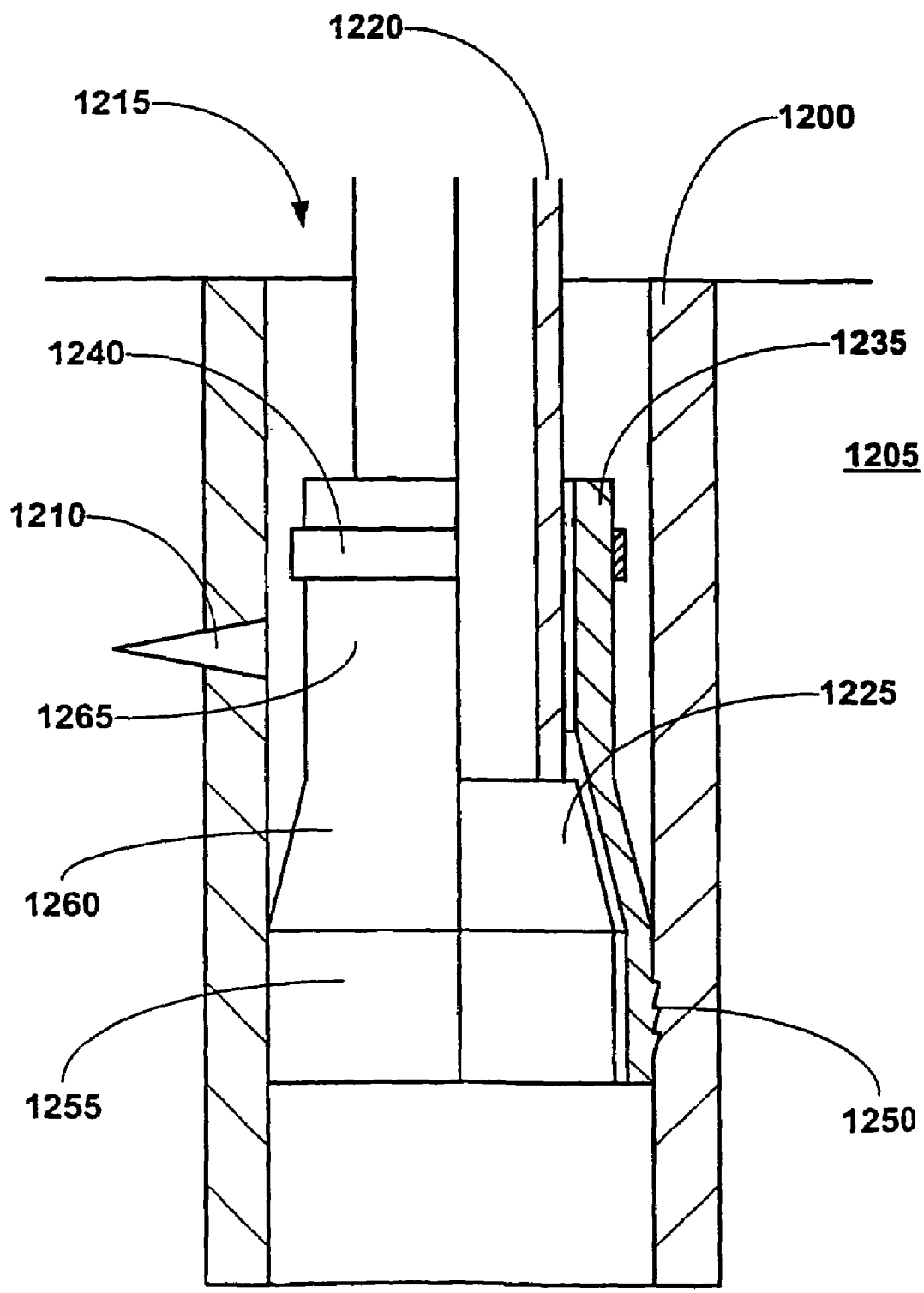
FIG. 12b is a fragmentary cross-sectional illustration of the apparatus of FIG. 12a after expanding the expandable expansion cone in order to anchor the expandable tubular member to the wellbore casing.

As illustrated in FIG. 12*b*, the expandable tubular member 1235 of the apparatus 1215 is then anchored to the wellbore casing 1200 by expanding the expandable expansion cone 1225 into contact with the lower section 1255 of the expandable tubular member 1235. In an exemplary embodiment, the lower section 1255 of the expandable tubular member 1235 is radially expanded into intimate contact with the wellbore casing 1200. In an exemplary embodiment, the engagement devices 1250 are thereby coupled to, and at least partially penetrate into, the wellbore casing 1200. In this manner, the lower section 1255 of the expandable tubular member 1235 is optimally coupled to the wellbore casing 1200.

In an alternative embodiment, a compressible cement and/or epoxy is then injected into the annular space between the unexpanded portion of the tubular member 1235 and the wellbore casing 1200. The compressible cement and/or epoxy may then be permitted to at least partially cure prior to the initiation of the radial expansion process. In this manner, an annular structural support and fluidic seal is provided around the tubular member 1235.

Figure 12C:
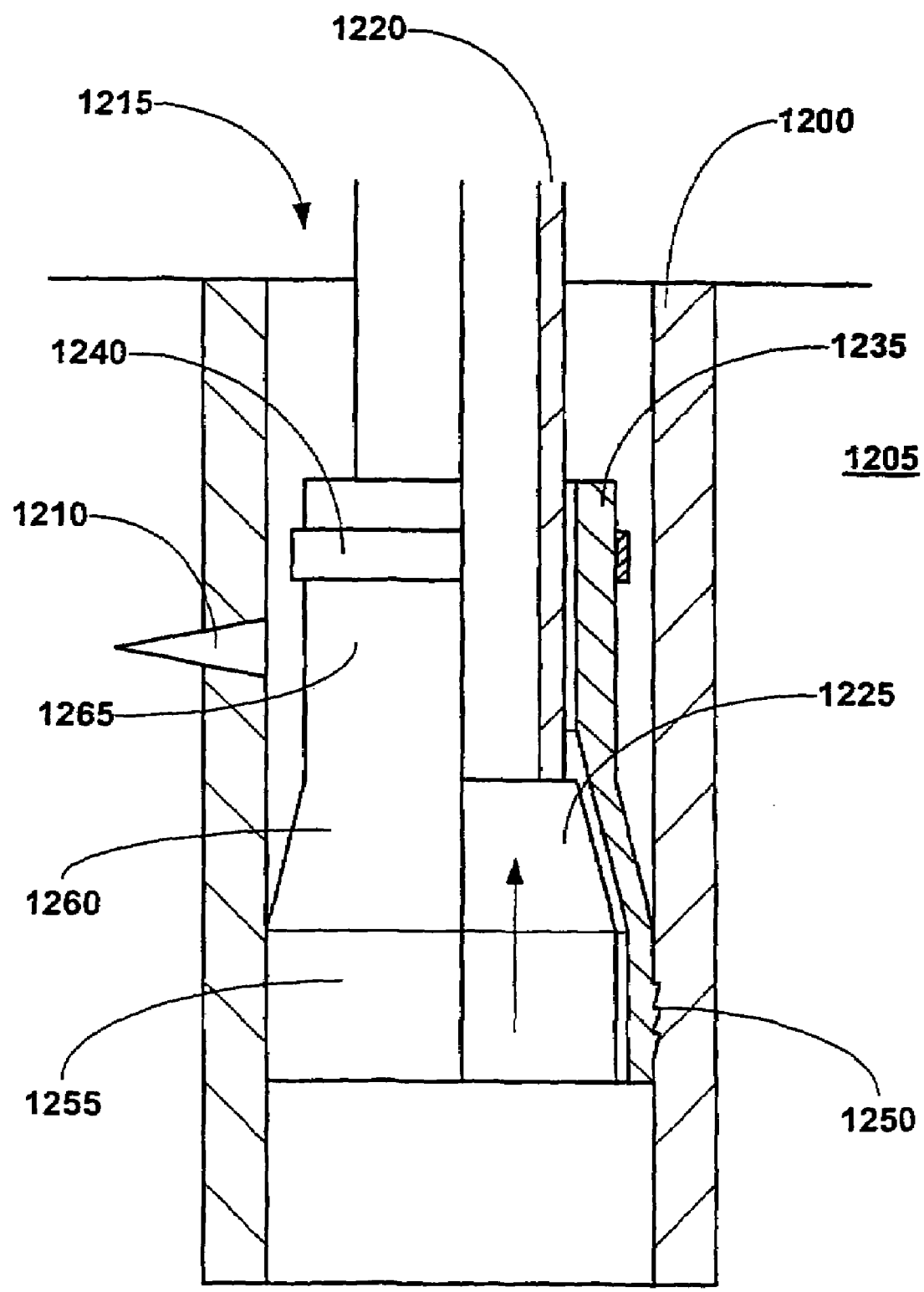
FIG. 12c is a fragmentary cross-sectional illustration of the apparatus of FIG. 12b after initiating the axial displacement of the expandable expansion cone.

As illustrated in FIG. 12*c*, the expandable expansion cone 1225 is then axially displaced by applying an axial force to the support member 1220. In an exemplary embodiment, the axial displacement of the expansion cone 1225 radially expands the expandable tubular member 1235 into intimate contact with the walls of the wellbore casing 1200.

Figure 12D:
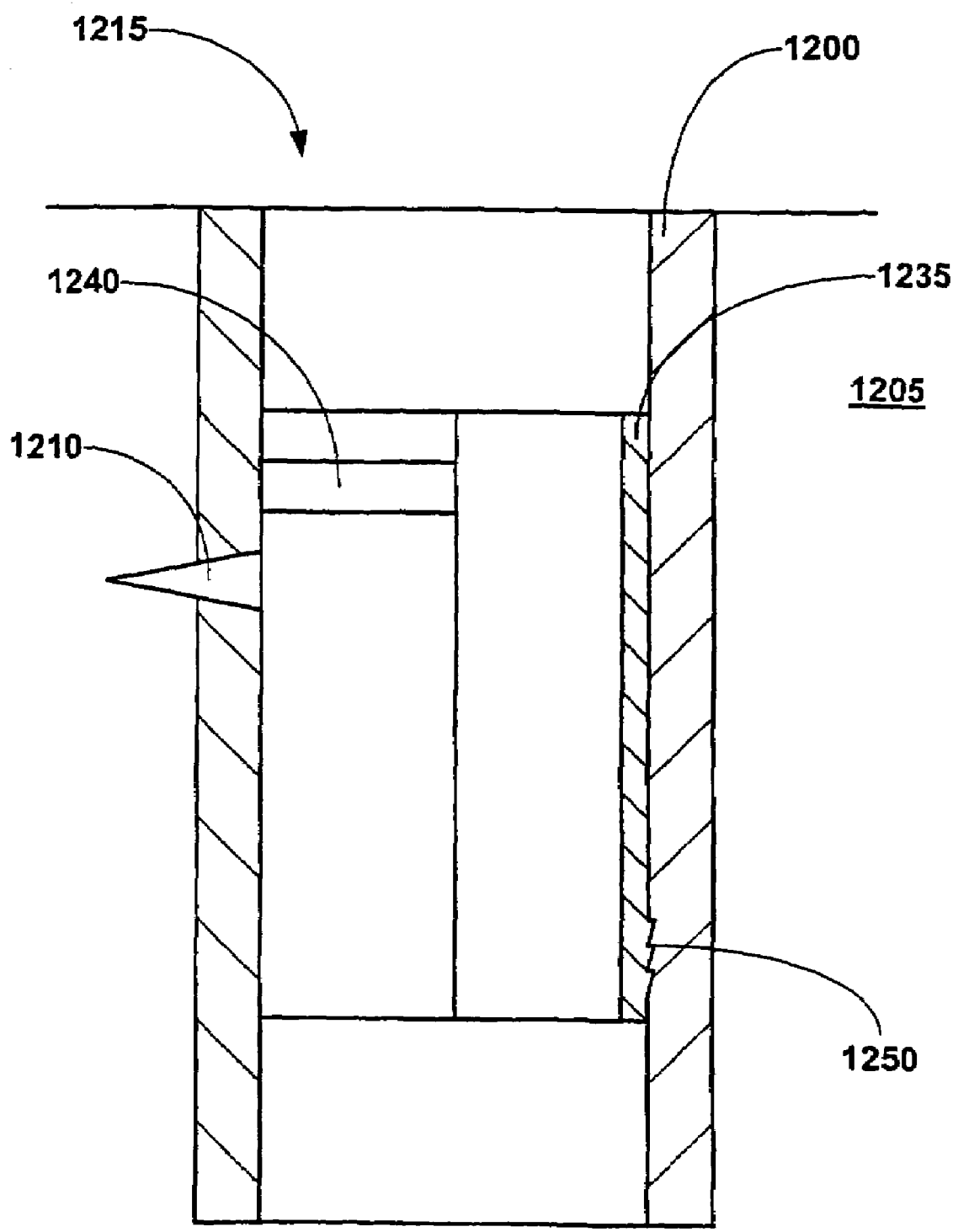
FIG. 12d is a fragmentary cross-sectional illustration of the apparatus of FIG. 12c after completing the radial expansion of the expandable tubular member.

As illustrated in FIG. 12*d*, in an exemplary embodiment, after the expandable tubular member 1235 has been radially expanded by the axial displacement of the expandable expansion cone 1235, the opening 1210 in the wellbore casing 1200 is sealed off by the radially expanded tubular member 1235. In this manner, repairs to the wellbore casing 1200 are optimally provided. More generally, the apparatus 1215 is used to repair or form wellbore casings, pipelines, and structural supports.

Figure 13A:
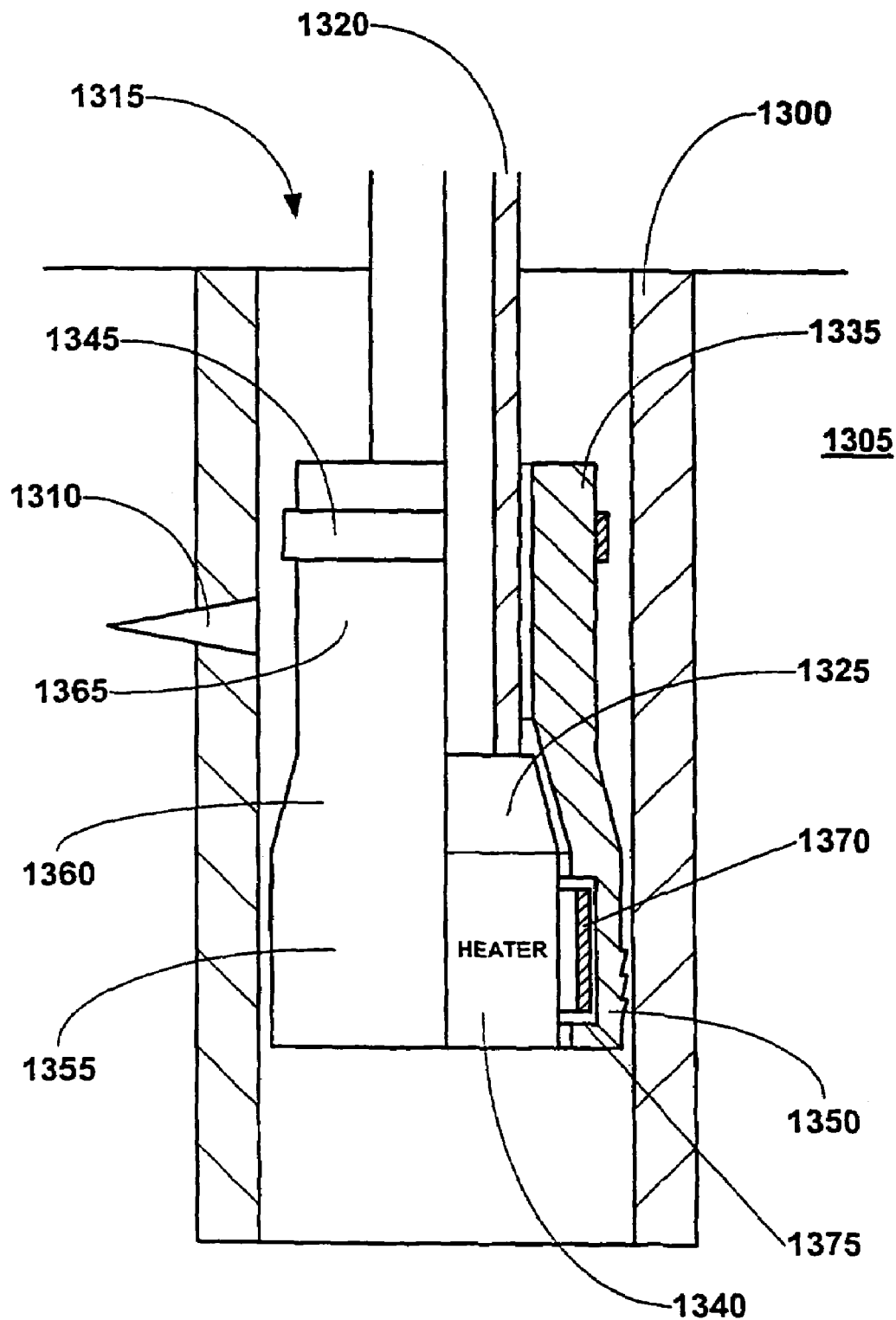
FIG. 13a is a fragmentary cross-sectional illustration of an alternative embodiment of an apparatus for coupling an expandable tubular member to a preexisting structure positioned within a wellbore.

Referring to FIGS. 13*a* to 13*d*, an alternative embodiment of an apparatus and method for coupling an expandable tubular member to a preexisting structure will now be described. Referring to FIG. 13*a*, a wellbore casing 1300 is positioned within a subterranean formation 1305. The wellbore casing 1300 may be positioned in any orientation from the vertical direction to the horizontal direction. The wellbore casing 1300 further includes one or more openings 1310 that may have been the result of unintentional damage to the wellbore casing 1300, or due to a prior perforation or fracturing operation performed upon the surrounding subterranean formation 1305. As will be recognized by persons having ordinary skill in the art, the openings 1310 can adversely affect the subsequent operation and use of the wellbore casing 1300 unless they are sealed off.

In an exemplary embodiment, an apparatus 1315 is utilized to seal off the openings 1310 in the wellbore casing 1300. More generally, the apparatus 1315 is preferably utilized to form or repair wellbore casings, pipelines, or structural supports.

The apparatus 1315 preferably includes a support member 1320, an expansion cone 1325, an expandable tubular member 1335, a heater 1340, and one or more sealing members 1345.

The support member 1320 is preferably adapted to be coupled to a surface location. The support member 1320 is further coupled to the expansion cone 1325. The support member 1320 is preferably adapted to convey pressurized fluidic materials and/or electrical current and/or communication signals from a surface location to the expansion cone 1325 and heater 1340. The support member 1320 may, for example, be conventional commercially available slick wire, braided wire, coiled tubing, or drilling stock material.

The expansion cone 1325 is coupled to the support member 1320. The expansion cone 1325 is preferably adapted to radially expand the expandable tubular member 1335 when the expansion cone 1325 is axially displaced relative to the expandable tubular member 1335. The expansion cone 1325 may be any number of conventional commercially available expansion cones.

In an exemplary embodiment, the expansion cone 1325 is further provided substantially as disclosed in one or more of the following: (1) U.S. utility patent application Ser. No. 09/454,139, filed on Dec. 3, 1999, which claimed the benefit of the filing date of U.S. provisional patent application No. 60/111,293, filed on Dec. 7, 1998; (2) U.S. utility patent application Ser. No. 09/510,913, filed on Feb. 23, 2000, which claimed the benefit of the filing date of U.S. provisional application No. 60/121,702, filed on Feb. 25, 1999; (3) U.S. utility patent application Ser. No. 09/502,350, filed on Feb. 10, 2000, which claimed the benefit of the filing date of U.S. provisional application No. 60/119,611, (4) U.S.

utility patent application Ser. No. 09/440,338, filed on Nov. 15, 1999, which claimed the benefit of the filing date of U.S. provisional application No. 60/108,558, filed on Nov. 16, 1998; (5) U.S. provisional patent application No. 60/183,546, filed on Feb. 18, 2000; (6) U.S. utility patent application Ser. No. 09/523,460, filed on Mar. 10, 2000, which claimed the benefit of the filing date of U.S. provisional application No. 60/124,042, filed on Mar. 11, 1999; (7) U.S. utility patent application Ser. No. 09/512,895, filed on Feb. 24, 2000, which claimed the benefit of the filing dates of U.S. provisional application No. 60/121,841, filed on Feb. 26, 1999 and U.S. provisional application No. 60/154,047, filed on Sep. 16, 1999; (8) U.S. utility application Ser. No. 09/511,941, filed on Feb. 24, 2000, which claimed the benefit of the filing date of U.S. provisional Ser. No. 60/121,907, filed on Feb. 26, 1999; (9) U.S. utility patent application Ser. No. 09/588,946, filed on Jun. 7, 2000, which claimed the benefit of the filing date of U.S. provisional patent application Ser. No. 60/137,998, filed on Jun. 7, 1999; (10) U.S. utility patent application Ser. No. 09/559,122, filed on Apr. 26, 2000, which claimed the benefit of the filing date of U.S. provisional application No. 60/131,106, filed on Apr. 26, 1999; (11) U.S. provisional application No. 60/146,203, filed on Jul. 29, 1999; (12) U.S. provisional application No. 60/143,039, filed on Jul. 9, 1999; (13) U.S. provisional patent application Ser. No. 60/162,671, filed on Nov. 1, 1999; (14) U.S. provisional application No. 60/159,039, filed on Oct. 12, 1999; (15) U.S. provisional patent application No. 60/159,033, filed on Oct. 12, 1999; and (16) U.S. provisional patent application No. 60/165,228, filed on Nov. 12, 1999, the disclosures of which are incorporated herein by reference.

The expandable tubular member 1335 is removably coupled to the expansion cone 1325. In an exemplary embodiment, the expandable tubular member 1335 includes one or more engagement devices 1350 that are adapted to couple with and penetrate the wellbore casing 1300. In this manner, the expandable tubular member 1335 is optimally coupled to the wellbore casing 1300. In an exemplary embodiment, the engagement devices 1350 include teeth for biting into the surface of the wellbore casing 1300.

In an exemplary embodiment, the expandable tubular member 1335 further includes a lower section 1355, an intermediate section 1360, and an upper section 1365. In an exemplary embodiment, the lower section 1355 includes the engagement devices 1350 in order to provide anchoring at an end portion of the expandable tubular member 1335. In an exemplary embodiment, the wall thickness of the lower and intermediate sections, 1355 and 1360, are less than the wall thickness of the upper section 1365 in order to optimally faciliate the radial expansion of the lower and intermediate sections, 1355 and 1360, of the expandable tubular member 1335.

In an exemplary embodiment, the lower section 1355 of the expandable tubular member 1335 includes one or more shape memory metal inserts 1370. In an exemplary embodiment, the inserts 1370 are adapted to radially expand the lower section 1355 of the expandable tubular member 1335 into intimate contact with the wellbore casing 1300 when heated by the heater 1340. The shape memory metal inserts 1370 may be fabricated from any number of conventional commercially available shape memory alloys such as, for example, NiTi or NiTiNOL using conventional forming processes such as, for example, those described in U.S. Pat. Nos. 5,312,152, 5,344,506, and 5,718,531, the disclosures of which are incorporated herein by reference. In this manner, the shape memory metal inserts 1370 preferably radially expand the lower section 1355 of the expandable tubular member 1335 when the inserts 1370 are heated to a temperature above their transformation temperature using the heater 1340. In an exemplary embodiment, the transformation temperature of the inserts 1370 ranges from about 250 E F to 450 E F. In an exemplary embodiment, the material composition of the lower section 1355 of the expandable tubular member 1335 is further selected to maximize the radial expansion of the lower section 1355 during the transformation process.

In an exemplary embodiment, the inserts 1370 are positioned within one or more corresponding recesses 1375 provided in the lower section 1355 of the expandable tubular member 1335. Alternatively, the inserts 1370 are completely contained within the lower section 1355 of the expandable tubular member 1335.

In an exemplary embodiment, the expandable tubular member 1335 is further provided substantially as disclosed in one or more of the following: (1) U.S. utility patent application Ser. No. 09/454,139, filed on Dec. 3, 1999, which claimed the benefit of the filing date of U.S. provisional patent application No. 60/111,293, filed on Dec. 7, 1998; (2) U.S. utility patent application Ser. No. 09/510,913, filed on Feb. 23, 2000, which claimed the benefit of the filing date of U.S. provisional application No. 60/121,702, filed on Feb. 25, 1999; (3) U.S. utility patent application Ser. No. 09/502,350, filed on Feb. 10, 2000, which claimed the benefit of the filing date of U.S. provisional application No. 60/119,611, (4) U.S. utility patent application Ser. No. 09/440,338, filed on Nov. 15, 1999, which claimed the benefit of the filing date of U.S. provisional application No. 60/108,558, filed on Nov. 16, 1998; (5) U.S. provisional patent application No. 60/183,546, filed on Feb. 18, 2000; (6) U.S. utility patent application Ser. No. 09/523,460, filed on Mar. 10, 2000, which claimed the benefit of the filing date of U.S. provisional application No. 60/124,042, filed on Mar. 11, 1999; (7) U.S. utility patent application Ser. No. 09/512,895, filed on Feb. 24, 2000, which claimed the benefit of the filing dates of U.S. provisional application No. 60/121,841, filed on Feb. 26, 1999 and U.S. provisional application No. 60/154,047, filed on Sep. 16, 1999; (8) U.S. utility application Ser. No. 09/511,941, filed on Feb. 24, 2000, which claimed the benefit of the filing date of U.S. provisional Ser. No. 60/121,907, filed on Feb. 26, 1999; (9) U.S. utility patent application Ser. No. 09/588,946, filed on Jun. 7, 2000, which claimed the benefit of the filing date of U.S. provisional patent application Ser. No. 60/137,998, filed on Jun. 7, 1999; (10) U.S. utility patent application Ser. No. 09/559,122, filed on Apr. 26, 2000, which claimed the benefit of the filing date of U.S. provisional application No. 60/131,106, filed on Apr. 26, 1999; (11) U.S. provisional application No. 60/146,203, filed on Jul. 29, 1999; (12) U.S. provisional application No. 60/143,039, filed on Jul. 9, 1999; (13) U.S. provisional patent application Ser. No. 60/162,671, filed on Nov. 1, 1999; (14) U.S. provisional application No. 60/159,039, filed on Oct. 12, 1999; (15) U.S. provisional patent application No. 60/159,033, filed on Oct. 12, 1999; and (16) U.S. provisional patent application No. 60/165,228, filed on Nov. 12, 1999, the disclosures of which are incorporated herein by reference.

The heater 1340 is coupled to the support member 1320. The heater 1340 is preferably adapted to controllably generate a localized heat source for elevating the temperature of the inserts 1370. In an exemplary embodiment, the heater 1340 includes a conventional thermostat control in order to control the operating temperature. The heater 1340 is preferably controlled by a surface control device in a conventional manner.

The sealing members 1345 are preferably coupled to the outer surface of the upper portion 1365 of the expandable tubular member 1335. The sealing members 1345 are preferably adapted to engage and fluidicly seal the interface between the radially expanded expandable tubular member 1335 and the wellbore casing 1300. In an exemplary embodiment, the apparatus 1315 includes a plurality of sealing members 1345. In an exemplary embodiment, the sealing members 1345 surround and isolate the opening 1310.

As illustrated in FIG. 13a, the apparatus 1315 is preferably positioned within the wellbore casing 1300 with the expandable tubular member 1335 positioned in opposing relation to the opening 1310. In an exemplary embodiment, the apparatus 1315 includes a plurality of sealing members 1345 that are positioned above and below the opening 1310. In this manner, the radial expansion of the expandable tubular member 1335 optimally fluidicly isolates the opening 1310.

Figure 13B:
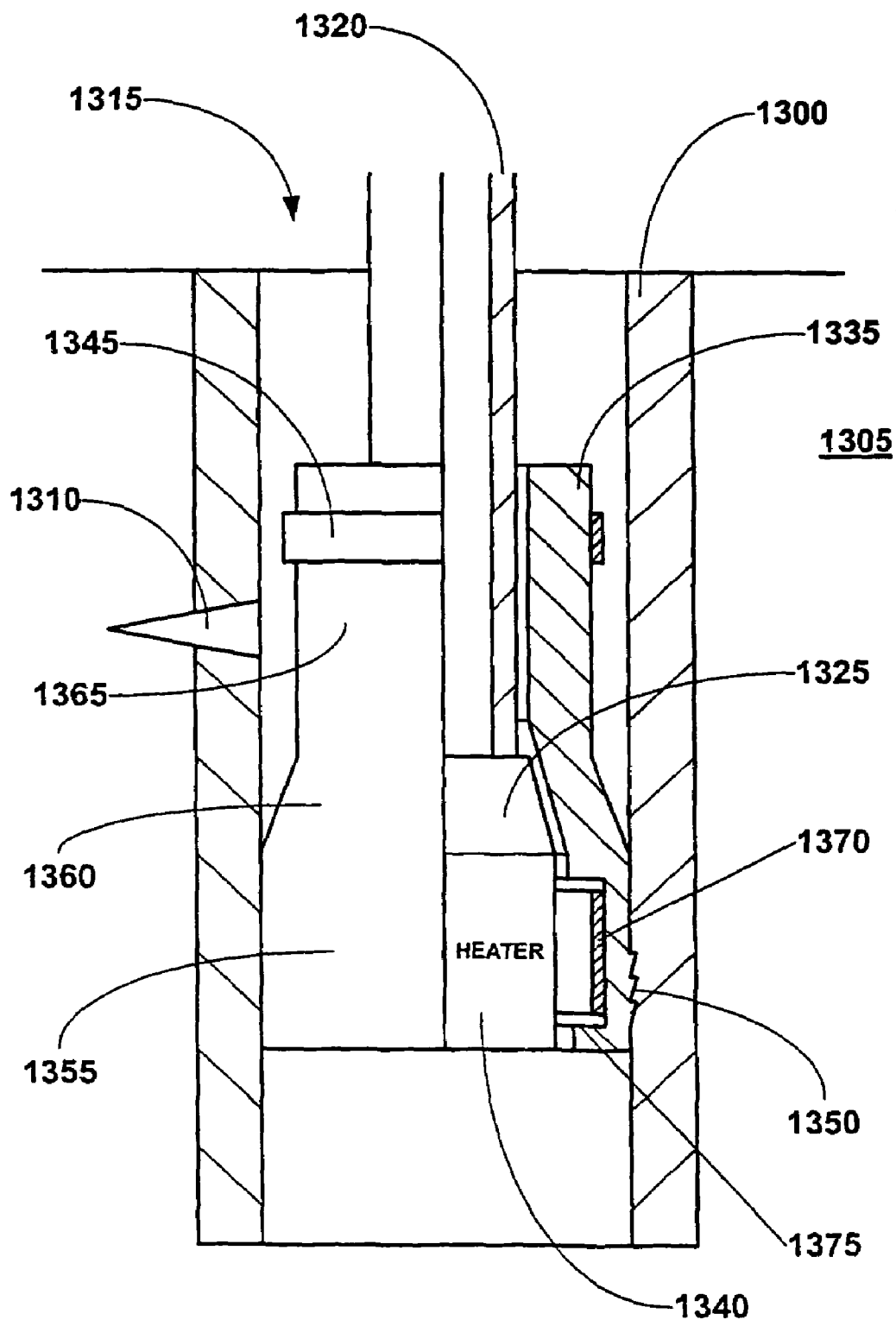
FIG. 13b is a fragmentary cross-sectional illustration of the apparatus of FIG. 13a after activating the shape memory metal inserts in order to anchor the expandable tubular member to the wellbore casing.

As illustrated in FIG. 13b, in an exemplary embodiment, the expandable tubular member 1335 of the apparatus 1315 is then anchored to the wellbore casing 1300 by radially expanding the inserts 1370 using the heater 1340. In an exemplary embodiment, the expansion of the inserts 1370 causes the lower section 1355 of the expandable tubular member 1335 to contact the wellbore casing 1300. In an exemplary embodiment, the engagement devices 1350 are thereby coupled to, and at least partially penetrate into, the wellbore casing 1300. In this manner, the lower section 1355 of the expandable tubular member 1335 is optimally coupled to the wellbore casing 1300.

In an alternative embodiment, a compressible cement and/or epoxy is then injected into the annular space between the unexpanded portion of the tubular member 1335 and the wellbore casing 1300. The compressible cement and/or epoxy may then be permitted to at least partially cure prior to the initiation of the radial expansion process. In this manner, an annular structural support and fluidic seal is provided around the tubular member 1335.

Figure 13C:
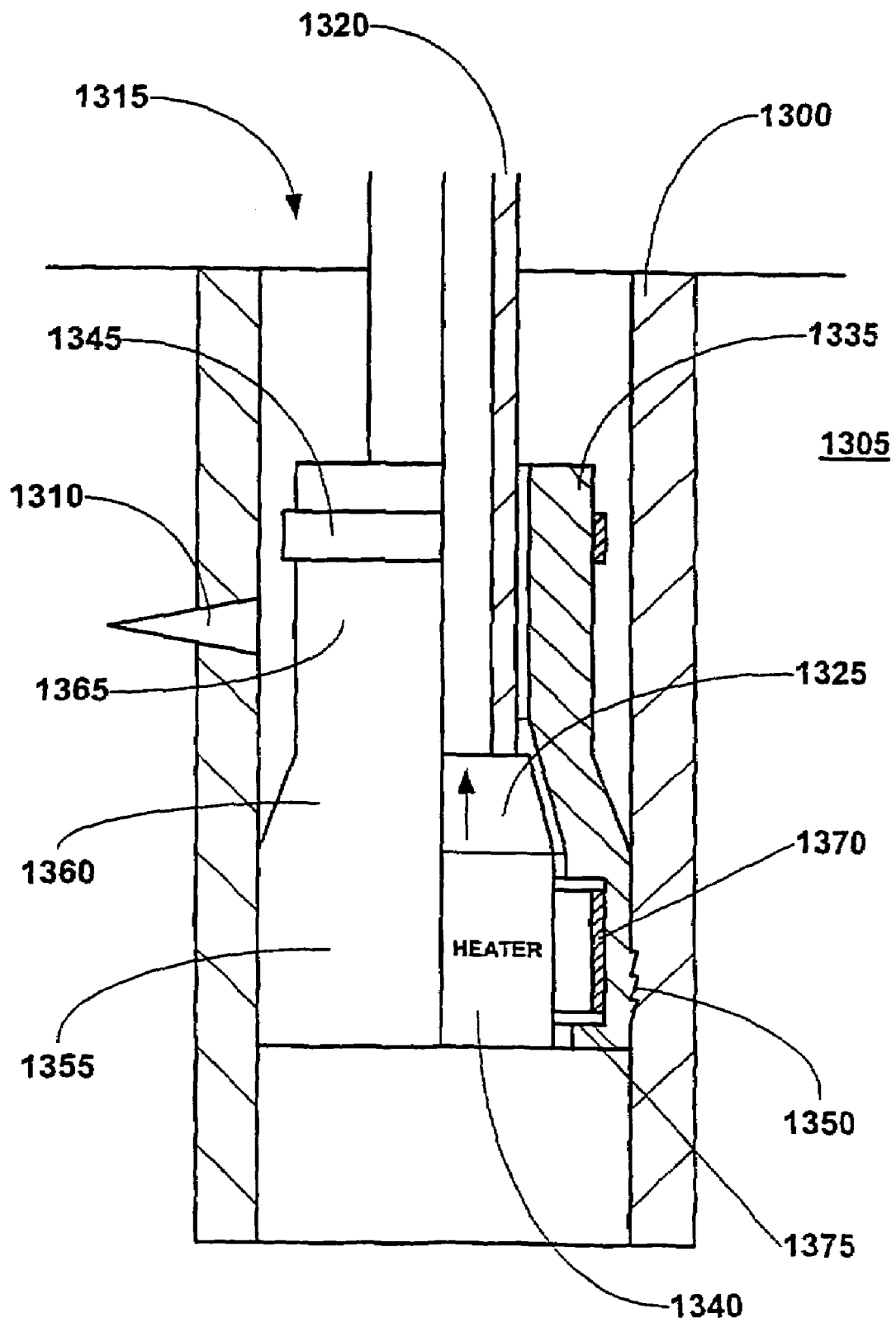
FIG. 13c is a fragmentary cross-sectional illustration of the apparatus of FIG. 13b after initiating the axial displacement of the expansion cone.

As illustrated in FIG. 13c, the expansion cone 1325 is then axially displaced by applying an axial force to the support member 1320. In an exemplary embodiment, the axial displacement of the expansion cone 1325 radially expands the expandable tubular member 1335 into intimate contact with the walls of the wellbore casing 1300.

Figure 13D:
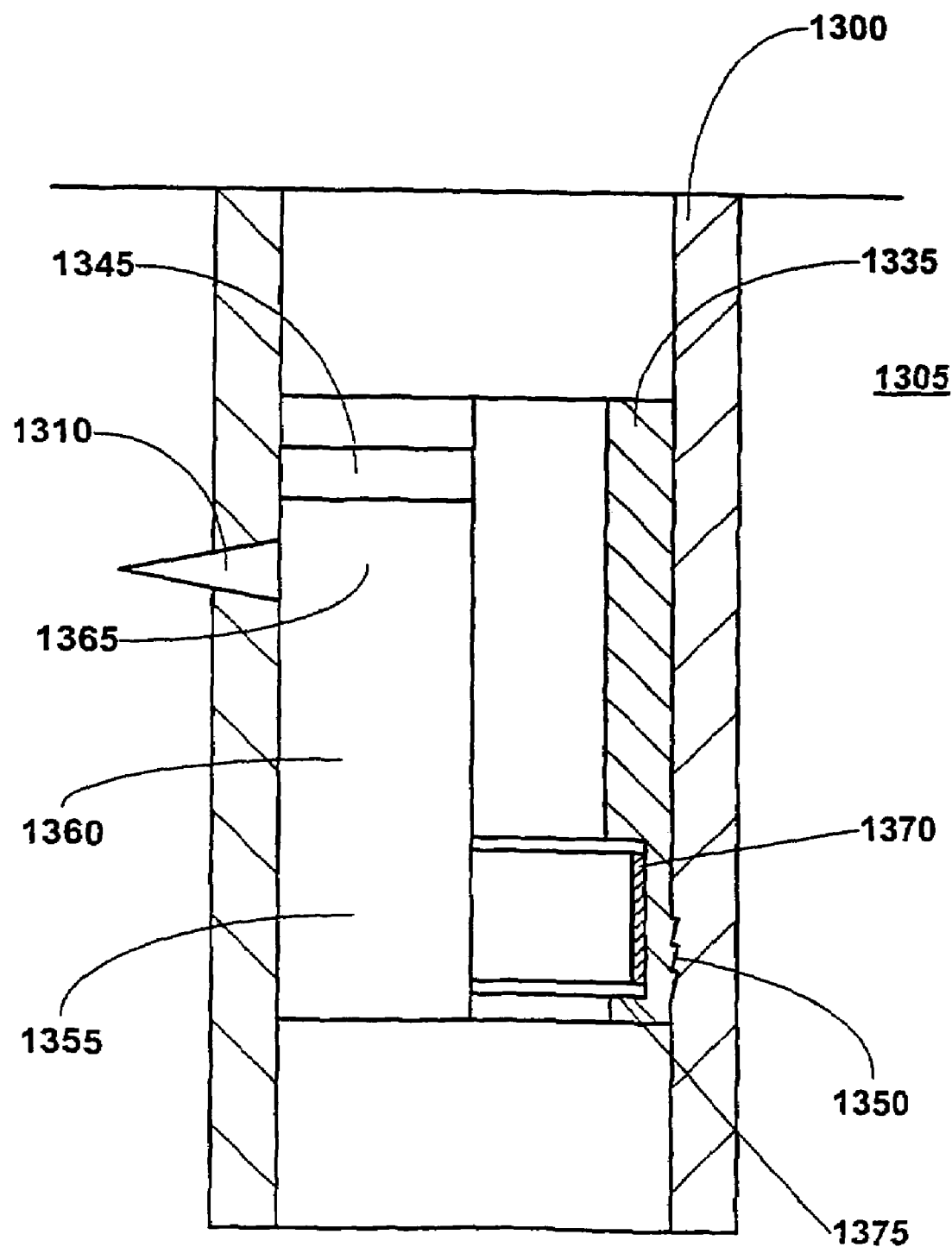
FIG. 13d is a fragmentary cross-sectional illustration of the apparatus of FIG. 13c after completing the radial expansion of the expandable tubular member.

As illustrated in FIG. 13d, in an exemplary embodiment, after the expandable tubular member 1335 has been completely radially expanded by the axial displacement of the expansion cone 1335, the opening 1310 in the wellbore casing 1300 is sealed off by the radially expanded tubular member 1335. In this manner, repairs to the wellbore casing 1300 are optimally provided. More generally, the apparatus 1315 is used to repair or form wellbore casings, pipelines, and structural supports.

Figure 14A:
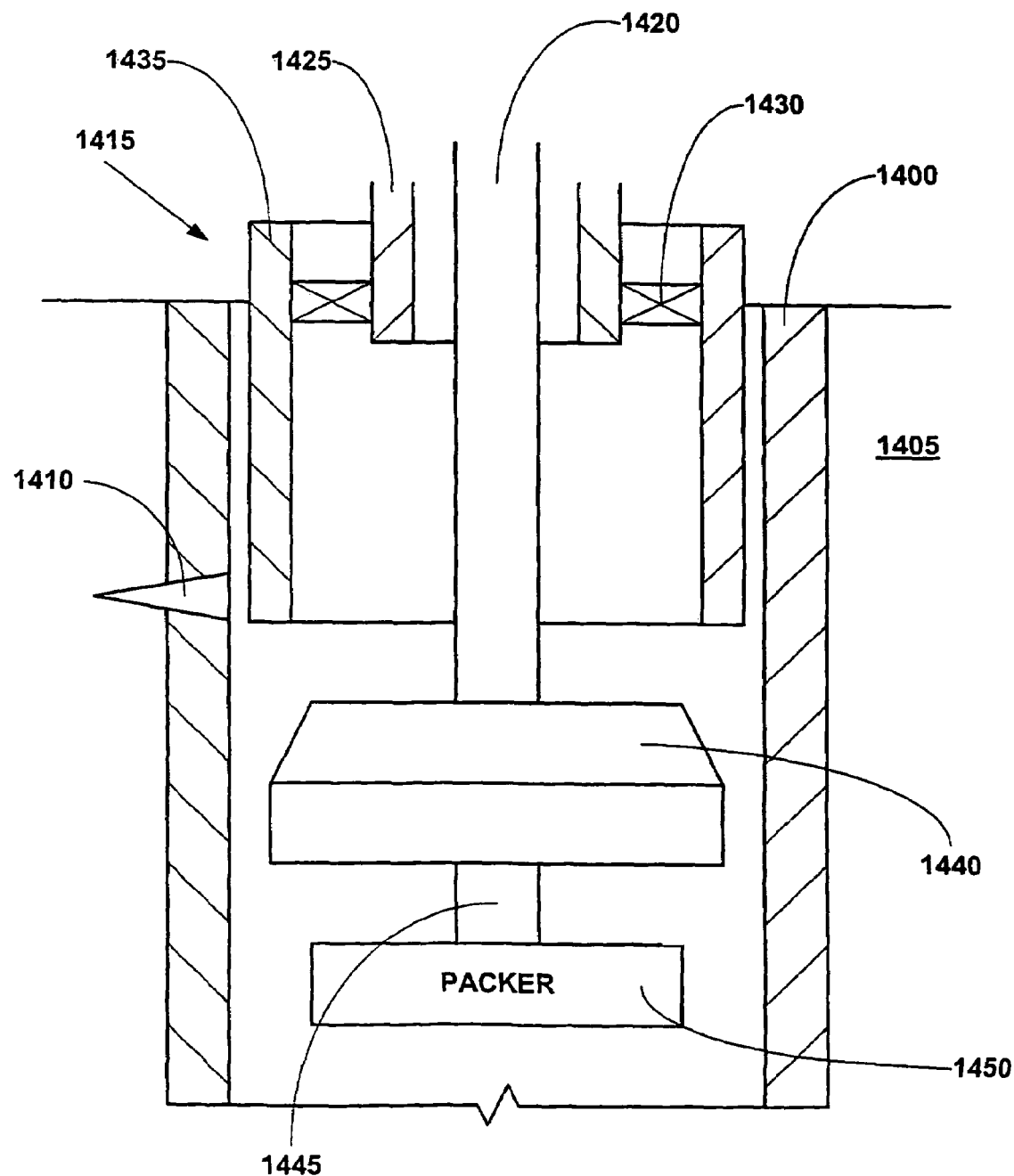
FIG. 14a is a fragmentary cross-sectional illustration of an alternative embodiment of an apparatus for coupling an expandable tubular member to a preexisting structure positioned within a wellbore casing.

Referring to FIGS. 14a to 14g, an alternative embodiment of an apparatus and method for coupling an expandable tubular member to a preexisting structure will now be described. Referring to FIG. 14a, a wellbore casing 1400 is positioned within a subterranean formation 1405. The wellbore casing 1400 may be positioned in any orientation from the vertical direction to the horizontal direction. The wellbore casing 1400 further includes one or more openings 1410 that may have been the result of unintentional damage to the wellbore casing 1400, or due to a prior perforation or fracturing operation performed upon the surrounding subterranean formation 1405. As will be recognized by persons having ordinary skill in the art, the openings 1410 can adversely affect the subsequent operation and use of the wellbore casing 1400 unless they are sealed off.

In an exemplary embodiment, an apparatus 1415 is utilized to seal off the openings 1410 in the wellbore casing 1400. More generally, the apparatus 1415 is preferably utilized to form or repair wellbore casings, pipelines, or structural supports.

The apparatus 1415 preferably includes a first support member 1420, a second support member 1425, a coupling 1430, an expandable tubular member 1435, an expansion cone 1440, a third support member 1445, and a packer 1450.

The first support member 1420 is preferably adapted to be coupled to a surface location. The support member 1420 is further coupled to the expansion cone 1440. The first support member 1420 is preferably adapted to convey pressurized fluidic materials and/or electrical current and/or communication signals from a surface location to the expansion cone 1440 and the packer 1450. The first support member 1420 may, for example, be conventional commercially available slick wire, braided wire, coiled tubing, or drilling stock material.

The second support member 1425 is preferably adapted to be coupled to a surface location. The support member 1425 is further coupled to the coupling 1430. The first support member 1425 is preferably adapted to convey pressurized fluidic materials and/or electrical current and/or communication signals from a surface location to the coupling 1430. The second support member 1425 may, for example, be conventional commercially available slick wire, braided wire, coiled tubing, or drilling stock material.

The coupling 1430 is coupled to the second support member 1425. The coupling 1430 is further preferably removably coupled to the expandable tubular member 1435. The coupling 1430 may be any number of conventional commercially available passive or actively controlled coupling devices such as, for example, packers or slips. In an exemplary embodiment, the coupling 1430 is a mechanical slip.

The expandable tubular member 1435 is removably coupled to the coupling 1430. In an exemplary embodiment, the expandable tubular member 1435 includes one or more engagement devices that are adapted to couple with and penetrate the wellbore casing 1400. In this manner, the expandable tubular member 1435 is optimally coupled to the wellbore casing 1400. In an exemplary embodiment, the engagement devices include teeth for biting into the surface of the wellbore casing 1400. In an exemplary embodiment, the expandable tubular member 1435 further includes one or more sealing members on the outside surface of the expandable tubular member 1435 in order to optimally seal the interface between the expandable tubular member 1435 and the wellbore casing 1400.

In an exemplary embodiment, the expandable tubular member 1435 is further provided substantially as disclosed in one or more of the following: (1) U.S. utility patent application Ser. No. 09/454,139, filed on Dec. 3, 1999, which claimed the benefit of the filing date of U.S. provisional patent application No. 60/111,293, filed on Dec. 7, 1998; (2) U.S. utility patent application Ser. No. 09/510,913, filed on Feb. 23, 2000, which claimed the benefit of the filing date of U.S. provisional application No. 60/121,702, filed on Feb. 25, 1999; (3) U.S. utility patent application Ser. No. 09/502,350, filed on Feb. 10, 2000, which claimed the benefit of the filing date of U.S. provisional application No.

60/119,611, (4) U.S. utility patent application Ser. No. 09/440,338, filed on Nov. 15, 1999, which claimed the benefit of the filing date of U.S. provisional application No. 60/108,558, filed on Nov. 16, 1998; (5) U.S. provisional patent application No. 60/183,546, filed on Feb. 18, 2000; (6) U.S. utility patent application Ser. No. 09/523,460, filed on Mar. 10, 2000, which claimed the benefit of the filing date of U.S. provisional application No. 60/124,042, filed on Mar. 11, 1999; (7) U.S. utility patent application Ser. No. 09/512,895, filed on Feb. 24, 2000, which claimed the benefit of the filing dates of U.S. provisional application No. 60/121,841, filed on Feb. 26, 1999 and U.S. provisional application No. 60/154,047, filed on Sep. 16, 1999; (8) U.S. utility application Ser. No. 09/511,941, filed on Feb. 24, 2000, which claimed the benefit of the filing date of U.S. provisional Ser. No. 60/121,907, filed on Feb. 26, 1999; (9) U.S. utility patent application Ser. No. 09/588,946, filed on Jun. 7, 2000, which claimed the benefit of the filing date of U.S. provisional patent application Ser. No. 60/137,998, filed on Jun. 7, 1999; (10) U.S. utility patent application Ser. No. 09/559,122, filed on Apr. 26, 2000, which claimed the benefit of the filing date of U.S. provisional application No. 60/131,106, filed on Apr. 26, 1999; (11) U.S. provisional application No. 60/146,203, filed on Jul. 29, 1999; (12) U.S. provisional application No. 60/143,039, filed on Jul. 9, 1999; (13) U.S. provisional patent application Ser. No. 60/162,671, filed on Nov. 1, 1999; (14) U.S. provisional application No. 60/159,039, filed on Oct. 12, 1999; (15) U.S. provisional patent application No. 60/159,033, filed on Oct. 12, 1999; and (16) U.S. provisional patent application Ser. No. 60/165,228, filed on Nov. 12, 1999, the disclosures of which are incorporated herein by reference.

The expansion cone 1440 is coupled to the first support member 1420 and the third support member 1445. The expansion cone 1440 is preferably adapted to radially expand the expandable tubular member 1435 when the expansion cone 1440 is axially displaced relative to the expandable tubular member 1435.

In an exemplary embodiment, the expansion cone 1440 is provided substantially as disclosed in one or more of the following: (1) U.S. utility patent application Ser. No. 09/454,139, filed on Dec. 3, 1999, which claimed the benefit of the filing date of U.S. provisional patent application No. 60/111,293, filed on Dec. 7, 1998; (2) U.S. utility patent application Ser. No. 09/510,913, filed on Feb. 23, 2000, which claimed the benefit of the filing date of U.S. provisional application No. 60/121,702, filed on Feb. 25, 1999; (3) U.S. utility patent application Ser. No. 09/502,350, filed on Feb. 10, 2000, which claimed the benefit of the filing date of U.S. provisional application No. 60/119,611, (4) U.S. utility patent application Ser. No. 09/440,338, filed on Nov. 15, 1999, which claimed the benefit of the filing date of U.S. provisional application No. 60/108,558, filed on Nov. 16, 1998; (5) U.S. provisional patent application No. 60/183,546, filed on Feb. 18, 2000; (6) U.S. utility patent application Ser. No. 09/523,460, filed on Mar. 10, 2000, which claimed the benefit of the filing date of U.S. provisional application No. 60/124,042, filed on Mar. 11, 1999; (7) U.S. utility patent application Ser. No. 09/512,895, filed on Feb. 24, 2000, which claimed the benefit of the filing dates of U.S. provisional application No. 60/121,841, filed on Feb. 26, 1999 and U.S. provisional application No. 60/154,047, filed on Sep. 16, 1999; (8) U.S. utility application Ser. No. 09/511,941, filed on Feb. 24, 2000, which claimed the benefit of the filing date of U.S. provisional Ser. No. 60/121,907, filed on Feb. 26, 1999; (9) U.S. utility patent application Ser. No. 09/588,946, filed on Jun. 7, 2000, which claimed the benefit of the filing date of U.S. provisional patent application Ser. No. 60/137,998, filed on Jun. 7, 1999; (10) U.S. utility patent application Ser. No. 09/559,122, filed on Apr. 26, 2000, which claimed the benefit of the filing date of U.S. provisional application No. 60/131,106, filed on Apr. 26, 1999; (11) U.S. provisional application No. 60/146,203, filed on Jul. 29, 1999; (12) U.S. provisional application No. 60/143,039, filed on Jul. 9, 1999; (13) U.S. provisional patent application Ser. No. 60/162,671, filed on Nov. 1, 1999; (14) U.S. provisional application No. 60/159,039, filed on Oct. 12, 1999; (15) U.S. provisional patent application No. 60/159,033, filed on Oct. 12, 1999; and (16) U.S. provisional patent application No. 60/165,228, filed on Nov. 12, 1999, the disclosures of which are incorporated herein by reference.

The third support member 1445 is preferably coupled to the expansion cone 1440 and the packer 1450. The third support member 1445 is preferably adapted to convey pressurized fluidic materials and/or electrical current and/or communication signals from a surface location to the packer 1450. The third support member 1445 may, for example, be conventional commercially available slick wire, braided wire, coiled tubing, or drilling stock material.

The packer 1450 is coupled to the third support member 1445. The packer 1450 is further preferably adapted to controllably coupled to the wellbore casing 1400. The packer 1450 may be any number of conventional commercially available packer devices. In an alternative embodiment, a bladder, slipped cage assembly or hydraulic slips may be substituted for the packer 1450.

As illustrated in FIG. 14*a*, the apparatus 1415 is preferably positioned within the wellbore casing 1400 with the bottom of the expandable tubular member 1435 and the top of the expansion cone 1440 positioned proximate the opening 1410.

Figure 14B:
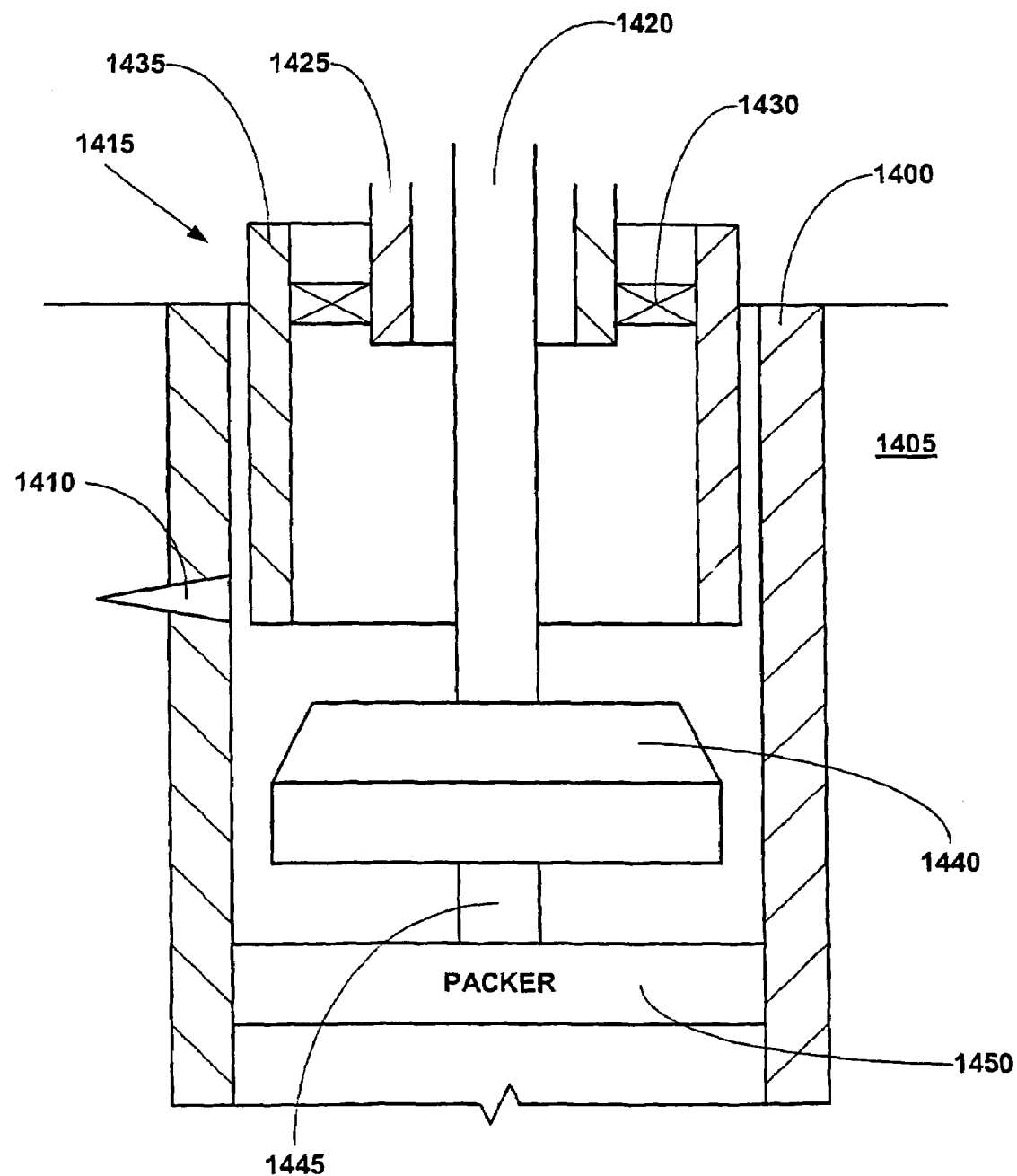
FIG. 14b is a fragmentary cross-sectional illustration of the apparatus of FIG. 14a after coupling the packer to the wellbore casing.

As illustrated in FIG. 14*b*, in an exemplary embodiment, the packer 1450 is then anchored to the wellbore casing 1400. In this manner, the expansion cone 1440 is maintained in a substantially stationary position.

Figure 14C:
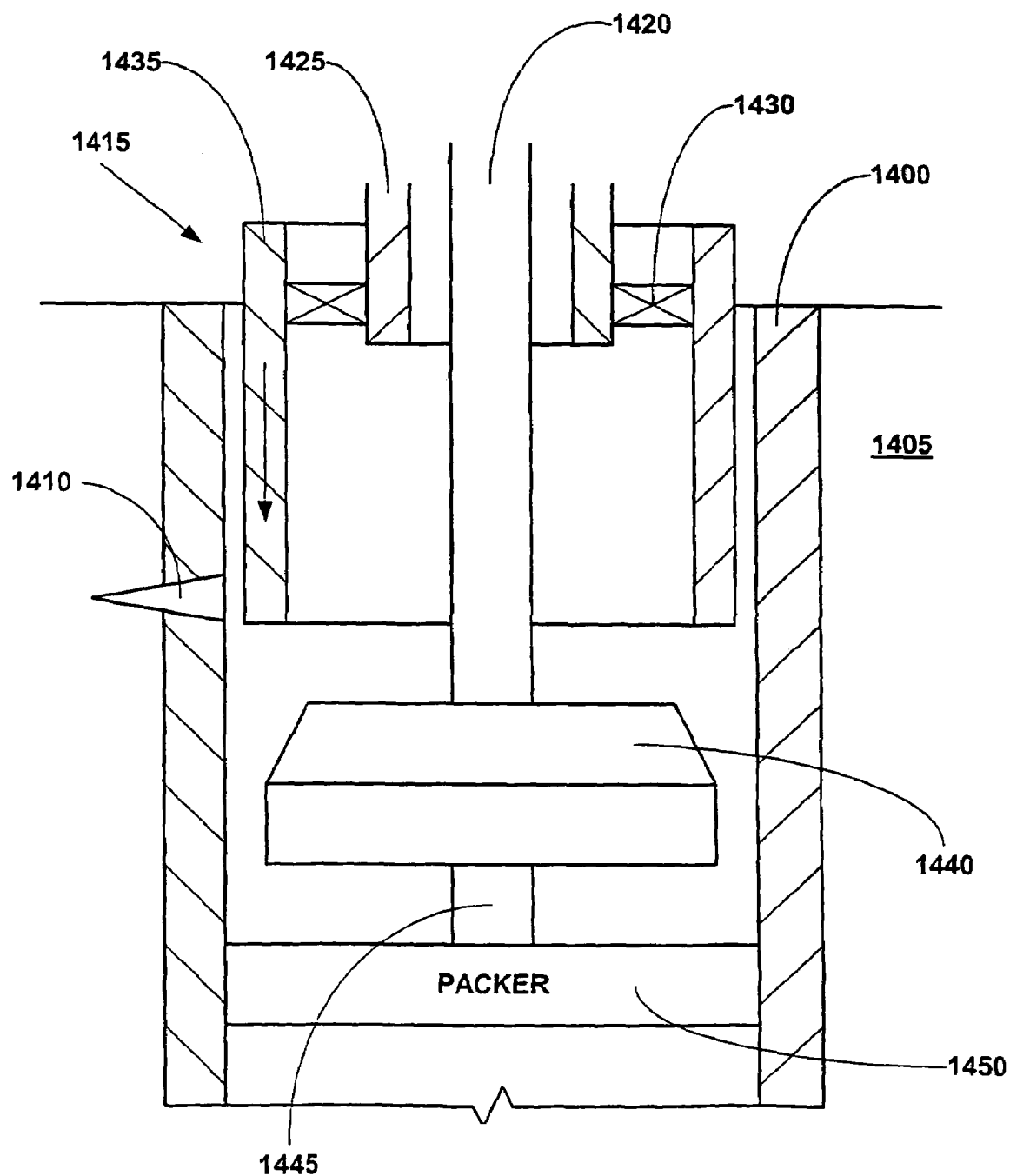
FIG. 14c is a fragmentary cross-sectional illustration of the apparatus of FIG. 14b after initiating the axial displacement of the expandable tubular member towards the expansion cone.
Figure 14D:
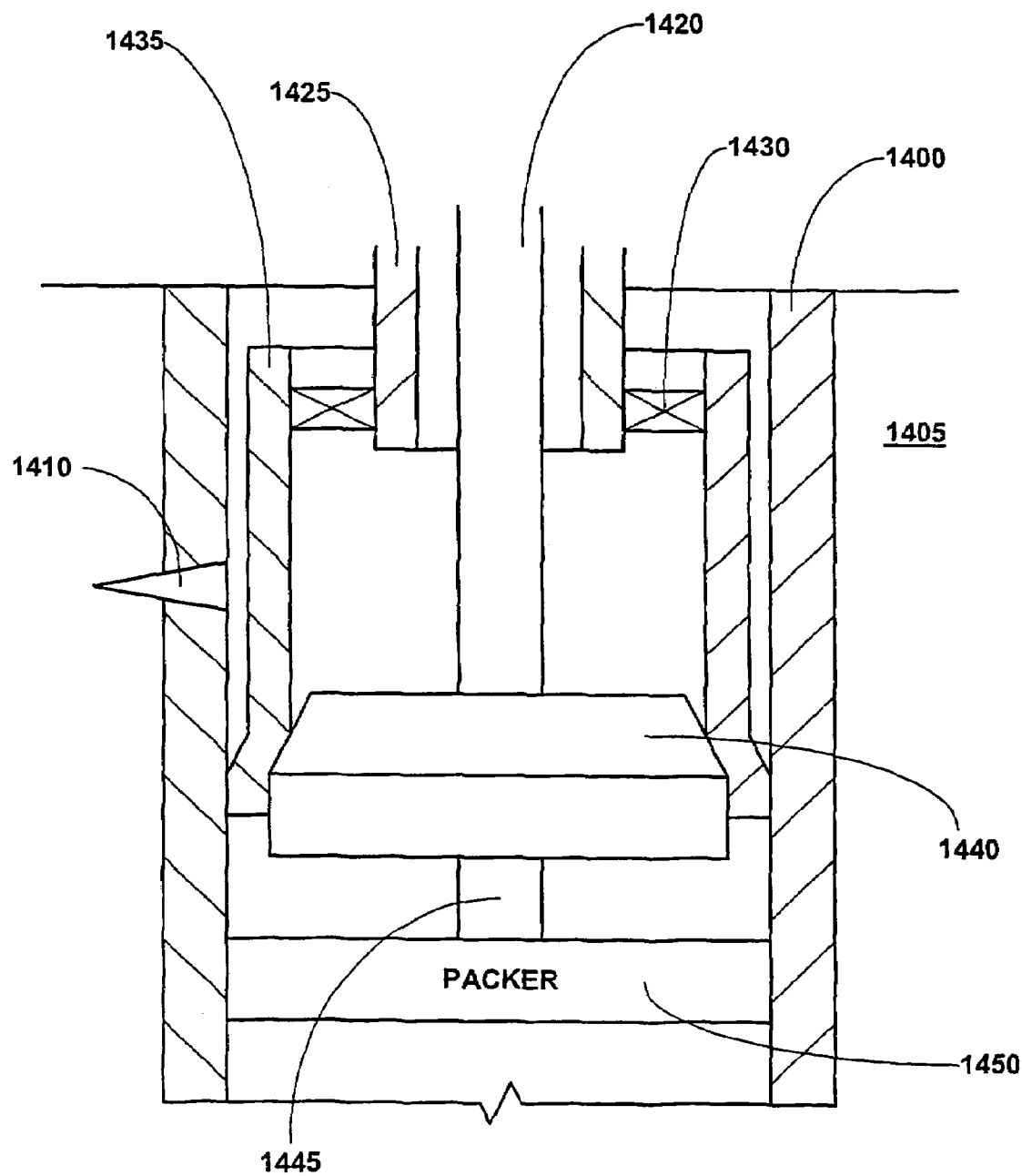
FIG. 14d is a fragmentary cross-sectional illustration of the apparatus of FIG. 14c after radially expanding the end of the expandable tubular member onto the expansion cone.

As illustrated in FIG. 14*c*, in an exemplary embodiment, the expandable tubular member 1435 is then lowered towards the stationary expansion cone 1440. In an exemplary embodiment, as illustrated in FIG. 14*d*, the lower end of the expandable tubular member 1435 impacts the expansion cone 1440 and is radially expanded into contact with the wellbore casing 1400. In an exemplary embodiment, the lower end of the expandable tubular member 1435 includes one or more engagement devices for engaging the wellbore casing 1400 in order to optimally couple the end of the expandable tubular member 1435 to the wellbore casing 1400.

In an alternative embodiment, a compressible cement and/or epoxy is then injected into the annular space between the unexpanded portion of the tubular member 1435 and the wellbore casing 1400. The compressible cement and/or epoxy is then permitted to at least partially cure prior to the initiation of the radial expansion process. In this manner, an annular structural support and fluidic seal is provided around the tubular member 1435.

Figure 14E:
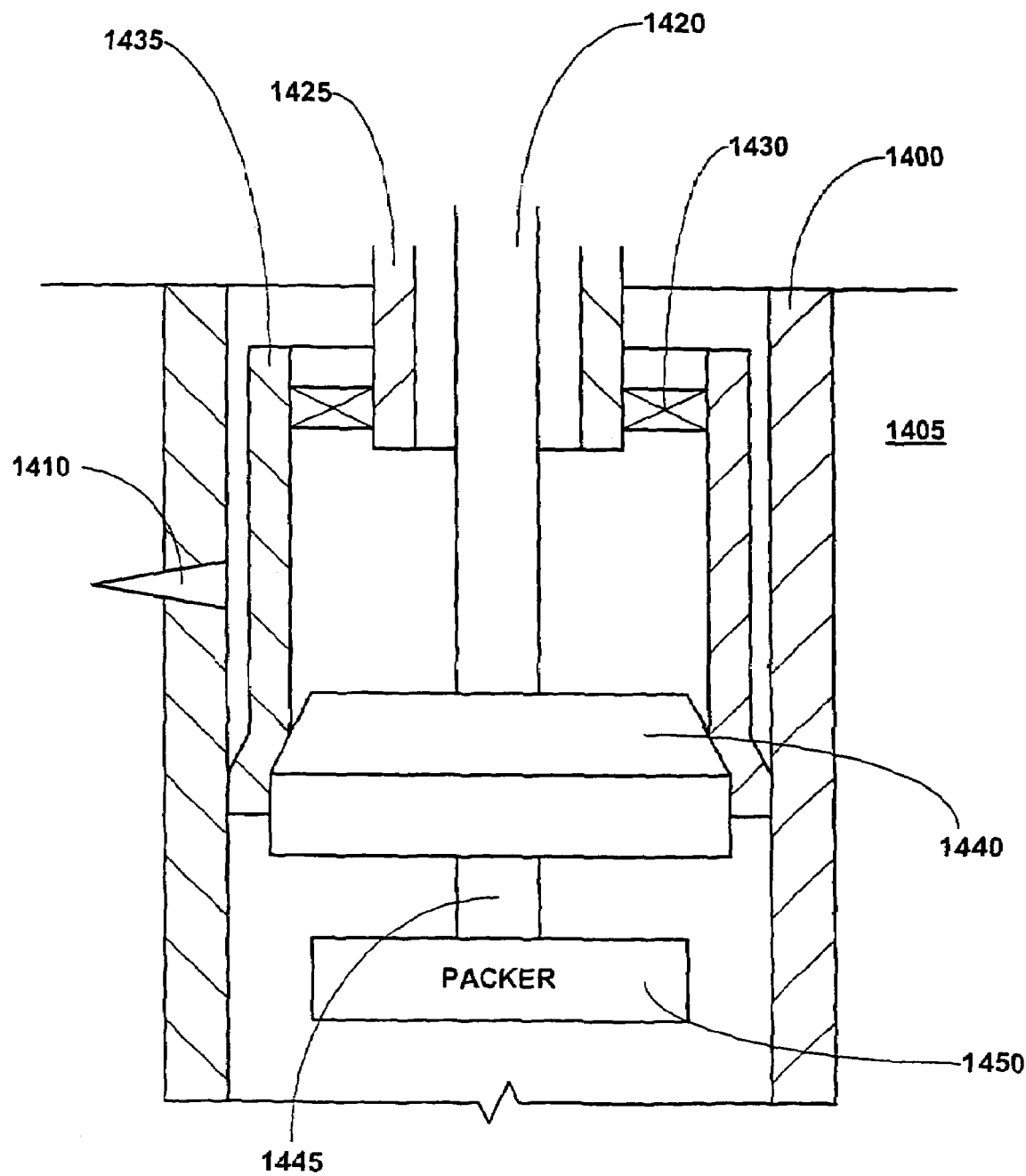
FIG. 14e is a fragmentary cross-sectional illustration of the apparatus of FIG. 14d after decoupling the packer from the wellbore casing.

As illustrated in FIG. 14*e*, in an exemplary embodiment, the packer 1450 is decoupled from the wellbore casing 1400.

Figure 14F:
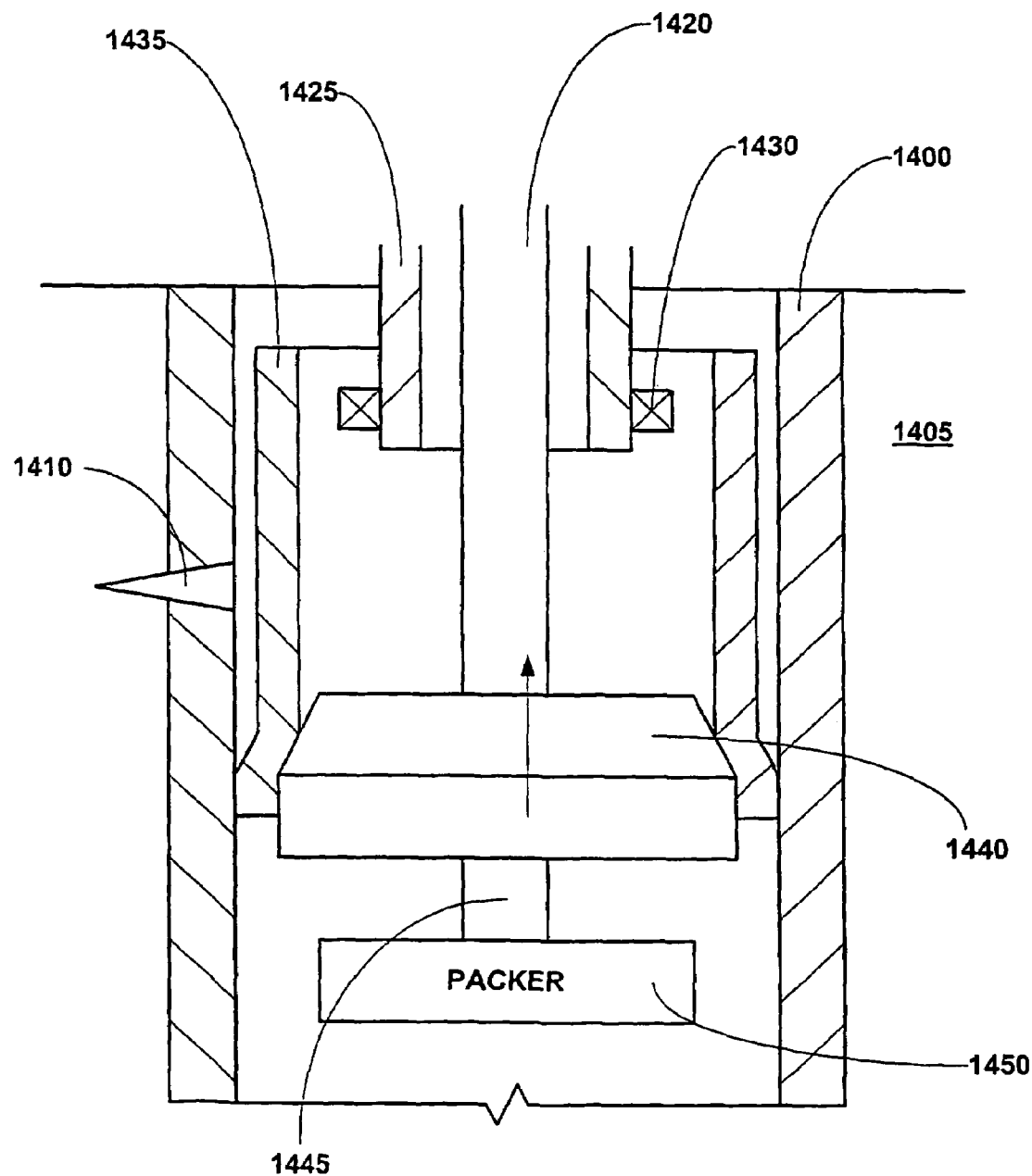
FIG. 14f is a fragmentary cross-sectional illustration of the apparatus of FIG. 14e after initiating the axial displacement of the expansion cone relative to the expandable tubular member.

As illustrated in FIG. 14*f*, in an exemplary embodiment, the expansion cone 1440 is then axially displaced by applying an axial force to the first support member 1420. In an exemplary embodiment, the axial displacement of the expansion cone 1440 radially expands the expandable tubular member 1435 into intimate contact with the walls of the wellbore casing 1400. In an exemplary embodiment, prior to the initiation of the axial displacement of the expansion cone 1440, the coupling 1430 is decoupled from the expandable tubular member 1430.

Figure 14G:
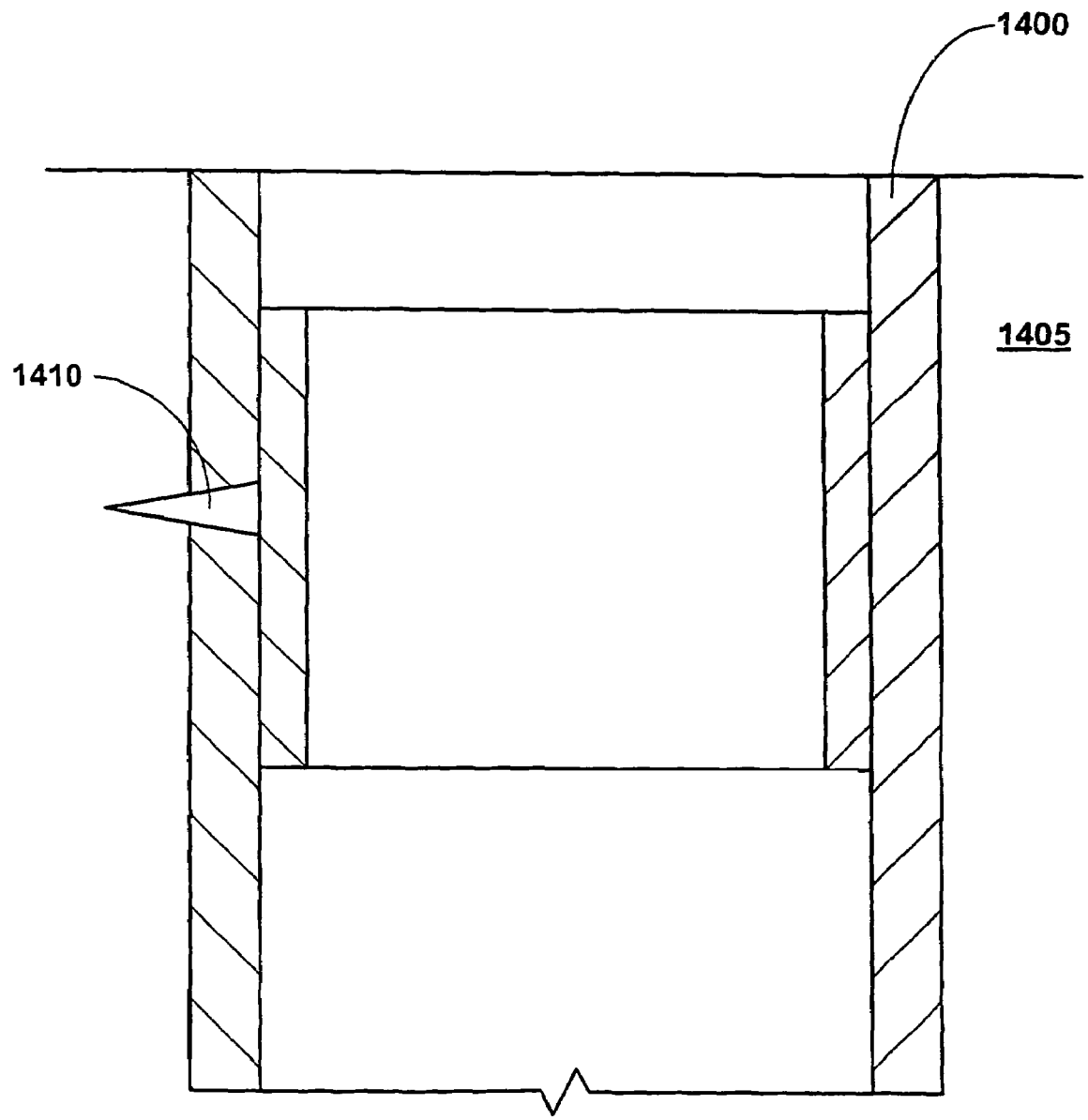
FIG. 14g is a fragmentary cross-sectional illustration of the completion of the radial expansion of the expandable tubular member.

As illustrated in FIG. 14g, in an exemplary embodiment, after the expandable tubular member 1435 has been completely radially expanded by the axial displacement of the expansion cone 1440, the opening 1410 in the wellbore casing 1400 is sealed off by the radially expanded tubular member 1435. In this manner, repairs to the wellbore casing 1400 are optimally provided. More generally, the apparatus 1415 is used to repair or form wellbore casings, pipelines, and structural supports.

Figure 15A:
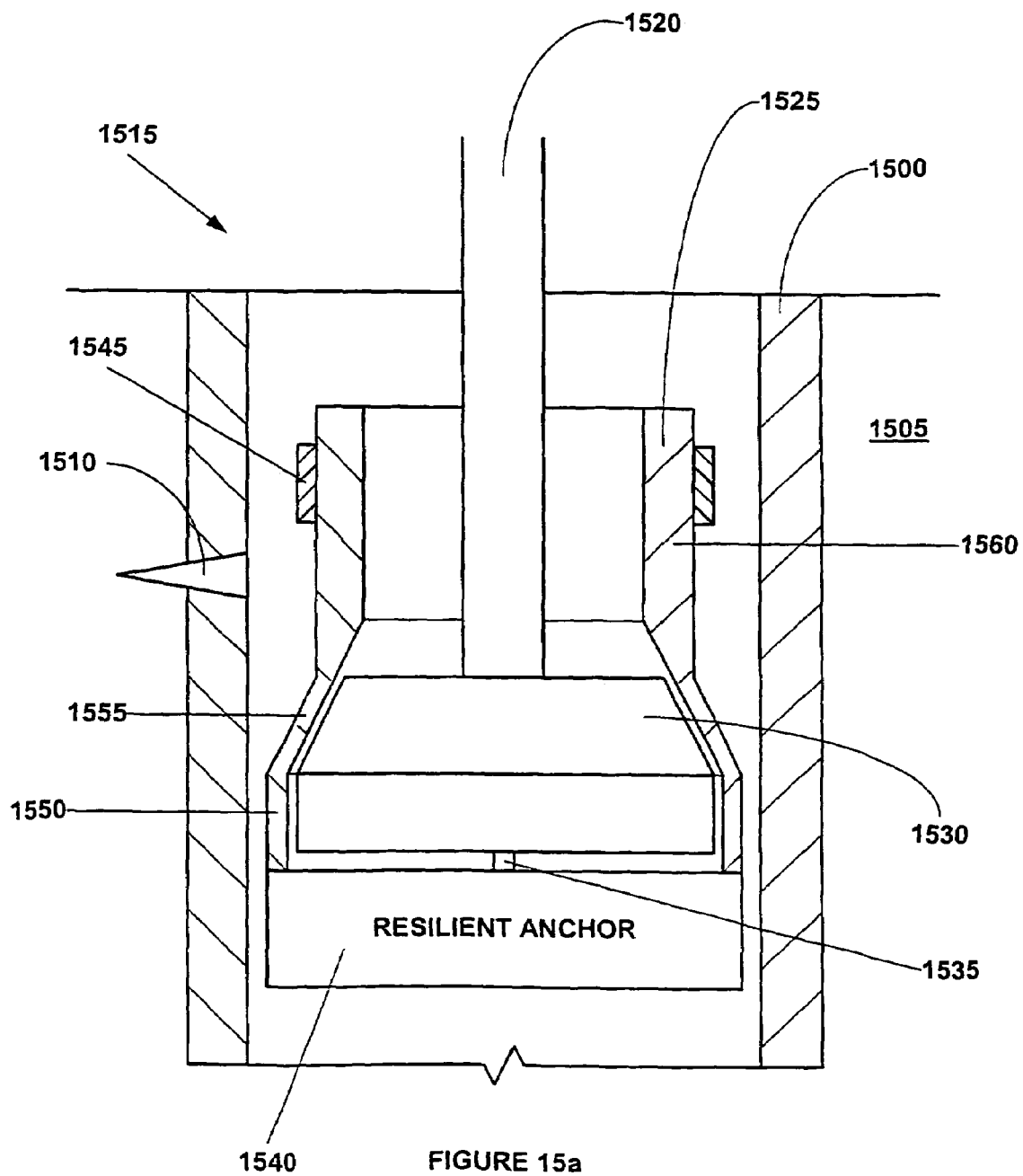
FIG. 15a is a fragmentary cross-sectional illustration of an alternative embodiment of an apparatus for coupling an expandable tubular member to a preexisting structure positioned within a wellbore.

Referring to FIGS. 15a to 15d, an alternative embodiment of an apparatus for coupling an expandable tubular member to a preexisting structure will now be described. Referring to FIG. 15a, a wellbore casing 1500 is positioned within a subterranean formation 1505. The wellbore casing 1500 may be positioned in any orientation from the vertical direction to the horizontal direction. The wellbore casing 1500 further includes one or more openings 1510 that may have been the result of unintentional damage to the wellbore casing 1500, or due to a prior perforation or fracturing operation performed upon the surrounding subterranean formation 1505. As will be recognized by persons having ordinary skill in the art, the openings 1510 can adversely affect the subsequent operation and use of the wellbore casing 1500 unless they are sealed off.

In an exemplary embodiment, an apparatus 1515 is utilized to seal off the openings 1510 in the wellbore casing 1500. More generally, the apparatus 1515 is preferably utilized to form or repair wellbore casings, pipelines, or structural supports.

The apparatus 1515 preferably includes a support member 1520, an expandable tubular member 1525, an expansion cone 1530, a coupling 1535, a resilient anchor 1540, and one or more seals 1545.

The support member 1520 is preferably adapted to be coupled to a surface location. The support member 1520 is further coupled to the expansion cone 1530. The support member 1520 is preferably adapted to convey pressurized fluidic materials and/or electrical current and/or communication signals from a surface location to the resilient anchor 1540. The support member 1520 may, for example, be conventional commercially available slick wire, braided wire, coiled tubing, or drilling stock material.

The expandable tubular member 1525 is removably coupled to the expansion cone 1530. In an exemplary embodiment, the expandable tubular member 1525 includes one or more engagement devices that are adapted to couple with and penetrate the wellbore casing 1500. In this manner, the expandable tubular member 1525 is optimally coupled to the wellbore casing 1500. In an exemplary embodiment, the engagement devices include teeth for biting into the surface of the wellbore casing 1500. In an exemplary embodiment, the expandable tubular member 1525 further includes one or more sealing members 1545 on the outside surface of the expandable tubular member 1525 in order to optimally seal the interface between the expandable tubular member 1525 and the wellbore casing 1500.

In an exemplary embodiment, the expandable tubular member 1525 includes a lower section 1550, an intermediate section 1555, and an upper section 1560. In an exemplary embodiment, the wall thicknesses of the lower and intermediate sections, 1550 and 1555, are less than the wall thickness of the upper section 1560 in order to optimally facilitate the radial expansion of the expandable tubular member 1525. In an exemplary embodiment, the sealing members 1545 are provided on the outside surface of the upper section 1560 of the expandable tubular member 1525. In an exemplary embodiment, the resilient anchor 1540 is coupled to the lower section 1550 of the expandable tubular member 1525 in order to optimally anchor the expandable tubular member 1525 to the wellbore casing 1500.

In an exemplary embodiment, the expandable tubular member 1525 is further provided substantially as disclosed in one or more of the following: (1) U.S. utility patent application Ser. No. 09/454,139, filed on Dec. 3, 1999, which claimed the benefit of the filing date of U.S. provisional patent application No. 60/111,293, filed on Dec. 7, 1998; (2) U.S. utility patent application Ser. No. 09/510,913, filed on Feb. 23, 2000, which claimed the benefit of the filing date of U.S. provisional application No. 60/121,702, filed on Feb. 25, 1999; (3) U.S. utility patent application Ser. No. 09/502,350, filed on Feb. 10, 2000, which claimed the benefit of the filing date of U.S. provisional application No. 60/119,611, (4) U.S. utility patent application Ser. No. 09/440,338, filed on Nov. 15, 1999, which claimed the benefit of the filing date of U.S. provisional application No. 60/108,558, filed on Nov. 16, 1998; (5) U.S. provisional patent application No. 60/183,546, filed on Feb. 18, 2000; (6) U.S. utility patent application Ser. No. 09/523,460, filed on Mar. 10, 2000, which claimed the benefit of the filing date of U.S. provisional application No. 60/124,042, filed on Mar. 11, 1999; (7) U.S. utility patent application Ser. No. 09/512,895, filed on Feb. 24, 2000, which claimed the benefit of the filing dates of U.S. provisional application No. 60/121,841, filed on Feb. 26, 1999 and U.S. provisional application No. 60/154,047, filed on Sep. 16, 1999; (8) U.S. utility application Ser. No. 09/511,941, filed on Feb. 24, 2000, which claimed the benefit of the filing date of U.S. provisional Ser. No. 60/121,907, filed on Feb. 26, 1999; (9) U.S. utility patent application Ser. No. 09/588,946, filed on Jun. 7, 2000, which claimed the benefit of the filing date of U.S. provisional patent application Ser. No. 60/137,998, filed on Jun. 7, 1999; (10) U.S. utility patent application Ser. No. 09/559,122, filed on Apr. 26, 2000, which claimed the benefit of the filing date of U.S. provisional application No. 60/131,106, filed on Apr. 26, 1999; (11) U.S. provisional application No. 60/146,203, filed on Jul. 29, 1999; (12) U.S. provisional application No. 60/143,039, filed on Jul. 9, 1999; (13) U.S. provisional patent application Ser. No. 60/162,671, filed on Nov. 1, 1999; (14) U.S. provisional application No. 60/159,039, filed on Oct. 12, 1999; (15) U.S. provisional patent application No. 60/159,033, filed on Oct. 12, 1999; and (16) U.S. provisional patent application No. 60/165,228, filed on Nov. 12, 1999, the disclosures of which are incorporated herein by reference.

The expansion cone 1530 is coupled to the support member 1520 and the coupling 1535. The expansion cone 1530 is preferably adapted to radially expand the expandable tubular member 1525 when the expansion cone 1530 is axially displaced relative to the expandable tubular member 1525. The expansion cone 1530 may be any number of conventional commercially available expansion cones.

In an exemplary embodiment, the expansion cone 1530 is provided substantially as disclosed in one or more of the following: (1) U.S. utility patent application Ser. No. 09/454,139, filed on Dec. 3, 1999, which claimed the benefit of the filing date of U.S. provisional patent application No. 60/111,293, filed on Dec. 7, 1998; (2) U.S. utility patent application Ser. No. 09/510,913, filed on Feb. 23, 2000, which claimed the benefit of the filing date of U.S. provisional application No. 60/121,702, filed on Feb. 25 1999; (3)

U.S. utility patent application Ser. No. 09/502,350, filed on Feb. 10, 2000, which claimed the benefit of the filing date of U.S. provisional application No. 60/119,611, (4) U.S. utility patent application Ser. No. 09/440,338, filed on Nov. 15, 1999, which claimed the benefit of the filing date of U.S. provisional application No. 60/108,558, filed on Nov. 16, 1998; (5) U.S. provisional patent application No. 60/183,546, filed on Feb. 18, 2000; , (6) U.S. utility patent application Ser. No. 09/523,460, filed on Mar. 10, 2000, which claimed the benefit of the filing date of U.S. provisional application No. 60/124,042, filed on Mar. 11, 1999; (7) U.S. utility patent application Ser. No. 09/512,895, filed on Feb. 24, 2000, which claimed the benefit of the filing dates of U.S. provisional application No. 60/121,841, filed on Feb. 26, 1999 and U.S. provisional application No. 60/154,047, filed on Sep. 16, 1999; (8) U.S. utility application Ser. No. 09/511,941, filed on Feb. 24, 2000, which claimed the benefit of the filing date of U.S. provisional Ser. No. 60/121,907, filed on Feb. 26, 1999; (9) U.S. utility patent application Ser. No. 09/588,946, filed on Jun. 7, 2000, which claimed the benefit of the filing date of U.S. provisional patent application Ser. No. 60/137,998, filed on Jun. 7, 1999; (10) U.S. utility patent application Ser. No. 09/559,122, filed on Apr. 26, 2000, which claimed the benefit of the filing date of U.S. provisional application No. 60/131,106, filed on Apr. 26, 1999; (11) U.S. provisional application No. 60/146,203, filed on Jul. 29, 1999; (12) U.S. provisional application No. 60/143,039, filed on Jul. 9, 1999; (13) U.S. provisional patent application Ser. No. 60/162,671, filed on Nov. 1, 1999; (14) U.S. provisional application No. 60/159,039, filed on Oct. 12, 1999; (15) U.S. provisional patent application No. 60/159,033, filed on Oct. 12, 1999; and (16) U.S. provisional patent application No. 60/165,228, filed on Nov. 12, 1999, the disclosures of which are incorporated herein by reference.

The coupling 1535 is preferably coupled to the support member 1520, the expansion cone 1530 and the resilient anchor 1540. The coupling 1535 is preferably adapted to convey pressurized fluidic materials and/or electrical current and/or communication signals from a surface location to the resilient anchor 1535. The coupling 1535 may, for example, be conventional commercially available slick wire, braided wire, coiled tubing, or drilling stock material. In an exemplary embodiment, the coupling 1535 is decoupled from the resilient anchor 1540 upon initiating the axial displacement of the expansion cone 1530.

The resilient anchor 1540 is preferably coupled to the lower section 1550 of the expandable tubular member 1525 and the coupling 1535. The resilient anchor 1540 is further preferably adapted to be controllably coupled to the wellbore casing 1500.

Figure 16A:
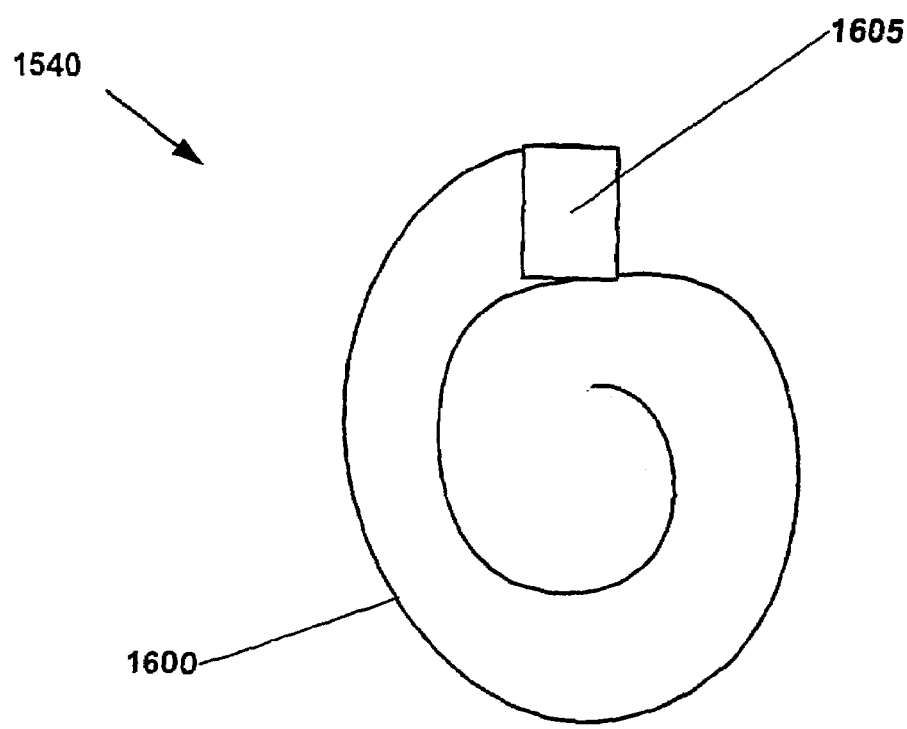
Figure 16B:
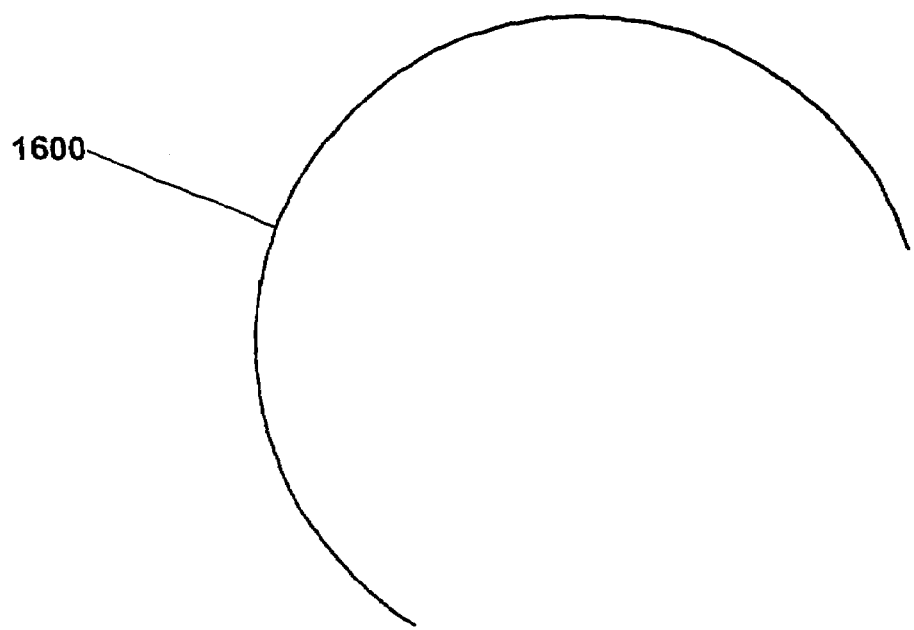
FIG. 16b is a top view of the resilient anchor of FIG. 16a after releasing the coiled resilient member.

Referring to FIGS. 16a and 16b, in an exemplary embodiment, the resilient anchor 1540 includes one or more coiled resilient members 1600 and corresponding releasable coupling devices 1605. In an exemplary embodiment, the resilient anchor 1540 is maintained in a compressed elastic position that is controllably released thereby causing the resilient anchor 1540 to expand in size thereby releasing the elastic energy stored within the resilient anchor 1540. As illustrated in FIG. 16b, in an exemplary embodiment, when the coupling device 1605 is released, the coiled resilient member 1600 at least partially uncoils in the outward radial direction. In an exemplary embodiment, at least a portion of the coiled member 1600 is coupled to the lower section 1550 of the expandable tubular member 1525. In an exemplary embodiment, the uncoiled member 1600 thereby couples the lower section 1550 of the expandable tubular member 1525 to the wellbore casing 1500.

The coiled member 1600 may be fabricated from any number of conventional commercially available resilient materials. In an exemplary embodiment, the coiled member 1600 is fabricated from a resilient material such as, for example, spring steel. In an exemplary embodiment, the coiled member 1600 is fabricated from memory metals in order to optimally provide control of shapes and stresses.

In an exemplary embodiment, the releasable coupling device 1605 maintains the coiled member 1600 is a coiled position until the device 1605 is released. The releasable coupling device 1605 may be any number of conventional commercially available releasable coupling devices such as, for example, an explosive bolt.

The resilient anchor 1540 may be positioned in any desired orientation. In an exemplary embodiment, the resilient anchor 1540 is positioned to apply the maximum normal force to the walls of the wellbore casing 1500 after releasing the resilient anchor 1540.

Figure 17A:
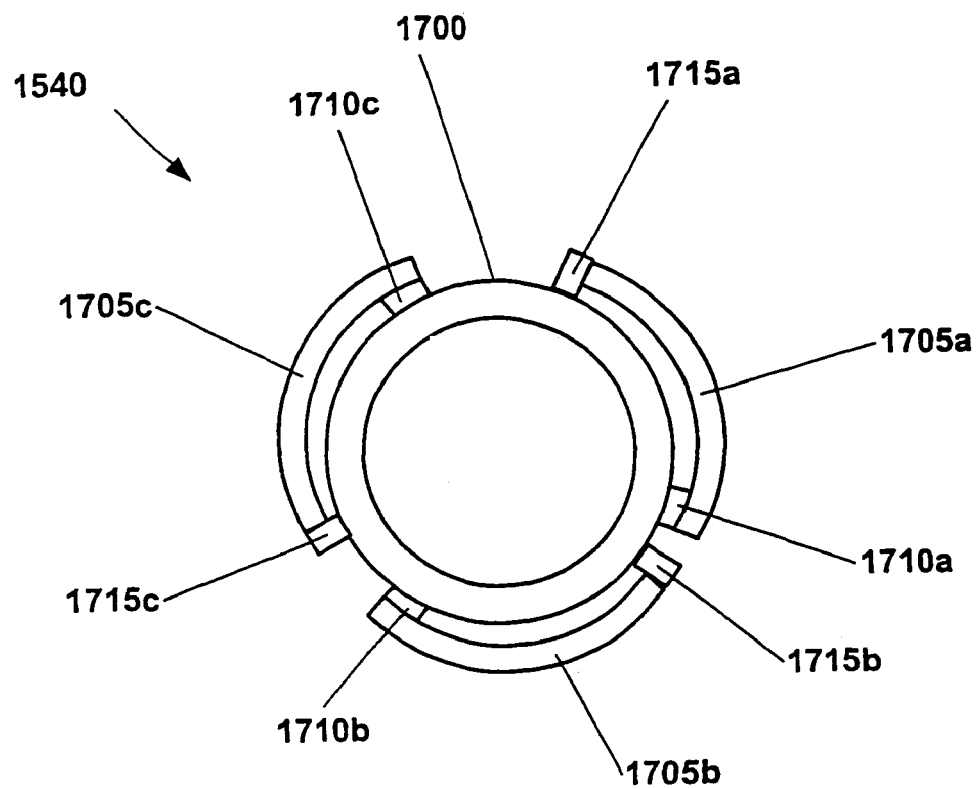
Figure 17B:
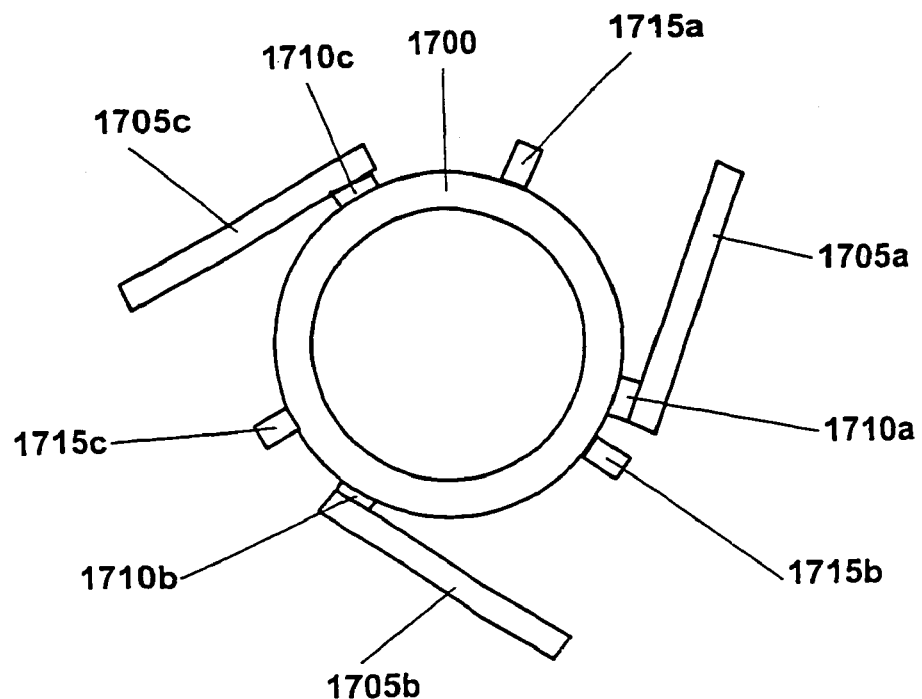
FIG. 17b is a top view of the resilient anchor of FIG. 17a after releasing the resilient elements.

In an alternate embodiment, as illustrated in FIGS. 17a and 17b, the resilient anchor 1540 includes a tubular member 1700, one or more resilient anchoring members 1705, one or more corresponding rigid attachments 1710, and one more corresponding releasable attachments 1715. In an exemplary embodiment, the resilient anchoring members 1705 are maintained in compressed elastic condition by the corresponding rigid and releasable attachments, 1710 and 1715. In an exemplary embodiment, when the corresponding releasable attachment 1715 is released, the corresponding resilient anchoring member 1705 expands, releasing the stored elastic energy, away from the tubular member 1700.

As illustrated in FIG. 17a, one end of each resilient anchoring member 1705 is rigidly attached to the outside surface of the tubular member 1700 by a corresponding rigid attachment 1710. The other end of each resilient anchoring member 1705 is removably attached to the outside surface of the tubular member 1700 by a corresponding releasable attachment 1715. As illustrated in FIG. 17b, in an exemplary embodiment, releasing the releasable attachment 1715 permits the resilient energy stored in the resilient anchoring member 1705 to be released thereby causing the resilient anchoring member 1705 to swing radially outward from the tubular member 1700.

The tubular member 1700 may be fabricated from any number of conventional materials.

The resilient anchoring members 1705 may be fabricated from any number of resilient materials. In an exemplary embodiment, the resilient anchoring members 1705 are fabricated from memory metal in order to optimally provide control of shapes and stresses.

The rigid attachments 1710 may be fabricated from any number of conventional commercially available materials. In an exemplary embodiment, the rigid attachments 1710 are fabricated from 4140 steel in order to optimally provide high strength.

The releasable attachments 1715 may be fabricated from any number of conventional commercially available devices such as, for example, explosive bolts.

Figure 18A:
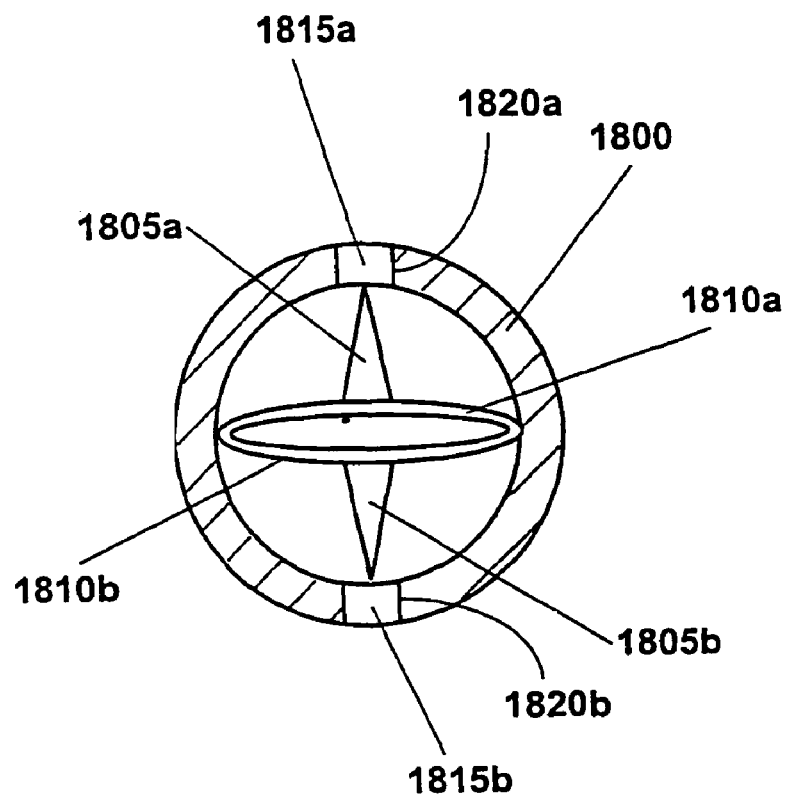
Figure 18B:
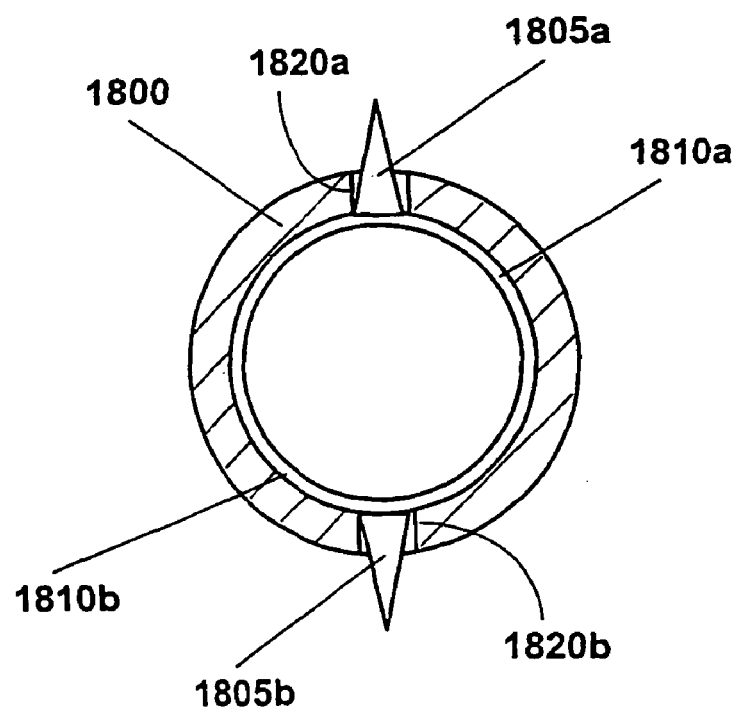
FIG. 18b is a fragmentary cross-sectional top view of the resilient anchor of FIG. 18a after releasing the resilient elements.

In another alternative embodiment, as illustrated in FIGS. 18a and 18b, the resilient anchor 1540 includes a tubular member 1800, one or more anchoring devices 1805, one or more resilient members 1810, and one or more release devices 1815. In an exemplary embodiment, the anchoring devices 1805 and resilient members 1810 are maintained in a compressed elastic position by the release devices 1815.

As illustrated in FIG. 18b, in an exemplary embodiment, when the release devices 1815 are removed, the anchoring devices 1805 and resilient members 1810 are permitted to expand outwardly in the radial direction.

The tubular member 1800 preferably includes one or more openings 1820 for containing the release devices 1815 and for permitting the anchoring devices 1805 to pass through. The tubular member 1800 may be fabricated from any number of conventional commercially available materials. In an exemplary embodiment, the tubular member 1800 is fabricated from 4140 steel in order to optimally provide high strength.

The anchoring devices 1805 are housed within the tubular member 1800. The anchoring devices 1805 are preferably adapted to at least partially extend through the corresponding openings 1820 in the tubular member 1800. The anchoring devices 1805 are preferably adapted to couple to, and at least partially penetrate, the surface of the wellbore 1500. The anchoring devices 1805 may be fabricated from any number of durable hard materials such as, for example, tungsten carbide, machine tool steel, or hard faced steel. In an exemplary embodiment, the anchoring devices 1805 are fabricated from machine tool steel in order to optimally provide high strength, hardness, and fracture toughness.

The resilient members 1810 are coupled to the inside surface of the tubular member 1800. The resilient members 1810 are preferably adapted to apply a radial force upon the corresponding anchoring devices 1805. In an exemplary embodiment, when the release devices 1815 release the anchoring devices 1805, the resilient members 1810 are preferably adapted to force the anchoring devices at least partially through the corresponding openings 1820 into contact with, to at least partially penetrate, the wellbore casing 1500.

The release devices 1815 are positioned within and coupled to the openings 1820 in the tubular member 1800. The release devices 1815 are preferably adapted to hold the corresponding anchoring devices 1805 within the tubular member 1800 until released by a control signal provided from a surface, or other, location. The release devices 1815 may be any number of conventional commercially available release devices. In an exemplary embodiment, the release devices 1815 are pressure activated in order to optimally provide ease of operation.

As illustrated in FIG. 15a, the apparatus 1515 is preferably positioned within the wellbore casing 1500 with the expandable tubular member 1525 positioned in opposing relation to the opening 1510.

Figure 15B:
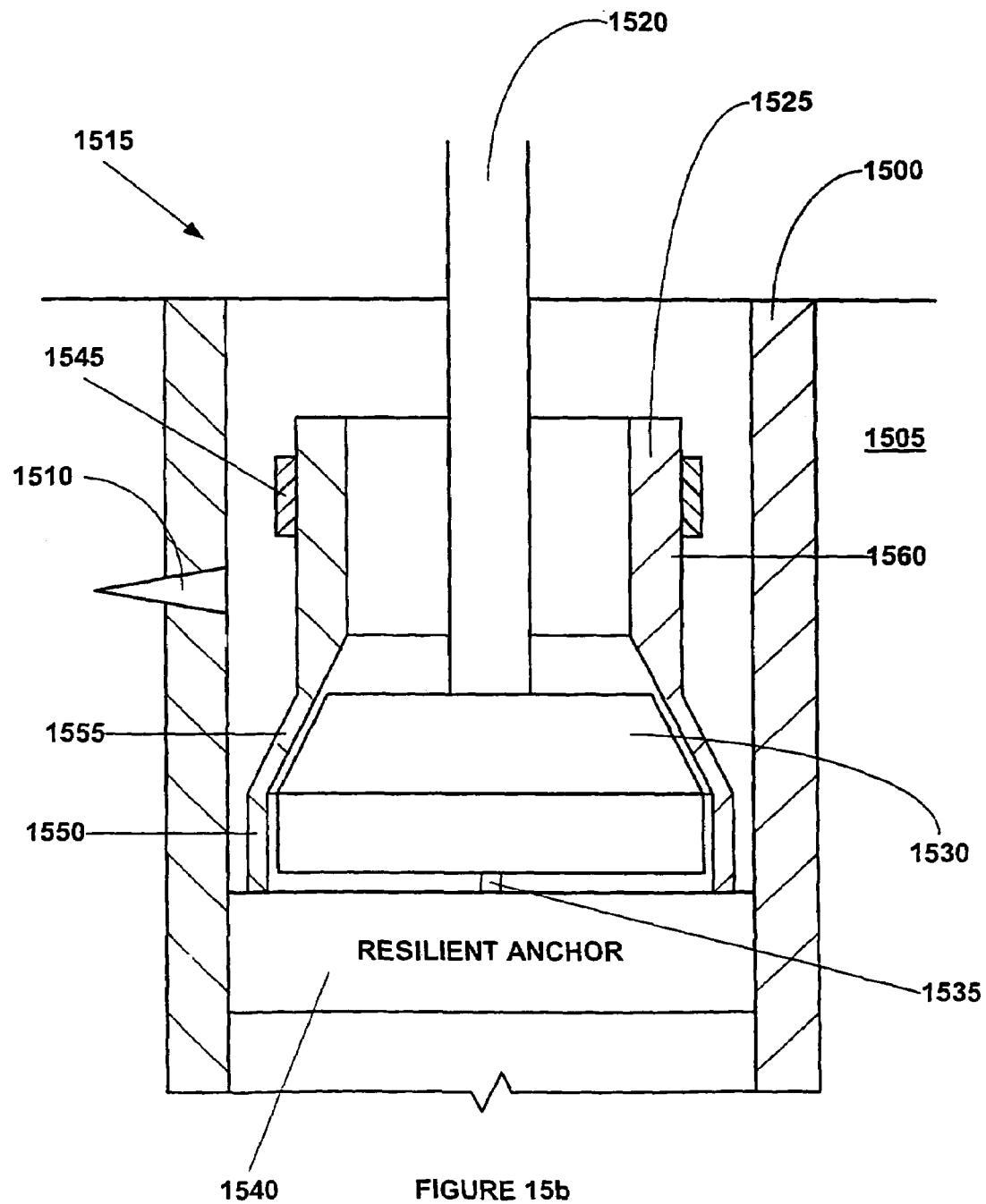
FIG. 15b is a fragmentary cross-sectional illustration of the apparatus of FIG. 15a after coupling the resilient anchor to the wellbore casing.

As illustrated in FIG. 15b, in an exemplary embodiment, the resilient anchor 1540 is then anchored to the wellbore casing 1500. In this manner, the lower section 1550 of the expandable tubular member 1525 is anchored to the wellbore casing 1500. In an exemplary embodiment, the resilient anchor 1540 is anchored by a control and/or electrical power signal transmitted from a surface location.

In an alternative embodiment, a compressible cement and/or epoxy is then injected into the annular space between the unexpanded portion of the tubular member 1525 and the wellbore casing 1500. The compressible cement and/or epoxy is then permitted to at least partially cure prior to the initiation of the radial expansion process. In this manner, an annular structural support and fluidic seal is provided around the tubular member 1525.

Figure 15C:
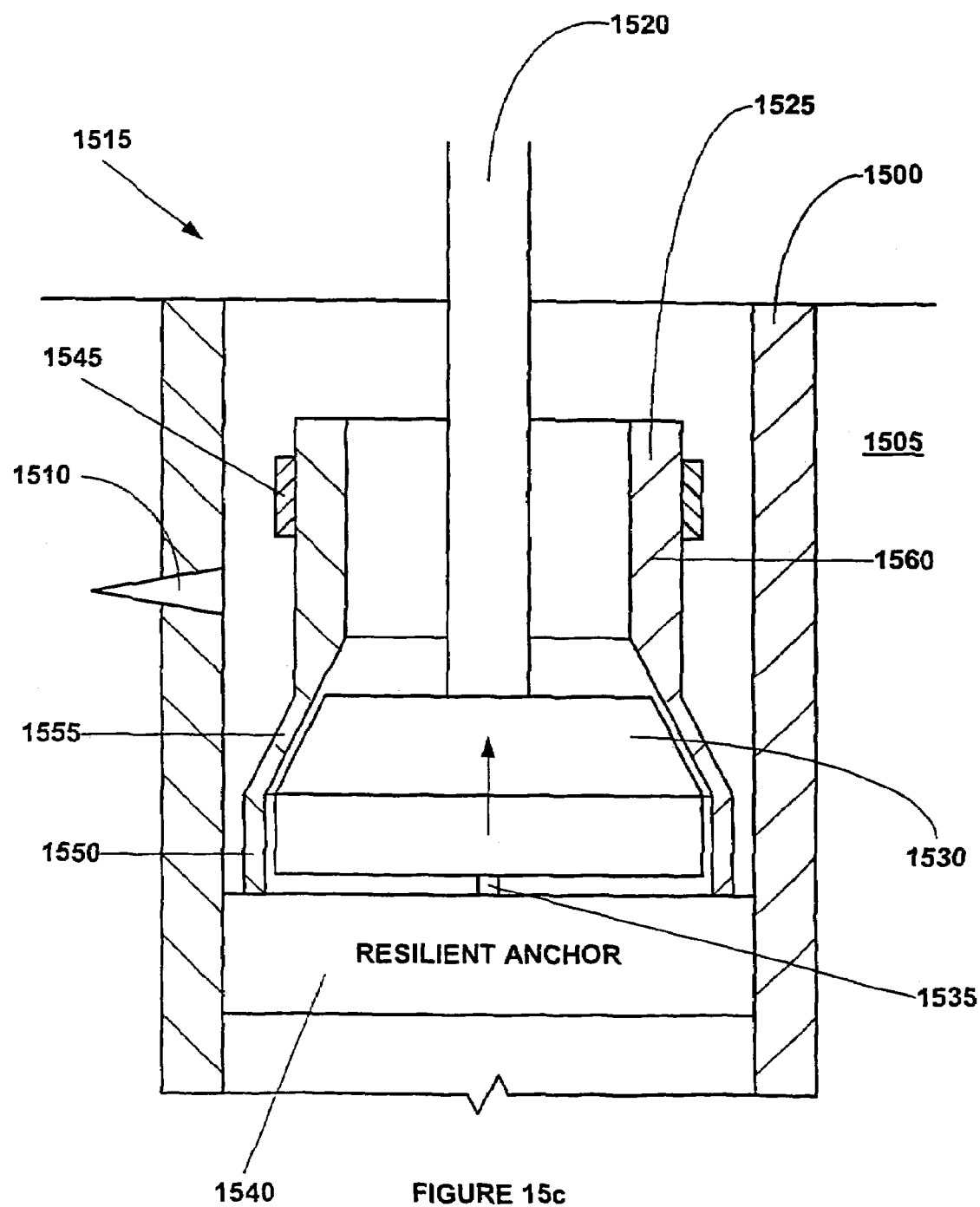
FIG. 15c is a fragmentary cross-sectional illustration of the apparatus of FIG. 15b after initiating the axial displacement of the expansion cone.

As illustrated in FIG. 15c, in an exemplary embodiment, the expansion cone 1530 is then axially displaced by applying an axial force to the support member 1520. In an exemplary embodiment, the axial displacement of the expansion cone 1530 radially expands the expandable tubular member 1525 into intimate contact with the walls of the wellbore casing 1500.

Figure 15D:
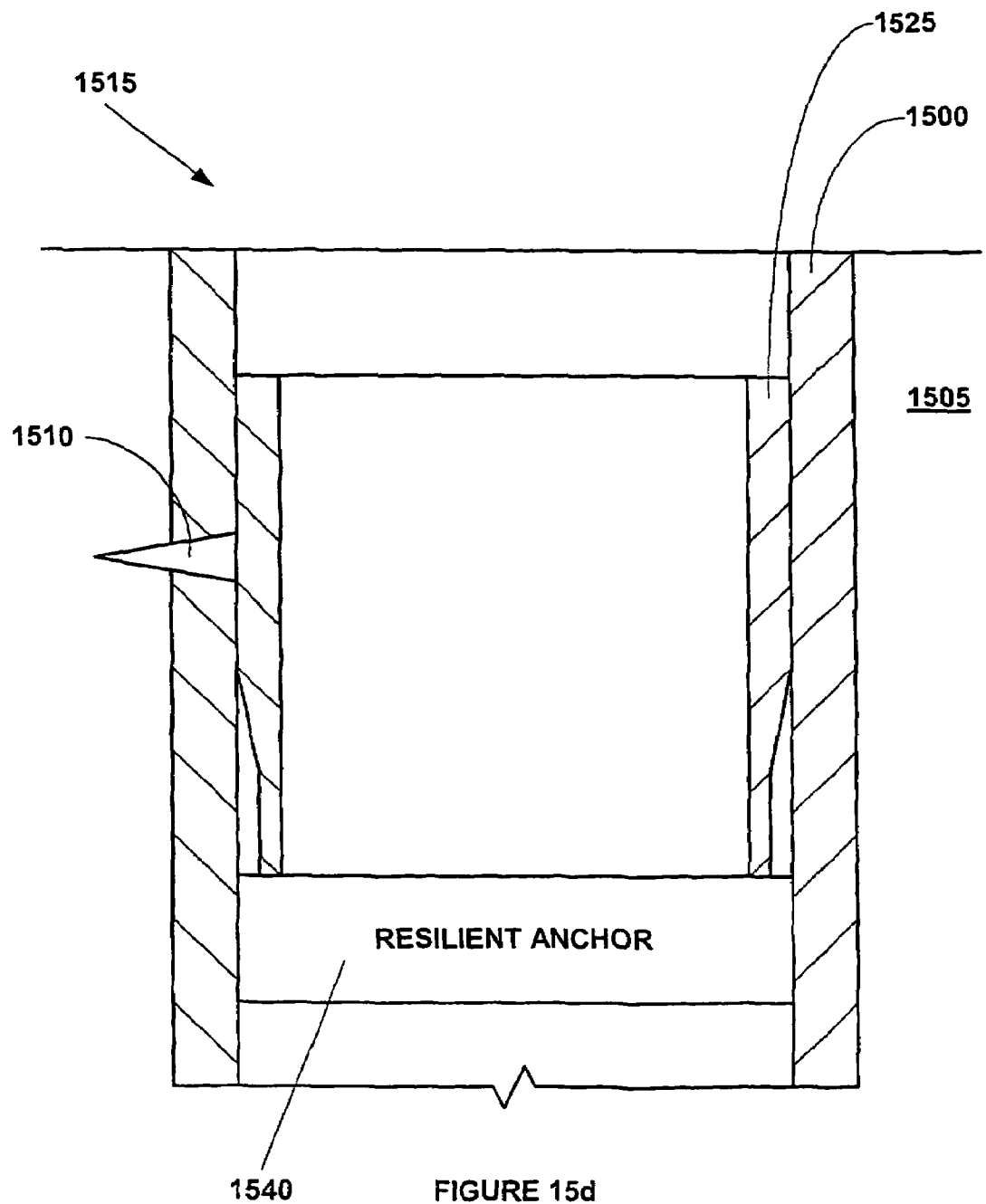
FIG. 15d is a fragmentary cross-sectional illustration of the apparatus of FIG. 15c after completion of the radial expansion of the expandable tubular member.

As illustrated in FIG. 15d, in an exemplary embodiment, after the expandable tubular member 1525 has been completely radially expanded by the axial displacement of the expansion cone 1530, the opening 1510 in the wellbore casing 1500 is sealed off by the radially expanded tubular member 1525. In this manner, repairs to the wellbore casing 1500 are optimally provided. More generally, the apparatus 1515 is used to repair or form wellbore casings, pipelines, and structural supports.

Figure 19A:
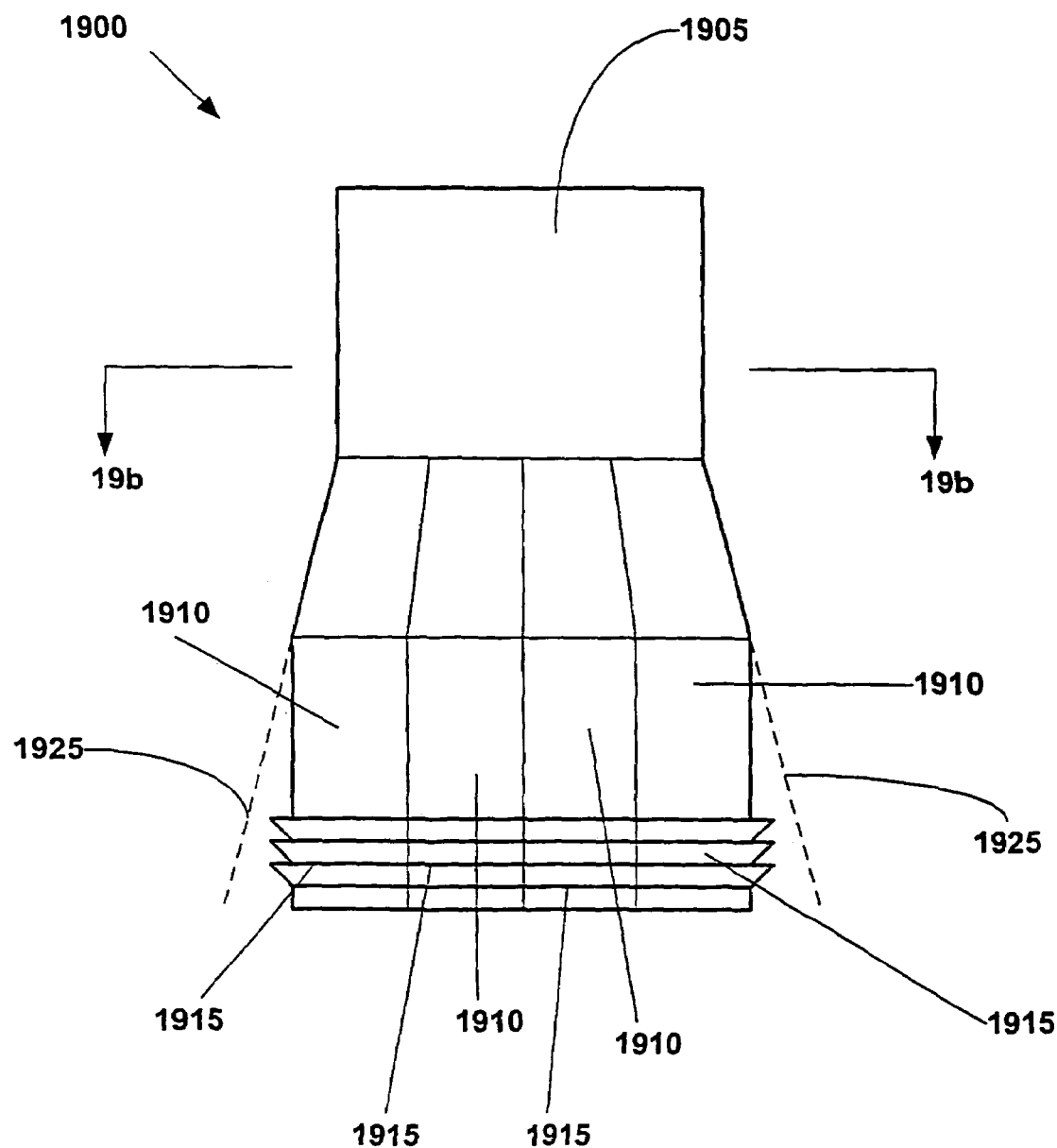
FIG. 19a is an front view of an embodiment of an expandable tubular member including one or more resilient panels.
Figure 19B:
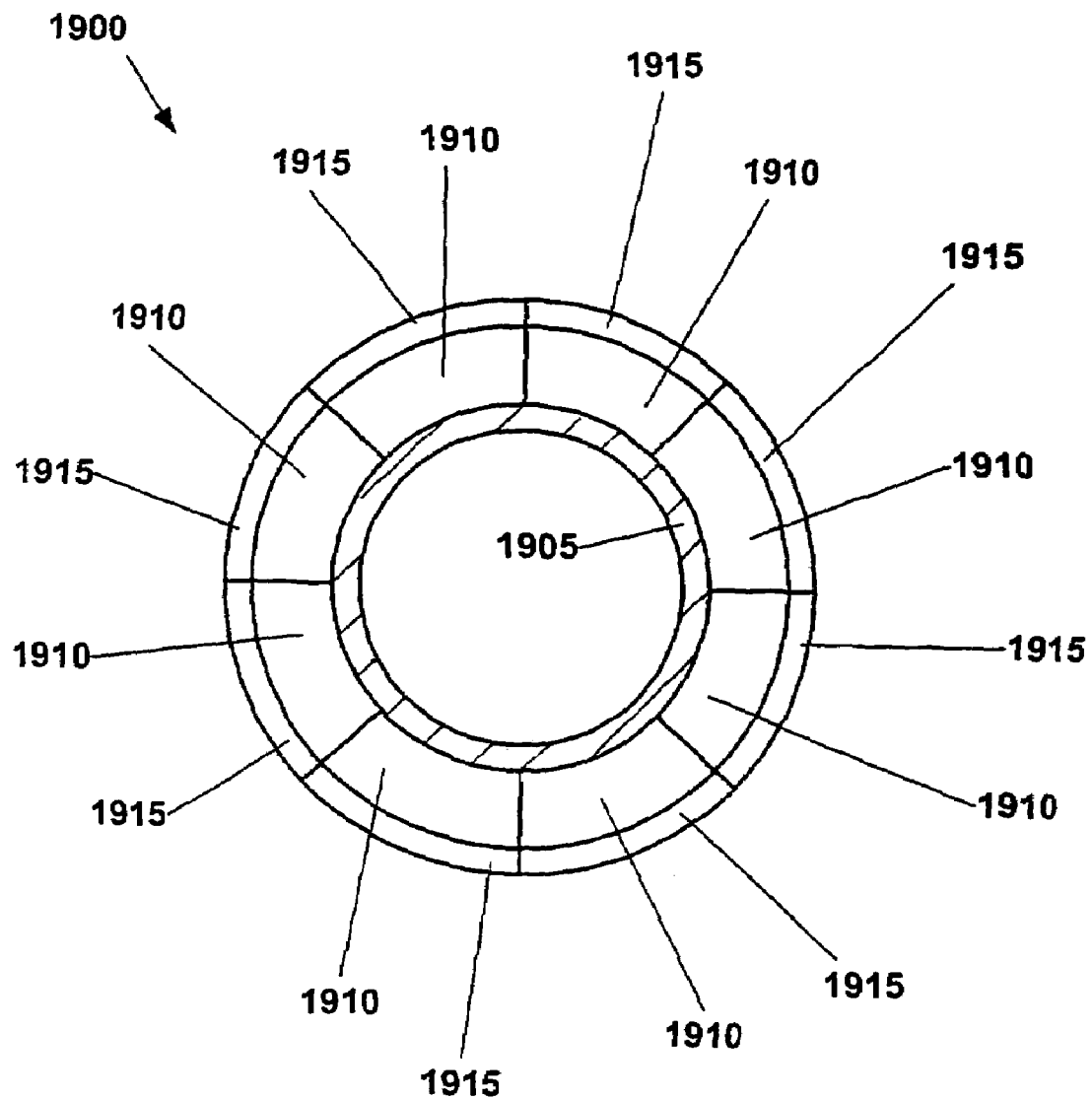
Figure 19C:
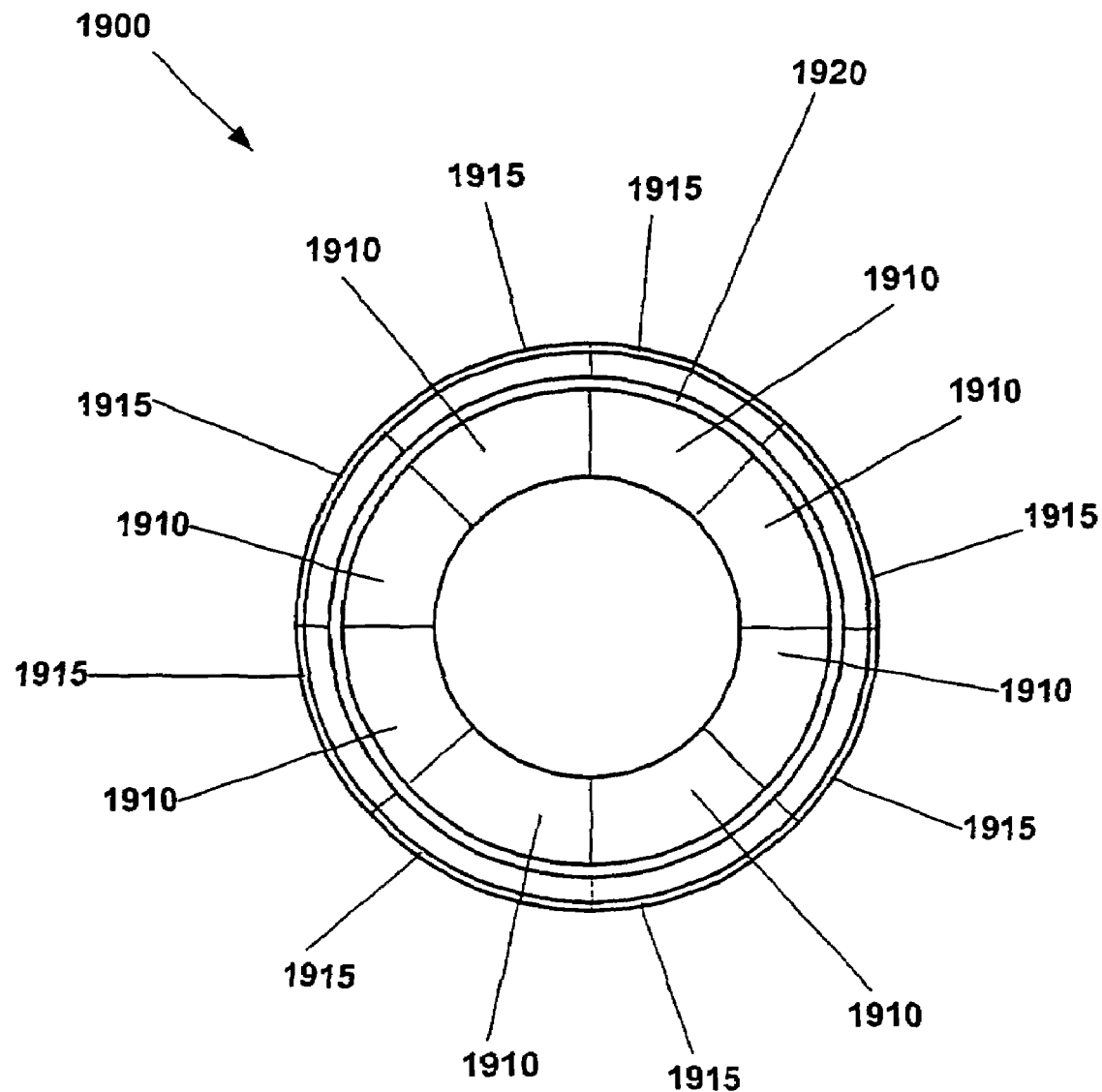

Referring to FIGS. 19a, 19b and 19c, an alternative embodiment of an expandable tubular member 1900 for use in the apparatus 1515 will now be described. In an exemplary embodiment, the expandable tubular member 1900 includes a tubular body 1905, one or more resilient panels 1910, one or more corresponding engagement members 1915, and a release member 1920. In an exemplary embodiment, the resilient panels 1910 are adapted to expand in the radial direction after being released by the release member 1920. In this manner, the expandable tubular member 1900 is anchored to a preexisting structure such as, for example, a wellbore casing, an open hole wellbore section, a pipeline, or a structural support.

The tubular member 1905 is coupled to the resilient panels 1910. The tubular member 1905 may be any number of conventional commercially available expandable tubular members. In an exemplary embodiment, the tubular member 1905 is an expandable casing in order to optimally provide high strength.

The resilient panels 1910 are coupled to the tubular member 1905. The resilient panels 1910 are further releasably coupled to the release member 1920. The resilient panels 1910 are preferably adapted to house the expansion cone 1530. The resilient panels 1910 are preferably adapted to extend to the position 1925 upon being released by the release member 1920. In an exemplary embodiment, the resilient panels 1910 are coupled to the tubular member 1905 by welding in order to optimally provide high strength. The resilient panels 1910 may be fabricated from any number of conventional commercially available resilient materials. In an exemplary embodiment, the resilient panels 1910 are fabricated from spring steel in order to optimally store elastic radially directed energy.

The engagement members 1915 are coupled to corresponding resilient panels. The engagement members 1915 are preferably adapted to engage, and at least partially penetrate, the wellbore casing 1500, or other preexisting structure.

The release member 1920 is releasably coupled to the resilient panels 1910. The release member 1920 is preferably adapted to controllably release the resilient panels 1910 from their initial strained positions in order to permit the resilient panels 1910 to expand to their expanded positions 1925. In an exemplary embodiment, the release member 1920 is releasably coupled to the coupling 1535. In this manner, electrical and/or control and/or hydraulic signals are communicated to and/or from the release member 1920. The release member 1920 may be any number of conventional commercially available release devices.

Figure 20A:
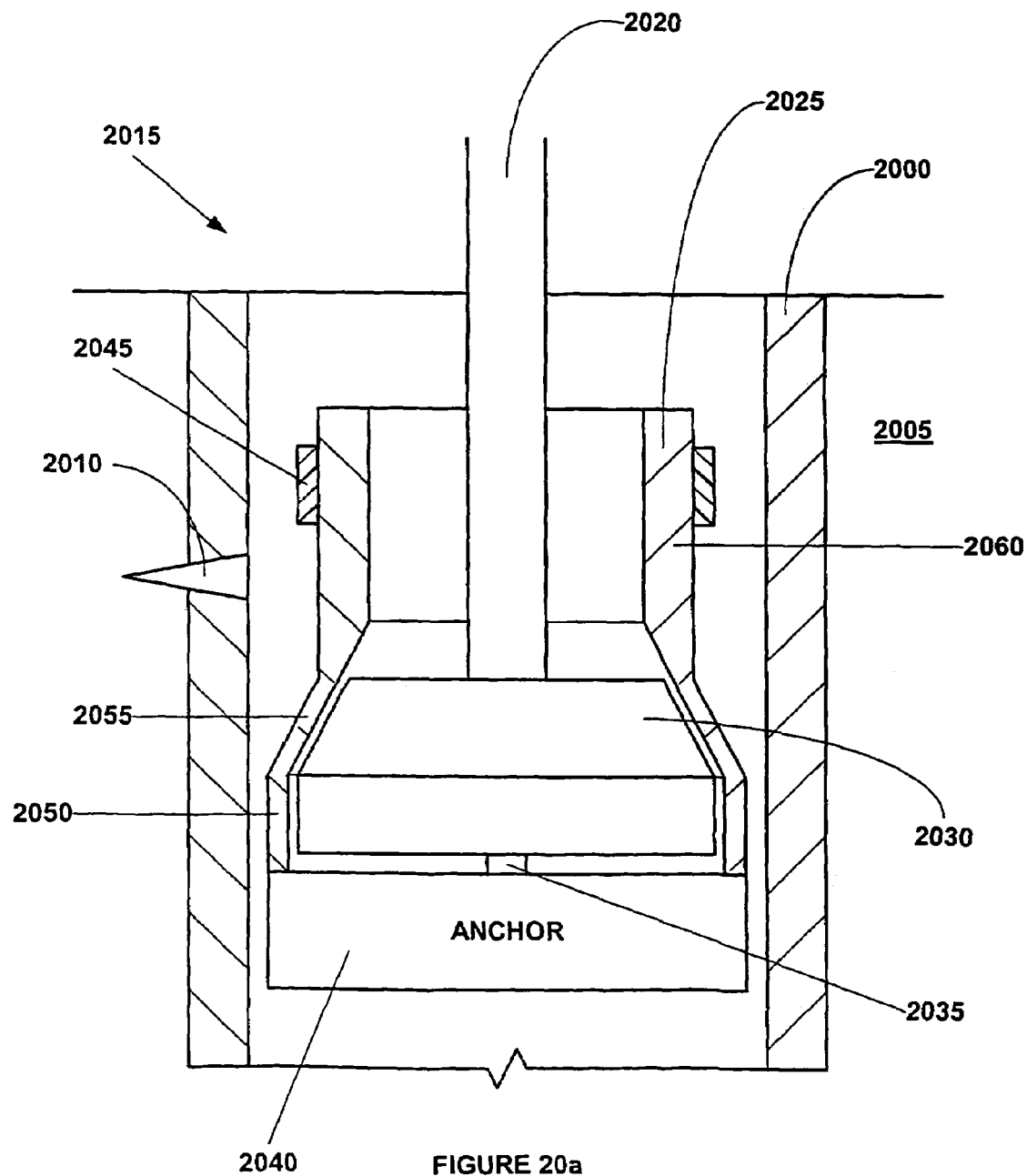
FIG. 20a is a fragmentary cross-sectional illustration of an alternative embodiment of an apparatus for coupling an expandable tubular member to a preexisting structure positioned within a wellbore.

Referring to FIGS. 20a to 20d, an alternative embodiment of an apparatus and method for coupling an expandable tubular member to a preexisting structure will now be described. Referring to FIG. 20a, a wellbore casing 2000 is positioned within a subterranean formation 2005. The wellbore casing 2000 may be positioned in any orientation from the vertical direction to the horizontal direction. The wellbore casing 2000 further includes one or more openings 2010 that may have been the result of unintentional damage to the wellbore casing 2000, or due to a prior perforation or fracturing operation performed upon the surrounding subterranean formation 2005. As will be recognized by persons having ordinary skill in the art, the openings 2010 can adversely affect the subsequent operation and use of the wellbore casing 2000 unless they are sealed off.

In an exemplary embodiment, an apparatus 2015 is utilized to seal off the openings 2010 in the wellbore casing 2000. More generally, the apparatus 2015 is preferably utilized to form or repair wellbore casings, pipelines, or structural supports.

The apparatus 2015 preferably includes a support member 2020, an expandable tubular member 2025, an expansion cone 2030, a coupling 2035, a resilient anchor 2040, and one or more seals 2045.

The support member 2020 is preferably adapted to be coupled to a surface location. The support member 2020 is further coupled to the expansion cone 2030. The support member 2020 is preferably adapted to convey pressurized fluidic materials and/or electrical current and/or communication signals from a surface location to the anchor 2040. The support member 2020 may, for example, be conventional commercially available slick wire, braided wire, coiled tubing, or drilling stock material.

The expandable tubular member 2025 is removably coupled to the expansion cone 2030. In an exemplary embodiment, the expandable tubular member 2025 includes one or more engagement devices that are adapted to couple with and penetrate the wellbore casing 2000. In this manner, the expandable tubular member 2025 is optimally coupled to the wellbore casing 2000. In an exemplary embodiment, the engagement devices include teeth for biting into the surface of the wellbore casing 2000. In an exemplary embodiment, the expandable tubular member 2025 further includes one or more sealing members 2045 on the outside surface of the expandable tubular member 2025 in order to optimally seal the interface between the expandable tubular member 2025 and the wellbore casing 2000.

In an exemplary embodiment, the expandable tubular member 2025 includes a lower section 2050, an intermediate section 2055, and an upper section 2060. In an exemplary embodiment, the wall thicknesses of the lower and intermediate sections, 2050 and 2055, are less than the wall thickness of the upper section 2060 in order to optimally facilitate the radial expansion of the expandable tubular member 2025. In an exemplary embodiment, the sealing members 2045 are provided on the outside surface of the upper section 2060 of the expandable tubular member 2025. In an exemplary embodiment, the resilient anchor 2040 is coupled to the lower section 2050 of the expandable tubular member 2025 in order to optimally anchor the expandable tubular member 2025 to the wellbore casing 2000.

In an exemplary embodiment, the expandable tubular member 2025 is further provided substantially as disclosed in one or more of the following: (1) U.S. utility patent application Ser. No. 09/454,139, filed on Dec. 3, 1999, which claimed the benefit of the filing date of U.S. provisional patent application No. 60/111,293, filed on Dec. 7, 1998; (2) U.S. utility patent application Ser. No. 09/510,913, filed on Feb. 23, 2000, which claimed the benefit of the filing date of U.S. provisional application No. 60/121,702, filed on Feb. 25, 1999; (3) U.S. utility patent application Ser. No. 09/502,350, filed on Feb. 10, 2000, which claimed the benefit of the filing date of U.S. provisional application No. 60/119,611, (4) U.S. utility patent application Ser. No. 09/440,338, filed on Nov. 15, 1999, which claimed the benefit of the filing date of U.S. provisional application No. 60/108,558, filed on Nov. 16, 1998; (5) U.S. provisional patent application No. 60/183,546, filed on Feb. 18, 2000; (6) U.S. utility patent application Ser. No. 09/523,460, filed on Mar. 10, 2000, which claimed the benefit of the filing date of U.S. provisional application No. 60/124,042, filed on Mar. 11, 1999; (7) U.S. utility patent application Ser. No. 09/512,895, filed on Feb. 24, 2000, which claimed the benefit of the filing dates of U.S. provisional application No. 60/121,841, filed on Feb. 26, 1999 and U.S. provisional application No. 60/154,047, filed on Sep. 16, 1999; (8) U.S. utility application Ser. No. 09/511,941, filed on Feb. 24, 2000, which claimed the benefit of the filing date of U.S. provisional Ser. No. 60/121,907, filed on Feb. 26, 1999; (9) U.S. utility patent application Ser. No. 09/588,946, filed on Jun. 7, 2000, which claimed the benefit of the filing date of U.S. provisional patent application Ser. No. 60/137,998, filed on Jun. 7, 1999; (10) U.S. utility patent application Ser. No. 09/559,122, filed on Apr. 26, 2000, which claimed the benefit of the filing date of U.S. provisional application No. 60/131,106, filed on Apr. 26, 1999; (11) U.S. provisional application No. 60/146,203, filed on Jul. 29, 1999; (12) U.S. provisional application No. 60/143,039, filed on Jul. 9, 1999; (13) U.S. provisional patent application Ser. No. 60/162,671, filed on Nov. 1, 1999; (14) U.S. provisional application No. 60/159,039, filed on Oct. 12, 1999; (15) U.S. provisional patent application No. 60/159,033, filed on Oct. 12, 1999; and (16) U.S. provisional patent application No. 60/165,228, filed on Nov. 12, 1999, the disclosures of which are incorporated herein by reference.

The expansion cone 2030 is preferably coupled to the support member 2020 and the coupling 2035. The expansion cone 2030 is preferably adapted to radially expand the expandable tubular member 2025 when the expansion cone 2030 is axially displaced relative to the expandable tubular member 2025.

In an exemplary embodiment, the expansion cone 2030 is provided substantially as disclosed in one or more of the following: (1) U.S. utility patent application Ser. No. 09/454,139, filed on Dec. 3, 1999, which claimed the benefit of the filing date of U.S. provisional patent application No. 60/111,293, filed on Dec. 7, 1998; (2) U.S. utility patent application Ser. No. 09/510,913, filed on Feb. 23, 2000, which claimed the benefit of the filing date of U.S. provisional application No. 60/121,702, filed on Feb. 25, 1999; (3) U.S. utility patent application Ser. No. 09/502,350, filed on Feb. 10, 2000, which claimed the benefit of the filing date of U.S. provisional application No. 60/119,611, (4) U.S. utility patent application Ser. No. 09/440,338, filed on Nov. 15, 1999, which claimed the benefit of the filing date of U.S. provisional application No. 60/108,558, filed on Nov. 16, 1998; (5) U.S. provisional patent application No. 60/183,546, filed on Feb. 18, 2000; (6) U.S. utility patent application Ser. No. 09/523,460, filed on Mar. 10, 2000, which claimed the benefit of the filing date of U.S. provisional application No. 60/124,042, filed on Mar. 11, 1999; (7) U.S. utility patent application Ser. No. 09/512,895, filed on Feb. 24, 2000, which claimed the benefit of the filing dates of U.S. provisional application No. 60/121,841, filed on Feb. 26, 1999 and U.S. provisional application No. 60/154,047, filed on Sep. 16. 1999; (8) U.S. utility application Ser. No. 09/511,941, filed on Feb. 24, 2000, which claimed the benefit of the filing date of U.S. provisional Ser. No. 60/121,907, filed on Feb. 26, 1999; (9) U.S. utility patent application Ser. No. 09/588,946, filed on Jun. 7, 2000, which claimed the benefit of the filing date of U.S. provisional patent application Ser. No. 60/137,998, filed on Jun. 7, 1999; (10) U.S. utility patent application Ser. No. 09/559,122, filed on Apr. 26, 2000, which claimed the benefit of the filing date of U.S. provisional application No. 60/131,106, filed on Apr. 26, 1999; (11) U.S. provisional application No. 60/146,203, filed on Jul. 29, 1999; (12) U.S. provisional application No. 60/143,039, filed on Jul. 9, 1999; (13) U.S. provisional patent application Ser. No. 60/162,671, filed on Nov. 1, 1999; (14) U.S. provisional application No. 60/159,039, filed on Oct. 12, 1999; (15) U.S. provisional patent application No. 60/159,033, filed on Oct. 12, 1999; and (16) U.S. provisional patent application No. 60/165,228, filed on Nov. 12, 1999, the disclosures of which are incorporated herein by reference.

The coupling 2035 is preferably coupled to the support member 2020, the expansion cone 2030, and the anchor 2040. The coupling 2035 is preferably adapted to convey pressurized fluidic materials and/or electrical current and/or communication signals from a surface location to the anchor 2035. The coupling 2035 may, for example, be conventional commercially available slick wire, braided wire, coiled tubing, or drilling stock material. In an exemplary embodiment, the coupling 2035 is decoupled from the anchor 2040 upon initiating the axial displacement of the expansion cone 2030.

The anchor 2040 is preferably coupled to the lower section 2050 of the expandable tubular member 2025 and the coupling 2035. The anchor 2040 is further preferably adapted to be controllably coupled to the wellbore casing 2000.

Figure 21A:
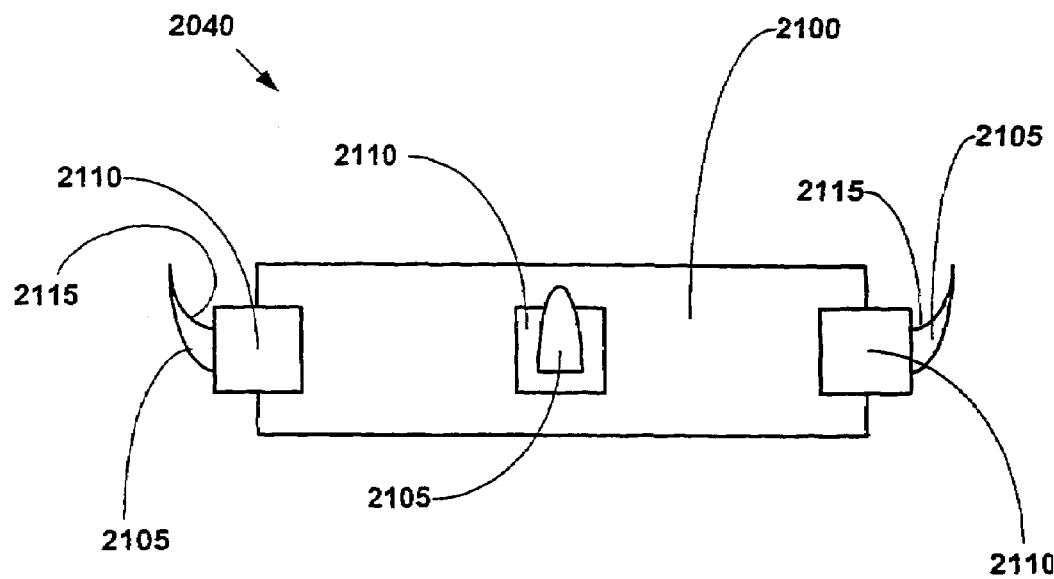
Figure 21B:
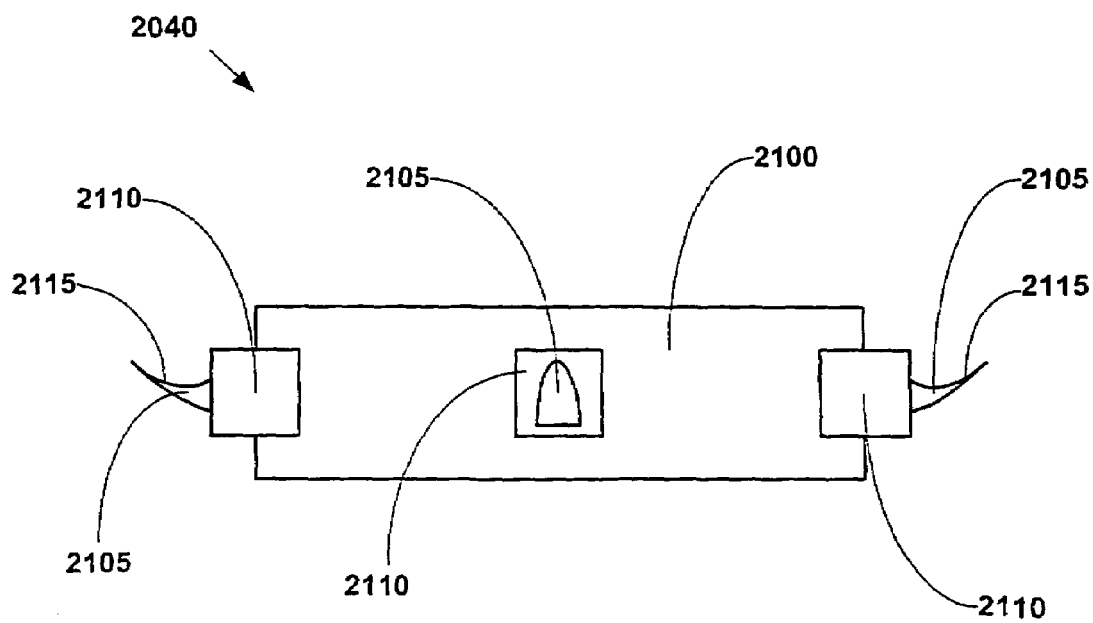
FIG. 21b is an illustration of the anchor of FIG. 21a after outwardly extending the spikes.

Referring to FIGS. 21a and 21b, in an exemplary embodiment, the anchor 2040 includes a housing 2100, one or more spikes 2105, and one or more corresponding actuators 2110. In an exemplary embodiment, the spikes 2105 are outwardly extended by the corresponding actuators 2110. In an alternative embodiment, the spikes 2105 are outwardly actuated by displacing the apparatus 2015 upwardly. In another alternative embodiment, the spikes 2105 are outwardly extended by placing a quantity of fluidic material onto the spikes 2105.

The housing 2100 is coupled to the lower section 2050 of the expandable tubular member 2025, the spikes 2105, and the actuators 2110. The housing 2100 is further preferably coupled to the coupling 2035. In an exemplary embodiment, the housing 2100 is adapted to convey electrical, communication, and/or hydraulic signals from the coupling 2035 to the actuators 2110.

The spikes 2105 are preferably movably coupled to the housing 2100 and the corresponding actuators 2110. The spikes 2105 are preferably adapted to pivot relative to the housing 2100. The spikes 2105 are further preferably adapted to extend outwardly in a radial direction to engage, and at least partially penetrate, the wellbore casing 2000, or other preexisting structure such as, for example, the wellbore. Each of the spikes 2105 further preferably include a concave upwardly facing surface 2115. In an exemplary embodiment, the placement of a quantity of fluidic material such as, for example, a barite plug or a flex plug, onto the surfaces 2115 causes the spikes 2105 to pivot outwardly away from the housing 2100 to engage the wellbore casing 2000, or other preexisting structure such as, for example, the wellbore. Alternatively, the upward displacement of the apparatus 2015 causes the spikes 2105 to pivot outwardly away from the housing 2100 to engage the wellbore casing 2000, or other preexisting structure such as, for example, the wellbore.

The actuators 2110 are preferably coupled to the housing 2100 and the corresponding spikes 2105. The actuators 2110 are preferably adapted to apply a force to the corresponding spikes 2105 sufficient to pivot the corresponding spikes 2105 outwardly and away from the housing 2100. The actuators 2110 may be any number of conventional commercially available actuators such as, for example, a spring, an electric or hydraulic motor, a hydraulic piston/cylinder. In an exemplary embodiment, the actuators 2100 are hydraulic pistons in order to optimally provide ease of operation. In an alternative embodiment, the actuators 2110 are omitted and the spikes are pivotally coupled to the housing 2100.

Figure 22A:
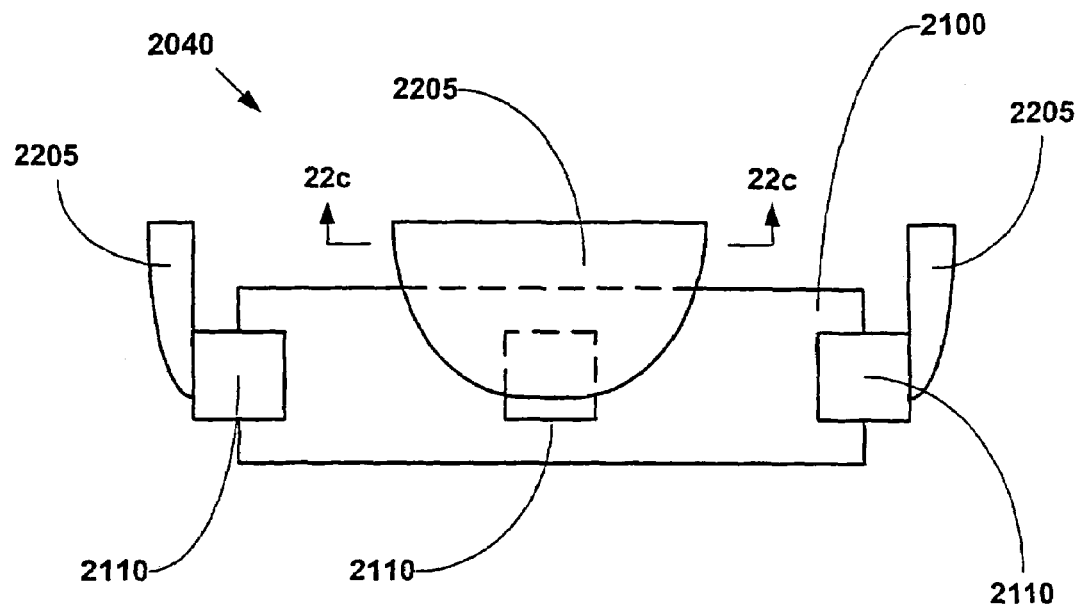
Figure 22B:
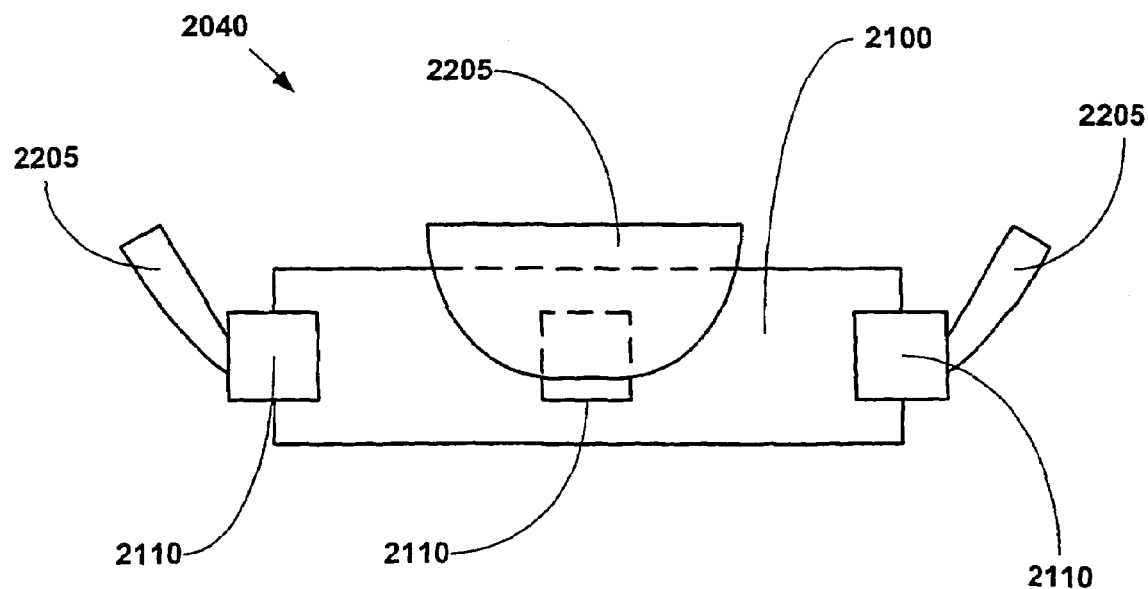
FIG. 22b is an illustration of the anchor of FIG. 22a after outwardly extending the spikes.
Figure 22C:
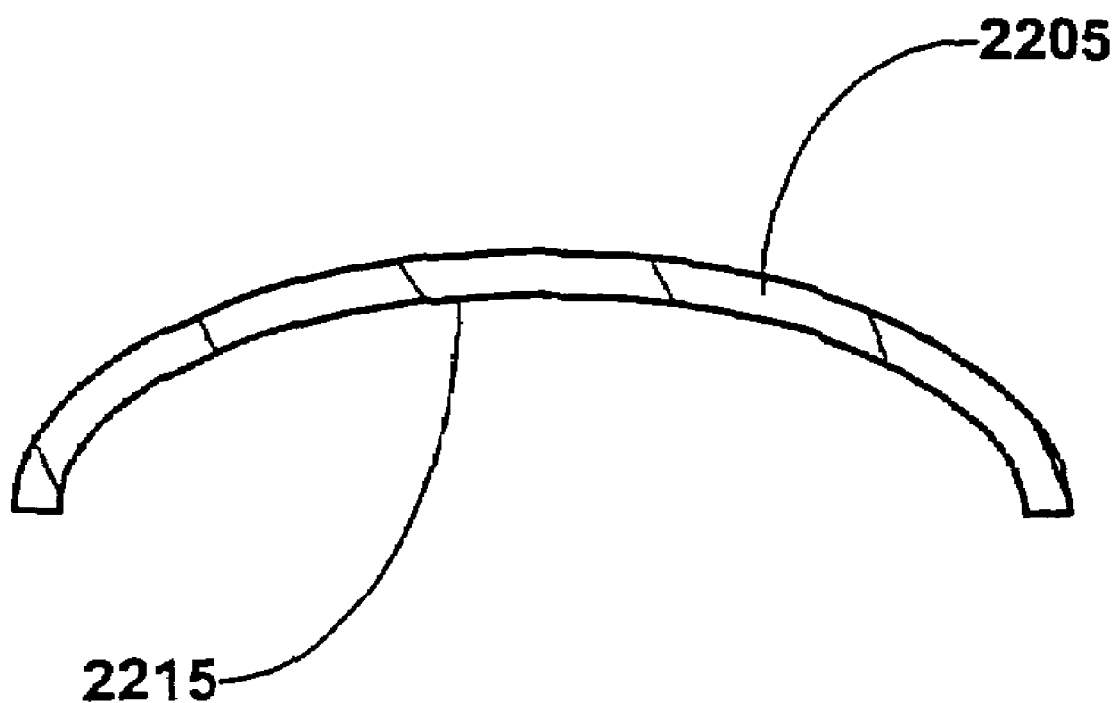

Referring to FIGS. 22a, 22b, and 22c, in an alternative embodiment, the anchor 2040 includes the housing 2100, one or more petal baskets 2205, and one or more corresponding actuators 2110. In an exemplary embodiment, the petal baskets 2205 are outwardly extended by the corresponding actuators 2110. In an alternative embodiment, the petal baskets 2205 are outwardly actuated by displacing the apparatus 2015 upwardly. In another alternative embodiment, the petal baskets 2205 are outwardly extended by placing a quantity of fluidic material onto the petal baskets 2205.

The housing 2100 is coupled to the lower section 2050 of the expandable tubular member 2025, the petal baskets 2205, and the actuators 2110.

The petal baskets 2205 are preferably movably coupled to the housing 2100 and the corresponding actuators 2110. The petal baskets 2205 are preferably adapted to pivot relative to the housing 2100. The petal baskets 2205 are further preferably adapted to extend outwardly in a radial direction to engage, and at least partially penetrate, the wellbore casing 2000, or other preexisting structure. As illustrated in FIG. 22c, each of the petal baskets 2205 further preferably include a concave upwardly facing surface 2215. In an exemplary embodiment, the placement of a quantity of fluidic material such as, for example, a barite plug or a flex plug, onto the surfaces 2215 causes the petal baskets 2205 to pivot outwardly away from the housing 2100 to engage the wellbore casing 2000, or other preexisting structure. Alternatively, the weight of the fluidic materials placed onto the petal baskets 2205 is sufficient to anchor the expandable tubular member 2025. Alternatively, the upward displacement of the apparatus 2015 causes the petal baskets 2205 to pivot outwardly away from the housing 2100 to engage the wellbore casing 2000, or other preexisting structure.

The actuators 2110 are preferably coupled to the housing 2100 and the corresponding petal baskets 2205. The actuators 2110 are preferably adapted to apply a force to the corresponding petal baskets 2205 sufficient to pivot the corresponding petal baskets 2205 outwardly and away from the housing 2100. In an alternative embodiment, the actuators 2110 are omitted and the petal baskets are pivotally coupled to the housing 2100.

In an alternative embodiment, the anchor 2040 includes one or more spikes 2105 and one or more petal baskets 2205.

As illustrated in FIG. 20a, the apparatus 2015 is preferably positioned within the wellbore casing 2000 with the expandable tubular member 2025 positioned in opposing relation to the opening 2010.

Figure 20B:
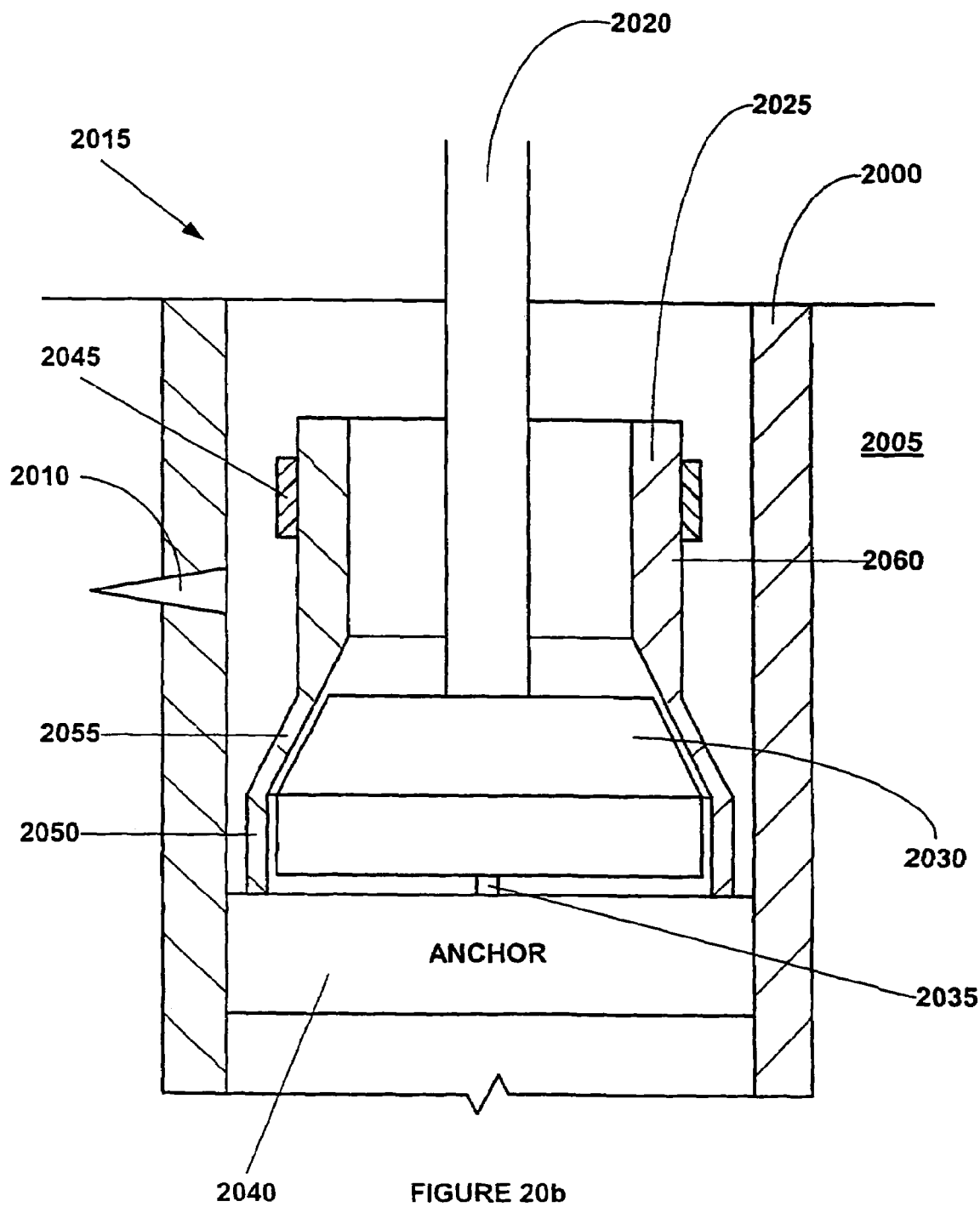
FIG. 20b is a fragmentary cross-sectional illustration of the apparatus of FIG. 20a after coupling the anchor to the wellbore casing.

As illustrated in FIG. 20b, in an exemplary embodiment, the anchor 2040 is then anchored to the wellbore casing 2000. In this manner, the lower section 2050 of the expandable tubular member 2025 is anchored to the wellbore casing 2000 or the wellbore casing. In an exemplary embodiment, the anchor 2040 is anchored by a control and/or electrical power signal transmitted from a surface location to the actuators 2110 of the anchor 2040. In an alternative embodiment, the anchor 2040 is anchored to the wellbore casing 2000 by upwardly displacing the apparatus 2015. In an alternative embodiment, the anchor 2040 is anchored to the wellbore casing 2000 by placing a quantity of a fluidic material such, for example, a barite plug or a flex plug, onto the spikes 2105 or petal baskets 2205 of the anchor 2040. In an alternative embodiment, the anchor 2040 is omitted, and the apparatus 2015 is anchored by placing a quantity of a fluidic material such, for example, a barite plug or a flex plug, onto at least the lower and/or the intermediate sections, 2050 and 2055, of the expandable tubular member 2025.

In an alternative embodiment, a compressible cement and/or epoxy is then injected into the annular space between the unexpanded portion of the tubular member 2025 and the wellbore casing 2000. The compressible cement and/or epoxy is then permitted to at least partially cure prior to the initiation of the radial expansion process. In this manner, an annular structural support and fluidic seal is provided around the tubular member 2025.

Figure 20C:
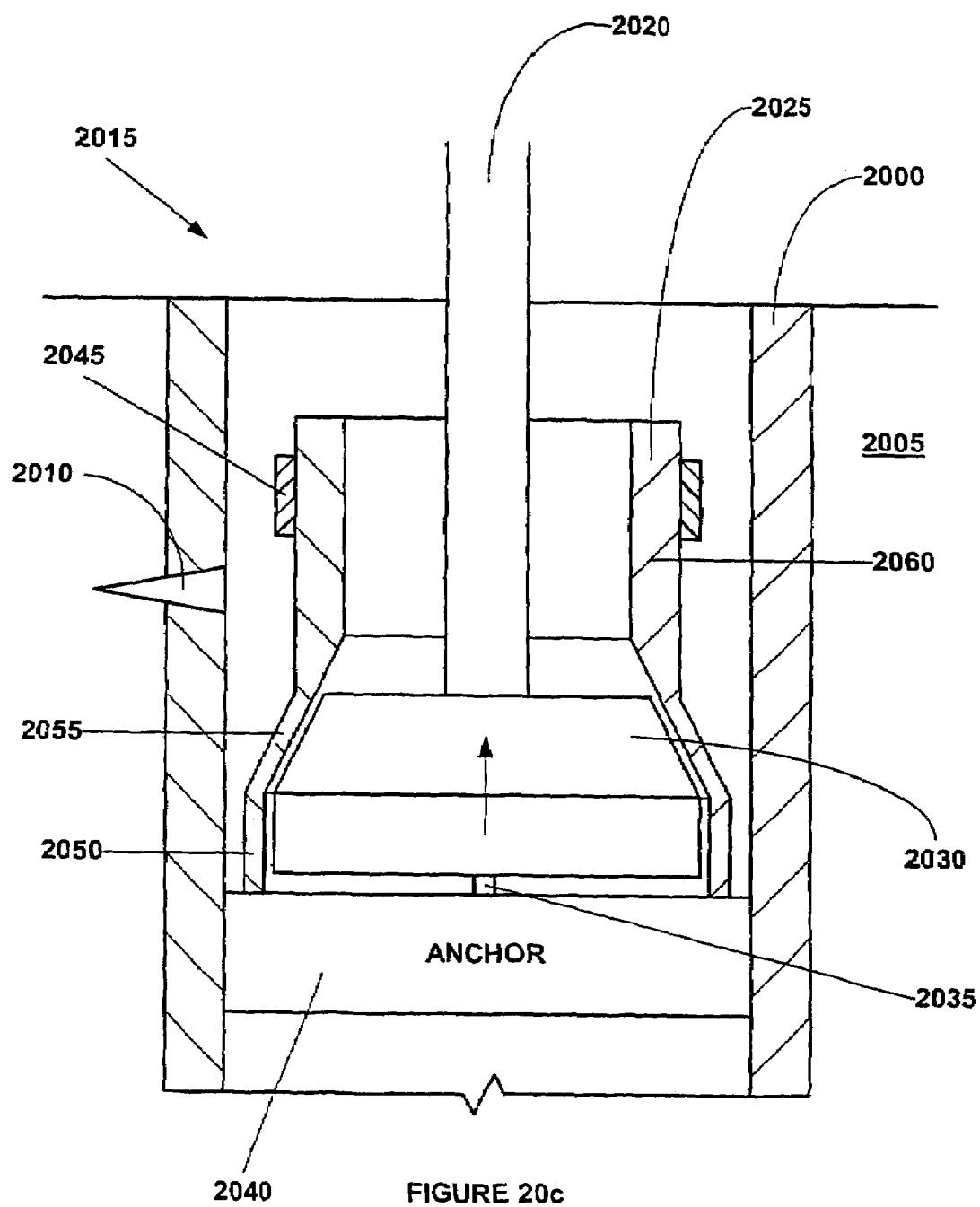
FIG. 20c is a fragmentary cross-sectional illustration of the apparatus of FIG. 20b after initiating the axial displacement of the expansion cone.

As illustrated in FIG. 20c, in an exemplary embodiment, the expansion cone 2030 is then axially displaced by applying an axial force to the support member 2020. In an exemplary embodiment, the axial displacement of the expansion cone 2030 radially expands the expandable tubular member 2025 into intimate contact with the walls of the wellbore casing 2000.

Figure 20D:
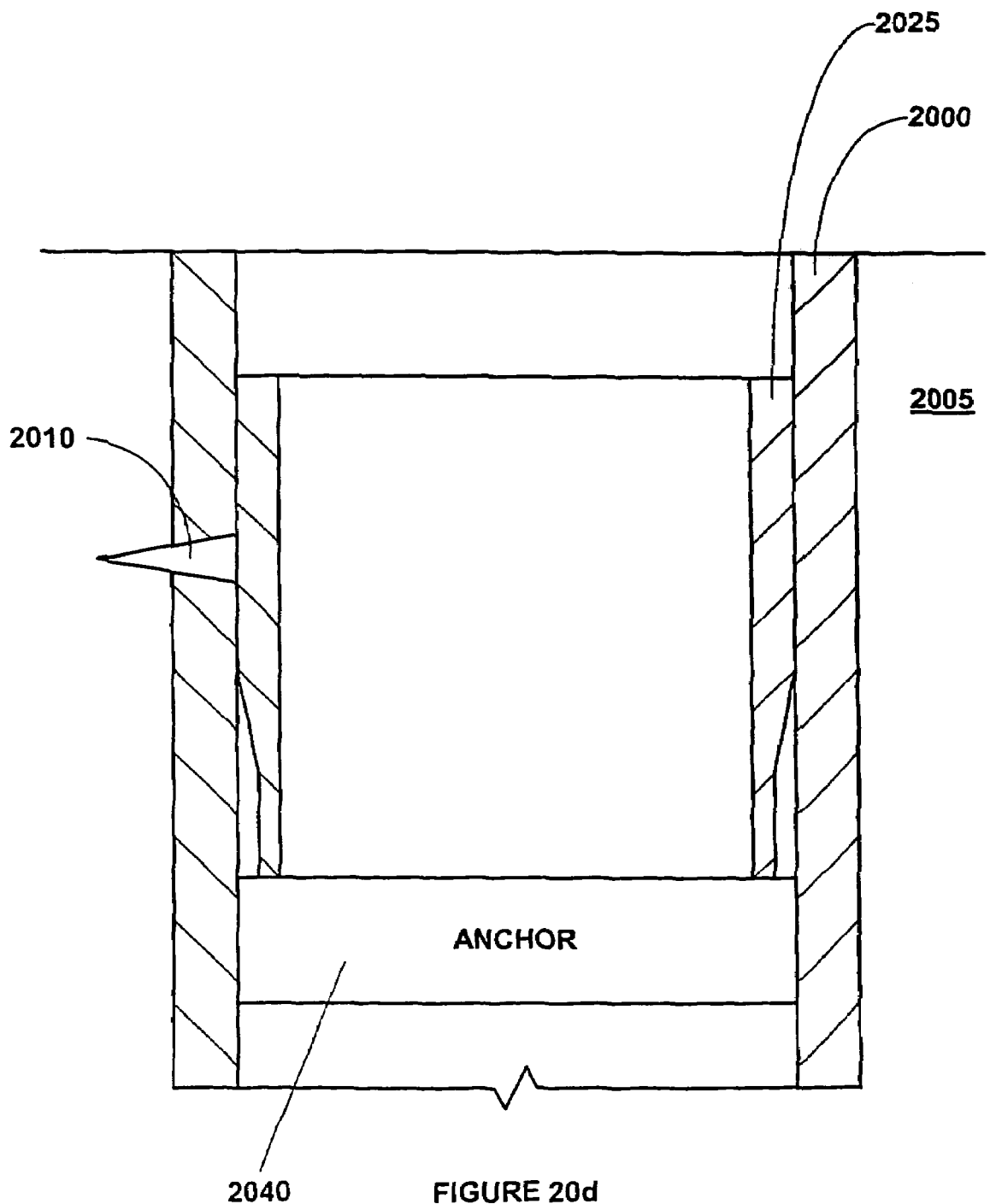
FIG. 20d is a fragmentary cross-sectional illustration of the apparatus of FIG. 20c after completion of the radial expansion of the expandable tubular member.

As illustrated in FIG. 20d, in an exemplary embodiment, after the expandable tubular member 2025 has been completely radially expanded by the axial displacement of the expansion cone 2030, the opening 2010 in the wellbore casing 2000 is sealed off by the radially expanded tubular member 1435. In this manner, repairs to the wellbore casing 2000 are optimally provided. More generally, the apparatus 2015 is used to repair or form wellbore casings, pipelines, and structural supports.

Figure 23A:
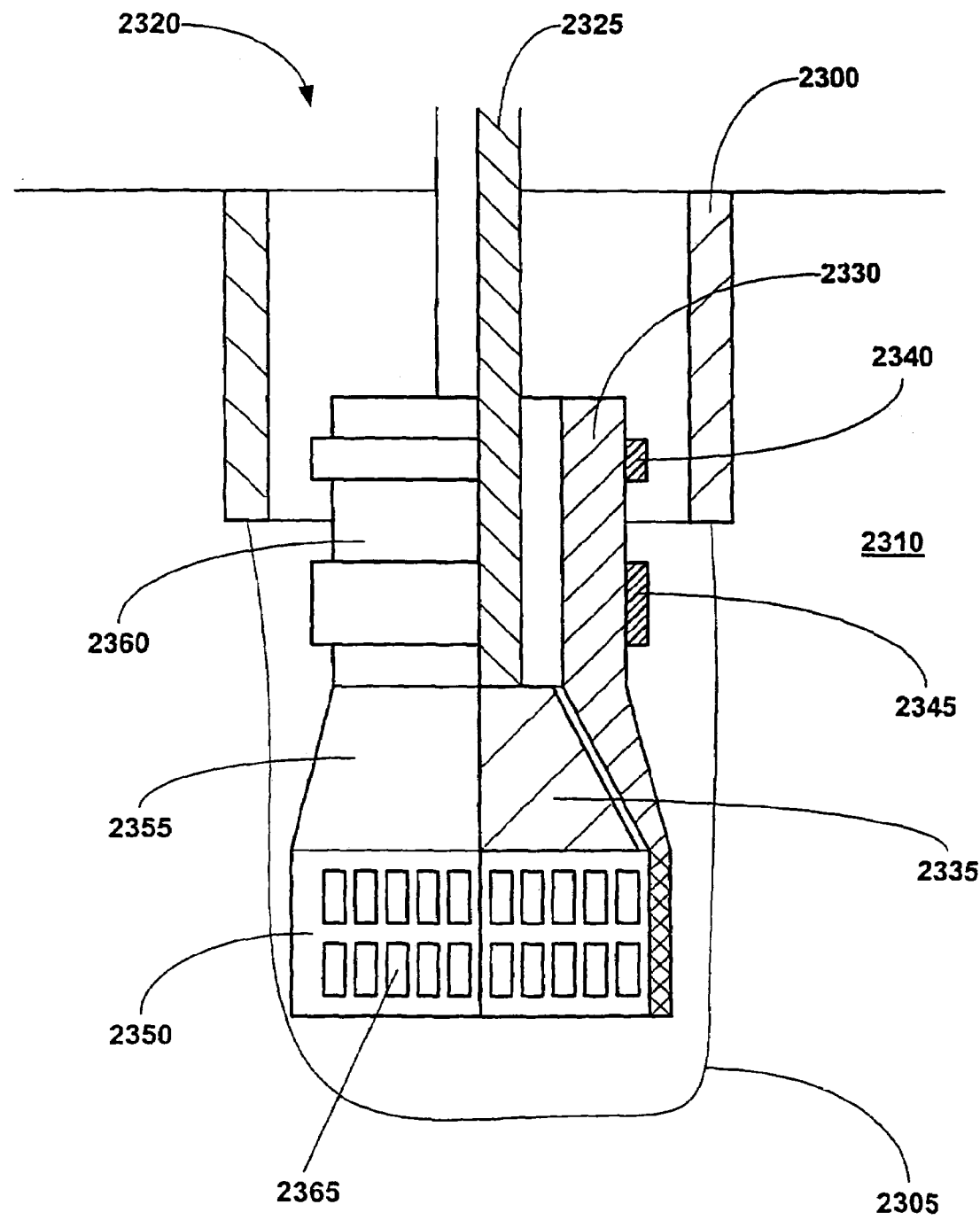
FIG. 23a is a fragmentary cross-sectional illustration of an alternative embodiment of an apparatus for coupling an expandable tubular member to a preexisting structure positioned within a wellbore.

Referring to FIGS. 23a to 23e, an alternative embodiment of an apparatus and method for coupling an expandable tubular member to a preexisting structure will now be described. Referring to FIG. 23a, a wellbore casing 2300 and an open hole wellbore section 2305 are positioned within a subterranean formation 2310. The wellbore casing 2300 and the open hole wellbore section 2305 may be positioned in any orientation from the vertical direction to the horizontal direction.

In an exemplary embodiment, an apparatus 2320 is utilized to form a new section of wellbore casing within the open hole wellbore section 2305. More generally, the apparatus 2320 is preferably utilized to form or repair wellbore casings, pipelines, or structural supports.

The apparatus 2320 preferably includes a support member 2325, an expandable tubular member 2330, an expansion cone 2335, one or more upper sealing members 2340, and one or more sealing members 2345.

The support member 2325 is preferably adapted to be coupled to a surface location. The support member 2325 is further coupled to the expansion cone 2335. The support member 2325 may, for example, be conventional commercially available slick wire, braided wire, coiled tubing, or drilling stock material.

The expandable tubular member 2330 is removably coupled to the expansion cone 2335. In an exemplary embodiment, the expandable tubular member 2025 further includes one or more upper and lower sealing members, 2340 and 2345, on the outside surface of the expandable tubular member 2330 in order to optimally seal the interface between the expandable tubular member 2330 and the wellbore casing 2300 and the open hole wellbore section 2305.

In an exemplary embodiment, the expandable tubular member 2025 further includes a lower section 2350, an intermediate section 2355, and an upper section 2360. In an exemplary embodiment, the wall thicknesses of the lower and intermediate sections, 2350 and 2355, are less than the wall thickness of the upper section 2360 in order to optimally facilitate the radial expansion of the expandable tubular member 2330. In an exemplary embodiment, the lower section 2350 of the expandable tubular member 2330 includes one or more slots 2365 adapted to permit a fluidic sealing material to penetrate the lower section 2350.

In an exemplary embodiment, the expandable tubular member 2330 is further provided substantially as disclosed in one or more of the following: (1) U.S. utility patent application Ser. No. 09/454,139, filed on Dec. 3, 1999, which claimed the benefit of the filing date of U.S. provisional patent application No. 60/111,293, filed on Dec. 7, 1998; (2) U.S. utility patent application Ser. No. 09/510,913, filed on Feb. 23, 2000, which claimed the benefit of the filing date of U.S. provisional application No. 60/121,702, filed on Feb. 25, 1999; (3) U.S. utility patent application Ser. No. 09/502,350, filed on Feb. 10, 2000, which claimed the benefit of the filing date of U.S. provisional application No. 60/119,611, (4) U.S. utility patent application Ser. No. 09/440,338, filed on Nov. 15, 1999, which claimed the benefit of the filing date of U.S. provisional application No. 60/108,558, filed on Nov. 16, 1998; (5) U.S. provisional patent application No. 60/183,546, filed on Feb. 2, 2000; (6) U.S. utility patent application Ser. No. 09/523,460, filed on Mar. 10, 2000, which claimed the benefit of the filing date of U.S. provisional application No. 60/124,042, filed on Mar. 11, 1999; (7) U.S. utility patent application Ser. No. 09/512,895, filed on Feb. 24, 2000, which claimed the benefit of the filing dates of U.S. provisional application No. 60/121,841, filed on Feb. 26, 1999 and U.S. provisional application No. 60/154,047, filed on Sep. 16, 1999; (8) U.S. utility application Ser. No. 09/511,941, filed on Feb. 24, 2000, which claimed the benefit of the filing date of U.S. provisional Ser. No. 60/121,907, filed on Feb. 26, 1999 ; (9) U.S. utility patent application Ser. No. 09/588,946, filed on Jun. 7, 2000, which claimed the benefit of the filing date of U.S. provisional patent application Ser. No. 60/137,998, filed on Jun. 7, 1999; (10) U.S. utility patent application Ser. No. 09/559,122, filed on Apr. 26, 2000, which claimed the benefit of the filing date of U.S. provisional application No. 60/131,106, filed on Apr. 26, 1999; (11) U.S. provisional application No. 60/146,203, filed on Jul. 29, 1999; (12) U.S. provisional application No. 60/143,039, filed on Jul. 2, 1999; (13) U.S. provisional patent application Ser. No. 60/162,671, filed on Nov. 1, 1999; (14) U.S. provisional application No. 60/159,039, filed on Oct. 12, 1999; (15) U.S. provisional patent application No. 60/159,033, filed on Oct. 12, 1999; and (16) U.S. provisional patent application No. 60/165,228, filed on Nov. 12, 1999, the disclosures of which are incorporated herein by reference.

The expansion cone 2335 is preferably coupled to the support member 2325. The expansion cone 2335 is further preferably removably coupled to the expandable tubular member 2330. The expansion cone 2335 is preferably adapted to radially expand the expandable tubular member 2330 when the expansion cone 2335 is axially displaced relative to the expandable tubular member 2330.

In an exemplary embodiment, the expansion cone 2335 is provided substantially as disclosed in one or more of the following: (1) U.S. utility patent application Ser. No. 09/454,139, filed on Dec. 3, 1999, which claimed the benefit of the filing date of U.S. provisional patent application No. 60/111,293, filed on Dec. 7, 1998; (2) U.S. utility patent application Ser. No. 09/510,913, filed on Feb. 23, 2000, which claimed the benefit of the filing date of U.S. provisional application No. 60/121,702, filed on Feb. 25, 1999; (3) U.S. utility patent application Ser. No. 09/502,350, filed on Feb. 10, 2000, which claimed the benefit of the filing date of U.S. provisional application No. 60/119,611, (4) U.S. utility patent application Ser. No. 09/440,338, filed on Nov. 15, 1999, which claimed the benefit of the filing date of U.S. provisional application No. 60/108,558, filed on Nov. 16, 1998; (5) U.S. provisional patent application No. 60/183,546, filed on Feb. 2, 2000; (6) U.S. utility patent application Ser. No. 09/523,460, filed on Mar. 10, 2000, which claimed the benefit of the filing date of U.S. provisional application No. 60/124,042, filed on Mar. 11, 1999; (7) U.S. utility patent application Ser. No. 09/512,895, filed on Feb. 24, 2000, which claimed the benefit of the filing dates of U.S. provisional application No. 60/121,841, filed on Feb. 26, 1999 and U.S. provisional application No. 60/154,047, filed on Sep. 16, 1999; (8) U.S. utility application Ser. No. 09/511,941, filed on Feb. 24, 2000, which claimed the benefit of the filing date of U.S. provisional Ser. No. 60/121,907, filed on Feb. 26, 1999; (9) U.S. utility patent application Ser. No. 09/588,946, filed on Jun. 7, 2000, which claimed the benefit of the filing date of U.S. provisional patent application Ser. No. 60/137,998, filed on Jun. 7, 1999; (10) U.S. utility patent application Ser. No. 09/559,122, filed on Apr. 26, 2000, which claimed the benefit of the filing date of U.S. provisional application No. 60/131,106, filed on Apr. 26, 1999; (11) U.S. provisional application No. 60/146,203, filed on Jul. 29, 1999; (12) U.S. provisional application No. 60/143,039, filed on Jul. 2, 1999; (13) U.S. provisional patent application Ser. No. 60/162,671, filed on Nov. 1, 1999; (14) U.S. provisional application No. 60/159,039, filed on Oct. 12, 1999; (15) U.S. provisional patent application No. 60/159,033, filed on Oct. 12, 1999; and (16) U.S. provisional patent application No. 60/165,228, filed on Nov. 12, 1999, the disclosures of which are incorporated herein by reference.

The upper sealing member 2340 is coupled to the outside surface of the upper section 2360 of the expandable tubular member 2330. The upper sealing member 2340 is preferably adapted to fluidicly seal the interface between the radially expanded upper section 2360 of the expandable tubular member 2330 and the wellbore casing 2300. The upper sealing member 2340 may be any number of conventional commercially available sealing members. In an exemplary embodiment, the upper sealing member 2340 is a viton rubber in order to optimally provide load carrying and pressure sealing capacity.

The lower sealing member 2345 is preferably coupled to the outside surface of the upper section 2360 of the expandable tubular member 2330. The lower sealing member 2340 is preferably adapted to fluidicly seal the interface between the radially expanded upper section 2360 of the expandable tubular member 2330 and the open hole wellbore section 2305. The lower sealing member 2345 may be any number of conventional commercially available sealing members. In an exemplary embodiment, the lower sealing member 2345 is viton rubber in order to optimally provide load carrying and sealing capacity.

As illustrated in FIG. 23*a*, the apparatus 2320 is preferably positioned within the wellbore casing 2300 and the open hole wellbore section 2305 with the expandable tubular member 2330 positioned in overlapping relation to the wellbore casing 2300.

Figure 23B:
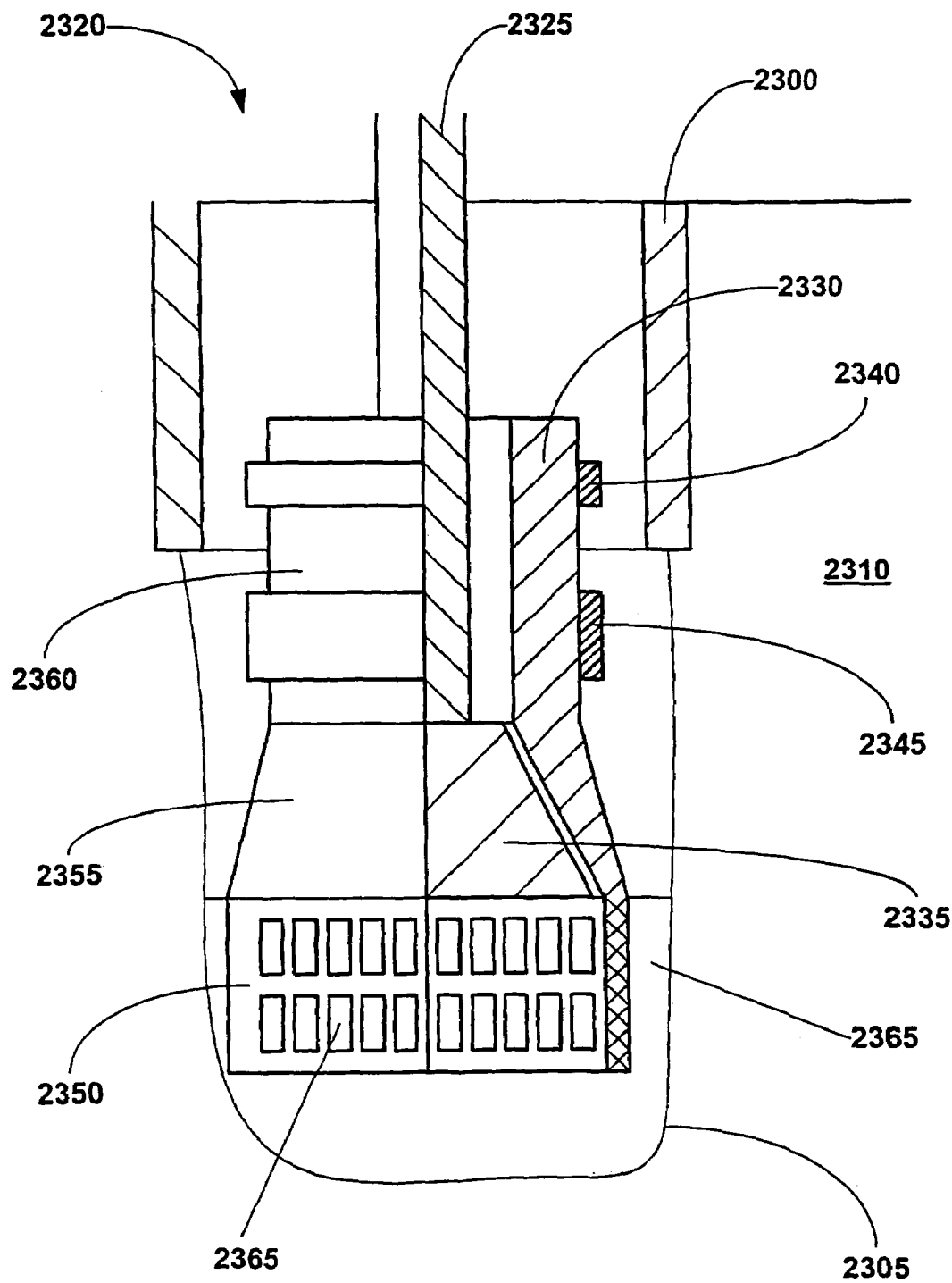
FIG. 23b is a fragmentary cross-sectional illustration of the apparatus of FIG. 20a after injecting a quantity of a hardenable fluidic sealing material into the open hole wellbore section proximate the lower section of the expandable tubular member.

As illustrated in FIG. 23*b*, in an exemplary embodiment, a quantity of a hardenable fluidic sealing material 2365 is then injected into the open hole wellbore section 2305 proximate to the lower section 2350 of the expandable tubular member 2330. The sealing material 2365 may be any number of conventional commercially available sealing materials such as, for example, cement and/or epoxy resin. In an exemplary embodiment, the hardenable fluidic sealing material 2365 at least partially enters the slots provided in the lower section 2350 of the expandable tubular member 2330.

Figure 23C:
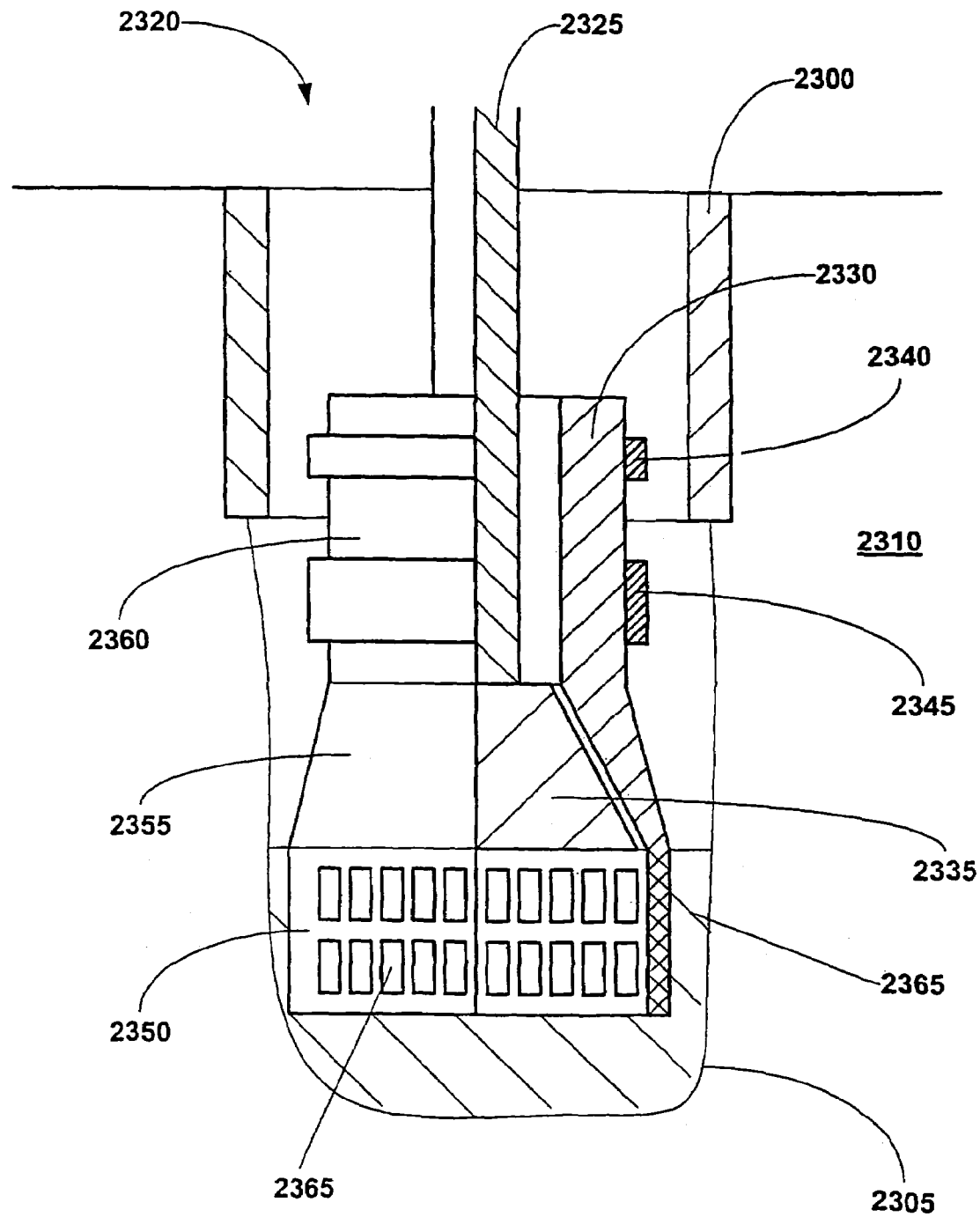
FIG. 23c is a fragmentary cross-sectional illustration of the apparatus of FIG. 23b after permitting the hardenable fluidic sealing material to at least partially cure.

As illustrated in FIG. 23*c*, the hardenable fluidic sealing material 2365 is preferably then permitted to at least partially cure. In this manner, the lower section 2350 of the expandable tubular member 2330 is anchored to the open hole wellbore section 2305.

In an alternative embodiment, a compressible cement and/or epoxy is then injected into the annular space between the unexpanded portion of the tubular member 2330 and the wellbore casing 2300. The compressible cement and/or epoxy is then permitted to at least partially cure prior to the initiation of the radial expansion process. In this manner, an annular structural support and fluidic seal is provided around the tubular member 2330.

Figure 23D:
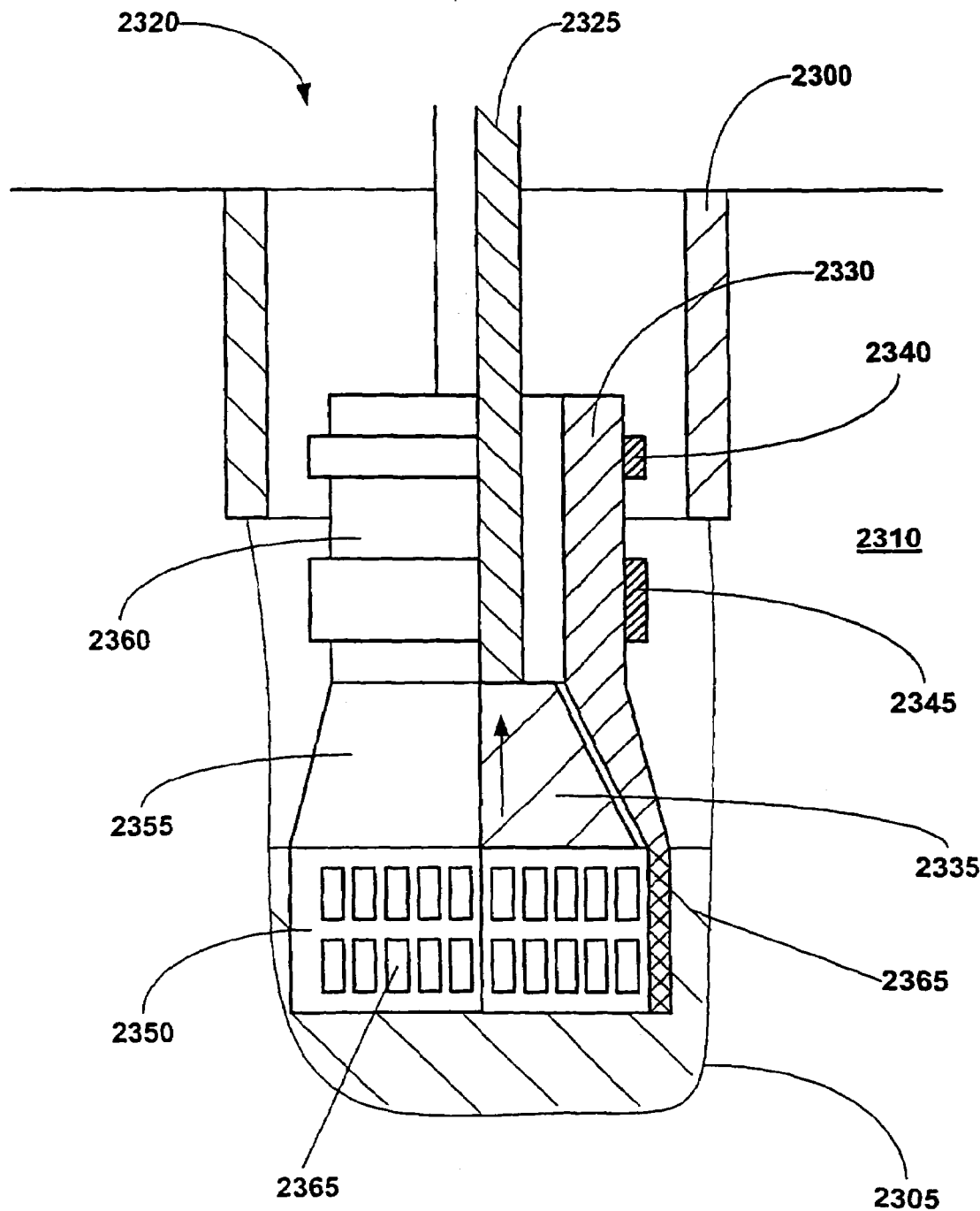
FIG. 23d is a fragmentary cross-sectional illustration of the apparatus of FIG. 23c after initiating the axial displacement of the expansion cone.

As illustrated in FIG. 23*d*, in an exemplary embodiment, the expansion cone 2335 is then axially displaced by applying an axial force to the support member 2325. In an exemplary embodiment, the axial displacement of the expansion cone 2335 radially expands the expandable tubular member 2330 into intimate contact with the walls of the wellbore casing 2300.

Figure 23E:
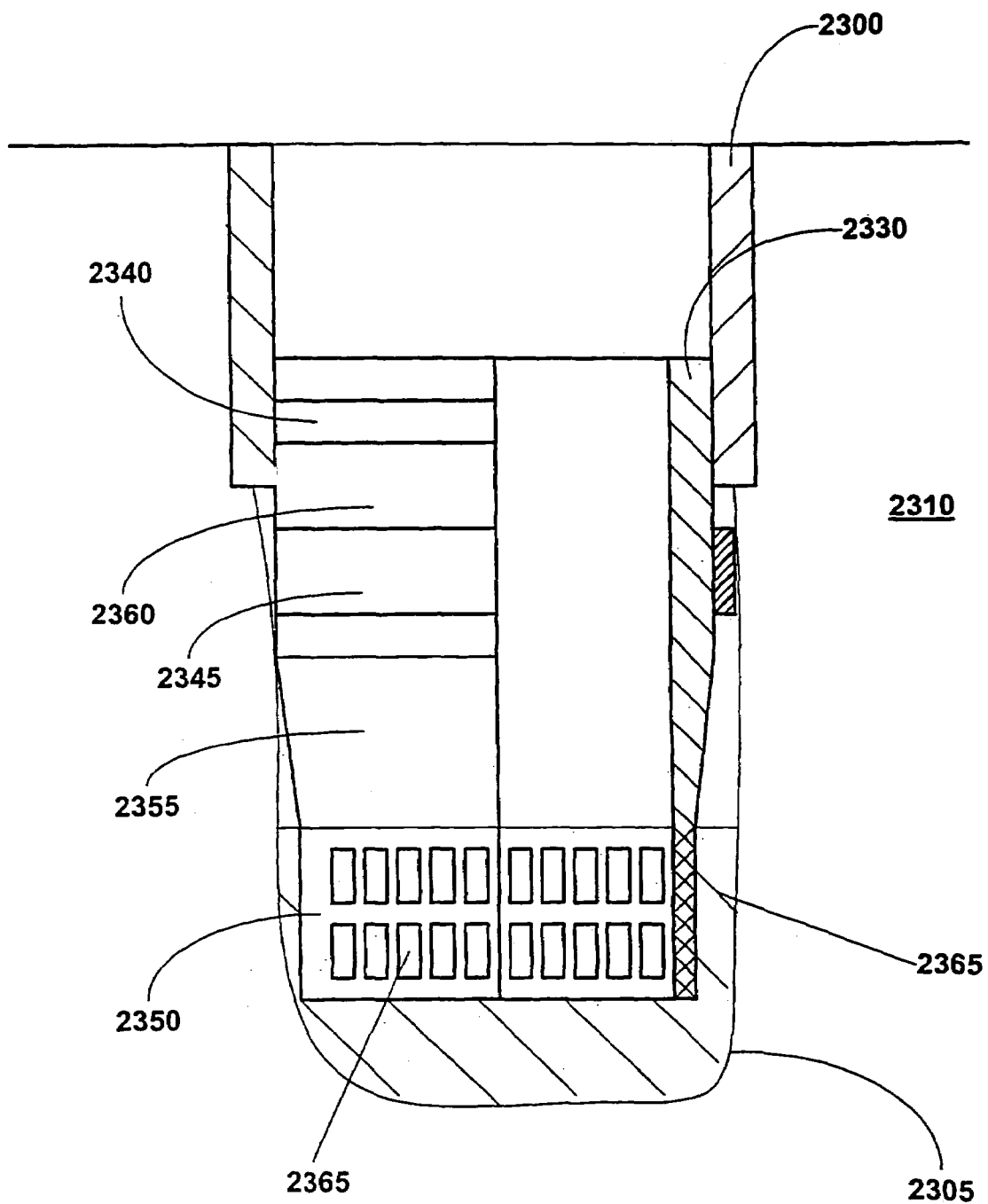
FIG. 23e is a fragmentary cross-sectional illustration of the apparatus of FIG. 23d after completion of the radial expansion of the expandable tubular member.

As illustrated in FIG. 23*e*, in an exemplary embodiment, after the expandable tubular member 2330 has been completely radially expanded by the axial displacement of the expansion cone 2335, a new section of wellbore casing is formed that preferably includes the radially expanded tubular member 2330 and an outer annular layer of a fluidic sealing material. More generally, the apparatus 2320 is used to repair or form wellbore casings, pipelines, and structural supports.

Figure 24A:
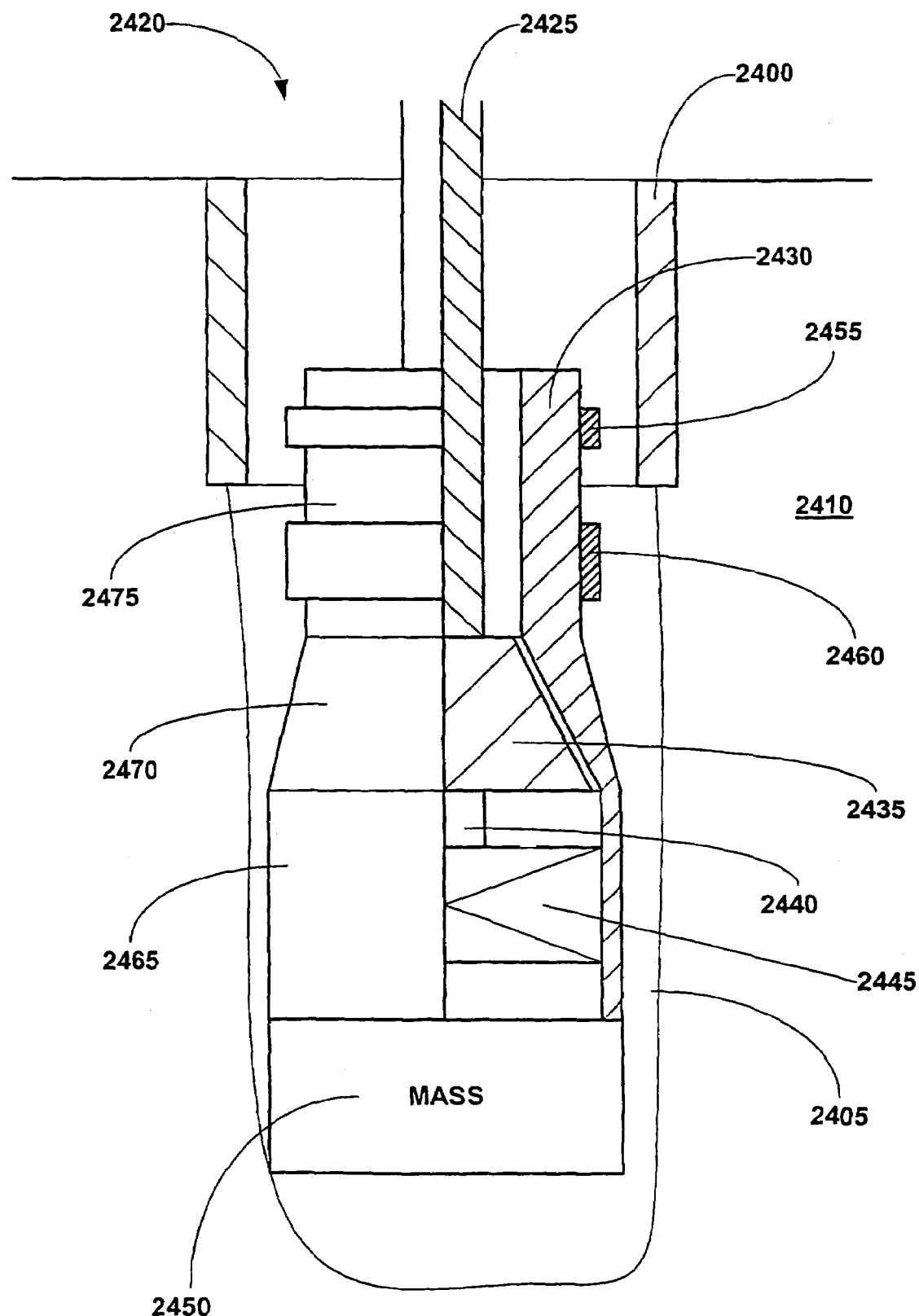
FIG. 24a is a fragmentary cross-sectional illustration of an alternative embodiment of an apparatus and method for coupling an expandable tubular member to a preexisting structure positioned within a wellbore casing and an open hole wellbore section.
Figure 24B:
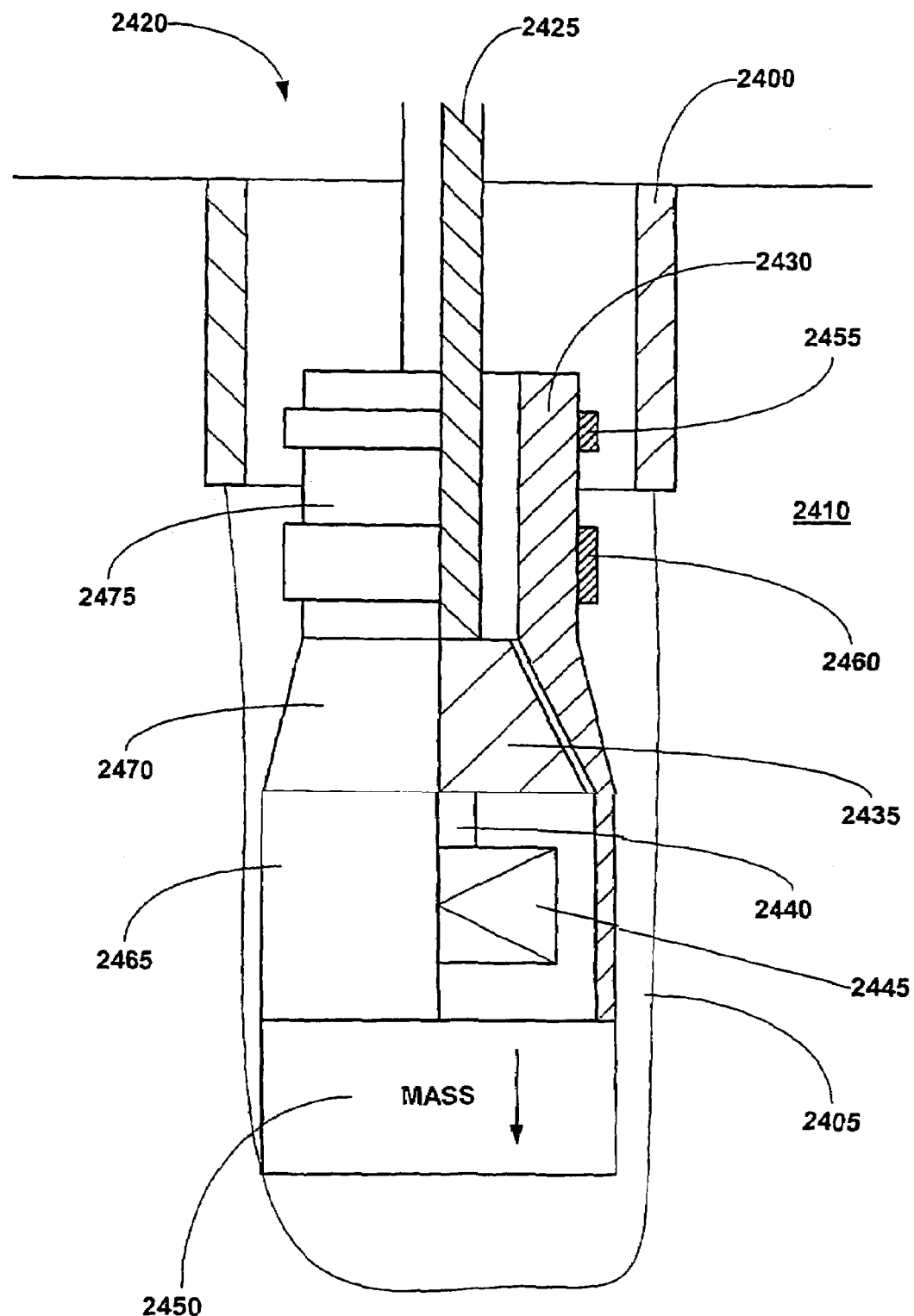
FIG. 24b is a fragmentary cross-sectional illustration of the apparatus of FIG. 24a after releasing the packer.
Figure 24C:
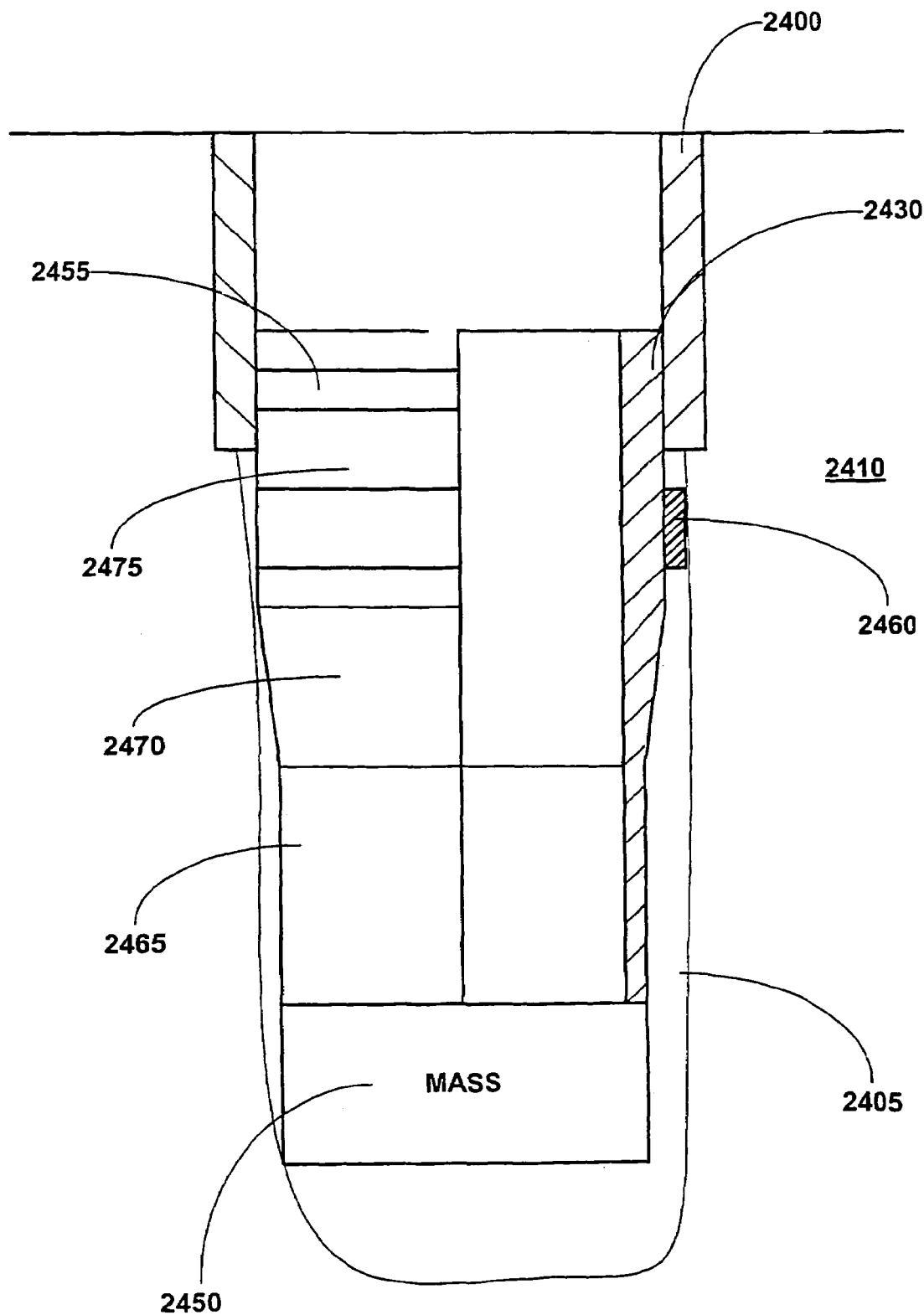
FIG. 24c is a fragmentary cross-sectional illustration of the apparatus of FIG. 24b after extruding the expandable tubular member off of the expansion cone.

Referring to FIGS. 24*a* to 24*c*, an alternative embodiment of an apparatus and method for coupling an expandable tubular member to a preexisting structure will now be described. Referring to FIG. 24*a*, a wellbore casing 2400 and an open hole wellbore section 2405 are positioned within a subterranean formation 2410. The wellbore casing 2400 and the open hole wellbore section 2405 may be positioned in any orientation from the vertical direction to approximately the horizontal direction.

In an exemplary embodiment, an apparatus 2420 is utilized to form a new section of wellbore casing within the open hole wellbore section 2405. More generally, the apparatus 2420 is preferably utilized to form or repair wellbore casings, pipelines, or structural supports.

The apparatus 2420 preferably includes a support member 2425, an expandable tubular member 2430, an expansion cone 2435, a coupling 2440, a packer 2445, a mass 2450, one or more upper sealing members 2455, and one or more sealing members 2460.

The support member 2425 is preferably adapted to be coupled to a surface location. The support member 2425 is further coupled to the expansion cone 2435. The support member 2425 is preferably adapted to convey electrical, communication, and/or hydraulic signals to and/or from the packer 2445. The support member 2425 may, for example, be conventional commercially available slick wire, braided wire, coiled tubing, or drilling stock material.

The expandable tubular member 2430 is removably coupled to the expansion cone 2435 and the packer 2445. The expandable tubular member 2430 is further preferably coupled to the mass 2450. In an exemplary embodiment, the expandable tubular member 2430 further includes one or more upper and lower sealing members, 2455 and 2460, on the outside surface of the expandable tubular member 2430 in order to optimally seal the interface between the expandable tubular member 2430 and the wellbore casing 2400 and the open hole wellbore section 2405.

In an exemplary embodiment, the expandable tubular member 2430 further includes a lower section 2465, an intermediate section 2470, and an upper section 2430. In an exemplary embodiment, the wall thicknesses of the lower and intermediate sections, 2465 and 2470, are less than the wall thickness of the upper section 2475 in order to optimally facilitate the radial expansion of the expandable tubular member 2430. In an exemplary embodiment, the lower section 2465 of the expandable tubular member 2430 is coupled to the mass 2450.

In an exemplary embodiment, the expandable tubular member 2430 is further provided substantially as disclosed in one or more of the following:

The expansion cone 2435 is preferably coupled to the support member 2425 and the coupling 2440. The expansion cone 2435 is further preferably removably coupled to the expandable tubular member 2430. The expansion cone 2435 is preferably adapted to radially expand the expandable tubular member 2430 when the expansion cone 2435 is axially displaced relative to the expandable tubular member 2430.

In an exemplary embodiment, the expansion cone 2435 is provided substantially as disclosed in one or more of the following: (1) U.S. utility patent application Ser. No. 09/454,139, filed on Dec. 3, 1999, which claimed the benefit of the filing date of U.S. provisional patent application No. 60/111,293, filed on Dec. 7, 1998; (2) U.S. utility patent application Ser. No. 09/510,913, filed on Feb. 23, 2000, which claimed the benefit of the filing date of U.S. provisional application No. 60/121,702, filed on Feb. 25, 1999; (3) U.S. utility patent application Ser. No. 09/502,350, filed on Feb. 10, 2000, which claimed the benefit of the filing date of U.S. provisional application No. 60/119,611, (4) U.S. utility patent application Ser. No. 09/440,338, filed on Nov. 15, 1999, which claimed the benefit of the filing date of U.S. provisional application No. 60/108,558, filed on Nov. 16, 1998; (5) U.S. provisional patent application No. 60/183,546, filed on Feb. 2, 2000; (6) U.S. utility patent application Ser. No. 09/523,460, filed on Mar. 10, 2000, which claimed the benefit of the filing date of U.S. provisional application No. 60/124,042, filed on Mar. 11, 1999; (7) U.S. utility patent application Ser. No. 09/512,895, filed on Feb. 24, 2000, which claimed the benefit of the filing dates of U.S. provisional application No. 60/121,841, filed on Feb. 26, 1999 and U.S. provisional application No. 60/154,047, filed on Sep. 16, 1999; (8) U.S. utility application Ser. No. 09/511,941, filed on Feb. 24, 2000, which claimed the benefit of the filing date of U.S. provisional Ser. No. 60/121,907, filed on Feb. 26, 1999; (9) U.S. utility patent application Ser. No. 09/588,946, filed on Jun. 7, 2000, which claimed the benefit of the filing date of U.S. provisional patent application Ser. No. 60/137,998, filed on Jun. 7, 1999; (10) U.S. utility patent application Ser. No. 09/559,122, filed on Apr. 26, 2000, which claimed the benefit of the filing date of U.S. provisional application No. 60/131,106, filed on Apr. 26, 1999; (11) U.S. provisional application No. 60/146,203, filed on Jul. 29, 1999; (12) U.S. provisional application No. 60/143,039, filed on Jul. 2, 1999; (13) U.S. provisional patent application Ser. No. 60/162,671, filed on Nov. 1, 1999; (14) U.S. provisional application No. 60/159,039, filed on Oct. 12, 1999; (15) U.S. provisional patent application No. 60/159,033, filed on Oct. 12, 1999; and (16) U.S. provisional patent application Ser. No. 60/165,228, filed on Nov. 12, 1999, the disclosures of which are incorporated herein by reference.

The coupling 2440 is preferably coupled to the support member 2425 and the expansion cone 2435. The coupling 2440 is preferably adapted to convey electrical, communication, and/or hydraulic signals to and/or from the packer 2445. The coupling 2440 may be any number of conventional support members such as, for example, commercially available slick wire, braided wire, coiled tubing, or drilling stock material.

The packer 2445 is coupled to the coupling 2440. The packer 2445 is further removably coupled to the lower section 2465 of the expandable wellbore casing 2430. The packer 2445 is preferably adapted to provide sufficient frictional force to support the lower section 2465 of the expandable wellbore casing 2430 and the mass 2450. The packer 2445 may be any number of conventional commercially available packers. In an exemplary embodiment, the packer 2445 is an RTTS packer available from Halliburton Energy Services in order to optimally provide multiple sets and releases. In an alternative embodiment, hydraulic slips may be substituted for, or used to supplement, the packer 2445.

The mass 2450 is preferably coupled to the lower section 2465 of the expandable tubular member 2430. The mass 2450 is preferably selected to provide a tensile load on the lower section 2465 of the expandable tubular member 2430 that ranges from about 50 to 100% of the yield point of the upper section 2475 of the expandable tubular member 2430. In this manner, when the packer 2445 is released, the axial force provided by the mass 2450 optimally radially expands and extrudes the expandable tubular member 2430 off of the expansion cone 2435.

The upper sealing member 2455 is preferably coupled to the outside surface of the upper section 2475 of the expandable tubular member 2430. The upper sealing member 2455 is preferably adapted to fluidicly seal the interface between the radially expanded upper section 2475 of the expandable tubular member 2430 and the wellbore casing 2400. The upper sealing member 2455 may be any number of conventional commercially available sealing members. In an exemplary embodiment, the upper sealing member 2455 is viton rubber in order to optimally provide load carrying and pressure sealing capacity.

The lower sealing member 2460 is preferably coupled to the outside surface of the upper section 2475 of the expandable tubular member 2430. The lower sealing member 2460 is preferably adapted to fluidicly seal the interface between the radially expanded upper section 2475 of the expandable tubular member 2430 and the open hole wellbore section 2405. The lower sealing member 2460 may be any number of conventional commercially available sealing members. In an exemplary embodiment, the lower sealing member 2460 is viton rubber in order to optimally provide lead bearing and sealing capacity.

As illustrated in FIG. 24*a*, the apparatus 2420 is preferably positioned within the wellbore casing 2400 and the open hole wellbore section 2405 with the expandable tubular member 2430 positioned in overlapping relation to the wellbore casing 2400. In an exemplary embodiment, the weight of the mass 2450 is supported by the support member 2425, the expansion cone 2435, the coupling 2440, the packer 2445, and the lower section 2465 of the expandable tubular member 2430. In this manner, the intermediate section 2470 of the expandable tubular member 2430 preferably does not support any of the weight of the mass 2450.

As illustrated in FIG. 24*b*, in an exemplary embodiment, the packer 2445 is then released from connection with the lower section 2465 of the expandable tubular member 2430. In this manner, the mass 2450 is preferably now supported by the support member 2425, expansion cone 2435, and the lower and intermediate sections, 2465 and 2470, of the expandable tubular member 2430. In an exemplary embodiment, the weight of the mass 2450 then causes the expandable tubular member 2430 to be radially expanded by, and extruded off of, the expansion cone 2435. In an exemplary embodiment, during the extrusion process, the position of the support member 2425 is adjusted to ensure an overlapping relation between the expandable tubular member 2430 and the wellbore casing 2400.

In an alternative embodiment, a compressible cement and/or epoxy is injected into the annular space between the unexpanded portion of the tubular member 2430 and the wellbore casing 2400 before and/or during the extrusion process. The compressible cement and/or epoxy is then preferably permitted to at least partially cure prior to the initiation of the radial expansion process. In this manner, an annular structural support and fluidic seal is provided around the tubular member 2430.

As illustrated in FIG. 24*c*, in an exemplary embodiment, after the expandable tubular member 2430 has been completely extruded off of the expansion cone 2435, a new section of wellbore casing is formed that preferably includes the radially expanded tubular member 2430 and an outer annular layer of a fluidic sealing material. More generally, the apparatus 2420 is used to repair or form wellbore casings, pipelines, and structural supports.

In an alternative embodiment, the mass 2450 is positioned on top of the upper section 2475 of the tubular member 2430. In an exemplary embodiment, the mass 2450 is fabricated from a thick walled tubular member that is concentric with respect to the support member 2425, and also rests on top of the upper section 2475 of the tubular member 2430. In this manner, when the expansion cone 2435 exits the tubular member 2430, the expansion cone will carry the mass 2450 out of the wellbore 2405.

Figure 25A:
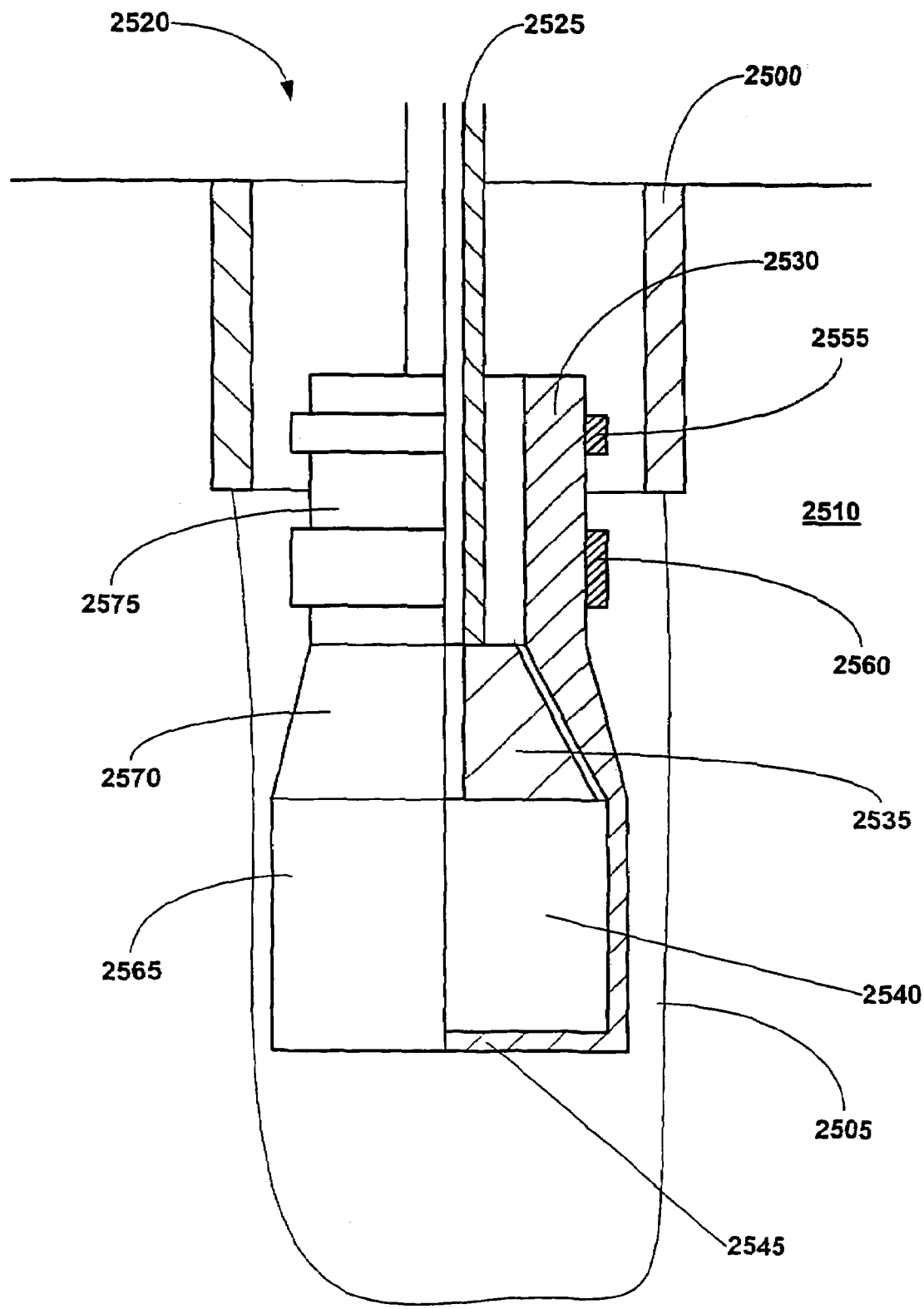
FIG. 25a is a fragmentary cross-sectional illustration of an alternative embodiment of an apparatus and method for coupling an expandable tubular member to a preexisting structure positioned within a wellbore casing and an open hole wellbore section.
Figure 25B:
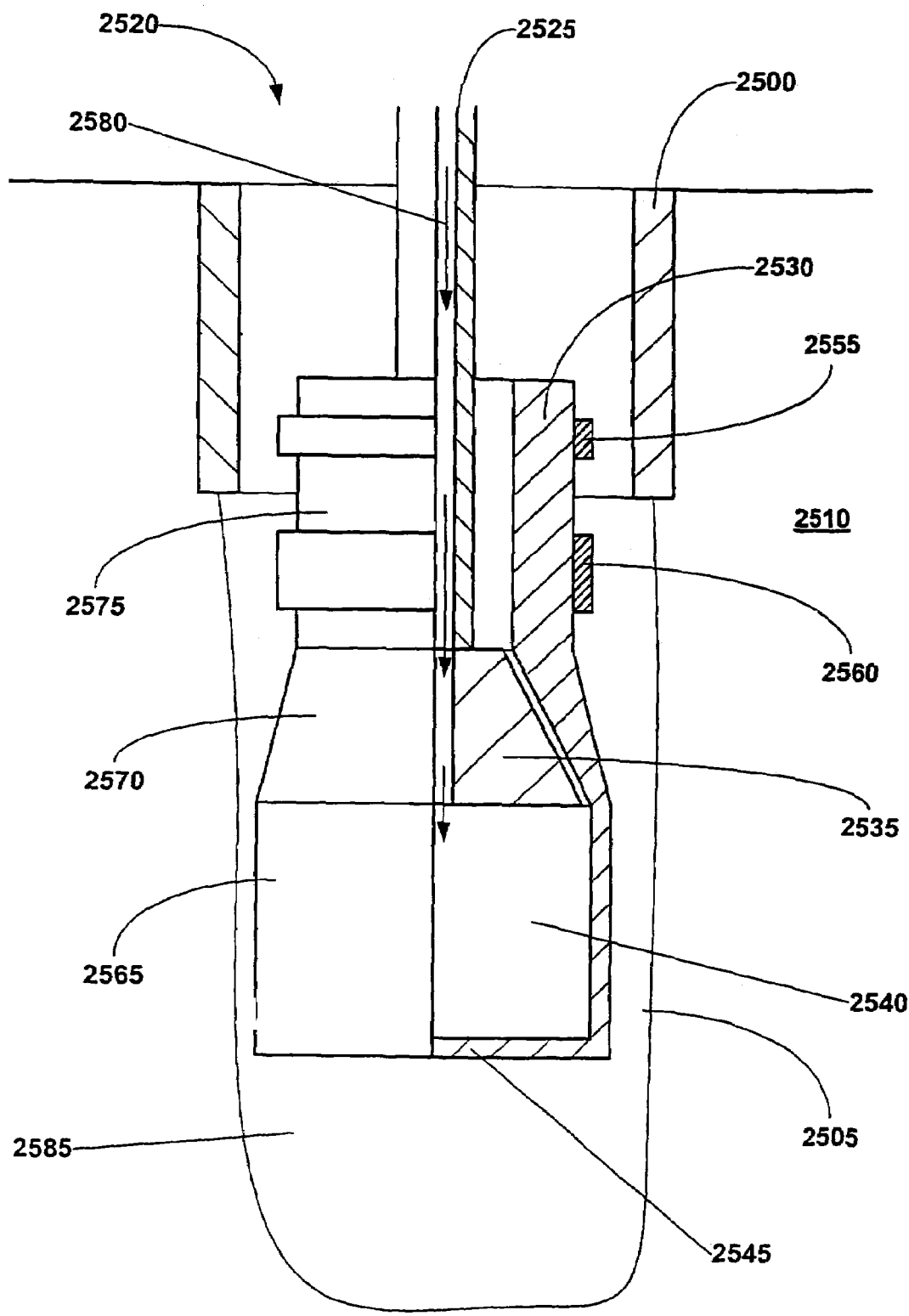
FIG. 25b is a fragmentary cross-sectional illustration of the apparatus of FIG. 25a after injecting a quantity of a fluidic material into the expandable tubular member having a higher density than the fluid within the preexisting structure outside of the expandable tubular member.
Figure 25C:
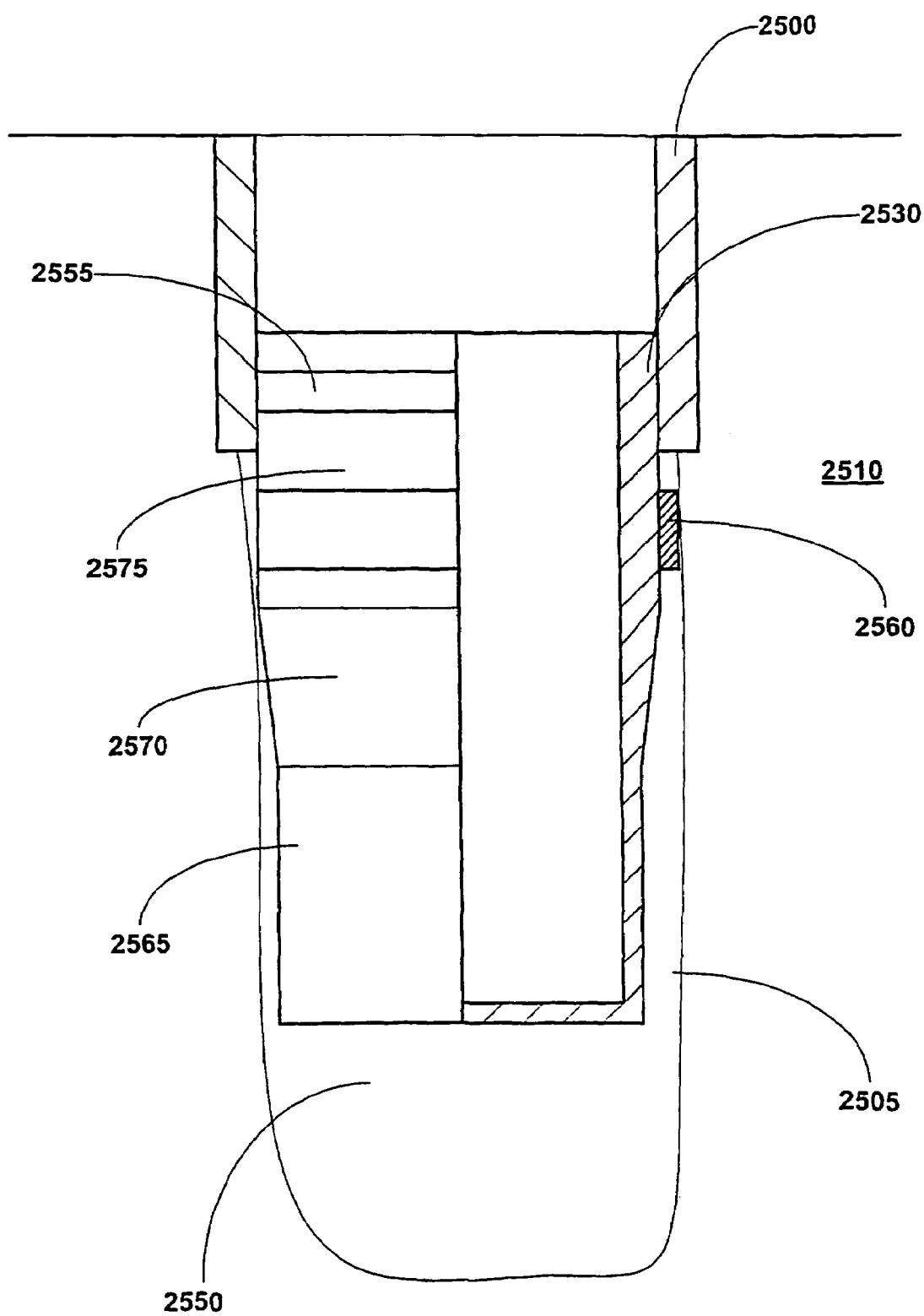
FIG. 25c is a fragmentary cross-sectional illustration of the apparatus of FIG. 25b after extruding the expandable tubular member off of the expansion cone.

Referring to FIGS. 25*a* to 25*c*, an alternative embodiment of an apparatus and method for coupling an expandable tubular member to a preexisting structure will now be described. Referring to FIG. 25*a*, a wellbore casing 2500 and an open hole wellbore section 2505 are positioned within a subterranean formation 2510. The wellbore casing 2500 and the open hole wellbore section 2505 may be positioned in any orientation from the vertical direction to approximately the horizontal direction.

In an exemplary embodiment, an apparatus 2520 is utilized to form a new section of wellbore casing within the open hole wellbore section 2505. More generally, the apparatus 2520 is preferably utilized to form or repair wellbore casings, pipelines, or structural supports.

The apparatus 2520 preferably includes a support member 2525, an expandable tubular member 2530, an expansion cone 2535, a chamber 2440, an end plate 2545, one or more upper sealing members 2555, and one or more sealing members 2560.

The support member 2525 is preferably adapted to be coupled to a surface location. The support member 2525 is further coupled to the expansion cone 2535. The support member 2525 is preferably adapted to convey fluidic materials to and/or from the chamber 2540. The support member 2525 may, for example, be conventional commercially available slick wire, braided wire, coiled tubing, or drilling stock material.

The expandable tubular member 2530 is removably coupled to the expansion cone 2535. In an exemplary embodiment, the expandable tubular member 2530 further includes one or more upper and lower sealing members, 2555 and 2560, on the outside surface of the expandable tubular member 2530 in order to optimally seal the interface between the expandable tubular member 2530 and the wellbore casing 2500 and the open hole wellbore section 2505.

In an exemplary embodiment, the expandable tubular member 2530 further includes a lower section 2565, an intermediate section 2570, and an upper section 2530. In an exemplary embodiment, the wall thicknesses of the lower and intermediate sections, 2565 and 2570, are less than the wall thickness of the upper section 2575 in order to optimally facilitate the radial expansion of the expandable tubular member 2530.

In an exemplary embodiment, the lower section 2565 of the expandable tubular member 2530 further includes the chamber 2540 and the end plate 2545.

In an exemplary embodiment, the expandable tubular member 2530 is further provided substantially as disclosed in one or more of the following: (1) U.S. utility patent application Ser. No. 09/454,139, filed on Dec. 3, 1999, which claimed the benefit of the filing date of U.S. provisional patent application No. 60/111,293, filed on Dec. 7, 1998; (2) U.S. utility patent application Ser. No. 09/510,913, filed on Feb. 23, 2000, which claimed the benefit of the filing date of U.S. provisional application No. 60/121,702, filed on Feb. 25, 1999; (3) U.S. utility patent application Ser. No. 09/502,350, filed on Feb. 10, 2000, which claimed the benefit of the filing date of U.S. provisional application No. 60/119,611, (4) U.S. utility patent application Ser. No. 09/440,338, filed on Nov. 15, 1999, which claimed the benefit of the filing date of U.S. provisional application No. 60/108,558, filed on Nov. 16, 1998; (5) U.S. provisional patent application No. 60/183,546, filed on Feb. 2, 2000; (6) U.S. utility patent application Ser. No. 09/523,460, filed on Mar. 10, 2000, which claimed the benefit of the filing date of U.S. provisional application No. 60/124,042, filed on Mar. 11, 1999; (7) U.S. utility patent application Ser. No. 09/512,895, filed on Feb. 24, 2000, which claimed the benefit of the filing dates of U.S. provisional application No. 60/121,841, filed on Feb. 26, 1999 and U.S. provisional application No. 60/154,047, filed on Sep. 16, 1999; (8) U.S. utility application Ser. No. 09/511,941, filed on Feb. 24, 2000, which claimed the benefit of the filing date of U.S. provisional Ser. No. 60/121,907, filed on Feb. 26, 1999; (9) U.S. utility patent application Ser. No. 09/588,946, filed on Jun. 7, 2000, which claimed the benefit of the filing date of U.S. provisional patent application Ser. No. 60/137,998, filed on Jun. 7, 1999; (10) U.S. utility patent application Ser. No. 09/559,122, filed on Apr. 26, 2000, which claimed the benefit of the filing date of U.S. provisional application No. 60/131,106, filed on Apr. 26, 1999; (11) U.S. provisional application No. 60/146,203, filed on Jul. 29, 1999; (12) U.S. provisional application No. 60/143,039, filed on Jul. 2, 1999; (13) U.S. provisional patent application Ser. No. 60/162,671, filed on Nov. 1, 1999; (14) U.S. provisional application No. 60/159,039, filed on Oct. 12, 1999; (15) U.S. provisional patent application No. 60/159,033, filed on Oct. 12, 1999; and (16) U.S. provisional patent application No. 60/165,228, filed on Nov. 12, 1999, the disclosures of which are incorporated herein by reference.

The expansion cone 2535 is preferably coupled to the support member 2525. The expansion cone 2535 is further preferably removably coupled to the expandable tubular member 2530. The expansion cone 2535 is preferably adapted to radially expand the expandable tubular member 2530 when the expansion cone 2535 is axially displaced relative to the expandable tubular member 2530. The expansion cone 2535 is further preferably adapted to convey fluidic materials to and/or from the chamber 2540.

In an exemplary embodiment, the expansion cone 2535 is provided substantially as disclosed in one or more of the following: (1) U.S. utility patent application Ser. No. 09/454,139, filed on Dec. 3, 1999, which claimed the benefit of the filing date of U.S. provisional patent application No. 60/111,293, filed on Dec. 7, 1998; (2) U.S. utility patent application Ser. No. 09/510,913, filed on Feb. 23, 2000, which claimed the benefit of the filing date of U.S. provisional application No. 60/121,702, filed on Feb. 25, 1999; (3) U.S. utility patent application Ser. No. 09/502,350, filed on Feb. 10, 2000, which claimed the benefit of the filing date of U.S. provisional application No. 60/119,611, (4) U.S. utility patent application Ser. No. 09/440,338, filed on Nov. 15, 1999, which claimed the benefit of the filing date of U.S. provisional application No. 60/108,558, filed on Nov. 16, 1998; (5) U.S. provisional patent application No. 60/183,546, filed on Feb. 2, 2000; (6) U.S. utility patent application Ser. No. 09/523,460, filed on Mar. 10, 2000, which claimed the benefit of the filing date of U.S. provisional application No. 60/124,042, filed on Mar. 11, 1999; (7) U.S. utility patent application Ser. No. 09/512,895, filed on Feb. 24, 2000, which claimed the benefit of the filing dates of U.S. provisional application No. 60/121,841, filed on Feb. 26, 1999 and U.S. provisional application No. 60/154,047, filed on Sep. 16, 1999; (8) U.S. utility application Ser. No. 09/511,941, filed on Feb. 24, 2000, which claimed the benefit of the filing date of U.S. provisional Ser. No. 60/121,907, filed on Feb. 26, 1999; (9) U.S. utility patent application Ser. No. 09/588,946, filed on Jun. 7, 2000, which claimed the benefit of the filing date of U.S. provisional patent application Ser. No. 60/137,998, filed on Jun. 7, 1999; (10) U.S. utility patent application Ser. No. 09/559,122, filed on Apr. 26, 2000, which claimed the benefit of the filing date of U.S. provisional application No. 60/131,106, filed on Apr. 26, 1999; (11) U.S. provisional application No. 60/146,203, filed on Jul. 29, 1999; (12) U.S. provisional application No. 60/143,039, filed on Jul. 2, 1999; (13) U.S. provisional patent application Ser. No. 60/162,671, filed on Nov. 1, 1999; (14) U.S. provisional application No. 60/159,039, filed on Oct. 12, 1999; (15) U.S. provisional patent application No. 60/159,033, filed on Oct. 12, 1999; and (16) U.S. provisional patent application Ser. No. 60/165,228, filed on Nov. 12, 1999, the disclosures of which are incorporated herein by reference.

The chamber 2540 is defined by the interior portion of the lower section 2565 of the expandable tubular member 2530 below the expansion cone 2535 and above the end plate 2545. The chamber 2540 is preferably adapted to contain a quantity of a fluidic materials having a higher density than the fluidic materials outside of the expandable tubular member 2530.

The upper sealing member 2555 is preferably coupled to the outside surface of the upper section 2575 of the expandable tubular member 2530. The upper sealing member 2555 is preferably adapted to fluidicly seal the interface between the radially expanded upper section 2575 of the expandable tubular member 2530 and the wellbore casing 2500. The upper sealing member 2555 may be any number of conventional commercially available sealing members. In an exemplary embodiment, the upper sealing member 2555 is viton rubber in order to optimally provide load carrying and pressure sealing capacity.

The lower sealing member 2560 is preferably coupled to the outside surface of the upper section 2575 of the expandable tubular member 2530. The lower sealing member 2560 is preferably adapted to fluidicly seal the interface between the radially expanded upper section 2575 of the expandable tubular member 2530 and the open hole wellbore section 2505. The lower sealing member 2560 may be any number of conventional commercially available sealing members. In an exemplary embodiment, the lower sealing member 2560 is viton rubber in order to optimally provide load carrying and pressure sealing capacity.

As illustrated in FIG. 25a, the apparatus 2520 is preferably positioned within the wellbore casing 2500 and the open hole wellbore section 2505 with the expandable tubular member 2530 positioned in overlapping relation to the wellbore casing 2500.

As illustrated in FIG. 25b, a quantity of a fluidic material 2580 having a density greater than the density of the fluidic material within the region 2585 outside of the expandable tubular member 2530 is injected into the chamber 2540. In an exemplary embodiment, the difference in hydrostatic pressure between the chamber 2540 and the region 2585, due to the differences in fluid densities of these regions, causes the expandable tubular member 2530 to be radially expanded by, and extruded off of, the expansion cone 2535. In an exemplary embodiment, during the extrusion process, the position of the support member 2525 is adjusted to ensure an overlapping relation between the expandable tubular member 2530 and the wellbore casing 2500. In an exemplary embodiment, the quantity of the fluidic material 2580 initially injected into the chamber 2540 is subsequently increased as the size of the chamber 2540 increases during the extrusion process. In this manner, high pressure pumping equipment is typically not required, or the need for it is at least minimized. Rather, in an exemplary embodiment, a column of the fluidic material 2580 is maintained within the support member 2525.

In an alternative embodiment, a compressible cement and/or epoxy is injected into the annular space between the unexpanded portion of the tubular member 2530 and the wellbore casing 2500 before and/or during the extrusion process. The compressible cement and/or epoxy is then preferably permitted to at least partially cure prior to the initiation of the radial expansion process. In this manner, an annular structural support and fluidic seal is provided around the tubular member 2530.

As illustrated in FIG. 25c, in an exemplary embodiment, after the expandable tubular member 2530 has been completely extruded off of the expansion cone 2535, a new section of wellbore casing is formed that preferably includes the radially expanded tubular member 2530 and an outer annular layer of a fluidic sealing material. More generally, the apparatus 2520 is used to repair or form wellbore casings, pipelines, and structural supports.

Figure 26A:
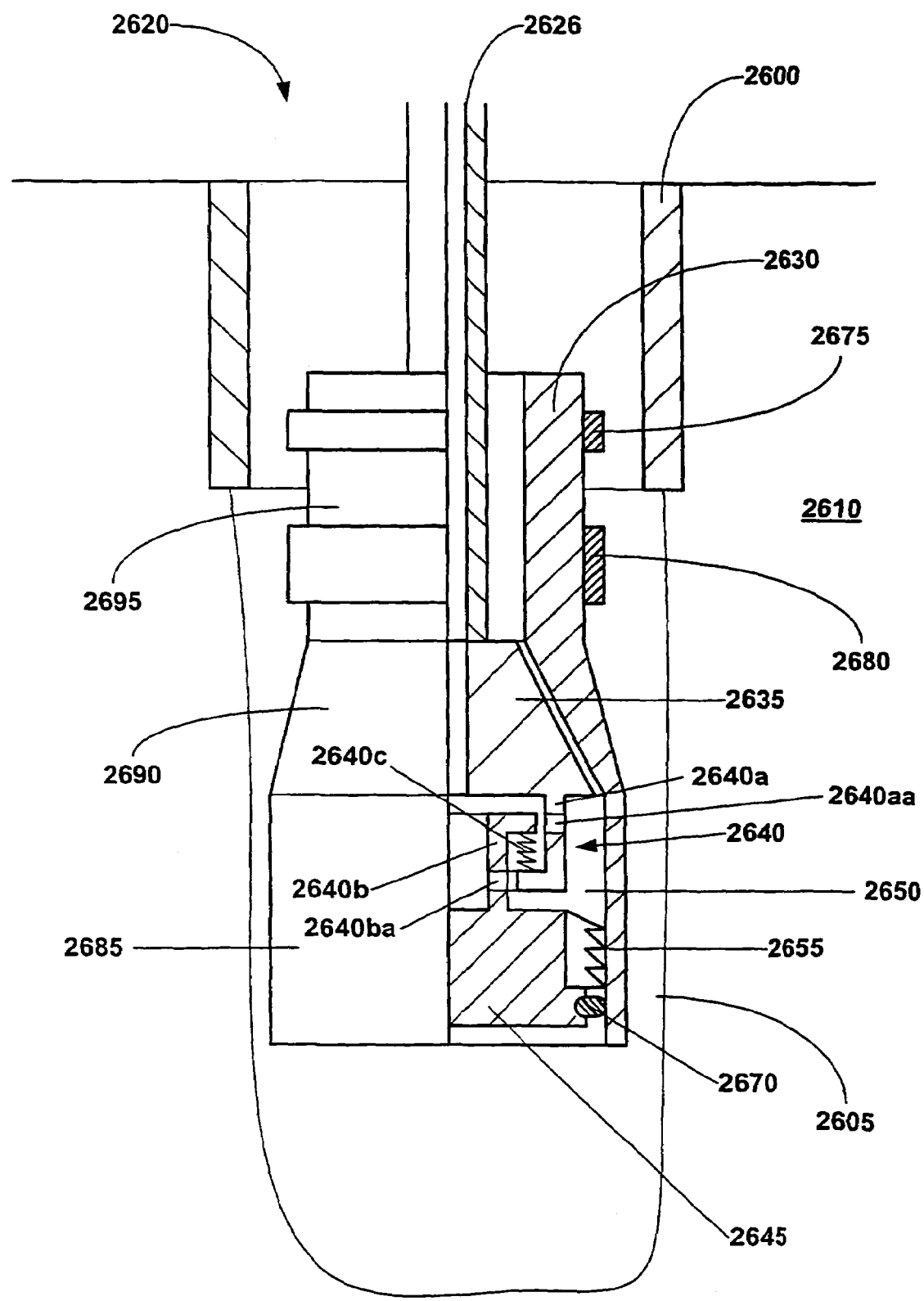
FIG. 26a is a fragmentary cross-sectional illustration of an alternative embodiment of an apparatus and method for coupling an expandable tubular member to a preexisting structure.
Figure 26B:
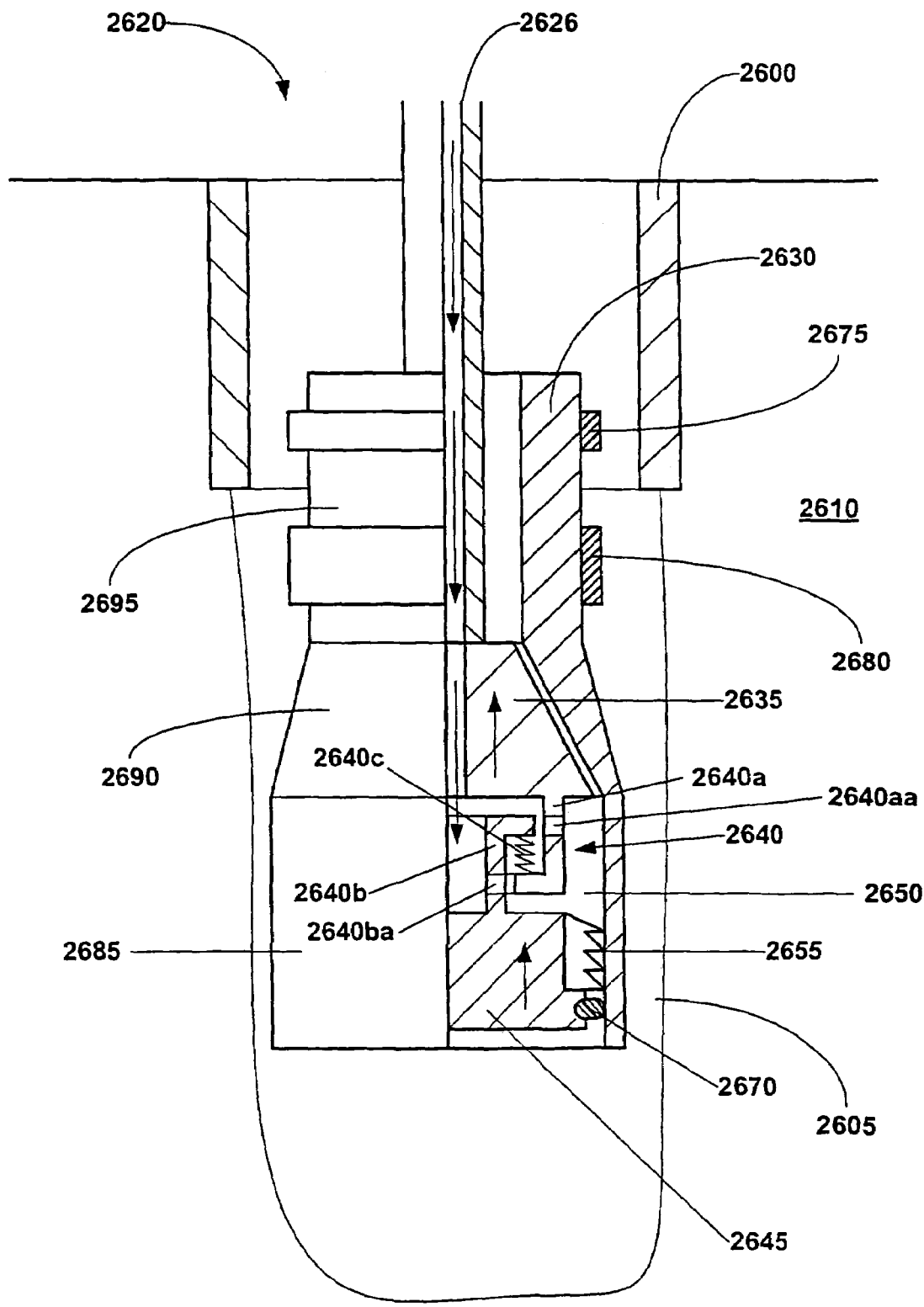
FIG. 26b is a fragmentary cross-sectional illustration of the apparatus of FIG. 26a after the initiation of the radial expansion process.
Figure 26C:
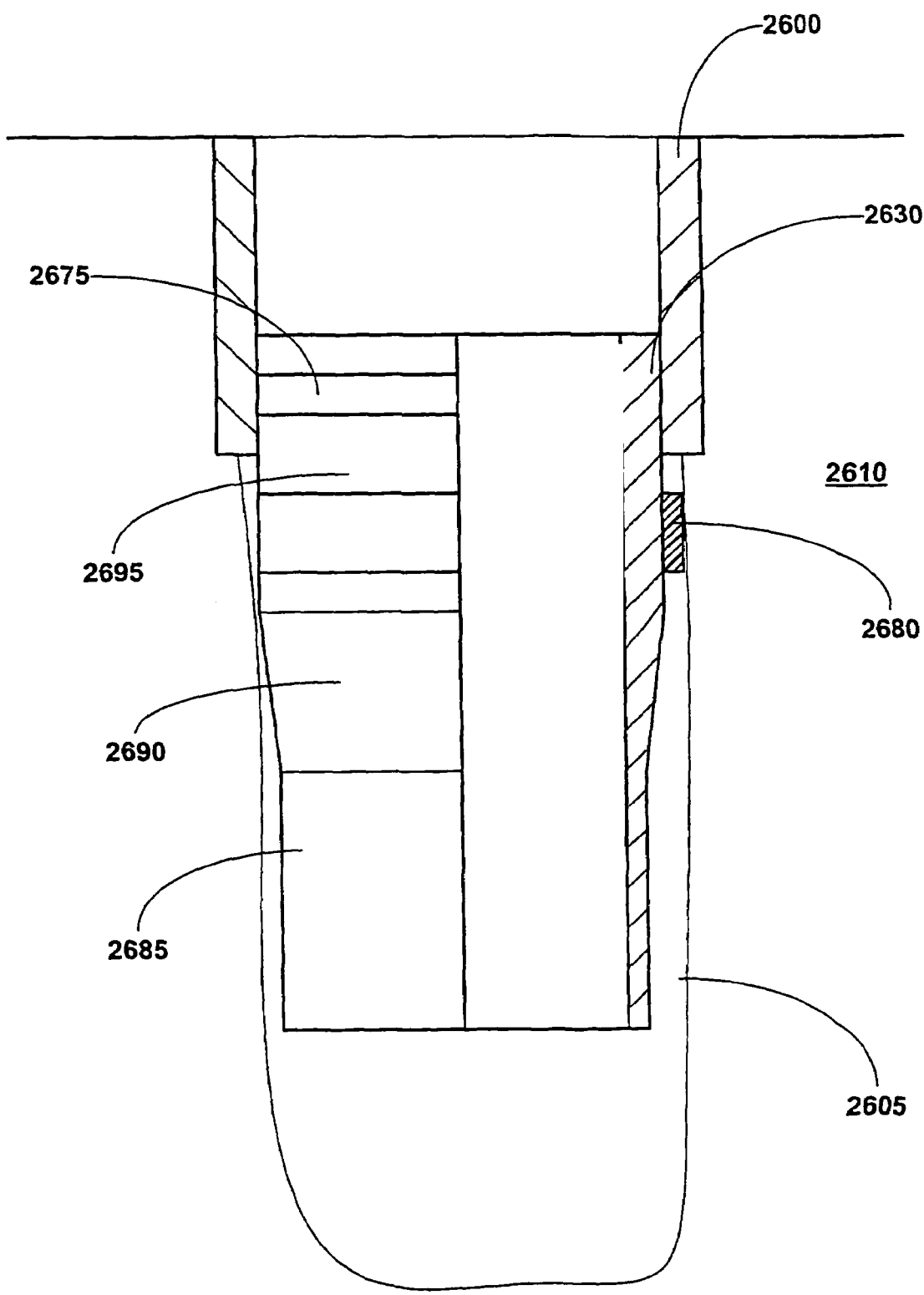
FIG. 26c is a fragmentary cross-sectional illustration of the completion of the radial expansion process using the apparatus of FIG. 26b.

Referring to FIGS. 26a to 26c, an alternative embodiment of an apparatus and method for coupling an expandable tubular member to a preexisting structure will now be described. Referring to FIG. 26a, a wellbore casing 2600 and an open hole wellbore section 2605 are positioned within a subterranean formation 2610. The wellbore casing 2600 and the open hole wellbore section 2605 may be positioned in any orientation from the vertical direction to approximately the horizontal direction.

In an exemplary embodiment, an apparatus 2620 is utilized to form a new section of wellbore casing within the open hole wellbore section 2605. More generally, the apparatus 2620 is preferably utilized to form or repair wellbore casings, pipelines, or structural supports.

The apparatus 2620 preferably includes a support member 2625, an expandable tubular member 2630, an expansion cone 2635, a slip joint 2640, an end plate 2545, a chamber 2650, one or more slip members 2655, one or more sealing members 2670, one or more upper sealing members 2675, and one or more lower sealing members 2680.

The support member 2625 is preferably adapted to be coupled to a surface location. The support member 2625 is further coupled to the expansion cone 2635. The support member 2625 is preferably adapted to convey fluidic materials to and/or from the chamber 2640. The support member 2625 may, for example, be conventional commercially available slick wire, braided wire, coiled tubing, or drilling stock material.

The expandable tubular member 2630 is removably coupled to the expansion cone 2635. In an exemplary embodiment, the expandable tubular member 2630 further includes one or more upper and lower sealing members, 2675 and 2680, on the outside surface of the expandable tubular member 2630 in order to optimally seal the interface between the expandable tubular member 2630 and the wellbore casing 2600 and the open hole wellbore section 2605.

In an exemplary embodiment, the expandable tubular member 2630 further includes a lower section 2685, an intermediate section 2690, and an upper section 2695. In an exemplary embodiment, the wall thicknesses of the lower and intermediate sections, 2685 and 2690, are less than the wall thickness of the upper section 2695 in order to optimally facilitate the radial expansion of the expandable tubular member 2630.

In an exemplary embodiment, the lower section 2685 of the expandable tubular member 2630 houses the slip joint 2640, the end plate 2645, the slips 2655, and the sealing members 2670. In an exemplary embodiment, the interior portion of the lower section 2685 of the expandable tubular member 2630 below the expansion cone 2635 and above the end plate defines the chamber 2650. In an exemplary embodiment, the lower section 2685 of the expandable tubular member 2630 further includes one or more of the anchoring devices described above with reference to FIGS. 1a to 25c.

In an exemplary embodiment, the expandable tubular member 2630 is further provided substantially as disclosed in one or more of the following: (1) U.S. utility patent application Ser. No. 09/454,139, filed on Dec. 3, 1999, which claimed the benefit of the filing date of U.S. provisional patent application No. 60/111,293, filed on Dec. 7, 1998; (2) U.S. utility patent application Ser. No. 09/510,913, filed on Feb. 23, 2000, which claimed the benefit of the filing date of U.S. provisional application No. 60/121,702, filed on Feb. 25, 1999; (3) U.S. utility patent application Ser. No. 09/502,350, filed on Feb. 10, 2000, which claimed the benefit of the filing date of U.S. provisional application No. 60/119,611, (4) U.S. utility patent application Ser. No. 09/440,338, filed on Nov. 15, 1999, which claimed the benefit of the filing date of U.S. provisional application No. 60/108,558, filed on Nov. 16, 1998; (5) U.S. provisional patent application Ser. No. 60/183,546, filed on Feb. 2, 2000; (6) U.S. utility patent application Ser. No. 09/523,460, filed on Mar. 10, 2000, which claimed the benefit of the filing date of U.S. provisional application No. 60/124,042, filed on Mar. 11, 1999; (7) U.S. utility patent application Ser. No. 09/512,895, filed on Feb. 24, 2000, which claimed the benefit of the filing dates of U.S. provisional application No. 60/121,841, filed on Feb. 26, 1999 and U.S. provisional application No. 60/154,047, filed on Sep. 16, 1999; (8) U.S. utility application Ser. No. 09/511,941, filed on Feb. 24, 2000, which claimed the benefit of the filing date of U.S. provisional Ser. No. 60/121,907, filed on Feb. 26, 1999; (9) U.S. utility patent application Ser. No. 09/588,946, filed on Jun. 7, 2000, which claimed the benefit of the filing date of U.S. provisional patent application Ser. No. 60/137,998, filed on Jun. 7, 1999; (10) U.S. utility patent application Ser. No. 09/559,122, filed on Apr. 26, 2000, which claimed the benefit of the filing date of U.S. provisional application No. 60/131,106, filed on Apr. 26, 1999; (11) U.S. provisional application No. 60/146,203, filed on Jul. 29, 1999; (12) U.S. provisional application No. 60/143,039, filed on Jul. 2, 1999; (13) U.S. provisional patent application Ser. No. 60/162,671, filed on Nov. 1, 1999; (14) U.S. provisional application No. 60/159,039, filed on Oct. 12, 1999; (15) U.S. provisional patent application No. 60/159,033, filed on Oct. 12, 1999; and (16) U.S. provisional patent application No. 60/165,228, filed on Nov. 12, 1999, the disclosures of which are incorporated herein by reference.

The expansion cone 2635 is preferably coupled to the support member 2625 and the slip joint 2640. The expansion cone 2635 is further preferably removably coupled to the expandable tubular member 2630. The expansion cone 2635 is preferably adapted to radially expand the expandable tubular member 2630 when the expansion cone 2635 is axially displaced relative to the expandable tubular member 2630. The expansion cone 2635 is further preferably adapted to convey fluidic materials to and/or from the chamber 2650.

In an exemplary embodiment, the expansion cone 2635 is further provided substantially as disclosed in one or more of the following: (1) U.S. utility patent application Ser. No. 09/454,139, filed on Dec. 3, 1999, which claimed the benefit of the filing date of U.S. provisional patent application No. 60/111,293, filed on Dec. 7, 1998; (2) U.S. utility patent application Ser. No. 09/510,913, filed on Feb. 23, 2000, which claimed the benefit of the filing date of U.S. provisional application No. 60/121,702, filed on Feb. 25, 1999; (3) U.S. utility patent application Ser. No. 09/502,350, filed on Feb. 10, 2000, which claimed the benefit of the filing date of U.S. provisional application No. 60/119,611, (4) U.S. utility patent application Ser. No. 09/440,338, filed on Nov. 15, 1999, which claimed the benefit of the filing date of U.S. provisional application No. 60/108,558, filed on Nov. 16, 1998; (5) U.S. provisional patent application No. 60/183,546, filed on Feb. 2, 2000; (6) U.S. utility patent application Ser. No. 09/523,460, filed on Mar. 10, 2000, which claimed the benefit of the filing date of U.S. provisional application No. 60/124,042, filed on Mar. 11, 1999; (7) U.S. utility patent application Ser. No. 09/512,895, filed on Feb. 24, 2000,which claimed the benefit of the filing dates of U.S. provisional application No. 60/121,841, filed on Feb. 26, 1999 and U.S. provisional application No. 60/154,047, filed on Sep. 16, 1999; (8) U.S. utility application Ser. No. 09/511,941, filed on Feb. 24, 2000, which claimed the benefit of the filing date of U.S. provisional Ser. No. 60/121,907, filed on Feb. 26, 1999; (9) U.S. utility patent application Ser. No. 09/588,946, filed on Jun. 7, 2000, which claimed the benefit of the filing date of U.S. provisional patent application Ser. No. 60/137,998, filed on Jun. 7, 1999; (10) U.S. utility patent application Ser. No. 09/559,122, filed on Apr. 26, 2000, which claimed the benefit of the filing date of U.S. provisional application No. 60/131,106, filed on Apr. 26, 1999; (11) U.S. provisional application No. 60/146,203, filed on Jul. 29, 1999; (12) U.S. provisional application No. 60/143,039, filed on Jul. 2, 1999; (13) U.S. provisional patent application Ser. No. 60/162,671, filed on Nov. 1, 1999; (14) U.S. provisional application No. 60/159,039, filed on Oct. 12, 1999; (15) U.S. provisional patent application No. 60/159,033, filed on Oct. 12, 1999; and (16) U.S. provisional patent application No. 60/165,228, filed on Nov. 12, 1999, the disclosures of which are incorporated herein by reference.

The slip joint 2640 is coupled to the expansion cone 2635 and the end plate 2645. The slip joint 2640 is preferably adapted to permit the end plate 2645 to be axially displaced relative to the expansion cone 2635. In this manner, the size of the chamber 2650 is variable. The slip joint 2640 may be any number of conventional commercially available slip joints modified in accordance with the teachings of the present disclosure.

The slip joint 2640 preferably includes an upper member 2640a, a resilient member 2640b, and a lower member 2640c. The upper member 2640a is coupled to the expansion cone 2635 and the resilient member 2640b. The upper member 2640a is movably coupled to the lower member 2640b. The upper member 2640a preferably includes one or more fluid passages 2640aa that permit the passage of fluidic materials. The lower member 2640b is coupled to the end plate 2645 and the resilient member 2640b. The lower member 2640b is movably coupled to the upper member 2640a. The lower member 2640b preferably includes one or more fluid passages 2640ba that permit the passage of fluidic materials. The resilient member 2640c is coupled between the upper and lower members, 2640a and 2640b. The resilient member 2640c is preferably adapted to apply an upward axial force to the end plate 2645.

The end plate 2645 is coupled to the slip joint 2640, the slips 2655, and the sealing members 2670. The end plate 2645 is preferably adapted to seal off a portion of the interior of the lower section 2685 of the expandable tubular member 2630. The end plate 2645 is further adapted to define, in combination with the expandable tubular member 2630, and the expansion cone 2635, the chamber 2650.

The chamber 2650 is defined by the interior portion of the lower section 2685 of the expandable tubular member 2630 below the expansion cone 2635 and above the end plate 2645. In an exemplary embodiment, the pressurization of the chamber 2650 causes the expansion cone 2635 to be axially displaced and thereby radially expand the expandable tubular member 2630. The chamber 2650 is preferably adapted to move upwardly within the expandable tubular member 2630 as the expansion cone 2635 and end plate 2645 are axially displaced within the expandable tubular member 2630.

The slips 2655 are coupled to the end plate 2645. The slips 2655 are preferably adapted to permit the end plate 2645 to be displaced in the upward axial direction; but prevent axial displacement of the end plate 2645 in the downward direction. In this manner, the chamber 2650 is pressurized by injecting fluidic materials into the chamber 2650. Because the end plate 2645 is maintained in a substantially stationary position, relative to the expandable tubular member 2630, during the injection of pressurized fluidic materials into the chamber 2650, the pressurization of the chamber 2650 preferably axially displaces the expansion cone 2635. In an exemplary embodiment, when the slip joint 2640 is fully extended, the slip joint 2640 then displaces the end plate 2645 in the upward axial direction. In an exemplary embodiment, when the spring force of the elastic member 2640c of the slip joint 2640 is greater than the fluidic pressurization force within the chamber 2650, the end plate 2645 is displaced in the upward axial direction.

The sealing members 2670 are coupled to the end plate 2645. The sealing members 2670 are further preferably sealingly coupled to the interior walls of the expandable tubular member 2630. In this manner, the chamber 2650 is optimally pressurized during operation of the apparatus 2620.

The upper sealing member 2675 is preferably coupled to the outside surface of the upper section 2695 of the expandable tubular member 2630. The upper sealing member 2675 is preferably adapted to fluidicly seal the interface between the radially expanded upper section 2695 of the expandable tubular member 2630 and the wellbore casing 2600. The upper sealing member 2675 may be any number of conventional commercially available sealing members. In an exemplary embodiment, the upper sealing member 2675 is viton rubber in order to optimally provide load carrying and pressure sealing capacity.

The lower sealing member 2680 is preferably coupled to the outside surface of the upper section 2695 of the expandable tubular member 2630. The lower sealing member 2680 is preferably adapted to fluidicly seal the interface between the radially expanded upper section 2695 of the expandable tubular member 2630 and the open hole wellbore section 2605. The lower sealing member 2680 may be any number of conventional commercially available sealing members. In an exemplary embodiment, the lower sealing member 2680 is viton rubber in order to optimally provide load carrying and pressure sealing capacity.

As illustrated in FIG. 26a, the apparatus 2620 is preferably positioned within the wellbore casing 2600 and the open hole wellbore section 2605 with the expandable tubular member 2630 positioned in overlapping relation to the wellbore casing 2600. In an exemplary embodiment, the lower section 2685 of the expandable tubular member 2630 is then anchored to the open hole wellbore section 2605 using one or more of the apparatus and methods described above with reference to FIGS. 1a to 25c.

As illustrated in FIG. 26b, the radial expansion of the expandable tubular member 2630 is then initiated by: (1) applying an upward axial force to the expansion cone 2635; and/or (2) pressurizing the chamber 2650 by injecting a pressurized fluidic material into the chamber 2650.

In an exemplary embodiment, the expandable tubular member 2630 is radially expanded by applying an upward axial force to the expansion cone 2635. In an exemplary embodiment, once the slip joint 2640 is fully extended, the end plate 2645 is then axially displaced in the upward direction. In this manner, the end plate 2645 follows the expansion cone 2635. In an exemplary embodiment, the chamber 2650 is pressurized when the frictional forces exceed a predetermined value. In this manner, the axial displacement of the expansion cone 2635 is provided by applying an axial force that is selectively supplemented by pressurizing the chamber 2650.

In an alternative embodiment, a compressible cement and/or epoxy is injected into the annular space between the unexpanded portion of the tubular member 2630 and the wellbore casing 2600 before and/or during the extrusion process. The compressible cement and/or epoxy is then preferably permitted to at least partially cure prior to the initiation of the radial expansion process. In this manner, an annular structural support and fluidic seal is provided around the tubular member 2630.

As illustrated in FIG. 26c, in an exemplary embodiment, after the expandable tubular member 2630 has been completely extruded off of the expansion cone 2635, a new section of wellbore casing is formed that preferably includes the radially expanded tubular member 2630 and an outer annular layer of a fluidic sealing material. More generally, the apparatus 2620 is used to repair or form wellbore casings, pipelines, and structural supports.

Figure 27:
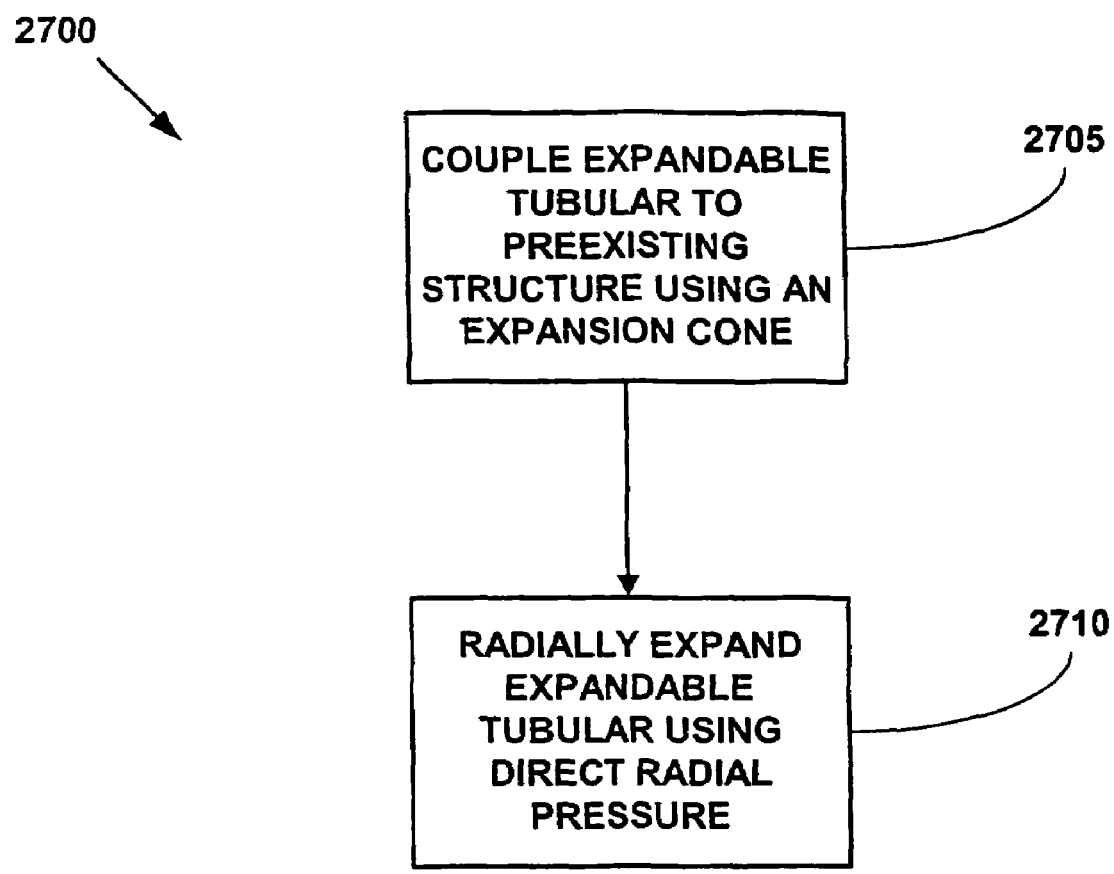
FIG. 27 is a flow chart illustration of an exemplary embodiment of a method of coupling an expandable tubular to a preexisting structure.

Referring initially to FIG. 27, an exemplary method 2700 of coupling an expandable tubular member to a preexisting structure includes the steps of: (1) coupling the expandable tubular member to the preexisting structure by axially displacing an expansion cone; and (2) radially expanding the expandable tubular by applying direct radial pressure.

Figure 28:
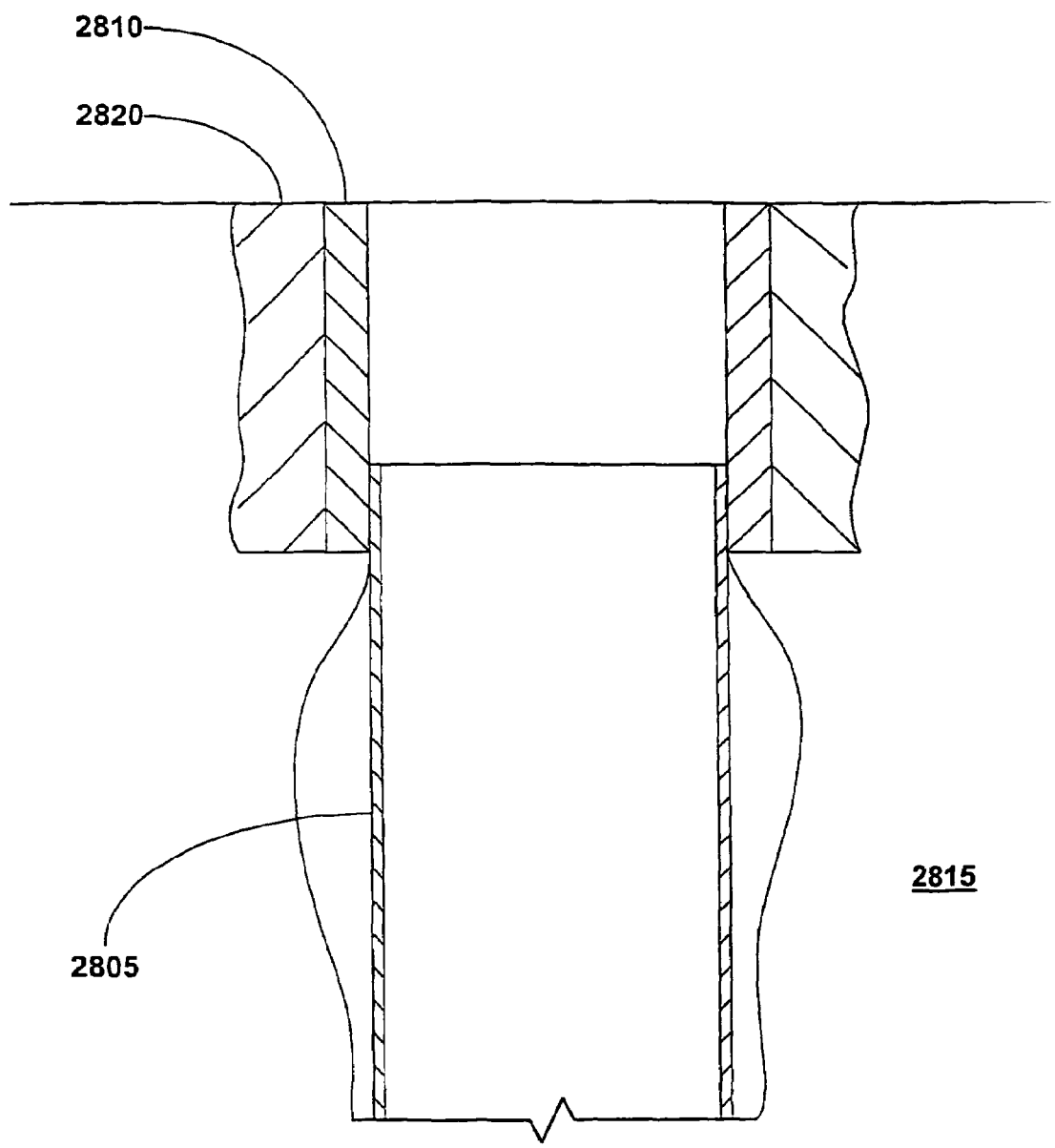
FIG. 28 is a cross-sectional illustration of an expandable tubular coupled to a preexisting structure using an expansion cone.

In an exemplary embodiment, as illustrated in FIG. 28, in step 2705, an expandable tubular member 2805 is coupled to a preexisting wellbore casing 2810 positioned within a subterranean formation 2815. In an exemplary embodiment, the wellbore casing 2810 further includes an outer annular layer 2820 of a fluidic sealing material such as, for example, cement. The expandable tubular member 2805 may be coupled to the preexisting wellbore casing 2810 using any number of conventional commercially available methods for coupling an expandable tubular member to a preexisting structure such as, for example, pulling an expansion cone through a tubular member, or pushing an expansion cone through a tubular member using a pressurized fluidic material. In an exemplary embodiment, the expandable tubular member 2805 is coupled to the preexisting structure 2810 using one or more of the apparatus and methods disclosed in the following: (1) U.S. utility patent application Ser. No. 09/454,139, filed on Dec. 3, 1999, which claimed the benefit of the filing date of U.S. provisional patent application No. 60/111,293, filed on Dec. 7, 1998; (2) U.S. utility patent application Ser. No. 09/510,913, filed on Feb. 23, 2000, which claimed the benefit of the filing date of U.S. provisional application No. 60/121,702, filed on Feb. 25, 1999; (3) U.S. utility patent application Ser. No. 09/502,350, filed on Feb. 10, 2000, which claimed the benefit of the filing date of U.S. provisional application No. 60/119,611, (4) U.S. utility patent application Ser. No. 09/440,338, filed on Nov. 15, 1999, which claimed the benefit of the filing date of U.S. provisional application No. 60/108,558, filed on Nov. 16, 1998; (5) U.S. provisional patent application No. 60/183,546, filed on Feb. 2, 2000; (6) U.S. utility patent application Ser. No. 09/523,460, filed on Mar. 10, 2000, which claimed the benefit of the filing date of U.S. provisional application No. 60/124,042, filed on Mar. 11, 1999; (7) U.S. utility patent application Ser. No. 09/512,895, filed on Feb. 24, 2000, which claimed the benefit of the filing dates of U.S. provisional application No. 60/121,841, filed on Feb. 26, 1999 and U.S. provisional application No. 60/154,047, filed on Sep. 16, 1999; (8) U.S. utility application Ser. No. 09/511,941, filed on Feb. 24, 2000, which claimed the benefit of the filing date of U.S. provisional Ser. No. 60/121,907, filed on Feb. 26, 1999; (9) U.S. utility patent application Ser. No. 09/588,946, filed on Jun. 7, 2000, which claimed the benefit of the filing date of U.S. provisional patent application Ser. No. 60/137,998, filed on Jun. 7, 1999; (10) U.S. utility patent application Ser. No. 09/559,122, filed on Apr. 26, 2000, which claimed the benefit of the filing date of U.S. provisional application No. 60/131,106, filed on Apr. 26, 1999; (11) U.S. provisional application No. 60/146,203, filed on Jul. 29, 1999; (12) U.S. provisional application No. 60/143,039, filed on Jul. 2, 1999; (13) U.S. provisional patent application Ser. No. 60/162,671, filed on Nov. 1, 1999; (14) U.S. provisional application No. 60/159,039, filed on Oct. 12, 1999; (15) U.S. provisional patent application No. 60/159,033, filed on Oct. 12, 1999; and (16) U.S. provisional patent application No. 60/165,228, filed on Nov. 12, 1999, the disclosures of which are incorporated herein by reference. In an exemplary embodiment, the amount of radial expansion provided in step 105 ranges from about 5% to 20%.

Figure 29:
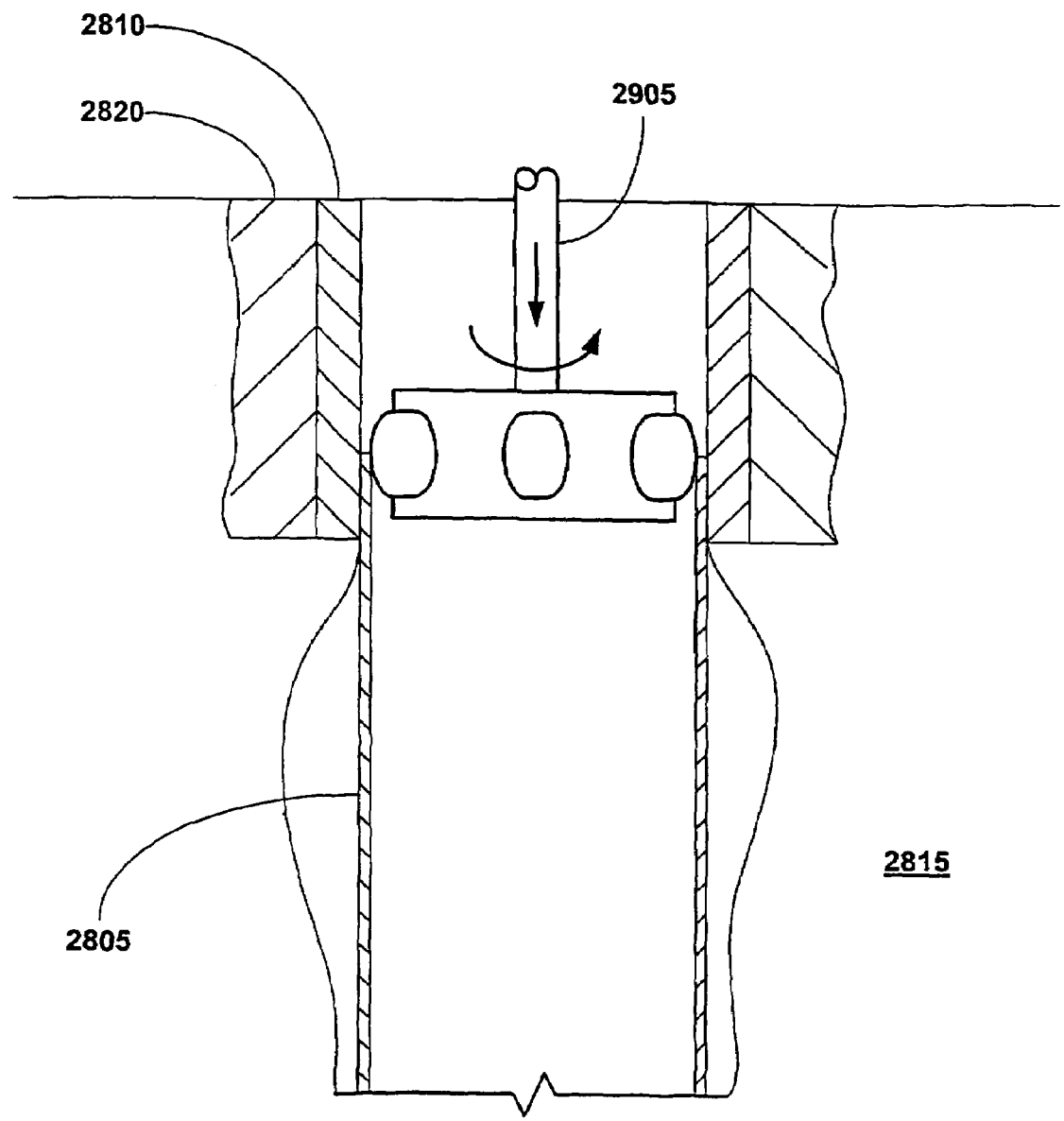
FIG. 29 is a cross-sectional illustration of the subsequent application of radial pressure to the expandable tubular member of FIG. 28.

In an exemplary embodiment, as illustrated in FIG. 29, in step 2710, at least a portion of the expandable tubular member 2805 is further radially expanded by using a radial expansion tool 2905 to apply direct radial pressure to the expandable tubular member 2805. The radial expansion tool 2905 may be any number of conventional radial expansion tools suitable for applying direct radial pressure to a tubular member. In an exemplary embodiment, the radial expansion tool 2905 is provided substantially as disclosed on one or more of the following U.S. Pat. Nos. 5,014,779 and 5,083,608, the disclosures of which are incorporated herein by reference. In an exemplary embodiment, the amount of radial expansion of the expandable tubular member 2805 provided in step 2710 ranges up to about 5%. In an exemplary embodiment, the radial contact pressures generated by the radial expansion tool 2905 in step 2710 range from about 5,000 to 140,000 psi, in order to optimally plastically deform the expandable tubular member 205 to the final desired geometry.

In an exemplary embodiment, the radial expansion provided in step 2705 is limited to the portion of the expandable tubular member 2805 that overlaps with the preexisting wellbore casing 2810. In this manner, the high compressive forces typically required to radially expand the portion of the expandable tubular member 2805 that overlaps with the preexisting wellbore casing 2810 are optimally provided.

In an alternative embodiment, the radial expansion in step 2705 radially expands the expandable tubular member 2805 to provide an inside diameter substantially equal to the inside diameter of the pre-existing wellbore casing 2810. In this manner, a mono-diameter wellbore casing is optimally provided.

Thus, the method 2700 provides a 2-step radial expansion process that utilizes: (1) a relatively quick method of radial expansion for the majority of the radial expansion; and (2) a high contact pressure method for the remaining radial expansion. In several alternative embodiments, the method 2700 is used to form or repair wellbore casings, pipelines, or structural supports.

The method 2700 further provides an apparatus and method for coupling an expandable tubular member to a preexisting structure. The expandable tubular is initially coupled to the preexisting structure by axially displacing an expansion cone within the expandable tubular member. The expandable tubular member is then further radially expanded by applying a radial force to the expandable tubular. The apparatus and method have wide application to the formation and repair of wellbore casings, pipelines, and structural supports. The apparatus and method provide an efficient and reliable method for forming and repairing wellbore casings, pipelines, and structural supports. In an exemplary implementation, the initial radial expansion of the expandable tubular member by axially displacing the expansion cone provide from about 5% to 25% of radial expansion, and the subsequent application of direct radial pressure to the expandable tubular member provides an additional radial expansion of up to about 10%. In this manner, the desired final geometry of the radially expanded tubular member is optimally achieved in a time efficient and reliable manner. This method and apparatus is particularly useful in optimally creating profiles and seal geometries for liner tops and for connections between jointed tubulars.

In several alternative embodiments, the tubular members of the various exemplary embodiments may be radially expanded and plastically deformed using, for example, other types of conventional expansion tools such as, for example, conventional roller expansion devices such as, for example, the roller expansion devices commercially available from Weatherford International.

A method of coupling an expandable tubular member to a preexisting structure has been described that includes positioning the tubular member and an expansion cone within the preexisting structure, anchoring the tubular member to the preexisting structure, axially displacing the expansion cone relative to the tubular member by pulling the expansion cone through the tubular member, and lubricating the interface between the expansion cone and the tubular member. In an exemplary embodiment, lubricating the interface between the expansion cone and the tubular member includes: injecting a lubricating fluid into the trailing edge of the interface between the expansion cone and the tubular member. In an exemplary embodiment, the lubricating fluid has a viscosity ranging from about 1 to 10,000 centipoise. In an exemplary embodiment, the injecting includes: injecting lubricating fluid into a tapered end of the expansion cone. In an exemplary embodiment, the injecting includes: injecting lubricating fluid into the area around the axial midpoint of a first tapered end of the expansion cone. In an exemplary embodiment, the injecting includes: injecting lubricating fluid into a second end of the expansion cone. In an exemplary embodiment, the injecting includes: injecting lubricating fluid into a tapered first end and a second end of the expansion cone. In an exemplary embodiment, the injecting includes: injecting lubricating fluid into an interior of the expansion cone. In an exemplary embodiment, the injecting includes: injecting lubricating fluid through an outer surface of the expansion cone. In an exemplary embodiment, the injecting includes: injecting the lubricating fluid into a plurality of discrete locations along the trailing edge portion. In an exemplary embodiment, the lubricating fluid includes drilling mud. In an exemplary embodiment, the lubricating fluid further includes: TorqTrim III, EP Mudlib, and DrillN-Slid. In an exemplary embodiment, the lubricating fluid includes TorqTrim III, EP Mudlib, and Drill-N-Slid. In an exemplary embodiment, the interface between the expansion cone and the tubular member includes: coating the interior surface of the tubular member with a lubricant. In an exemplary embodiment, lubricating the interface between the expansion cone and the tubular member includes: coating the interior surface of the tubular member with a first part of a lubricant, and applying a second part of the lubricant to the interior surface of the tubular member. In an exemplary embodiment, the lubricant includes a metallic soap. In an exemplary embodiment, the lubricant is selected from the group consisting of C-Lube-10, C-PHOS-58-M, and C-PHOS-58-R. In an exemplary embodiment, the lubricant provides a sliding friction coefficient of less than about 0.20. In an exemplary embodiment, the lubricant is chemically bonded to the interior surfaces of the tubular members. In an exemplary embodiment, the lubricant is mechanically bonded to the interior surfaces of the tubular members. In an exemplary embodiment, the lubricant is adhesively bonded to the interior surface of the tubular members. In an exemplary embodiment, the lubricant includes epoxy, molybdenum disulfide, graphite, aluminum, copper, alumisilicate and polyethylenepolyamine.

A method of coupling a tubular member to a preexisting structure has also been described that includes positioning the tubular member and an expansion cone within the preexisting structure, anchoring the tubular member to the preexisting structure, and axially displacing the expansion cone relative to the tubular member by pulling the expansion cone through the tubular member. The tubular member preferably includes: an annular member, including: a wall thickness that varies less than about 8%, a hoop yield strength that varies less than about 10%, imperfections of less than about 8% of the wall thickness, no failure for radial expansions of up to about 30%, and no necking of the walls of the annular member for radial expansions of up to about 25%.

A method of coupling a tubular member to a preexisting structure has also been described that includes injecting a lubricating fluid into the preexisting structure, positioning the tubular member and an expansion cone within the preexisting structure, anchoring the tubular member to the preexisting structure, and axially displacing the expansion cone relative to the tubular member by pulling the expansion cone through the tubular member. In an exemplary embodiment, the lubricating fluid includes: BARO-LUB GOLD-SEALJ brand drilling mud lubricant.

A method of coupling an expandable tubular member to a preexisting structure has also been described that includes positioning the expandable tubular member and an expansion cone within the preexisting structure, anchoring the expandable tubular member to the preexisting structure, and Axially displacing the expansion cone relative to the expandable tubular member by pulling the expansion cone through the expandable tubular member. In an exemplary embodiment, the expandable tubular member includes: a first tubular member, a second tubular member, and a threaded connection for coupling the first tubular member to the second tubular member. In an exemplary embodiment, the threaded connection includes: one or more sealing members for sealing the interface between the first and second tubular members. In an exemplary embodiment, the threaded connection includes a pin and box threaded connection. In an exemplary embodiment, the sealing members are positioned adjacent to an end portion of the threaded connection. In an exemplary embodiment, one of the sealing members is positioned adjacent to an end portion of the threaded connection; and wherein another one of the sealing members is not positioned adjacent to an end portion of the threaded connection. In an exemplary embodiment, a plurality of the sealing members are positioned adjacent to an end portion of the threaded connection.

A method of coupling an expandable tubular member to a preexisting structure has also been described that includes positioning the expandable tubular member and an expansion cone within the preexisting structure, anchoring the expandable tubular member to the preexisting structure, and axially displacing the expansion cone relative to the expandable tubular member by pulling the expansion cone through the expandable tubular member. In an exemplary embodiment, the expandable tubular member includes a plurality of tubular members having threaded portions that are coupled to one another by the process of: coating the threaded portions of the tubular members with a sealant, coupling the threaded portions of the tubular members, and curing the sealant. In an exemplary embodiment, the sealant is selected from the group consisting of epoxies, thermosetting sealing compounds, curable sealing compounds, and sealing compounds having polymerizable materials. In an exemplary embodiment, the method further includes: initially curing the sealant prior to radially expanding the tubular members, and finally curing the sealant after radially expanding the tubular members. In an exemplary embodiment, the sealant can be stretched up to about 30 to 40 percent after curing without failure. In an exemplary embodiment, the sealant is resistant to conventional wellbore fluidic materials. In an exemplary embodiment, the material properties of the sealant are substantially stable for temperatures ranging from about 0 to 450 EF. In an exemplary embodiment, the method further includes: applying a primer to the threaded portions of the tubular members prior to coating the threaded portions of the tubular members with the sealant. In an exemplary embodiment, the primer includes a curing catalyst. In an exemplary embodiment, the primer is applied to the threaded portion of one of the tubular members and the sealant is applied to the threaded portion of the other one of the tubular members. In an exemplary embodiment, the primer includes a curing catalyst.

A method of coupling a tubular member to a preexisting structure has also been described that includes positioning the tubular member and an expansion cone within the preexisting structure, anchoring the tubular member to the preexisting structure, and axially displacing the expansion cone relative to the tubular member by pulling the expansion cone through the expandable tubular member. In an exemplary embodiment, the tubular member includes: a pair of rings for engaging the preexisting structure, and a sealing element positioned between the rings for sealing the interface between the tubular member and the preexisting structure.

A method of coupling a tubular member to a preexisting structure has also been described that includes positioning the expandable tubular member and an expansion cone within the preexisting structure, anchoring the expandable tubular member to the preexisting structure, and axially displacing the expansion cone relative to the expandable tubular member by pulling the expansion cone through the expandable tubular member. In an exemplary embodiment, the tubular member includes one or more slots. In an exemplary embodiment, the slots are provided at a preexpanded portion of the tubular member. In an exemplary embodiment, the slots are provided at a non-preexpanded portion of the tubular member.

A method of coupling a tubular member to a preexisting structure has also been described that includes positioning the expandable tubular member and an expansion cone within the preexisting structure, anchoring the expandable tubular member to the preexisting structure, and axially displacing the expansion cone relative to the expandable tubular member by pulling the expansion cone through the expandable tubular member. In an exemplary embodiment, the tubular member includes: a first preexpanded portion, an intermediate portion coupled to the first preexpanded portion including a sealing element, and a second preexpanded portion coupled to the intermediate portion.

A method of coupling a tubular member to a preexisting structure has also been described that includes positioning the expandable tubular member and an expansion cone within the preexisting structure, anchoring the expandable tubular member to the preexisting structure, and axially displacing the expansion cone relative to the expandable tubular member by pulling the expansion cone through the expandable tubular member by applying an axial force to the expansion cone. The axial force preferably includes a substantially constant axial force, and an increased axial force. In an exemplary embodiment, the increased axial force is provided on a periodic basis. In an exemplary embodiment, the increased axial force is provided on a random basis. In an exemplary embodiment, the ratio of the increased axial force to the substantially constant axial force ranges from about 5 to 40%.

A method of coupling a tubular member to a preexisting structure has also been described that includes positioning the tubular member and an expansion cone within the preexisting structure, anchoring the tubular member to the preexisting structure, and axially displacing the expansion cone relative to the expandable tubular member by pushing and pulling the expansion cone through the expandable tubular member. In an exemplary embodiment, pushing the expansion cone includes: injecting a pressurized fluidic material into contact with the expansion cone.

A method of coupling a tubular member to a preexisting structure has also been described that includes positioning the tubular member and an expansion cone within the preexisting structure, anchoring the tubular member to the preexisting structure, axially displacing the expansion cone relative to the tubular member by pulling the expansion cone through the expandable tubular member, and injecting a curable fluidic sealing material between the tubular member and the preexisting structure prior to axially displacing the expansion cone.

A method of coupling a tubular member to a preexisting structure has also been described that includes positioning the tubular member and an expansion cone within the preexisting structure, anchoring the tubular member to the preexisting structure by increasing the size of the expansion cone, and axially displacing the expansion cone relative to the tubular member by pulling the expansion cone through the tubular member.

A method of coupling a tubular member to a preexisting structure has also been described that includes positioning the tubular member and an expansion cone within the preexisting structure, anchoring the tubular member to the preexisting structure by heating a portion of the tubular member, and axially displacing the expansion cone relative to the tubular member by pulling the expansion cone through the tubular member.

A method of coupling an expandable tubular member to a preexisting structure has also been described that includes positioning the expandable tubular member, an expansion cone, and an anchoring device within the preexisting structure, positioning the anchoring device above the expansion cone, anchoring the expandable tubular member to the preexisting structure using the anchoring device, and axially displacing the expansion cone.

A method of coupling an expandable tubular member to a preexisting structure has also been described that includes positioning the tubular member and an expansion cone within the preexisting structure, explosively anchoring the tubular member to the preexisting structure, and axially displacing the expansion cone relative to the tubular member.

A method of coupling an expandable tubular to a preexisting structure has also been described that includes fixing the position of an expansion cone within the preexisting structure, driving the expandable tubular member onto the expansion cone in a first direction, and axially displacing the expansion cone in a second direction relative to the expandable tubular member. In an exemplary embodiment, the first and second directions are different.

A method of coupling an expandable tubular member to a preexisting structure has also been described that includes placing the expandable tubular, an expansion cone, and a resilient anchor within the preexisting structure, releasing the resilient anchor, and axially displacing the expansion cone within the expandable tubular member.

A method of coupling an expandable tubular member to a preexisting structure has also been described that includes placing the expandable tubular member, an expansion cone, and an anchor into the preexisting structure, anchoring the expandable tubular member to the preexisting structure by: pivoting one or more engagement elements, and axially displacing the expansion cone. In an exemplary embodiment, pivoting the engagement elements includes: actuating the engagement elements. In an exemplary embodiment, pivoting the engagement elements includes: placing a quantity of a fluidic material onto the engagement elements. In an exemplary embodiment, pivoting the engagement elements includes: displacing the expandable tubular member.

A method of coupling an expandable tubular member to a preexisting structure has also been described that includes placing the expandable tubular member and an expansion cone into the preexisting structure, placing a quantity of a fluidic material onto the expandable tubular member to anchor the expandable tubular member to the preexisting structure, and axially displacing the expansion cone. In an exemplary embodiment, the fluidic material includes a barite plug. In an exemplary embodiment, the fluidic material includes a flex plug.

A method of coupling an expandable tubular member to a preexisting structure has also been described that includes positioning the expandable tubular member and an expansion cone into the preexisting structure, anchoring the expandable tubular member to the preexisting structure by injecting a quantity of a hardenable fluidic material into the preexisting structure, at least partially curing the hardenable fluidic sealing material, and Axially displacing the expansion cone.

A method of coupling an expandable tubular member to a preexisting structure has also been described that includes placing the expandable tubular member and an expansion cone within the preexisting structure, and applying an axial force to the expandable tubular member in a downward direction.

A method of coupling an expandable tubular member to a preexisting structure has also been described that includes placing the expandable tubular member and an expansion cone within the preexisting structure, injecting a quantity of a first fluidic material having a first density into the region of the preexisting structure outside of the expandable tubular member, and injecting a quantity of a second fluidic material having a second density into a portion of the expandable tubular member below the expansion cone. In an exemplary embodiment, the second density is greater than the first density.

A method of coupling an expandable tubular member to a preexisting structure has also been described that includes placing the expandable tubular member and an expansion cone into the preexisting structure, anchoring the expandable tubular member to the preexisting structure, applying an axial force to the expansion cone, and pressurizing an interior portion of the expandable tubular member below the expansion cone.

A method of coupling an expandable tubular member to a preexisting structure has also been described that includes placing the expandable tubular member and an expansion cone into the preexisting structure, and applying an axial force to the expandable tubular member.

An apparatus for coupling a tubular member to a preexisting structure has also been described that includes an expandable tubular member, an anchoring device adapted to couple the expandable tubular member to the preexisting structure, and an expansion cone movably coupled to the expandable tubular member and adapted to radially expand the expandable tubular member, including: a housing including a tapered first end and a second end, one or more grooves formed in the outer surface of the tapered first end, and one or more axial flow passages fluidicly coupled to the grooves. In an exemplary embodiment, the grooves include circumferential grooves. In an exemplary embodiment, the grooves include spiral grooves. In an exemplary embodiment, the grooves are concentrated around the axial midpoint of the tapered portion of the housing. In an exemplary embodiment, the axial flow passages include axial grooves. In an exemplary embodiment, the axial grooves are spaced apart by at least about 3 inches in the circumferential direction. In an exemplary embodiment, the axial grooves extend from the tapered first end of the body to the grooves. In an exemplary embodiment, the axial grooves extend from the second end of the body to the grooves. In an exemplary embodiment, the axial grooves extend from the tapered first end of the body to the second end of the body. In an exemplary embodiment, the axial flow passages are positioned within the housing of the expansion cone. In an exemplary embodiment, the axial flow passages extend from the tapered first end of the body to the grooves. In an exemplary embodiment, the axial flow passages extend from the tapered first end of the body to the second end of the body. In an exemplary embodiment, the axial flow passages extend from the second end of the body to the grooves. In an exemplary embodiment, one or more of the flow passages include inserts having restricted flow passages. In an exemplary embodiment, one or more of the axial flow passages include filters. In an exemplary embodiment, the cross sectional area of the grooves is greater than the cross sectional area of the axial flow passages. In an exemplary embodiment, the cross-sectional area of the grooves ranges from about $2 \times 10^{-4}$ in to $5 \times 10^{-2}$ in$^2$. In an exemplary embodiment, the cross-sectional area of the axial flow passages ranges from about $2 \times 10^{-4}$ in$^2$ to $5 \times 10^{-2}$ in$^2$. In an exemplary embodiment, the angle of attack of the first tapered end of the body ranges from about 10 to 30 degrees. In an exemplary embodiment, the grooves are concentrated in a trailing edge portion of the tapered first end. In an exemplary embodiment, the angle of inclination of the axial flow passages relative to the longitudinal axis of the expansion cone is greater than the angle of attack of the first tapered end. In an exemplary embodiment, the grooves include: a flow channel having a first radius of curvature, a first shoulder positioned on one side of the flow channel having a second radius of curvature, and a second shoulder positioned on the other side of the flow channel having a third radius of curvature. In an exemplary embodiment, the first, second and third radii of curvature are substantially equal. In an exemplary embodiment, the axial flow passages include: a flow channel having a first radius of curvature, a first shoulder positioned on one side of the flow channel having a second radius of curvature, and a second shoulder positioned on the other side of the flow channel having a third radius of curvature. In an exemplary embodiment, the first, second and third radii of curvature are substantially equal. In an exemplary embodiment, the second radius of curvature is greater than the third radius of curvature.

An apparatus for coupling an expandable tubular member to a preexisting structure has also been described that includes an expandable tubular member, an anchoring device adapted to couple the expandable tubular member to the preexisting structure, and an expansion cone movably coupled to the expandable tubular member and adapted to radially expand the expandable tubular member. In an exemplary embodiment, the expandable tubular member includes: an annular member, having: a wall thickness that varies less than about 8%, a hoop yield strength that varies less than about 10%; imperfections of less than about 8% of the wall thickness, no failure for radial expansions of up to about 30%, and no necking of the walls of the annular member for radial expansions of up to about 25%.

An apparatus for coupling an expandable tubular member to a preexisting structure has also been described that includes an expandable tubular member, an anchoring device adapted to couple the expandable tubular member to the preexisting structure, and an expansion cone movably coupled to the expandable tubular member and adapted to radially expand the expandable tubular member. In an exemplary embodiment, the expandable tubular member includes: a first tubular member, a second tubular member, and a threaded connection for coupling the first tubular member to the second tubular member. In an exemplary embodiment, the threaded connection includes: one or more sealing members for sealing the interface between the first and second tubular members. In an exemplary embodiment, the threaded connection includes a pin and box threaded connection. In an exemplary embodiment, the sealing members are positioned adjacent to an end portion of the threaded connection. In an exemplary embodiment, one of the sealing members is positioned adjacent to an end portion of the threaded connection, and another one of the sealing members is not positioned adjacent to an end portion of the threaded connection. In an exemplary embodiment, the plurality of the sealing members are positioned adjacent to an end portion of the threaded connection.

An apparatus for coupling an expandable tubular member to a preexisting structure has also been described that includes an expandable tubular member, an anchoring device adapted to couple the expandable tubular member to the preexisting structure, and an expansion cone movably coupled to the expandable tubular member and adapted to radially expand the expandable tubular member. In an exemplary embodiment, the expandable tubular member includes: a layer of a lubricant coupled to the interior surface of the tubular member. In an exemplary embodiment, the lubricant includes a metallic soap. In an exemplary embodiment, the lubricant is selected from the group consisting of C-Lube-10, C-PHOS-58-M, and C-PHOS-58-R. In an exemplary embodiment, the lubricant provides a sliding friction coefficient of less than about 0.20. In an exemplary embodiment, the lubricant is chemically bonded to the interior surface of the expandable tubular member. In an exemplary embodiment, the lubricant is mechanically bonded to the interior surface of the expandable tubular member. In an exemplary embodiment, the lubricant is adhesively bonded to the interior surface of the expandable tubular member. In an exemplary embodiment, the lubricant includes epoxy, molybdenum disulfide, graphite, aluminum, copper, alumisilicate and polyethylenepolyamine.

An apparatus for coupling an expandable tubular member to a preexisting structure has also been described that includes an expandable tubular member, an anchoring device adapted to couple the expandable tubular member to the preexisting structure, and an expansion cone movably coupled to the expandable tubular member and adapted to radially expand the expandable tubular member. In an exemplary embodiment, the expandable tubular member includes: a pair of tubular members having threaded portions coupled to one another, and a quantity of a sealant within the threaded portions of the tubular members. In an exemplary embodiment, the sealant is selected from the group consisting of epoxies, thermosetting sealing compounds, curable sealing compounds, and sealing compounds having polymerizable materials. In an exemplary embodiment, the sealant includes an initial cure cycle and a final cure cycle. In an exemplary embodiment, the sealant can be stretched up to about 30 to 40 percent without failure. In an exemplary embodiment, the sealant is resistant to conventional wellbore fluidic materials. In an exemplary embodiment, the material properties of the sealant are substantially stable for temperatures ranging from about 0 to 450 EF. In an exemplary embodiment, the threaded portions of the tubular members include a primer for improving the adhesion of the sealant to the threaded portions.

An apparatus for coupling an expandable tubular member to a preexisting structure has also been described that includes an expandable tubular member, an anchoring device adapted to couple the expandable tubular member to the preexisting structure, and an expansion cone movably coupled to the expandable tubular member and adapted to radially expand the expandable tubular member. In an exemplary embodiment, the expandable tubular member includes: a pair of rings for engaging the preexisting structure, and a sealing element positioned between the rings for sealing the interface between the tubular member and the preexisting structure.

An apparatus for coupling an expandable tubular member to a preexisting structure has also been described that includes an expandable tubular member, an anchoring device adapted to couple the expandable tubular member to the preexisting structure, and an expansion cone movably coupled to the expandable tubular member and adapted to radially expand the expandable tubular member. In an exemplary embodiment, the expandable tubular member includes one or more slots. In an exemplary embodiment, the slots are provided at a preexpanded portion of the expandable tubular member. In an exemplary embodiment, the slots are provided at a non-preexpanded portion of the tubular member.

An apparatus for coupling an expandable tubular member to a preexisting structure has also been described that includes an expandable tubular member, an anchoring device adapted to couple the expandable tubular member to the preexisting structure, and an expansion cone movably coupled to the expandable tubular member and adapted to radially expand the expandable tubular member. In an exemplary embodiment, the expandable tubular member includes: a first preexpanded portion, an intermediate portion coupled to the first preexpanded portion including a sealing element, and a second preexpanded portion coupled to the intermediate portion.

An apparatus for coupling an expandable tubular member to a preexisting structure has also been described that includes an expandable tubular member, an anchoring device adapted to couple the expandable tubular member to the preexisting structure, an expansion cone movably coupled to the expandable tubular member and adapted to radially expand the expandable tubular member, and a valveable fluid passage coupled to the anchoring device.

An apparatus for coupling an expandable tubular member to a preexisting structure has also been described that includes a first support member, a second support member coupled to the first support member, an expansion cone coupled to the first support member, an expandable tubular member coupled to the expansion cone, and an anchoring device coupled to the second support member adapted to couple the expandable tubular member to the preexisting structure. In an exemplary embodiment, the anchoring device is positioned above the expansion cone. In an exemplary embodiment, the outside diameter of the expansion cone is greater than the inside diameter of the expandable tubular member. In an exemplary embodiment, the outside diameter of the expansion cone is approximately equal to the outside diameter of the expandable tubular member.

An apparatus for coupling an expandable tubular member to a preexisting structure has also been described that includes a first support member, a second support member coupled to the first support member, an expansion cone coupled to the first support member, an expandable tubular member coupled to the expansion cone, and an explosive anchoring device coupled to the second support member adapted to couple the expandable tubular member to the preexisting structure.

An apparatus for coupling an expandable tubular member to a preexisting structure has also been described that includes a support member, an expandable expansion cone coupled to the support member, and an expandable tubular member coupled to the expansion cone.

An apparatus for coupling an expandable tubular member to a preexisting structure has also been described that includes a support member, an expandable expansion cone coupled to the support member, and an expandable tubular member coupled to the expandable expansion cone. In an exemplary embodiment, the expandable tubular member includes one or more anchoring devices. In an exemplary embodiment, the expandable tubular member includes a slotted end portion.

An apparatus for coupling an expandable tubular to a preexisting structure has also been described that includes a support member, an expansion cone coupled to the support member, an expandable tubular member coupled to the expansion cone including one or more shape memory metal inserts, and a heater coupled to the support member in opposing relation to the shape memory metal inserts.

An apparatus for coupling an expandable tubular member to a preexisting structure has also been described that includes a support member, An expansion cone coupled to the support member, an expandable tubular member coupled to the expandable expansion cone, and a resilient anchor coupled to the expandable tubular member. In an exemplary embodiment, the resilient anchor includes a resilient scroll. In an exemplary embodiment, the resilient anchor includes one or more resilient arms. In an exemplary embodiment, the resilient anchor includes: one or more resilient radially oriented elements. In an exemplary embodiment, the resilient anchor is adapted to mate with the expansion cone.

An expandable tubular member has also been described that includes an expandable tubular body, one or more resilient panels coupled to the expandable tubular body, and a release member releasably coupled to the resilient panels adapted to controllably release the resilient panels.

An apparatus for coupling an expandable tubular member to a preexisting structure has also been described that includes a support member, An expansion cone coupled to the support member, an expandable tubular member coupled to the expandable expansion cone, and an anchor coupled to the expandable tubular member, including: one or more spikes pivotally coupled to the expandable tubular member for engaging the preexisting structure. In an exemplary embodiment, the apparatus further includes one or more corresponding actuators for pivoting the spikes.

An apparatus for coupling an expandable tubular member to a preexisting structure has also been described that includes a support member, An expansion cone coupled to the support member, an expandable tubular member coupled to the expandable expansion cone, and an anchor coupled to the expandable tubular member, including: one or more petal baskets pivotally coupled to the expandable tubular member. In an exemplary embodiment, the apparatus further includes one or more corresponding actuators for pivoting the petal baskets.

An apparatus for coupling an expandable tubular member to a preexisting structure has also been described that includes a support member, an expansion cone coupled to the support member, an expandable tubular member coupled to the expansion cone, including: a slotted portion provided at one end of the expandable tubular member.

An apparatus for coupling an expandable tubular member to a preexisting structure has also been described that includes a support member, an expansion cone, an expandable tubular member coupled to the expansion cone, a coupling device coupled to the support member and an end portion of the expandable tubular member, and a mass coupled to the end portion of the expandable tubular member. In an exemplary embodiment, the weight of the mass is greater than about 50 to 100% of the yield strength of the expandable tubular member.

An apparatus for coupling an expandable tubular member to a preexisting structure has also been described that includes a support member including a fluid passage, an expansion cone coupled to the support member, an expandable tubular member coupled to the expansion cone, a slip joint coupled to the expansion cone, an end plate coupled to the slip joint, a fluid chamber coupled to the fluid passage, the fluid chamber defined by the interior portion of the expandable tubular member between the expansion cone and the end plate.

A method of coupling a tubular member to a preexisting structure has been described that includes positioning the tubular member and an expansion cone within the preexisting structure, axially displacing the expansion cone, removing the expansion cone, and applying direct radial pressure to the first tubular member. In an exemplary embodiment, axially displacing the expansion cone includes pressurizing at least a portion of the interior of the tubular member. In an exemplary embodiment, axially displacing the expansion cone includes: injecting a fluidic material into the tubular member. In an exemplary embodiment, axially displacing the expansion cone includes: applying a tensile force to the expansion cone. In an exemplary embodiment, axially displacing the expansion cone includes: displacing the expansion cone into the tubular member. In an exemplary embodiment, axially displacing the expansion cone includes: displacing the expansion cone out of the tubular member. In an exemplary embodiment, axially displacing the expansion cone radially expands the tubular member by about 10% to 20%. In an exemplary embodiment, applying direct radial pressure to the first tubular member radially expands the tubular member by up to about 5%. In an exemplary embodiment, applying direct radial pressure to the tubular member includes applying a radial force at discrete locations. In an exemplary embodiment, the preexisting structure includes a wellbore casing. In an exemplary embodiment, the preexisting structure includes a pipeline. In an exemplary embodiment, the preexisting structure includes a structural support.

An apparatus also has been described that includes a tubular member coupled to a preexisting structure. The tubular member is coupled to the preexisting structure by the process of: positioning the tubular member and an expansion cone within the preexisting structure, axially displacing the expansion cone, removing the expansion cone, and applying direct radial pressure to the tubular member. In an exemplary embodiment, axially displacing the expansion cone includes: pressurizing at least a portion of the interior of the tubular member. In an exemplary embodiment, axially displacing the expansion cone includes: injecting a fluidic material into the tubular member. In an exemplary embodiment, axially displacing the expansion cone includes: applying a tensile force to the expansion cone. In an exemplary embodiment, axially displacing the expansion cone includes: displacing the expansion cone into the tubular member. In an exemplary embodiment, axially displacing the expansion cone includes: displacing the expansion cone out of the tubular member. In an exemplary embodiment, axially displacing the expansion cone radially expands the tubular member by about 10% to 20%. In an exemplary embodiment, applying direct radial pressure to the tubular member radially expands the tubular member by up to about 5%. In an exemplary embodiment, applying direct radial pressure to the tubular member includes applying a radial force at discrete locations. In an exemplary embodiment, the preexisting structure includes a wellbore casing. In an exemplary embodiment, the preexisting structure includes a pipeline. In an exemplary embodiment, the preexisting structure includes a structural support.

Although this detailed description has shown and described illustrative embodiments of the invention, this description contemplates a wide range of modifications, changes, and substitutions. In some instances, one may employ some features of the present invention without a corresponding use of the other features. Accordingly, it is appropriate that readers should construe the appended claims broadly, and in a manner consistent with the scope of the invention.

What is claimed is:

1. An apparatus for coupling a tubular member to a preexisting structure, comprising:
   a tubular support member comprising a fluid passage;
   a tubular expansion cone coupled to an end of the support member;
   a tubular member coupled to an end of the tubular expansion device;
   a slip joint coupled to the tubular expansion cone;
   an end plate coupled to the slip joint; and
   a fluid chamber coupled to the fluid passage, the fluid chamber defined by the interior portion of the tubular member between the tubular expansion cone and the end plate.

2. An apparatus for radially expanding and plastically deforming a tubular member, comprising:
   an expansion device adapted to radially expand and plastically deform the tubular member;
   a gripping device adapted to prevent movement of the tubular member relative to the expansion device in one or more directions; and
   a slip joint coupled between the expansion device and the gripping device adapted to permit movement of the expansion device relative to the gripping device.

3. The apparatus of claim 2, wherein the expansion device comprises:
   a tubular expansion cone.

4. The apparatus of claim 2, wherein the gripping device comprises:
   one or more slips.

5. The apparatus of claim 2, wherein the gripping device is adapted to permit movement of the tubular member relative to the expansion device in one or more other directions.

6. A method of radially expanding and plastically deforming a tubular member, comprising:
   positioning an expansion device within a portion of the tubular member;
   displacing the expansion device relative to the tubular member to radially expand and plastically deform the tubular member; and
   preventing displacement of the tubular member in the direction of the displacement of the expansion device during the radial expansion and plastic deformation of the tubular member using an elastic element that is coupled to the expansion device.

7. The method of claim 6, wherein displacing the expansion device relative to the tubular member to radially expand and plastically deform the tubular member further comprises:
   pressurizing and de-pressurizing an interior portion of the tubular member.

8. The method of claim 7, wherein pressurizing and de-pressurizing an interior portion of the tubular member comprises:
   pressurizing and de-pressurizing the interior portion of a radially expanded and plastically deformed portion of the tubular member.

9. The method of claim 6, wherein displacing the expansion device relative to the tubular member to radially expand and plastically deform the tubular member further comprises:
   fluidicly sealing an interior portion of the tubular member.

10. The method of claim 9, wherein fluidicly sealing an interior portion of the tubular member comprises:
    fluidicly sealing the interior portion of a radially expanded and plastically deformed portion of the tubular member.

11. The method of claim 6, wherein displacing the expansion device relative to the tubular member to radially expand and plastically deform the tubular member further comprises:
    pressurizing a variable sized pressure chamber defined within the tubular member.

12. The method of claim 11, wherein pressurizing the variable sized pressure chamber defined within the tubular member comprises:
    pressurizing a variable sized pressure chamber defined within the radially expanded and plastically deformed portion of the tubular member.

13. The method of claim 6, further comprising:
    defining a pressure chamber within the tubular member.

14. The method of claim 13, wherein the pressure chamber is movable relative to the tubular member.

15. The method of claim 13, wherein the pressure chamber is expandable.

16. The method of claim 13, wherein the pressure chamber is movable relative to the tubular member; and wherein the pressure chamber is expandable.

17. An apparatus for radially expanding and plastically deforming a tubular member comprising:

an expansion device adapted to radially expand and plastically deform the tubular member; and an expandable pressure chamber defined within the tubular member operably coupled to the expansion device that is elastically coupled to an end of the expansion device.

18. The apparatus of claim 17, wherein the pressure chamber is movable relative to the tubular member.

19. An apparatus for radially expanding and plastically deforming a tubular member, comprising:

an expansion device adapted to radially expand and plastically deform the tubular member; and a pressure chamber defined within the tubular member that is movable relative to the tubular member and elastically coupled to the expansion device.

20. The apparatus of claim 19, wherein the pressure chamber is expandable.

21. A system of radially expanding and plastically deforming a tubular member, comprising:

means for positioning an expansion device within a portion of the tubular member;

means for displacing the expansion device relative to the tubular member to radially expand and plastically deform the tubular member;

means for preventing displacement of the tubular member in the direction of the displacement of the expansion device during the radial expansion and plastic deformation of the tubular member.

22. The system of claim 21, wherein means for displacing the expansion device relative to the tubular member to radially expand and plastically deform the tubular member further comprises:

means for pressurizing and de-pressurizing an interior portion of the tubular member.

23. The system of claim 22, wherein means for pressurizing and de-pressurizing an interior portion of the tubular member comprises:

means for pressurizing and de-pressurizing the interior portion of a radially expanded and plastically deformed portion of the tubular member.

24. The system of claim 21, wherein means for displacing the expansion device relative to the tubular member to radially expand and plastically deform the tubular member further comprises:

means for fluidicly sealing an interior portion of the tubular member.

25. The system of claim 24, wherein means for fluidicly sealing an interior portion of the tubular member comprises:

means for fluidicly sealing the interior portion of a radially expanded and plastically deformed portion of the tubular member.

26. The system of claim 21, wherein means for displacing the expansion device relative to the tubular member to radially expand and plastically deform the tubular member further comprises:

means for pressurizing a variable sized pressure chamber defined within the tubular member.

27. The system of claim 26, wherein means for pressurizing the variable sized pressure chamber defined within the tubular member comprises:

means for pressurizing a variable sized pressure chamber defined within the radially expanded and plastically deformed portion of the tubular member.

28. The system of claim 21, further comprising:
means for defining a pressure chamber within the tubular member.

29. The system of claim 28, wherein the pressure chamber is movable relative to the tubular member.

30. The system of claim 28, wherein the pressure chamber is expandable.

31. The system of claim 28, wherein the pressure chamber is movable relative to the tubular member; and wherein the pressure chamber is expandable.

32. An apparatus for radially expanding and plastically deforming a tubular member, comprising:

an expansion device adapted to radially expand and plastically deform the tubular member;

a gripping device adapted to prevent movement of the tubular member relative to the expansion device in one or more directions; and an elastic element coupled between the expansion device and the gripping device adapted to permit movement of the expansion device relative to the gripping device.

33. An apparatus for radially expanding and plastically deforming a tubular member, comprising:

an expansion device adapted to radially expand and plastically deform the tubular member; and a resettable elastic pressure chamber operably coupled to the expansion device for displacing the expansion device relative to the tubular member in an axial direction.

34. A method of radially expanding and plastically deforming a tubular member, comprising:

positioning an expansion device within a portion of the tubular member;

displacing the expansion device in an axial direction relative to the tubular member to radially expand and plastically deform the tubular member;

preventing displacement of the tubular member in the direction of the displacement of the expansion device during the radial expansion and plastic deformation of the tubular member; and repeatedly pressurizing and de-pressurizing an interior portion of the tubular member.

35. A system for radially expanding and plastically deforming a tubular member, comprising:

means for positioning an expansion device within a portion of the tubular member;

means for displacing the expansion device relative to the tubular member to radially expand and plastically deform the tubular member;

means for preventing displacement of the tubular member in the direction of the displacement of the expansion device during the radial expansion and plastic deformation of the tubular member; and means for repeatedly pressurizing and de-pressurizing an interior portion of the tubular member.

36. A method of radially expanding and plastically deforming a tubular member, comprising:

positioning an expansion device within a portion of the tubular member;

displacing the expansion device relative to the tubular member to radially expand and plastically deform the tubular member;

preventing displacement of the tubular member in the direction of the displacement of the expansion device during the radial expansion and plastic deformation of the tubular member; and defining a pressure chamber within the tubular member; wherein the pressure chanter is movable relative to the tubular member in an axial direction.

37. A system for radially expanding and plastically deforming a tubular member, comprising:
- means for positioning an expansion device within a portion of the tubular member;
- means for displacing the expansion device relative to the tubular member to radially expand and plastically deform the tubular member;
- means for preventing displacement of the tubular member in the direction of the displacement of the expansion device during the radial expansion and plastic deformation of the tubular member; and
- means for defining a pressure chamber within the tubular member;
- wherein the pressure chamber is movable relative to the tubular member in an axial direction.

* * * * *